United States Patent
Mobley et al.

(10) Patent No.: US 7,218,901 B1
(45) Date of Patent: May 15, 2007

(54) AUTOMATIC FREQUENCY CONTROL OF MULTIPLE CHANNELS

(75) Inventors: Joseph Graham Mobley, Dunwoody, GA (US); Jiening Ao, Suwanee, GA (US); Steven E. Blashewski, Duluth, GA (US); Florin Farcas, Lawrenceville, GA (US); John A. Ritchie, Jr., Duluth, GA (US); Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 486 days.

(21) Appl. No.: 10/245,853

(22) Filed: Sep. 17, 2002

Related U.S. Application Data

(60) Provisional application No. 60/397,987, filed on Jul. 23, 2002, provisional application No. 60/342,627, filed on Dec. 20, 2001, provisional application No. 60/338,868, filed on Nov. 13, 2001, provisional application No. 60/322,966, filed on Sep. 18, 2001.

(51) Int. Cl.
*H04B 1/18* (2006.01)
*H04B 7/00* (2006.01)

(52) U.S. Cl. .............. 455/182.2; 455/192.2; 455/258

(58) Field of Classification Search .......... 455/164.1, 455/164.2, 127.1, 196.1, 192.1, 184.1, 199, 455/62, 192.2, 182.2, 258; 370/252, 203
See application file for complete search history.

(56) References Cited

U.S. PATENT DOCUMENTS

| 3,573,355 | A |   | 4/1971 | Cavelos ..................... 178/5.8 |
| 4,259,744 | A |   | 3/1981 | Junod et al. ................. 455/103 |
| 5,109,544 | A | * | 4/1992 | Mittel et al. ............. 455/182.2 |
| 5,335,354 | A | * | 8/1994 | Koike ..................... 455/192.2 |

(Continued)

FOREIGN PATENT DOCUMENTS

EP     0 817 418     1/1998

OTHER PUBLICATIONS

A New Frequency Detector for Orthogonal . . . Daffara F. et al.

(Continued)

*Primary Examiner*—Tilahun Gesesse

(57) ABSTRACT

An architecture for providing high-speed access over frequency-division multiplexed (FDM) channels allows transmission of ethernet frames and/or other data across a cable transmission network or other form of FDM transport. The architecture involves downstream and upstream FDM multiplexing techniques to allow contemporaneous, parallel communications across a plurality of frequency channels. Moreover, an automatic frequency control resolves some issues of a free-running clock in an upstream tuner of the central concentrator by performing adjustments based on the average frequency error of a number of active upstream tones. In the preferred embodiments of the present invention, the automatic frequency control (AFC) utilizes a feedback loop for at least each active upstream tone. Also, the average of the active upstream tones is determined and is utilized in providing feedback to adjust the automatic frequency control (AFC).

18 Claims, 62 Drawing Sheets

U.S. PATENT DOCUMENTS

| | | | |
|---|---|---|---|
| 5,450,621 A | 9/1995 | Kianush et al. | 455/192.2 |
| 5,678,223 A | 10/1997 | Callaway, Jr. et al. | 455/324 |
| 5,774,799 A * | 6/1998 | Croft et al. | 455/192.2 |
| 5,963,851 A * | 10/1999 | Blanco et al. | 455/75 |
| 5,970,053 A * | 10/1999 | Schick et al. | 370/252 |
| 5,970,105 A * | 10/1999 | Dacus | 375/344 |
| 5,987,518 A | 11/1999 | Gotwald | 709/230 |
| 6,028,900 A | 2/2000 | Taura et al. | 375/344 |
| 6,229,991 B1 * | 5/2001 | Hietala et al. | 455/75 |
| 6,816,716 B2 * | 11/2004 | Shohara | 455/196.1 |
| 6,985,432 B1 * | 1/2006 | Hadad | 370/203 |
| 2002/0007494 A1 | 1/2002 | Hodge | 725/109 |

OTHER PUBLICATIONS

"DAVIC 1.5 Specification, DAVIC Intranet, Technical Platform Specification (Provisional Document Structure), Revision 1.0," Digital Audio-Visual Council, Geneva, Switzerland, 1999, pp. i-xii and 1-27.

"DAVIC 1.5 Specification, DAVIC Cable Modem (Technical Specification), Revision 3.1," Digital Audio-Visual Council, Geneva, Switzerland, 1999, pp. 1-134.

"Data-Over-Cable Service Interface Specifications, Radio Frequency Interface Specification", SP-RFI-I05-991105, Cable Television Laboratories, Inc., 1999, pp. i-xii and 1-202.

\* cited by examiner

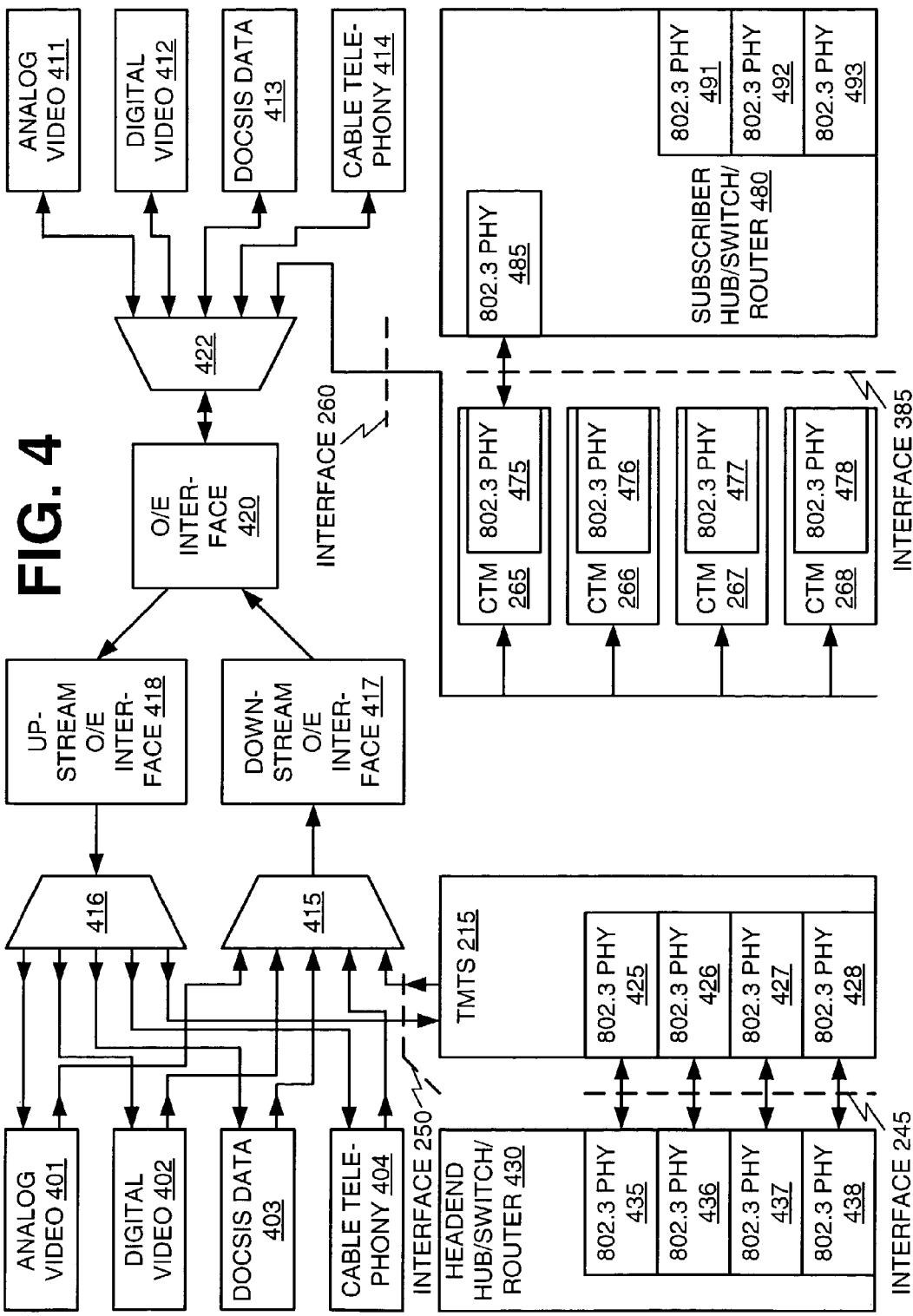

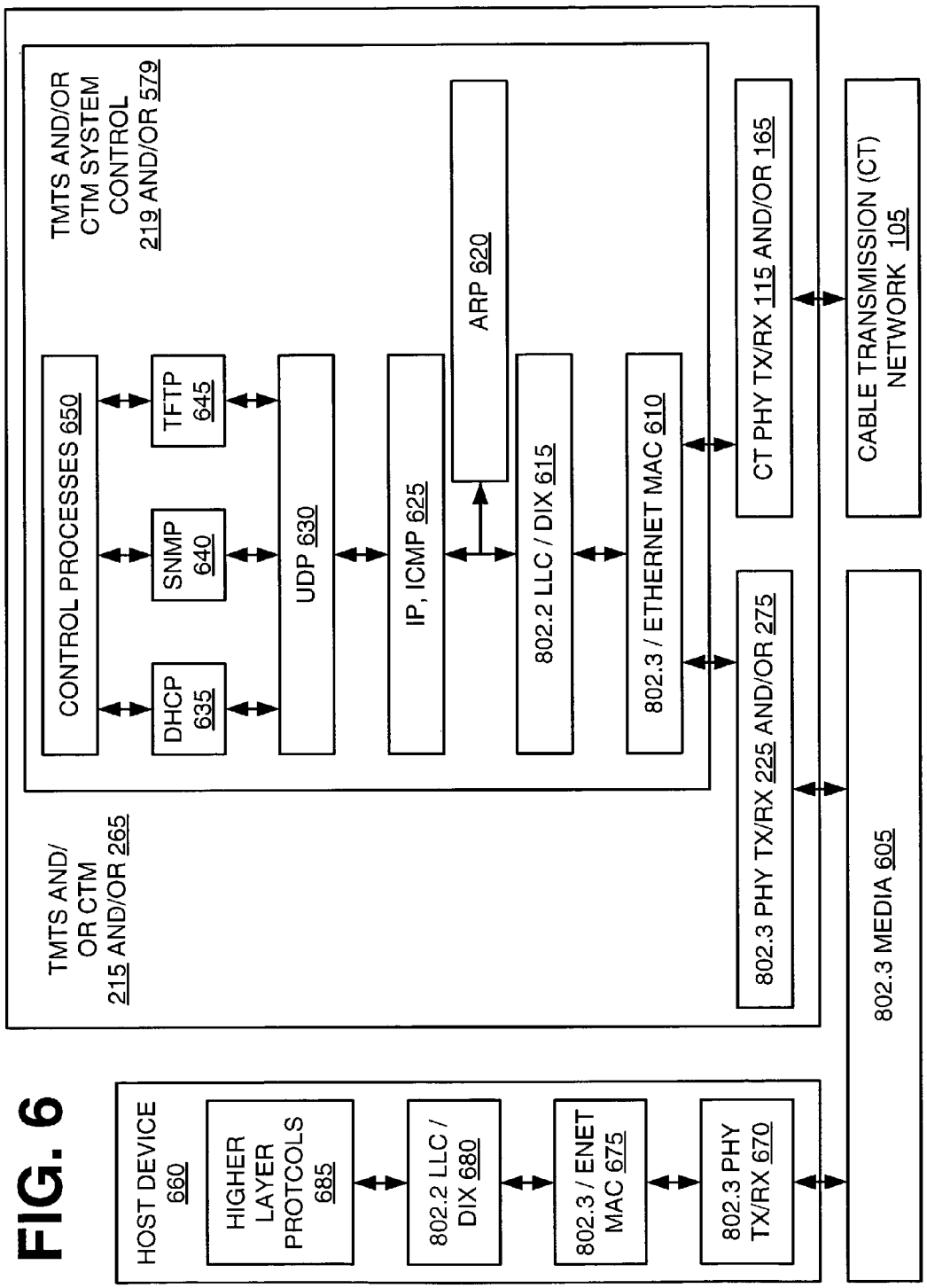

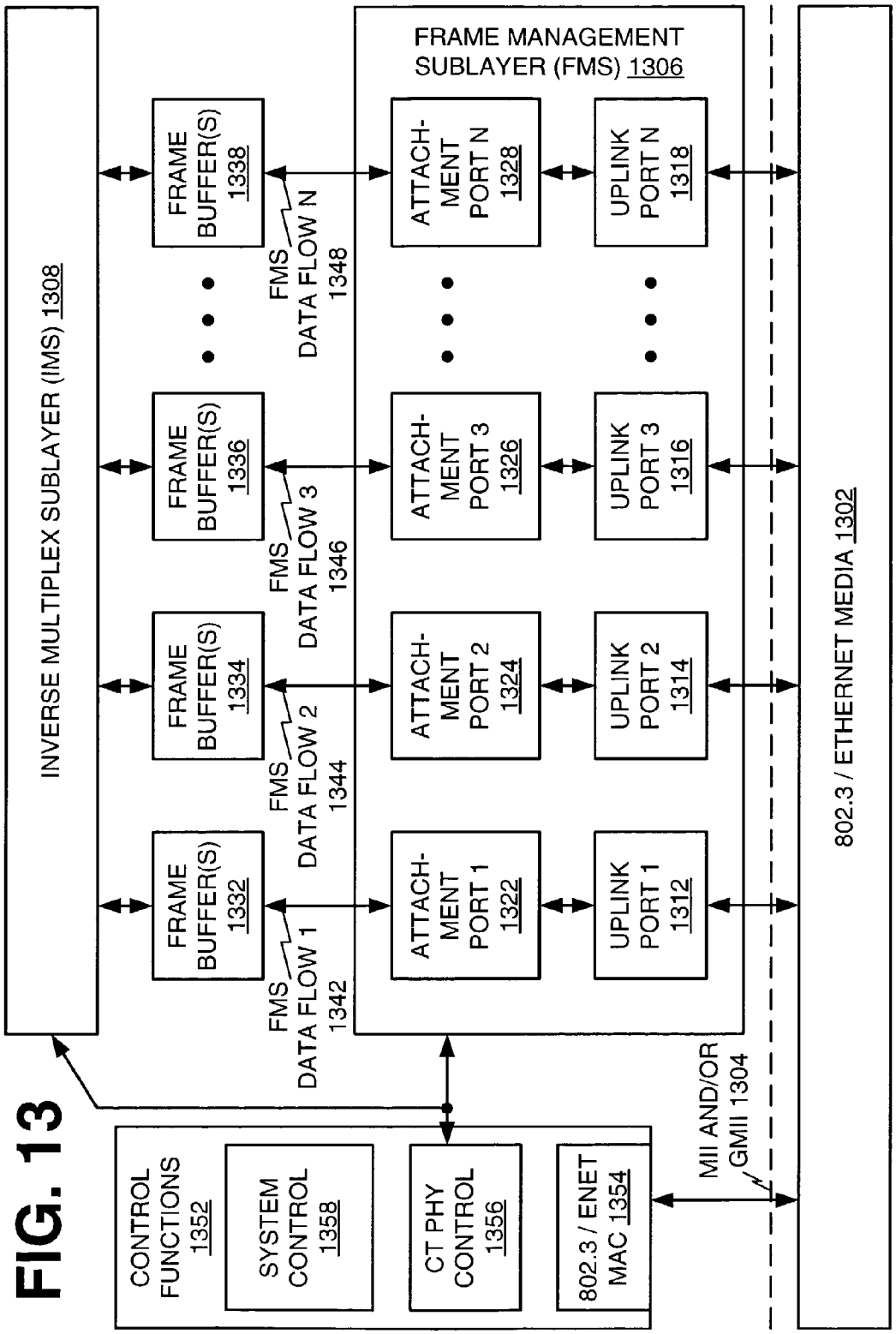

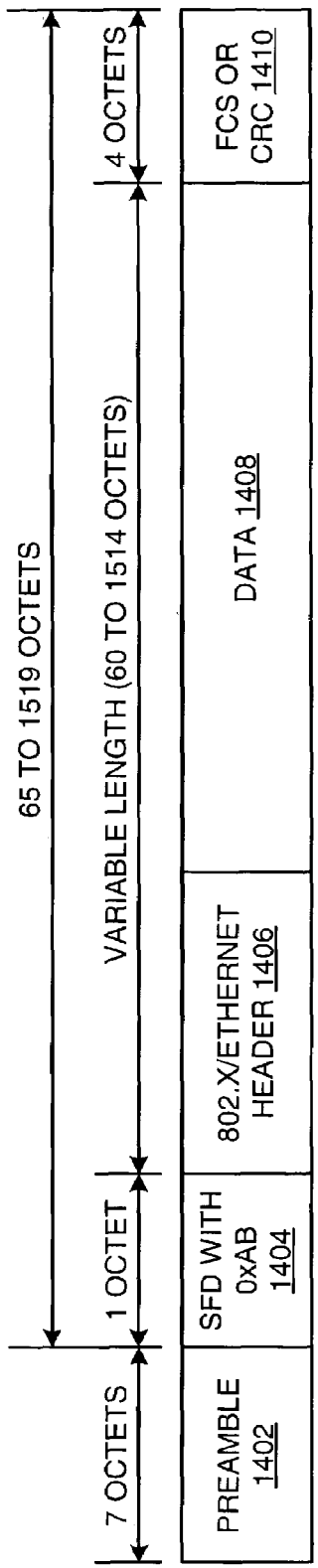
FIG. 14 - PRIOR ART
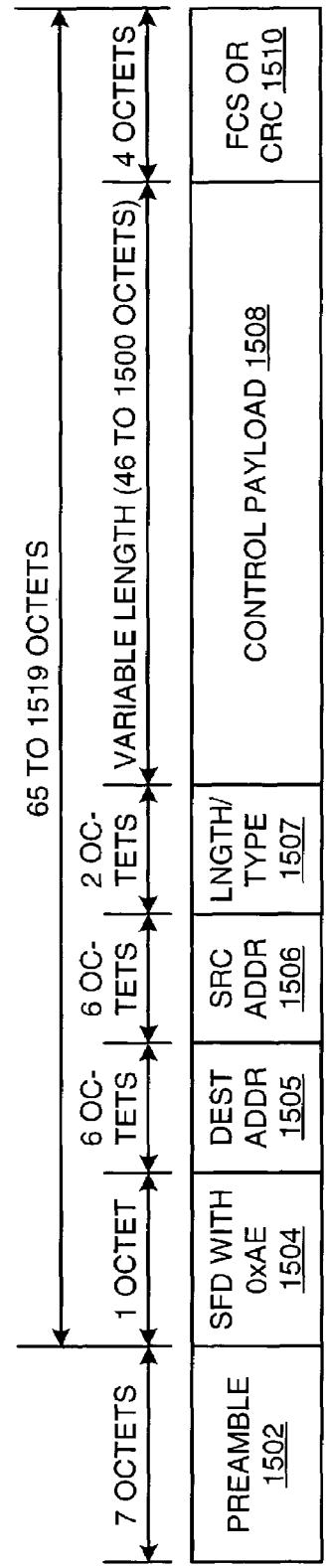
FIG. 15

FIG. 29

| TMTS MAC ADDRESS (6 OCTETS) 2902 | cTM MAC ADDRESS (6 OCTETS) 2904 | NUMBER OF ASSIGNED PORTS (W) (1 OCTET) 2906 | NUMBER OF ASSIGNED PAYLOAD OCTETS (2 OCTETS) 2908 | NUMBER OF AVAILABLE PAYLOAD OCTETS (2 OCTETS) 2910 |
|---|---|---|---|---|

FIG. 30

| TMTS PORT ID (1 OCTET) 3001 | cTM PORT ID (1 OCTET) 3002 | NUMBER OF PIDS (1 OCTET) 3003 | MPEG PIDS (2 OCTETS) 3004 | MPEG PAYLOAD ALLOCATION BIT MAP (23 OCTETS = 184 BITS) 3005 |
|---|---|---|---|---|
| TMTS PORT ID 1 3011 | cTM PORT ID 1 3012 | X PIDS 3014 | PID 1 3016 | BITMAP PATTERN 1 3018 |
| | | | PID 2 3026 | BITMAP PATTERN 2 3028 |
| | | | ... | ... |
| | | | PID X 3036 | BITMAP PATTERN X 3038 |
| TMTS PORT ID 2 3041 | cTM PORT ID 2 3042 | Y PIDS 3044 | PID 1 3046 | BITMAP PATTERN 1 3048 |
| | | | PID 2 3056 | BITMAP PATTERN 2 3058 |
| | | | ... | ... |
| | | | PID Y 3066 | BITMAP PATTERN Y 3068 |
| ... | ... | ... | ... | ... |
| TMTS PORT ID W 3071 | cTM PORT ID W 3072 | Z PIDS 3074 | PID 1 3076 | BITMAP PATTERN 1 3078 |
| | | | PID 2 3086 | BITMAP PATTERN 2 3088 |
| | | | ... | ... |
| | | | PID Z 3096 | BITMAP PATTERN Z 3098 |

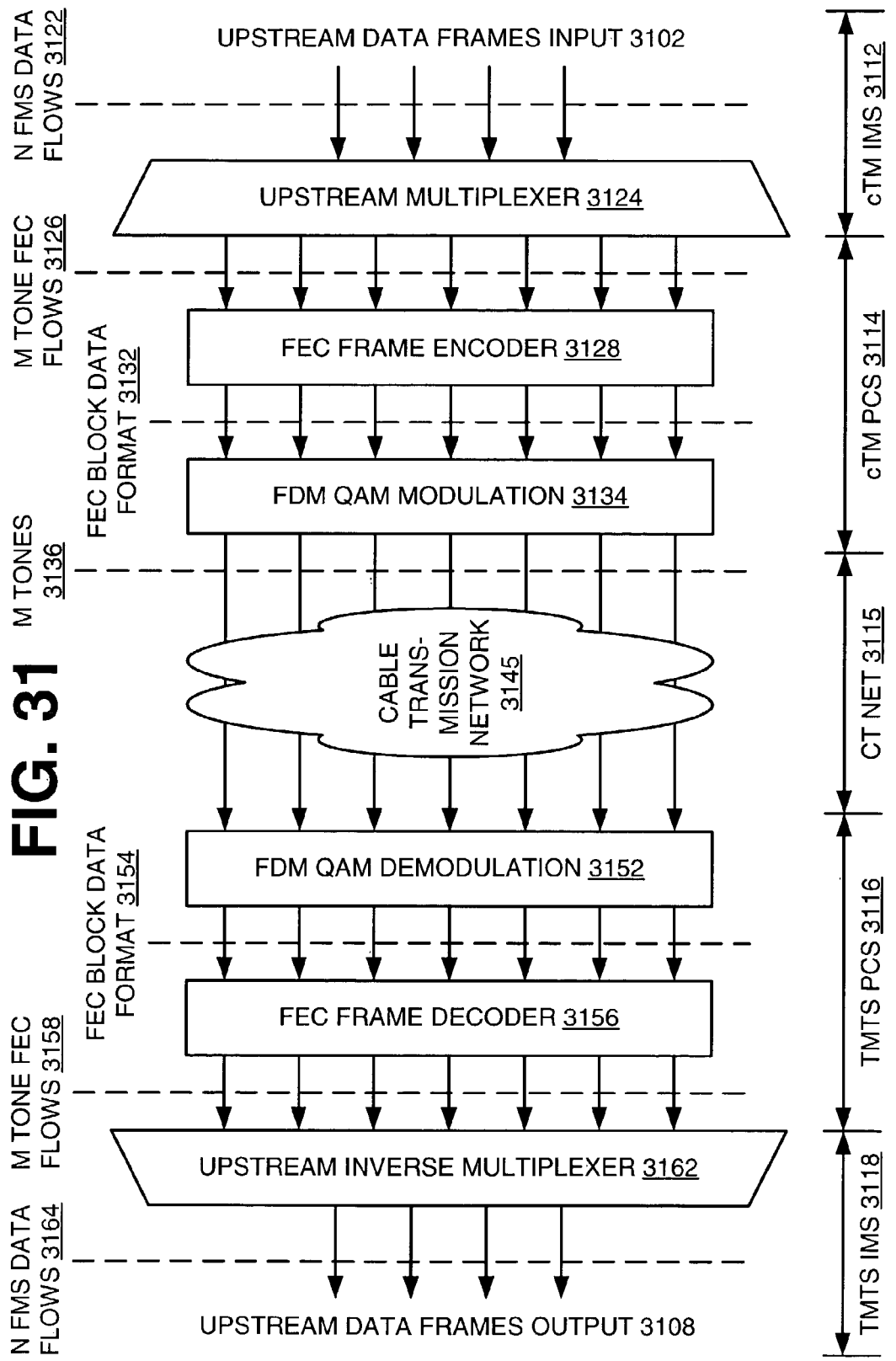

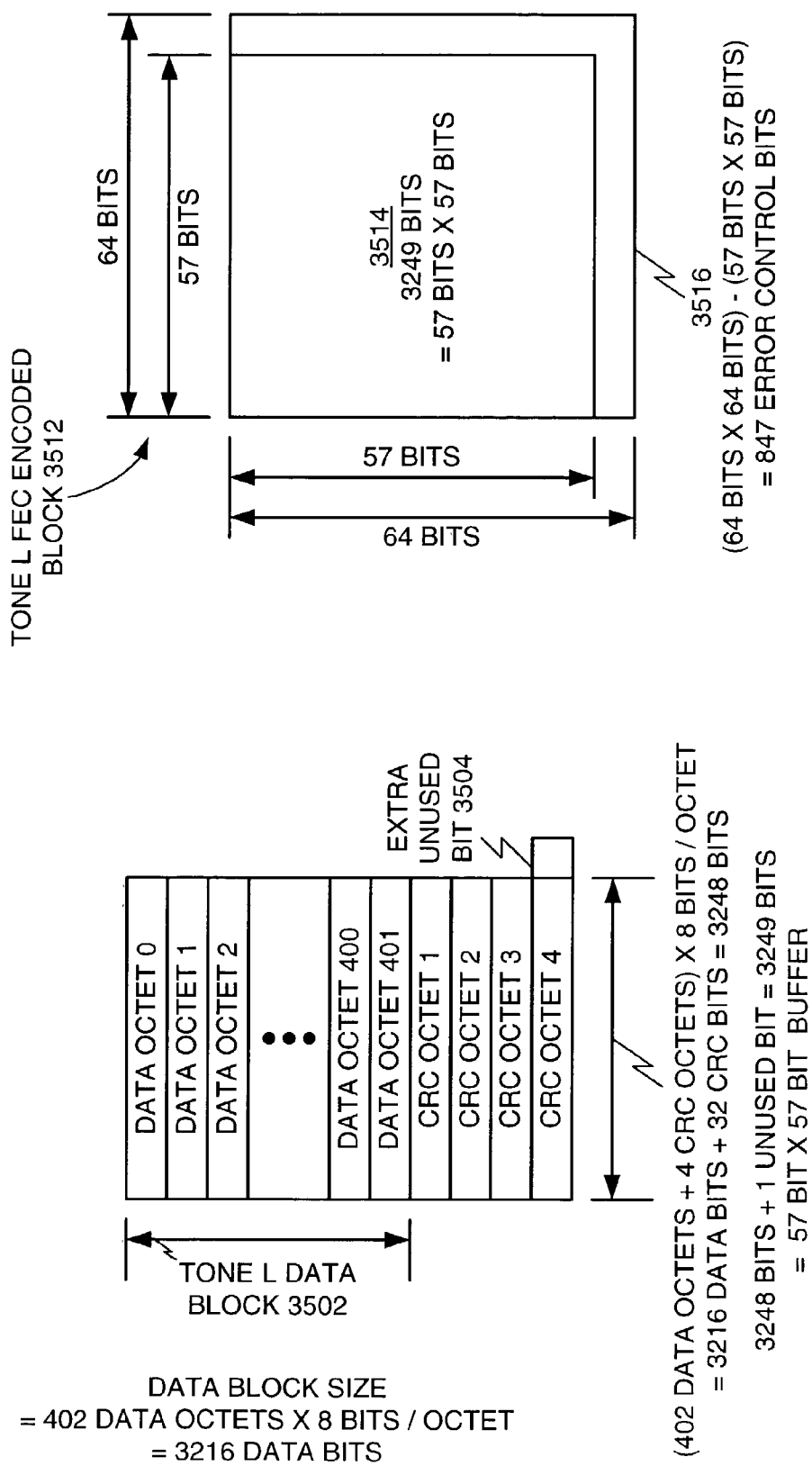

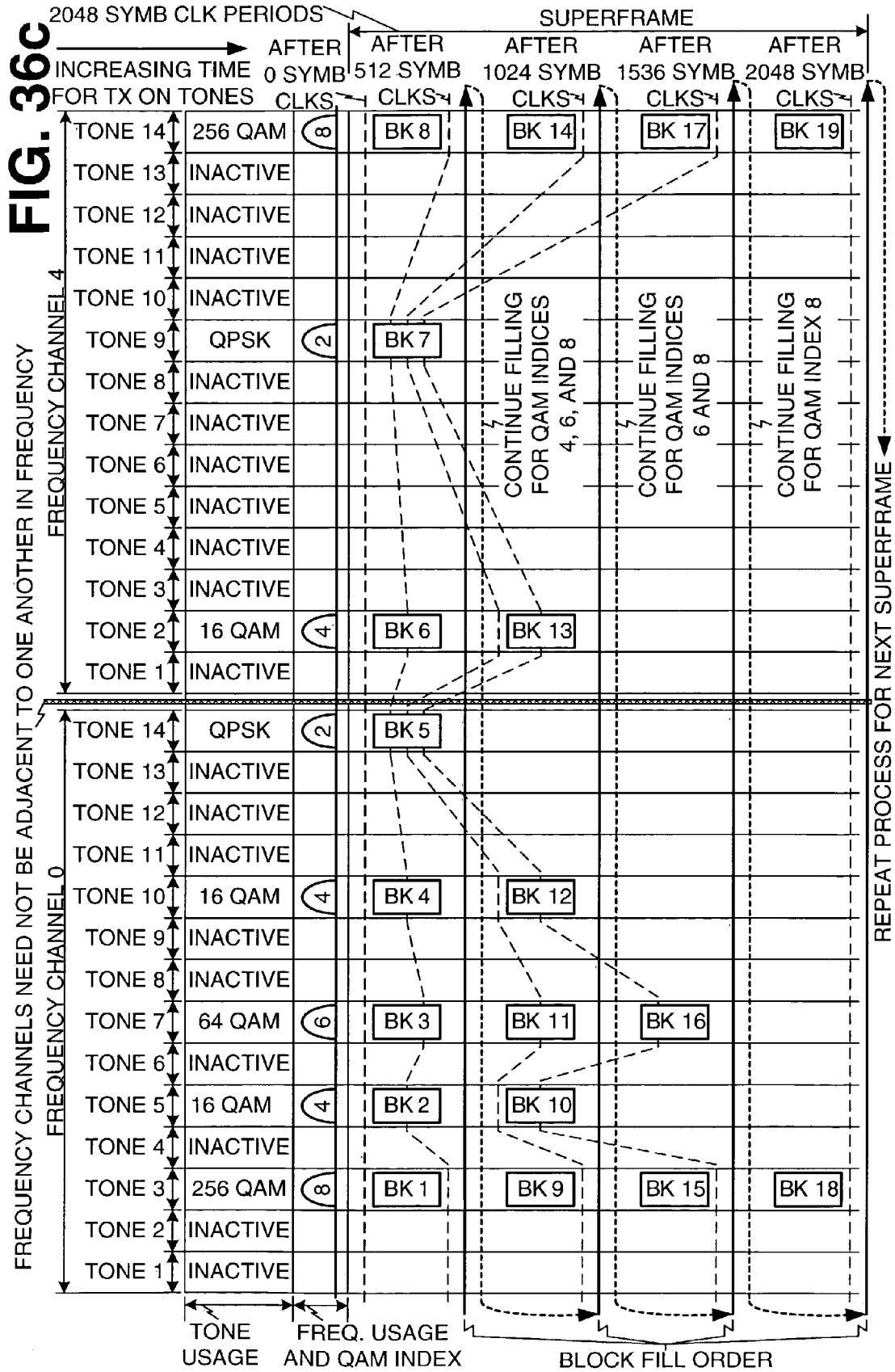

AUTOMATIC FREQUENCY CONTROL OF MULTIPLE CHANNELS

CROSS-REFERENCE TO RELATED PATENT APPLICATIONS

This present application claims priority to copending U.S. provisional application having Ser. No. 60/322,966, which was filed on Sep. 18, 2001 and is entirely incorporated herein by reference. Also, this present application claims priority to copending U.S. provisional application having Ser. No. 60/338,868, which was filed on Nov. 13, 2001 and is entirely incorporated herein by reference. In addition, this present application claims priority to copending U.S. provisional application having Ser. No. 60/342,627, which was filed on Dec. 20, 2001 and is entirely incorporated herein by reference. Moreover, this present application claims priority to copending U.S. provisional application having Ser. No. 60/397,987, which was filed on Jul. 23, 2002, and is entirely incorporated herein by reference.

Furthermore, the present application is one of 6 related patent applications that are being filed on the same day. The 6 patents listed by applicant docket number and title are the following:
- 7901- "Allocation of Bit Streams for Communication over Multi-Carrier Frequency-Division Multiplexing (FDM)" Ser. No. 10/245,054
- 7902- "MPEG Program Clock Reference (PCR) Delivery for Support of Accurate Network Clocks" Ser. No. 10/245,250
- 7903- "Multi-Carrier Frequency-Division Multiplexing (FDM) Architecture for High Speed Digital Service" Ser. No. 10/244,899
- 7904—"Multi-Carrier Frequency-Division Multiplexing (FDM) Architecture for High Speed Digital Service in Local Networks" Ser. No. 10/245,179
- 7905—"Ethernet over Multi-Carrier Frequency-Division Multiplexing (FDM)" Ser. No. 60/397,987
- 7977—"Mapping of Bit Streams into MPEG Frames" Ser. No. 10/245,032

FIELD OF THE INVENTION

The present invention relates generally to the field of communication networks and systems for using frequency-division multiplexing to carry data across broadband networks with the potential to support a plurality of subscribers at high data rates.

BACKGROUND OF THE INVENTION

Many solutions have been tried for delivering digital data services to customers over cable networks. Historically, cable networks were designed for community antenna television (CATV) delivery supporting 6 MHz analog channels that were frequency-division multiplexed into a radio-frequency (RF) medium that was primarily coaxial cable or coax. To support higher throughput and advanced digital services, many of these cable TV networks migrated to a hybrid fiber-coax (HFC) architecture. With the development of HFC networks to support advanced services, such as digital television channels, the capability to provide bi-directional data services also evolved.

At present bi-directional data services are often available to customers using systems based upon the DOCSIS (Data-Over-Cable Service Interface Specifications) industry standards promulgated by Cable Television Laboratories or CableLabs. The DOCSIS standards comprise many documents that specify mechanisms and protocols for carrying digital data between a cable modem (CM), generally located at a customer premises, and a cable modem termination system (CMTS), commonly located within the headend of the service provider. Within distribution networks in the cable industry, data flowing from a service provider to a customer premises is commonly referred to as downstream traffic, while data flowing from a customer premises to a service provider is generally known as upstream traffic. Although DOCSIS is a bridged architecture that is capable of carrying other network protocols besides and/or in addition to the Internet Protocol (IP), it is primarily designed and used for Internet access using IP.

Furthermore, for many cable system operators (also known as multiple system operators or MSOs) the primary market for selling services such as cable TV, Internet access, and/or local phone services has been residential customers. Although DOCSIS cable modems could be used by business customers, DOCSIS was primarily designed to meet the Internet access needs of residential users. To make the deployment of DOCSIS systems economically feasible, the DOCSIS standards were designed to support a large number of price-sensitive residential, Internet-access users on a single DOCSIS system. Though home users may desire extremely high speed Internet access, generally they are unwilling to pay significantly higher monthly fees. To handle this situation DOCSIS was designed to share the bandwidth among a large number of users. In general, DOCSIS systems are deployed on HFC networks supporting many CATV channels. In addition, the data bandwidth used for DOCSIS generally is shared among multiple users using a time-division multiple-access (TDMA) process.

In the downstream direction the DOCSIS CMTS transmits to a plurality of cable modems that may share at least one downstream frequency. In effect the CMTS dynamically or statistically time-division multiplexes downstream data for a plurality of cable modems. In general, based on destination addresses the cable modems receive this traffic and forward the proper information to user PCs or hosts. In the upstream direction the plurality of cable modems generally contend for access to transmit at a certain time on an upstream frequency. This contention for upstream slots of time has the potential of causing collisions between the upstream transmissions of multiple cable modems. To resolve these and many other problems resulting from multiple users sharing an upstream frequency channel to minimize costs for residential users, DOCSIS implements a media access control (MAC) algorithm. The DOCSIS layer 2 MAC protocol is defined in the DOCSIS radio frequency interface (RFI) specifications, versions 1.0, 1.1, and/or 2.0. DOCSIS RFI 2.0 actually introduces a code division multiple access (CDMA) physical layer that may be used instead of or in addition to the TDMA functionality described in DOCSIS RFI 1.0 and/or 1.1.

However, the design of DOCSIS to provide a large enough revenue stream by deploying systems shared by a large number of residential customers has some drawbacks. First, the DOCSIS MAC is generally asymmetric with respect to bandwidth, with cable modems contending for upstream transmission and with the CMTS making downstream forwarding decisions. Also, though DOCSIS supports multiple frequency channels, it does not have mechanisms to quickly and efficiently allocate additional frequency channels to users in a dynamic frequency-division multiple access (FDMA) manner. Furthermore, while the data rates of DOCSIS are a vast improvement over analog dial-up V.90 modems and Basic Rate Interface (BRI) ISDN (integrated services digital network) lines, the speeds of DOCSIS cable modems are not significantly better than other services which are targeted at business users.

Because businesses generally place high value on the daily use of networking technologies, these commercial customers often are willing to pay higher fees in exchange for faster data services than are available through DOCSIS. The data service needs of businesses might be met by using all-fiber optic networks with their large bandwidth potential. However, in many cases fiber optic lines are not readily available between business locations. Often new installations of fiber optic lines, though technically feasible, are cost prohibitive based on factors such as having to dig up the street to place the lines. Also, in many cases the devices used in optical transmission (including, but not limited to, fiber optic lines) are relatively newer than the devices used in electrical transmission (including, but not limited to coax cable transmission lines). (Both electrical and optical transmission systems may use constrained media such as, but not limited to, electrical conductors, waveguides, and/or fiber as well as unconstrained media in wireless and/or free-space transmission.) As a result, generally more development time has been invested in simplifying and reducing the costs of devices used in electrical communication systems, such as but not limited to coax CATV systems, than the development time that has been invested in devices used in optical communication systems. Thus, although fiber optics certainly has the capability of offering high data rates, these issues tend to drive up the costs of fiber optic communication systems.

Furthermore, in deploying networks to support primarily residential access, the transmission lines of the MSOs generally run past many businesses. Thus, a technical solution that functions over existing HFC networks of the MSOs, that provides higher data rates than DOCSIS, and that has the capability of working in the future over all fiber networks is a distinct improvement over the prior art and has the capability of meeting the needs of a previously untapped market segment.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The reference numbers in the drawings have at least three digits with the two rightmost digits being reference numbers within a figure. The digits to the left of those two digits are the number of the figure in which the item identified by the reference number first appears. For example, an item with reference number 211 first appears in FIG. 2.

FIG. 4 shows a block diagram of the architecture for integrating a transport modem termination system and a plurality of client transport modems into a system carrying other services.

FIG. 6 shows a block diagram of some protocols that may be used in the system control of a transport modem termination system (TMTS) and/or a client transport modem (cTM).

FIG. 13 shows the relationship among 802.3/ethernet media, the frame management sublayer, and the inverse multiplex sublayer.

FIG. 14 shows the IEEE 802.3/ethernet frame format.

FIG. 15 shows the control frame format.

FIG. 29 shows the header format for allocation map packets.

FIG. 30 shows the format of allocation map packets.

FIG. 31 shows the upstream architecture for communication from a cTM to a TMTS.

FIG. 35a shows the number of bytes in a data block.

FIG. 35b shows the data bits and the error control bits in an FEC encoded block.

FIG. 36*c* shows a non-limiting example of the superframe from FIG. 36*b* being communicated upstream across a plurality of active tones in a plurality of channels with each tone operating at a modulation index of 2, 4, 6, or 8.

DETAILED DESCRIPTION

Figure 1:
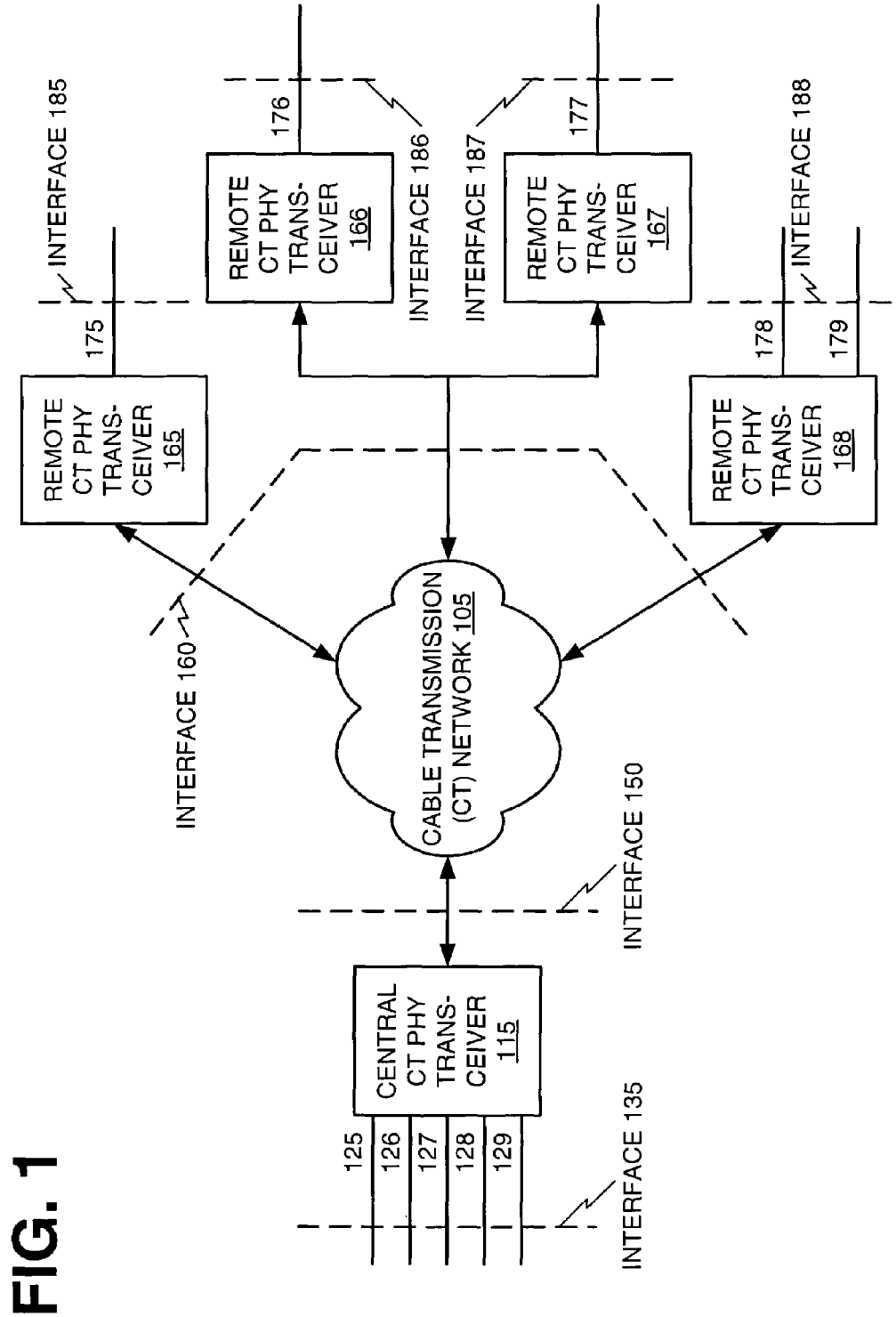
FIG. 1 shows a block diagram of central and remote transceivers connected to a cable transmission network.

In general, the seven-layer Open Systems Interconnect (OSI) model is a useful abstraction in analyzing and describing communication protocols and/or systems. The seven layers of the OSI model from lowest to highest are: 1) the physical layer, 2) the data link layer, 3) the network layer, 4) the transport layer, 5) the session layer, 6) the presentation layer, and 7) the application layer. This OSI model is well-known to those of ordinary skill in the art. Furthermore, the OSI model layers have often been broken down into sub-layers in various contexts. For example, the level two, data link layer may be divided into a medium access control (MAC) sublayer and a logical link control (LLC) sublayer in the documentation of the IEEE (Institute for Electrical and Electronic Engineers) standard 802. Furthermore, some of the IEEE standards (such as for 100 Mbps fast ethernet and 1 Gbps gigabit ethernet) break level one (i.e., the physical layer) down into sublayers such as, but not limited to, the physical coding sublayer (PCS), the physical medium attachment layer (PMA), and the physical media dependent (PMD) sublayer. These sublayers are described more fully in the IEEE 802 specifications and more specifically in the IEEE 802.3/ethernet specifications. The specifications of IEEE 802 (including, but not limited to, IEEE 802.3) are incorporated by reference in their entirety herein.

In general, the preferred embodiments of the present invention comprise physical layer protocols that may be implemented in physical layer transceivers. The physical layer interfaces and/or protocols of the preferred embodiments of the present invention may be incorporated into other networking methods, devices, and/or systems to provide various types of additional functionality. Often the behavior and capabilities of networking devices are categorized based on the level of the OSI model at which the networking device operates.

Repeater, bridge, switch, router, and gateway are some commonly used terms for interconnection devices in networks. Though these terms are commonly used in networking their definition does vary from context to context, especially with respect to the term switch. However, a brief description of some of the terms generally associated with various types of networking devices may be useful. Repeaters generally operate at the physical layer of the OSI model. In general, digital repeaters interpret incoming digital signals and generate outgoing digital signals based on the interpreted incoming signals. Basically, repeaters act to repeat the signals and generally do not make many decisions as to which signals to forward. As a non-limiting example, most ethernet hubs are repeater devices. Hubs in some contexts are called layer one switches. In contrast to repeaters, bridges and/or layer-two switches generally operate at layer two of the OSI model and evaluate the data link layer or MAC layer (or sublayer) addresses in incoming frames. Bridges and/or layer two switches generally only forward frames that have destination addresses that are across the bridge. Basically, bridges or layer two switches generally are connected between two shared contention media using media access control (MAC) algorithms. In general, a bridge or layer two switch performs an instance of a MAC algorithm for each of its interfaces. In this way, bridges and/or layer two switches generally may be used to break shared or contention media into smaller collision domains.

Routers (and layer three switches) generally make forwarding decisions based at least upon the layer three network addresses of packets. Often routers modify the frames transversing the router by changing the source and/or destination data link, MAC, or hardware addresses when a packet is forwarded. Finally, the more modern usage of the term gateway refers to networking devices that generally make forwarding decisions based upon information above layer three, the network layer. (Some older Internet usage of the term gateway basically referred to devices performing a layer three routing function as gateways. This usage of the term gateway is now less common.)

One skilled in the art will be aware of these basic categories of networking devices. Furthermore, often actual networking devices incorporate functions that are hybrids of these basic categories. Generally, because the preferred embodiments of the present invention comprise a physical layer, the preferred embodiments of the present invention may be utilized in repeaters, bridges, switches, routers, gateways, hybrid devices and/or any other type of networking device that utilizes a physical layer interface. "Routing and Switching: Time of Convergence", which was published in 2002, by Rita Puzmanova and "Interconnections, Second Edition: Bridges, Router, Switches, and Internetworking Protocols", which was published in 2000, by Radia Perlman are two books describing some of the types of networking devices that might potentially utilize the preferred embodiments of the present invention. These two books are incorporated in their entirety by reference herein.

Overview

In general, the preferred embodiments of the present invention(s) involve many concepts. Because of the large number of concepts of the preferred embodiments of the present invention, to facilitate easy reading and comprehension of these concepts, the document is divided into sections with appropriate headings. None of these headings are intended to imply any limitations on the scope of the present invention(s). In general, the "Network Model" section at least partially covers the forwarding constructs of the preferred embodiments of the present invention(s). The section entitled "Integration Into Existing Cable Network Architectures" generally relates to utilization of the preferred embodiments of the present invention in cable network architectures. The "Protocol Models" section describes a non-limiting abstract model that might be used to facilitate understanding of the preferred embodiments of the present invention(s). The "Frame Management Sublayer (FMS) Data Flows" section describes the formation of FMS data flows. The section entitled "MPEG Packets" describes the format of MPEG packets as utilized in the preferred embodiments of the present invention(s). The "Network Clocking" section generally covers distribution of network clock.

The "Downstream Multiplexing" section generally covers the downstream multiplexing using MPEG packets in the preferred embodiments of the present invention(s). The "Upstream Multiplexing" section generally relates to upstream multiplexing across one or more active tones. The section entitled "Division of Upstream Data" generally relates to the division of data into blocks for forward error correction (FEC) processing and to the formation of superframes lasting 2048 symbol clock periods. The next section is entitled "Upstream Client Transport Modem (cTM) Inverse Multiplexing Sublayer (IMS)" and generally covers upstream multiplexing in a client transport modem. The section entitled "Upstream Transport Modem Termination System (TMTS) Inverse Multiplexing Sublayer (IMS)" and generally covers upstream multiplexing in a transport modem termination system.

In addition, the section entitled "Downstream Client Transport Modem (cTM) Demodulation and Physical Coding Sublayer (PCS)" generally relates to cTM downstream demodulation. The section entitled "Upstream Client Transport Modem (cTM) Modulation and Physical Coding Sublayer (PCS)" generally covers cTM upstream modulation. The next section is entitled "Upstream Transport Modem Termination System (TMTS) Demodulation and Physical Coding Sublayer (PCS)" and generally covers TMTS upstream demodulation. Also, the section entitled "Upstream Forward Error Correction (FEC) and Non-Limiting Example with Four Active Tones at 256 QAM, 64 QAM, 16 QAM, and QPSK Respectively" generally relates to forward error correction. Finally, the section entitled "Client Transport Modem (cTM) and Transport Modem Termination System (TMTS) Physical Medium Dependent (PMD) Sublayer" generally relates to physical medium dependent sublayer interfaces.

Network Model

FIG. 1 generally shows one preferred embodiment of the present invention. In general, the preferred embodiment of the present invention allows physical layer connectivity over a cable transmission network 105. One skilled in the art will be aware of the types of technologies and devices used in a cable transmission (CT) network 105. Furthermore, many of the devices and technologies are described in "Modern Cable Television Technology: Video, Voice, and Data Communications", which was published in 1999, by Walter Ciciora, James Farmer, and David Large. CT network 105 generally has evolved from the networks designed to allow service providers to deliver community antenna television (CATV, also known as cable TV) to customers or subscribers. However, the networking technologies in CATV may be used by other environments.

Often the terms service provider and subscriber or customer are used to reference various parts of CATV networks and to provide reference points in describing the interfaces found in CATV networks. Usually, the CATV network may be divided into service provider and subscriber or customer portions based on the demarcation of physical ownership of the equipment and/or transmission facilities. Though some of the industry terms used herein may refer to service provider and/or subscriber reference points and/or interfaces, one of ordinary skill in the art will be aware that the preferred embodiments of the present invention still apply to networks regardless of the legal ownership of specific devices and/or transmission facilities in the network. Thus, although cable transmission (CT) network 105 may be a CATV network that is primarily owned by cable service providers or multiple system operators (MSOs) with an interface at the customer or subscriber premises, one skilled in the art will be aware that the preferred embodiments of the present invention will work even if ownership of all or portions of cable transmission (CT) network 105 is different than the ownership commonly found in the industry. Thus, cable transmission (CT) network 105 may be privately owned.

As one skilled in the art will be aware, cable transmission (CT) network 105 generally is designed for connecting service providers with subscribers or customers. However, the terms service provider and subscriber or customer generally are just used to describe the relative relationship of various interfaces and functions associated with CT network 105. Often the service-provider-side of CT network 105 is located at a central site, and there are a plurality of subscriber-side interfaces located at various remote sites. The terms central and remote also are just used to refer to the relative relationship of the interfaces to cable transmission (CT) network 105. Normally, a headend and/or distribution hub is a central location where service provider equipment is concentrated to support a plurality of remote locations at subscriber or customer premises.

Given this relative relationship among equipment connected to cable transmission (CT) network 105, the preferred embodiment of the present invention may comprise a central cable transmission (CT) physical (PHY) layer transceiver 115. The central CT PHY transceiver (TX/RX) 115 generally may have at least one port on the central-side or service-provider-side of the transceiver 115. Ports 125, 126, 127, 128, and 129 are examples of the central-side ports of central CT PHY transceiver 115. In general, interface 135 may define the behavior of central CT PHY transceiver 115 with respect to at least one central-side port such as central-side ports 125, 126, 127, 128, and 129. Interface 135 for the central-side ports 125, 126, 127, 128, and 129 may represent separate hardware interfaces for each port of central CT PHY transceiver 115. However, interface 135 may be implemented using various technologies to share physical interfaces such that central-side ports 125, 126, 127, 128, and 129 may be only logical channels on a shared physical interface or media. These logical channels may use various multiplexing and/or media sharing techniques and algorithms. Furthermore, one skilled in the art will be aware that the central-side ports 125, 126, 127, 128, and 129 of central CT PHY transceiver 115 may be serial and/or parallel interfaces and/or buses.

Therefore, the preferred embodiments of the present invention are not limited to specific implementations of interface 135, and one skilled in the art will be aware of many possibilities. As a non-limiting example, although central CT PHY transceiver 115 generally is for use inside of networking devices, a serial-interface shared medium such as ethernet/802.3 could be used on each of the central-side ports 125, 126, 127, 128, and 129 inside of a networking device. Often the decision to use different technologies for interface 135 will vary based on costs and transmission line lengths.

Central CT PHY transceiver 115 further is connected through interface 150 to cable transmission (CT) network 105. In addition to the central-side or service-provider-side at interface 150 of cable transmission (CT) network 105, interface 160 generally is on the subscriber-side, customer-side, or remote-side of cable transmission (CT) network 105. Generally, at least one remote transceiver (such as remote cable transmission (CT) physical (PHY) transceivers 165, 166, 167, and 168) is connected to interface 160 on the subscriber-side or remote-side of CT network 105. Each remote CT PHY transceiver 165, 166, and 167 is associated with at least one remote-side port, 175, 176, and 177 respectively. Furthermore, remote CT PHY transceiver 168 also is associated with at least one remote-side port, with the two remote-side ports 178 and 179 actually being shown in FIG. 1. Each remote CT PHY transceiver 165, 166, 167, and 168 can be considered to have an interface 185, 186, 187, and 188, respectively, through which it receives information for upstream transmission and through which it delivers information from downstream reception.

In general, digital transceivers (such as central CT PHY transceiver 115 and remote CT PHY transceivers 165, 166, 167, and 168) comprise a transmitter and a receiver as are generally needed to support bi-directional applications. Although the preferred embodiments of the present invention generally are designed for bi-directional communication, the preferred embodiments of the present invention certainly could be used for uni-directional communications without one half of the transmitter/receiver pair in some of the transceivers. In general, digital transmitters basically are concerned with taking discrete units of information (or digital information) and forming the proper electromagnetic signals for transmission over networks such as cable transmission (CT) network 105. Digital receivers generally are concerned with recovering the digital information from the incoming electromagnetic signals. Thus, central CT PHY transceiver 115 and remote CT PHY transceivers 165, 166, 167, and 168 generally are concerned with communicating information between interface 135 and interfaces 185, 186, 187, and 188, respectively. Based on the theories of Claude Shannon, the minimum quanta of information is the base-two binary digit or bit. Therefore, the information communicated by digital transceivers often is represented as bits, though the preferred embodiments of the present invention are not necessarily limited to implementations designed to communicate information in base two bits.

The preferred embodiments of the present invention generally have a point-to-point configuration such that there generally is a one-to-one relationship between the central-side ports 125, 126, 127, 128, and 129 of the central CT PHY transceiver 115 and the remote-side ports 175, 176, 177, 178, and 179, respectively. Like interface 135 for a plurality of central-side ports 125, 126, 127, 128, and 129, interface 188 with a plurality of remote-side ports 178 and 179 may represent separate hardware interfaces for each port of remote CT PHY transceiver 168. However, interface 188 may be implemented using various technologies to share physical interfaces such that remote-side ports 178 and 179 may only be logical channels on a shared physical interface or media. These logical channels may use various multiplexing and/or media sharing techniques and algorithms. Furthermore, one skilled in the art will be aware that the remote-side ports 178 and 179 of remote CT PHY transceiver 168 may be serial and/or parallel interfaces and/or buses.

In general, the preferred embodiments of the present invention comprise a one-to-one or point-to-point relationship between active central-side ports and active remote-side ports such that central-side port 125 may be associated with remote-side port 175, central-side port 126 may be associated with remote-side port 176, central-side port 127 may be associated with remote-side port 177, central-side port 128 may be associated with remote-side port 178, and central-side port 129 may be associated with remote-side port 179. Though this relationship between active central-side ports and active remote-side ports is one-to-one or point-to-point, many technologies such as, but not limited to, multiplexing and/or switching may be used to carry the point-to-point communications between active central-side ports and active remote-side ports.

In general, active ports are allocated at least some bandwidth through cable transmission (CT) network 105. Normally, most dial-up modem phone calls through the public switched telephone network (PSTN) are considered to be point-to-point connections even though the phone call may go through various switches and/or multiplexers that often use time-division multiplexing (TDM). Establishment of an active phone call generally allocates bandwidth in the PSTN to carry the point-to-point communications through the PSTN. In a similar fashion, the preferred embodiments of the present invention generally provide point-to-point connectivity between active ports of the central CT PHY transceiver 115 and the active ports of remote CT PHY transceivers 165, 166, 167, and 168. However, the preferred embodiments of the present invention generally work over cable transmission (CT) network 105, which is not like the generally time-division multiplexed PSTN. (Note: references in this specification to point-to-point should not be limited to the Point-to-Point Protocol, PPP, which generally is only one specific protocol that may be used over point-to-point connections.)

Also, the use of five central-side ports 125, 126, 127, 128, and 129 is not intended to be limiting and is only shown for example purposes. In general, central CT PHY transceiver 115 may support at least one central-side port. In addition, the use of four remote CT PHY transceivers 165, 166, 167, and 168 is only for example purposes and is not intended to be limiting. In general, central CT PHY transceiver 115 might communicate with at least one remote CT PHY transceiver (such as 165, 166, 167, and 168). Also, each remote CT PHY transceiver 165, 166, 167, and 168 may have at least one remote side port, and remote CT PHY transceiver 168 is shown with a plurality of remote-side ports 178 and 179.

Figure 2A:
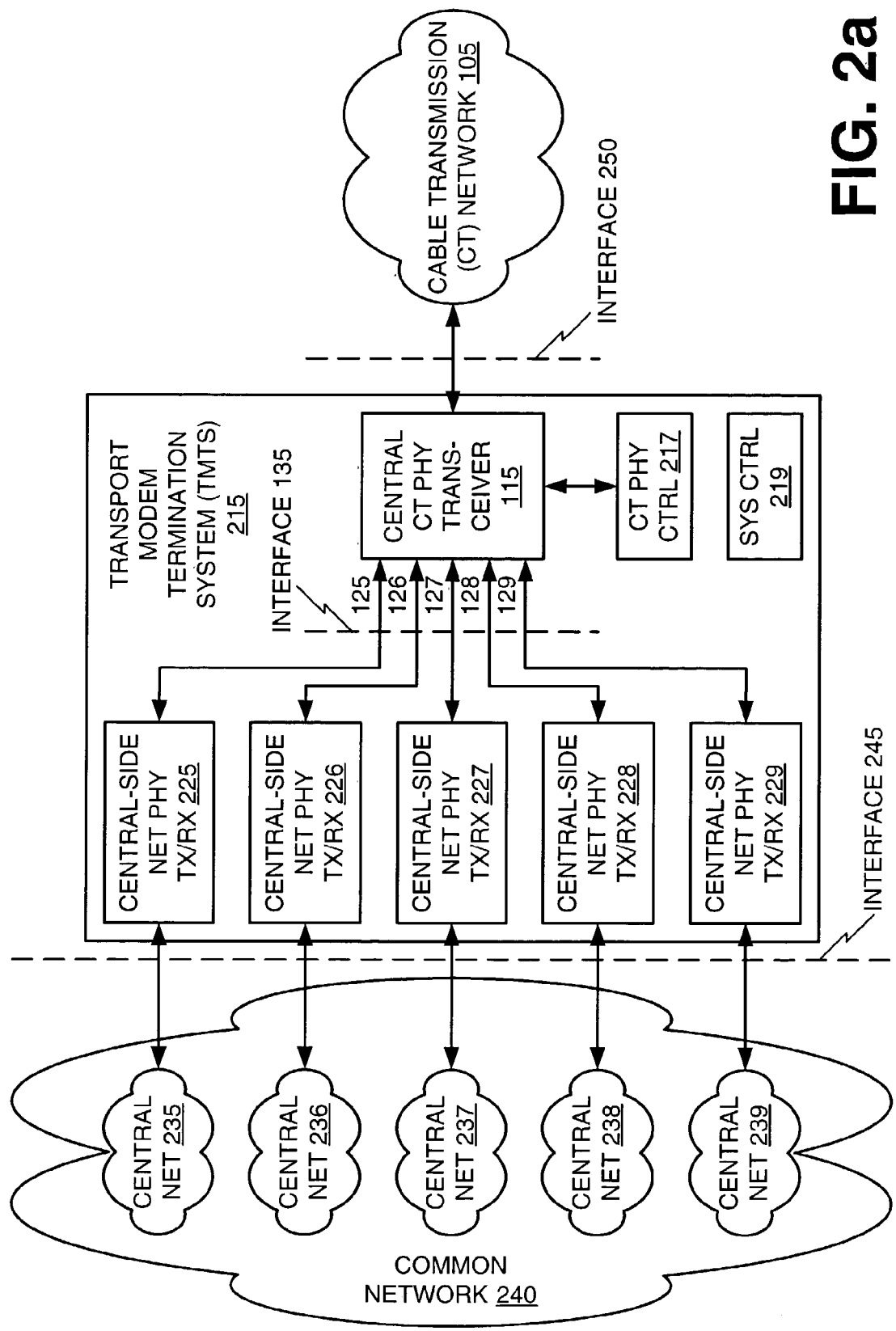
FIG. 2a shows a block diagram of a transport modem termination system connected to a cable transmission network.
Figure 2B:
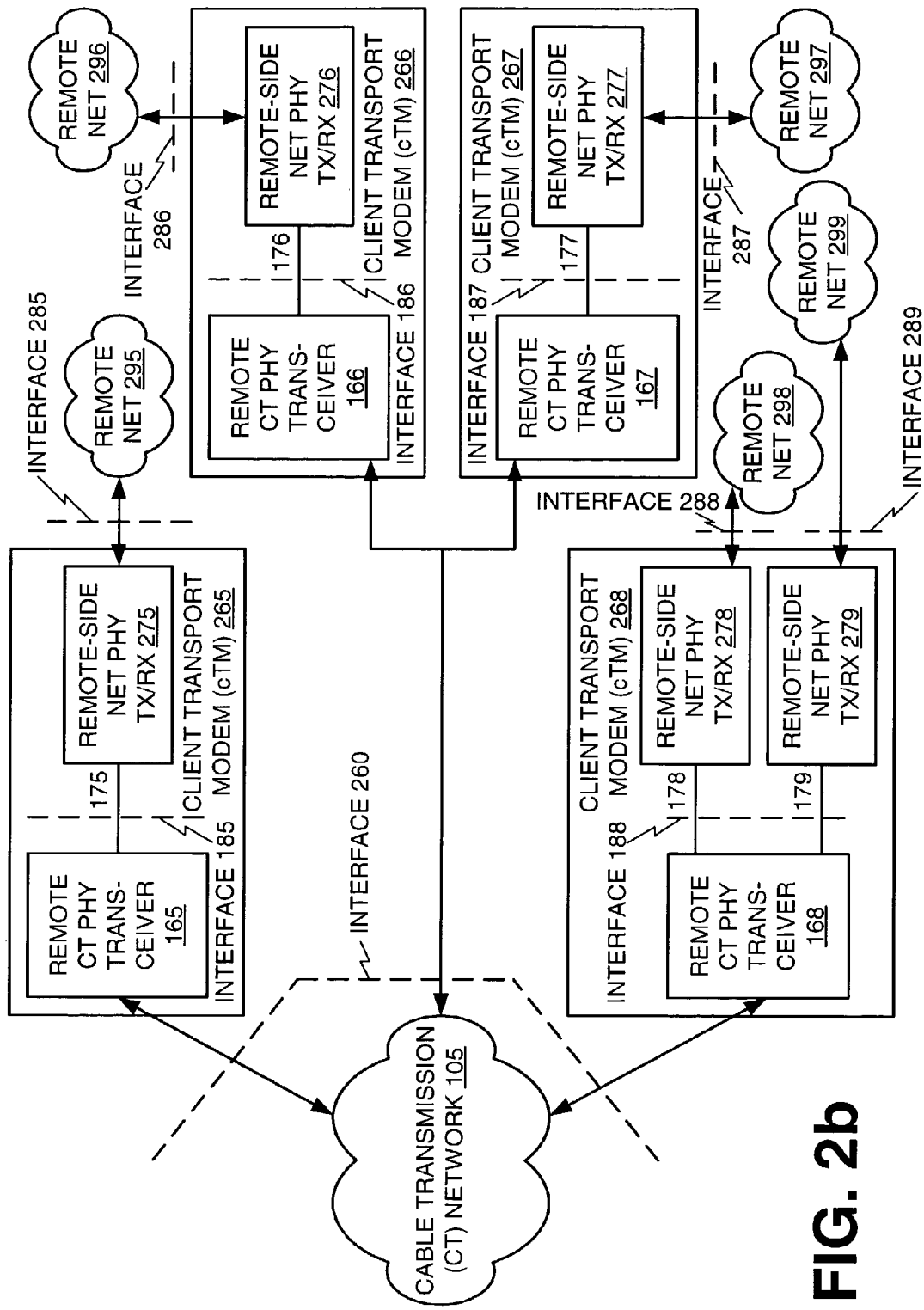
FIG. 2b shows a block diagram of a plurality of client transport modems connected to a cable transmission network.

FIGS. 2a and 2b show further detail on the use of central CT PHY transceiver 115 and remote CT PHY transceivers 165, 166, 167, and 168 in networking devices. As shown in FIG. 2a, central CT PHY transceiver 115 generally might be incorporated into a transport modem termination system (TMTS) 215. In addition to central CT PHY transceiver 115, TMTS 215 comprises cable transmission (CT) physical layer (PHY) control 217 and system control 219. In general, CT PHY control 217 is concerned with handling bandwidth allocations in cable transmission (CT) network 105, and system control 219 generally is concerned with TMTS management and/or configuration. Each one of the central-side ports 125, 126, 127, 128, and 129 of central CT PHY transceiver 115 may be connected over interface 135 to central-side network physical layer (PHY) transceivers (TX/RX) 225, 226, 227, 228, and 229, respectively. As discussed with respect to FIG. 1, interface 135 may actually be some sort of shared interface among the various central-side ports (125, 126, 127, 128, and 129) and central-side network physical (PHY) transceivers (225, 226, 227, 228, and 229).

Generally, most communication systems have transmitters and/or receivers (or transceivers) that handle transmitting and/or receiving signals on communication media. Often these transmitters and/or receivers (or transceivers) are responsible for converting between the electromagnetic signals used to convey information within a device (such as in baseband transistor—transistor logic (TTL) or complementary metal-oxide semiconductor (CMOS) signal levels) to electromagnetic signal levels that are suitable for transmission through external media that may be wired, wireless, waveguides, electrical, optical, etc. Although interface 135 is shown as individual connections between the central-side ports 125, 126, 127, 128, and 129 of central CT PHY transceiver 115 and central-side network PHY transceivers 225, 226, 227, 228, and 229, one skilled in the art will be aware that many possible implementations for interface 135 are possible including, but not limited, to serial interfaces, parallel interfaces, and/or buses that may use various technologies for multiplexing and or access control to share at least one physical communications medium at interface 135.

In general, central-side network physical interfaces 225, 226, 227, 228, and 229 are connected to central networks 235, 236, 237, 238, and 239, respectively. Based upon the policy decisions of the service provider (and/or the owners of the TMTS 215 and of the associated central-side network PHY transceivers 225, 226, 227, 228, and/or 229), central networks 235, 236, 237, 238, and 239 may be connected together into a common network 240. One skilled in the art will be aware that many different configurations for connecting central networks 235, 236, 237, 238, and 239 are possible based upon different policy decisions of the owners of the equipment and any customers paying for connectivity through the equipment.

Central-side network PHY transceivers 225, 226, 227, 228, and 229 generally are connected over interface 245 to central networks 235, 236, 237, 238, and 239, respectively. In the preferred embodiment of the present invention central-side network PHY transceivers 225, 226, 227, 228, and 229 are ethernet/802.3 interfaces, and each ethernet/802.3 interface may be connected to a separate central network. However, other connections for interface 245 are possible that allow one or more transmission media to be shared using various techniques and/or media access control algorithms the may perform various multiplexing strategies. Although one skilled in the art will be aware that various methods could be used to share communications media at interface 245, in general having separate ethernet/802.3 ports and/or separate T1 ports (i.e., N×56/64 ports) at interface 135 for each central-side network PHY transceiver 225, 226, 227, 228, and 229 offers maximum flexibility in allowing service providers or equipment owners to make policy decisions and also offers low cost based on the ubiquitous availability of ethernet/802.3 interfaces and equipment.

Furthermore, one skilled in the art will be aware that there are many data speeds and physical layer specifications for ethernet/802.3. In general, the preferred embodiments of the present invention will work with any of the ethernet/802.3 specifications. Thus, if central-side network physical (PHY) transceivers (TX/RX) 225, 226, 227, 228, and 228 are ethernet/802.3 interfaces, they may utilize any of the ethernet/802.3 speeds and/or physical layer interfaces. Also, each central-side PHY transceiver 225, 226, 227, 228, and 229 might use a different ethernet/802.3 speed and/or a physical layer specification from any of the other central-side network PHY transceivers 225, 226, 227, 228, and 229.

FIG. 2b generally shows the remote-side, customer-side, or subscriber-side equipment and connections, whereas FIG. 2a generally shows the central-side or service-provider-side equipment and connections. In FIG. 2b, cable transmission (CT) network 105 is repeated from FIG. 2a. In addition, FIG. 2a shows the four remote CT PHY transceivers 165, 166, 167, 168, and 169 as they might be used inside client transport modems (cTMs) 265, 266, 267, and 268, respectively.

Client transport modem 265 comprises remote CT PHY transceiver 165 that is connected through connection 175 across interface 185 to at least one remote-side network physical layer (PHY) transceiver (TX/RX) 275. Also, client transport modem 266 comprises remote CT PHY transceiver 166 that is connected through connection 176 across interface 186 to at least one remote-side network physical layer (PHY) transceiver (TX/RX) 276. In addition, client transport modem 267 comprises remote CT PHY transceiver 167 that is connected through connection 177 across interface 187 to at least one remote-side network physical layer (PHY) transceiver (TX/RX) 277. Finally, client transport modem 268 comprises remote CT PHY transceiver 168 that is connected through connection 178 across interface 188 to at least one remote-side network physical layer (PHY) transceiver (TX/RX) 278 and that is connected through connection 179 across interface 189 to at least one remote-side network physical layer (PHY) transceiver (TX/RX) 279.

In general, the use of four client transport modems (cTMs) 265, 266, 267, and 268 in FIG. 2b is only for illustrative purposes and is not meant to imply any limitations on the number of client transport modems (cTMs) that may be supported. Furthermore, one skilled in the art will be aware that based upon networking needs the capabilities of multiple client transport modems (cTMs) could be integrated into a single unit. Thus, a single unit connected to the customer-side, subscriber-side, or remote-side of the cable transmission (CT) network 105 could actually have a plurality of remote CT PHY transceivers.

In general, the remote-side network physical (PHY) transceivers (TX/RX) 275, 276, 277, 278, and 279 are connected across interfaces 285, 286, 287, 288, and 289 to remote networks 295, 296, 297, 298, and 299, respectively. In the preferred embodiment of the present invention interfaces 285, 286, 287, 288, and/or 289 are ethernet/802.3 interfaces. However, one skilled in the art will be aware that other interfaces and technologies might be used with the concepts disclosed in this specification. As a non-limiting example, an interface of a client transport modem (cTM) might be used to support circuit emulation services (CES) to carry N×56 kbps and/or N×64 kbps (where N is a positive integer) digital data streams. One skilled in the art will be aware that various N×56 and N×64 configurations are commonly designated as various digital speeds such as, but not limited to, DS0, DS1, DS3, etc. Also, one skilled in the art will be aware that the various N×56 and/or N×64 services are often delivered over plesiochronous digital hierarchy (PDH) interfaces such as, but not limited to, T1, T3, etc. and/or synchronous digital hierarchy (SDH) interfaces such as, but not limited to, Synchronous Transport Signal, Level 1 (STS-1), STS-3, etc. Often the STS frames are carried in a synchronous optical network (SONET) on optical carriers that are generally referred to as OC-1 (optical carrier 1), OC-3, etc. In addition, to these higher order multiplexing of multiple DS0s, interfaces such as switched 56/64 and basic rate interface (BRI) ISDN offer support for smaller numbers of 56/64 kbps DS0s.

One skilled in the art will be aware of these various N×56 and N×64 technologies and how they generally can be used to connect devices to networks such as the PSTN (public switched telephone network). In addition, one skilled in the art will be aware that such digital N×56 and N×64 kbps connections also may carry digitized voice generally using pulse code modulation (PCM) and various companding techniques such as, but not limited to, A-law and mu-law. Therefore, the remote-side network physical (PHY) transceivers (TX/RX) 275, 276, 277, 278, and 279 do not all have to use 802.3/ethernet. In at least one preferred embodiment of the present invention, a client transport modem (cTM) 268 with a plurality of remote-side network physical (PHY) transceivers (TX/RX) 278 and 279 may support different types of interfaces for each transceiver at interfaces 288 and 289. Thus, as a non-limiting example, remote-side network physical (PHY) transceiver 278 may use ethernet/802.3 to connect to an ethernet/802.3 remote network 298, and remote-side network physical (PHY) transceiver 279 may be a T1 interface to remote network 299. This non-limiting example configuration is expected to be common for many remote offices that need ethernet/802.3 connectivity to carry data and packetized real-time services such as voice or video and that also need T1 interfaces to connect to legacy circuit-switched voice for devices such as PBXs (Private Branch Exchanges).

Furthermore, one skilled in the art will be aware that there are many data speeds and physical layer specifications for ethernet/802.3. In general, the preferred embodiments of the present invention will work with any of the ethernet/802.3 specifications. Thus, if remote-side network physical (PHY) transceivers (TX/RX) 275, 276, 277, 278, and 279 are ethernet/802.3 interfaces, they may utilize any of the ethernet/802.3 speeds and/or physical layer interfaces. Also, each remote-side PHY transceiver 275, 276, 277, 278, and 279 might use a different ethernet/802.3 speed and/or physical layer specification from any of the other remote-side network PHY transceivers 275, 276, 277, 278, and 279.

In general, the preferred embodiments of the present invention might be considered as providing repeater functionality between the central-side network PHY transceivers 225, 226, 227, 228, and 229 and remote-side network PHY transceivers 275, 276, 277, 278, and 279, respectively. Generally, the repeater service may involve corresponding central-side and remote-side interfaces and transceivers having the same speeds. However, one skilled in the art will be aware that ethernet/802.3 hubs are repeaters and that some ethernet/802.3 hubs handle speed conversions such as between 10 Mbps ethernet/802.3 and 100 Mbps fast ethernet/802.3. Thus, one skilled in the art will be aware of using the techniques found in these multi-speed ethernet/802.3 hubs to support different speeds on the interfaces of corresponding central-side and remote-side network physical (PHY) transceivers (TX/RX) and generally still provide repeater functionality. Also, one skilled in the art will be aware that even if a central-side network physical transceiver (such as, but limited to, central-side network physical transceiver 225) and a corresponding remote-side network physical transceiver (such as, but limited to, remote-side network physical transceiver 275) operate at the same data rate, the transceivers may use different types of physical media and portions of the ethernet/802.3 specification such as, but not limited to, 100BaseTX on copper for a central-side network physical transceiver and 100BaseFX on fiber for a remote-side network physical transceiver.

Figure 3:
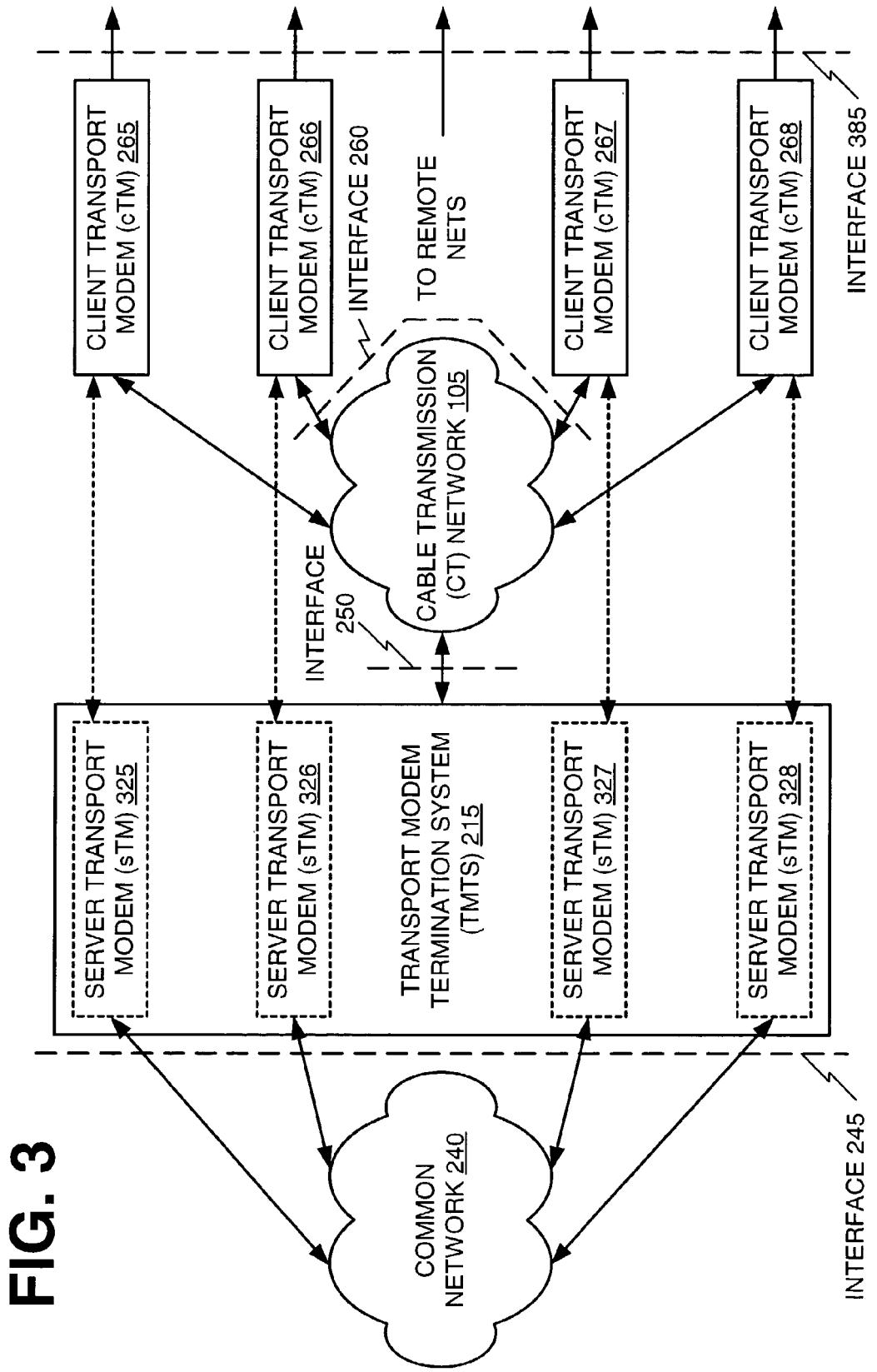
FIG. 3 shows a block diagram of the connection-oriented relationship between client transport modems and ports of a transport modem termination system.

Given the general point-to-point relationship between central-side network physical (PHY) transceivers (TX/RX) 225, 226, 227, 228, and 229 with the corresponding remote-side network physical (PHY) transceivers (TX/RX) 275, 276, 277, 278, and 279, respectively, the client transport modems (cTMs) 265, 266, 267, and 268 can each be thought of as having a corresponding server transport modem (sTM) 325, 326, 327, and 328, respectively, as shown in FIG. 3. In general, the server transport modems (sTMs) 325, 326, 327, and 328 may not be separate equipment, but may instead be implemented using shared hardware in TMTS 215 in the preferred embodiment of the present invention. Although to each client transport modem (cTM) 265, 266, 267, and 268 it may seem like there is a connection to a dedicated server transport modem (sTM), (such as sTMs 325, 326, 327, and 328, respectively), the server transport modems may not be actual individual hardware in the preferred embodiment of the present invention. Even though the preferred embodiments of the present invention may not use individual server transport modems, this does not preclude such implementations.

In the FIG. 3 representation of the preferred embodiments of the present invention, the server transport modems (sTMs) 325, 326, 327, and 328 as well as the corresponding connections to the client transport modems (cTMs) 265, 266, 267, and 268, respectively, are shown as small dashed lines to indicate the virtual nature of the relationship. The server transport modems (sTMs) 325, 326, 327, and 328 may be virtual in the preferred embodiments of the present invention because they generally may be implemented using shared hardware in TMTS 215.

In general, the preferred embodiments of the present invention may act to transparently repeat digital signals between interfaces 245 and 385. Interfaces 245 and/or 385 may have different types of technologies and/or media for the point-to-point connections between active ports on interface 245 and active ports on interface 385. Active ports generally are associated with point-to-point connections between TMTS 215 and a client transport modem 265, 266, 267, or 268, when the point-to-point connection is allocated bandwidth through cable transmission (CT) network 105. In general, TMTS 215 connects at interface 250 to the central-side or service-provider-side of cable transmission (CT) network 105, whereas client transport modems (cTMs) 265, 266, 267, and 268 connect at interface 260 to the remote-side, customer-side, or subscriber-side of cable transmission (CT) network 105. Furthermore, the client transport modems (cTMs) 265, 266, 267, and 268 may be connected to remote networks over interface 385 using various types of media and technologies. The transport modem termination system (TMTS) 215 connected at interface 245 may further be connected into a common network 240, although the technology of the preferred embodiments of the present invention allows other central network configurations based upon various policy decisions and network ownership requirements. Some of these considerations include, but are not limited to, privacy, security, cost, and/or connectivity.

Integration Into Existing Cable Network Architectures

FIG. 4 shows a more detailed implementation of the preferred embodiment of the present invention from FIGS. 1 through 3 and its use in a cable network that may carry additional services over the cable transmission (CT) network 105. FIG. 4 shows TMTS 215 and cTMs 265, 266, 267, and 268 that were briefly described with respect to FIGS. 2a and 2b. As shown in FIG. 4, each cTM 265, 266, 267, and 268 has at least one ethernet/802.3 physical (PHY) transceiver 475, 476, 477, and 478, respectively. The ethernet/802.3 PHY transceivers 475, 476, 477, and 478 correspond to one non-limiting type of transceiver that may be used in the preferred embodiment of the present invention for remote-side network physical (PHY) transceivers (TX/RX) 275, 276, 277, 278, and 279 at the associated interfaces 285, 286, 287, 288, and 289 of FIG. 2b. Also each cTM 265, 266, 267, 268 may have one or a plurality of physical transceivers at interface 385. Each one of these transceivers may be an ethernet/802.3 physical interface or any other type of communications interface.

Furthermore, those skilled in the art will be aware of the relatively minor differences between IEEE 802.3 and the Digital-Intel-Xerox (DIX) 2.0 (or II) specification of ethernet and the possibility of carrying multiple frame formats such as, but not limited to, ethernet_II, 802.3 raw, 802.3/802.2 LLC (logical link control), and 802.3/802.2 SNAP (Sub-Network Access Protocol) on networks colloquially known as ethernet. In addition, the preferred embodiments of the present invention also are intended to cover other versions and variations of ethernet/802.3 including, but not limited to, DIX ethernet 1.0. References in this specification to ethernet and/or IEEE 802.3 generally are intended to refer to networks capable of carrying any combination of the various frame types generally carried on such ethernet/802.3 networks. Because the preferred embodiments of the present invention generally provide a physical layer interface that may be used for repeater service, the preferred embodiments of the present invention generally are transparent to the various types of ethernet/802.3 frames.

Although FIG. 4 shows four cTMs and four interfaces on TMTS 215, this is only for illustrative purposes, and the preferred embodiments of the present invention are not limited to providing connectivity to exactly four client transport modems. Instead the preferred embodiment of the present invention will work with at least one client transport modem and at least one corresponding interface on TMTS 215. In general, in FIG. 4 each one of the 802.3 physical (PHY) layer interfaces or transceivers 475, 476, 477, and 478 of the client transport modems (cTMs) generally is associated with a corresponding 802.3 physical layer interface and/or transceiver 425, 426, 427, and 428, respectively, in the TMTS 215. In general, 802.3 physical layer interfaces and/or transceivers 425, 426, 427, and 428 are one non-limiting example of the types of transceivers that may be used in the preferred embodiment of the present invention for central-side network physical (PHY) transceivers (TX/RX) 225, 226, 227, 228, and 229 at the associated interface 245 of FIG. 2a.

As shown in FIG. 4, the 802.3 PHY interfaces and/or transceivers 425, 426, 427, and 428 of the TMTS 215 are further connected to a headend networking device such as hub, switch, and/or router 430 with 802.3 PHY interfaces and/or transceivers 435, 436, 437, and 438, respectively. Those skilled in the art will be aware that this is only one of the many possible ways of connecting the ethernet/802.3 PHY interfaces and/or transceivers 425, 426, 427, and 428 of TMTS 215 to a service-provider common network 240 that may include a service provider backbone network (not shown in FIG. 4). Generally, based on service provider policies and equipment costs, various choices may be made for the specific device(s) to be connected to the 802.3 PHY interfaces and/or transceivers 225, 226, 227, and 228 of TMTS 215. As a non-limiting example, two of the 802.3 PHY interfaces and/or transceivers 225, 226, 227, and 228 may be associated with providing connectivity to two different remote offices of a particular company. That company may just want those two 802.3 PHY interfaces and/or transceivers of TMTS 215 to be directly connected (possibly using an ethernet cross-over cable that is known to one of skill in the art by crossing pins 1 and 3 as well as pins 2 and 6 of an RJ45 connector).

Therefore, the 802.3 PHY interfaces and/or transceivers 425, 426, 427, and 428 of TMTS 215 can be connected based on service provider policies and/or subscriber (or customer) demands. In addition, the present invention is not limited to a specific type of network device or link used to connect the 802.3 PHY interfaces port 225, 226, 227, and 228 of TMTS 215 to a service provider's network, which may be a common network 240 and may include a backbone network (not shown in FIG. 4). Thus, the at least one connection to headend hub/switch/router 430 over interface 245 is only one non-limiting example of how the TMTS 215 can be connected to a service provider backbone network.

Furthermore, as described with respect to FIGS. 1 through 3, the preferred embodiment of the present invention basically functions as a ethernet/802.3 repeater that transparently copies the bits from ethernet/802.3 frames between interfaces 245 and 385 of FIGS. 3 and 4. The transparent support of ethernet/802.3 generally allows the system to transparently carry ethernet/802.3 frames with virtual LAN or label-based multiplexing information such as, but not limited to, the information defined in IEEE 802.1Q (VLAN or Virtual LAN) and/or IEEE 802.17 (RPR or Resilient Packet Ring). Because of the transparency of the preferred embodiment of the present invention to various ethernet virtual LAN and/or tag/label information, service providers using the preferred embodiment of the present invention generally have the flexibility to specify policies for carrying, combining, and/or segregating the traffic of different subscribers based on the types of devices connected to interfaces 245 and 385. Also, subscribers or customers may choose to implement various mechanisms such as, but not limited to, 802.1Q VLAN and/or 802.17 RPR that might be used between two or more subscriber sites that are each connected to the preferred embodiment of the present invention. The transparency of the preferred embodiment of the present invention to this additional information in ethernet/802.3 frames provides versatility to the service provider and the subscriber in deciding on how to use various VLAN, tag, and/or label mechanisms that are capable of being carried with ethernet/802.3 frames.

In addition, FIG. 4 further shows how one client transport modem (cTM) 265 with at least one 802.3 PHY interface or transceiver 475 is connected over interface 385 to 802.3 PHY interface or transceiver 485. Ethernet/802.3 PHY interface 485 may be located in a subscriber hub/switch/router 480 that has more 802.3 PHY interfaces or transceivers 491, 492, and 493 into the customer or subscriber LANs or networks, which are non-limiting examples of portions of remote networks. The other client transport modems (cTMs) 266, 267, and 268 also would likely have connections over interface 385 to various devices of other customer or subscriber LANs, though these are not shown in FIG. 4. Much like headend hub/switch/router 430, the actual type of network device or connection for subscriber hub/switch/router 480 is not limited by the preferred embodiment of the present invention. The preferred embodiment of the present invention generally provides transparent ethernet repeater capability over a cable transmission network 105. In FIG. 4, the interfaces 250 and 260 generally correspond to the central-side or service-provider-side and to the remote-side, customer-side, or subscriber-side, respectively, of cable transmission (CT) network 105. These reference interfaces 250 and 260 in FIG. 4 were shown in FIGS. 2a, 2b, and 3 as the interfaces of cable transmission (CT) network 105.

Those skilled in the art will be aware of the devices and technologies that generally make up cable transmission networks 105. At least some of this cable transmission technology is described in "Modern Cable Television Technology: Video, Voice, and Data Communications" by Walter Ciciora, James Farmer, and David Large, which is incorporated by reference in its entirety herein. In general, the cable transmission networks 105 may carry other services in addition to those of the preferred embodiment of the present invention. For instance, as known by one skilled in the art, a cable transmission network 105 may carry analog video, digital video, DOCSIS data, and/or cable telephony in addition to the information associated with the preferred embodiment of the present invention. Each one of these services generally has equipment located at the service provider, such as analog video equipment 401, digital video equipment 402, DOCSIS data equipment 403, and cable telephony equipment 404 as well as equipment located at various customer or subscriber locations such as analog video equipment 411, digital video equipment 412, DOCSIS data equipment 413, and cable telephony equipment 414. Even though these other services in FIG. 4 are shown as if they are bi-directional, often some of the services such as analog video and digital video have historically been primarily uni-directional services that generally are broadcast from the headend to the subscribers.

In addition, FIG. 4 further shows some of the transmission equipment that might be used in a cable transmission network 105 (generally found between interfaces 250 and 260 in FIG. 4). For example, cable transmission networks 105 might include combiner 415 and splitter 416 to combine and split electromagnetic signals, respectively. As cable transmission network 105 may be a hybrid fiber-coax (HFC) network, it could contain devices for converting electromagnetic signals between electrical and optical formats. For example, downstream optical/electrical (O/E) interface device 417 may convert downstream electrical signals (primarily carried over coaxial cable) to downstream optical signals (primarily carried over fiber optic lines). Also, upstream optical/electrical (O/E) interface device 418 may convert upstream optical signals (primarily carried over fiber optic lines) to upstream electrical signals (primarily carried over coaxial cable). Downstream optical/electrical interface 417 and upstream optical/electrical interface 418 generally are connected to a subscriber or customer premises over at least one fiber optic connection to optical/electrical (O/E) interface 420. The downstream optical communications between downstream O/E interface 417 and O/E interface 420 might be carried on different optical fibers from the fibers carrying upstream optical communications between O/E interface 420 and upstream O/E interface 418. However, one skilled in the art will be aware that a variation on frequency-division multiplexing (FDM) known as wavelength division multiplexing (WDM) could be used to allow bi-directional duplex transmission of both the downstream and upstream optical communications on a single fiber optic link.

Generally, for an HFC system the interfaces at customer or subscriber premises are electrical coax connections. Thus, optical/electrical interface 420 may connect into a splitter/combiner 422 that divides and/or combines electrical signals associated with analog video device 411, digital video device 412, DOCSIS data device 413, and/or cable telephone device 413 that generally are located at the customer or subscriber premises. This description of the splitters, combiners, and optical electrical interfaces of HFC networks that may be used for cable transmission network 105 is basic and does not cover all the other types of equipment that may be used in a cable transmission network 105. Some non-limiting examples of other types of equipment used in a cable transmission network 105 include, but are not limited to, amplifiers and filters. Those skilled in the art will be aware of these as well as many other types of devices and equipment used in cable transmission networks.

Furthermore, one skilled in the art will be aware that the preferred embodiments of the present invention may be used on all-coax, all-fiber, and/or hybrid fiber-coax (HFC) such as cable transmission networks (CT) 105. In general, cable transmission (CT) network 105 generally is a radio frequency (RF) network that generally includes some frequency-division multiplexed (FDM) channels. Also, one skilled in the art will be aware that the preferred embodiments of the present invention may be used on a cable transmission (CT) network 105 that generally is not carrying information for other applications such as, but not limited to, analog video, digital video, DOCSIS data, and/or cable telephony. Alternatively, the preferred embodiments of the present invention may coexist on a cable transmission (CT) network 105 that is carrying information analog video, digital video, DOCSIS data, and/or cable telephony as well as various combinations and permutations thereof. Generally in the preferred embodiments of the present invention, the cable transmission (CT) network 105 is any type of network capable of providing frequency-division multiplexed (FDM) transport of communication signals such as but not limited to electrical and/or optical signals. The FDM transport includes the variation of FDM in optical networks which is generally called wavelength-division multiplexing (WDM).

In addition, the preferred embodiments of the present invention may use one or more MPEG PIDs for downstream transmission of MPEG packets carrying the traffic of Frame Management Sublayer (FMS) data flows. In addition, MPEG packets carrying the octets of one or more FMS data flows of the preferred embodiments of the present invention are capable of being multiplexed into the same frequency channel of a cable transmission network that also carries other MPEG packets that have different PID values and that generally are unrelated to the FMS data flows of the preferred embodiments of the present invention. Thus, not only are both the upstream and the downstream frequency channel usages of the preferred embodiments of the present invention easily integrated into the general frequency-division multiplexing (FDM) bandwidth allocation scheme commonly-found in cable transmission networks, but also the use of the MPEG frame format for downstream transmission in the preferred embodiments of the present invention allows easy integration into the PID-based time-division multiplexing (TDM) of MPEG 2 transport streams that also is commonly-found in cable transmission networks. Thus, one skilled in the art will be aware that the preferred embodiments of the present invention can be easily integrated into the frequency-division multiplexing (FDM) architecture of cable transmission networks.

As one skilled in the art will be aware, in North America cable transmission networks generally were first developed for carrying analog channels of NTSC (National Television Systems Committee) video that generally utilize 6 MHz of frequency bandwidth. Also, one skilled in the art will be aware that other parts of the world outside North America have developed other video coding standards with other cable transmission networks. In particular, Europe commonly utilizes the phase alternating line (PAL) analog video encoding that is generally carried on cable transmission networks in frequency channels with a little more bandwidth than the generally 6 MHz channels, which are commonly used in North American cable transmission networks. Because the frequency channels used in the preferred embodiments of the present invention will fit into the more narrow frequency bandwidth channels that were originally designed to carry analog NTSC video, the frequency channels used in the preferred embodiments of the present invention also will fit into larger frequency bandwidth channels designed for carrying analog PAL video.

In addition, although the preferred embodiments of the present invention are designed to fit within the 6 MHz channels commonly-used for analog NTSC signals and will also fit into cable transmission networks capable of carrying analog PAL signals, one skilled in the art will be aware that the multiplexing techniques utilized in the preferred embodiments of the present invention are general. Thus, the scope of the embodiments of the present invention is not to be limited to just cable transmission systems, which are designed for carrying NTSC and/or PAL signals. Instead, one skilled in the art will be aware that the concepts of the embodiments of the present invention generally apply to transmission facilities that use frequency division multiplexing (FDM) and have a one-to-many communication paradigm for one direction of communication as well as a many-to-one communication paradigm for the other direction of communication.

Furthermore, the preferred embodiments of the present invention generally communicate using signals with similar transmission characteristics to other signals commonly found in cable transmission networks. Thus, one skilled in the art will be aware that the signal transmission characteristics of the preferred embodiments of the present invention are designed to integrate into existing, already-deployed cable transmission networks that may be carrying other types of signals for other services such as, but not limited to, analog and/or digital video, analog and/or digital audio, and/or digital data. The preferred embodiments of the present invention are designed to be carried in the same communications medium that also may be carrying the other services without the preferred embodiments of the present invention introducing undesirable and unexpected interference on the other services. Furthermore, the preferred embodiments of the present invention will operate over various types of communication media including, but not limited to, coaxial (coax) cable, fiber, hybrid fiber-coax, as well as wireless. Because the preferred embodiments of the present invention generally are designed to conform to some of the historical legacy standards of cable networks, the preferred embodiments of the present invention can be used in many existing network infrastructures that are already carrying other services. Therefore, the preferred embodiments of the present invention peacefully coexist with existing historical legacy services. Also, the preferred embodiments of the present invention can be used in other environments that are not limited by historical legacy services (or services compatible with historical legacy standards).

Figure 5A:
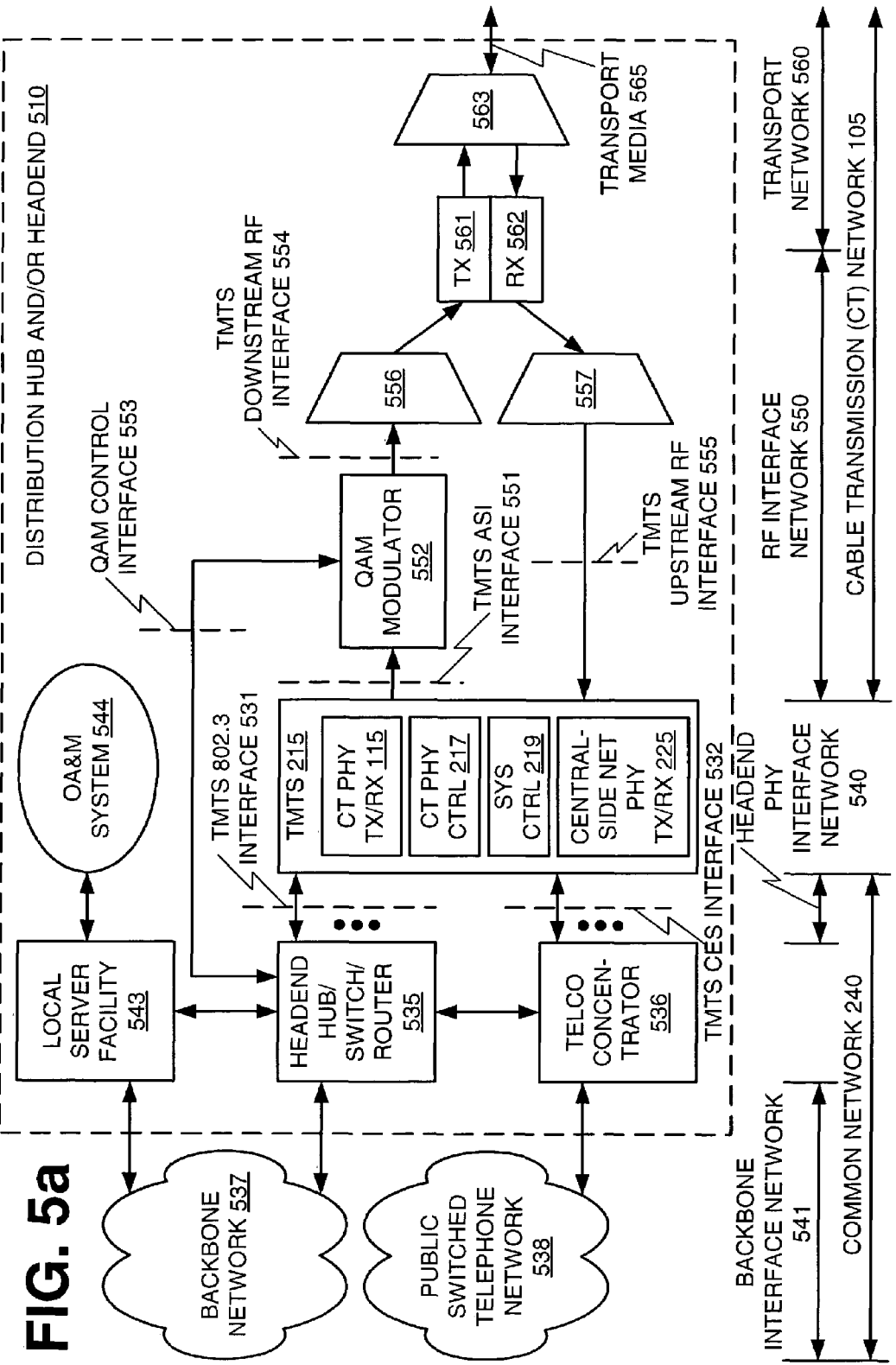
FIG. 5a shows a block diagram of a transport modem termination system connected in a headend.
Figure 5B:
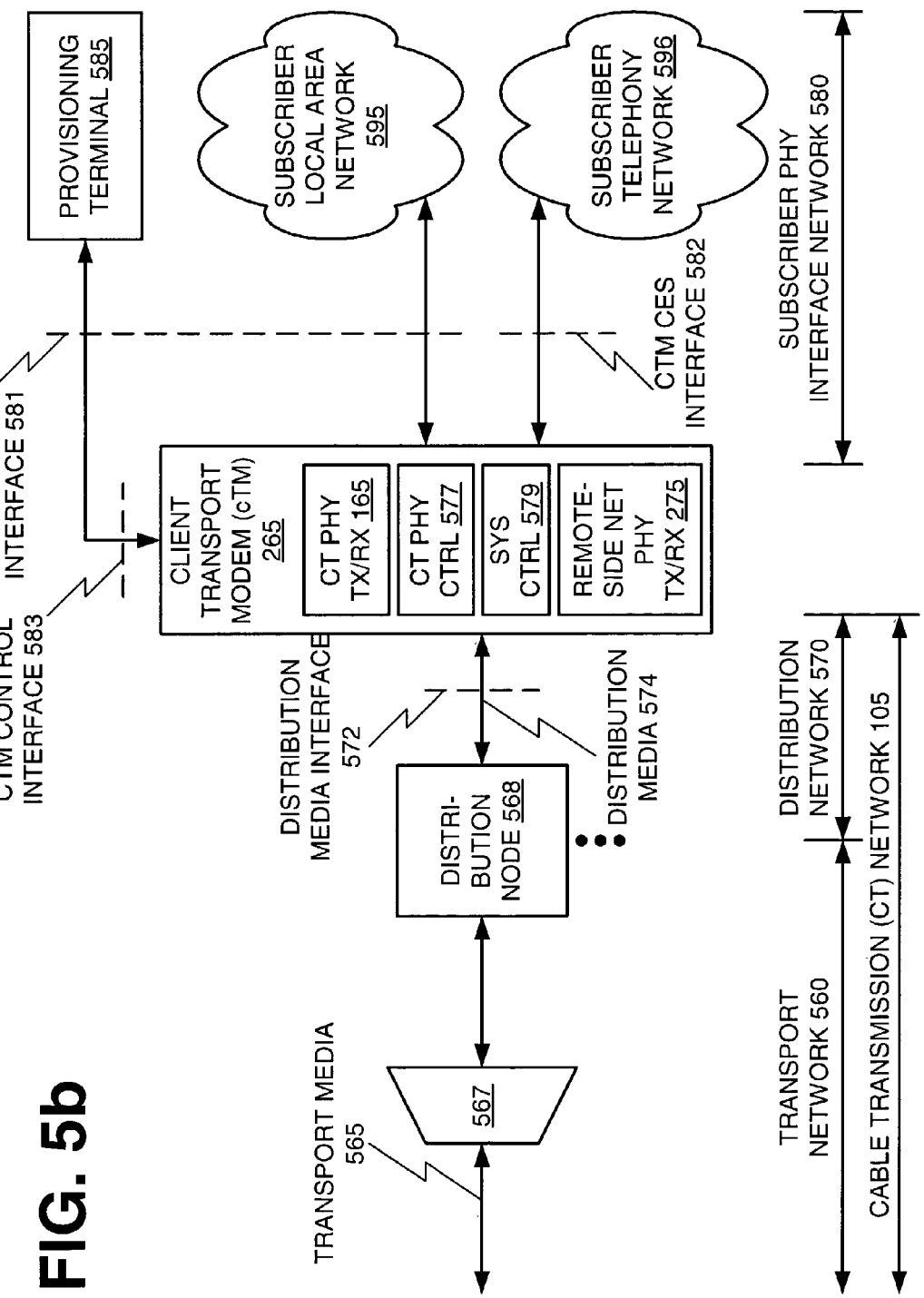
FIG. 5b shows a block diagram of a client transport modem connected to a cable transmission network.

FIGS. 5*a* and 5*b* generally show a more detailed system reference diagram for a communication system that might be using a preferred embodiment of the present invention. In general, FIG. 5*a* covers at least some of the equipment and connections commonly found on the central-side or service-provider-side in a system using the preferred embodiments of the present invention. In contrast, FIG. 5*b* generally covers at least some of the equipment and connections commonly found on the remote-side, customer-side, or subscriber-side of a system using the preferred embodiments of the present invention. Generally, the approximate demarcation of cable transmission network (CT) 105 network is shown across the FIGS. 5*a* and 5*b*. One skilled in the art will be aware that the devices shown in FIGS. 5*a* and 5*b* are non-limiting examples of the types of equipment generally found in RF cable networks. Thus, FIGS. 5*a* and 5*b* show only a preferred embodiment of the present invention and other embodiments are possible.

In general, the equipment for the central-side, service-provider side, and/or customer-side of the network generally may be located in a distribution hub and/or headend 510. FIG. 5*a* shows transport modem termination system (TMTS) 215 comprising at least one cable transmission (CT) physical (PHY) transceiver (TX/RX) 115, at least one cable transmission (CT) physical (PHY) control (CTRL) 217, at least system control (SYS CTRL) 219, and at least one central-side network physical (PHY) transceiver (TX/RX) 225. In the preferred embodiments of the present invention, TMTS 215 supports two types of interfaces to common network 240. In FIG. 5*a* these two types of interfaces are shown as TMTS 802.3 interface 531 and TMTS circuit emulation service (CES) interface 532. In general, there may be multiple instances of both TMTS 802.3 interface 531 and TMTS CES interface 532 that might be used to handle traffic for multiple remote-side network interfaces and/or transceivers on a single client transport modem (cTM) or for multiple remote-side network interfaces on a plurality of client transport modems (cTMs).

In the preferred embodiment of the present invention the at least one TMTS 802.3 interface 531 generally is capable of transparently conveying the information in ethernet/802.3 frames. Generally, at the most basic level, the preferred embodiments of the present invention are capable of acting as an ethernet/802.3 physical layer repeater. However, one skilled in the art will be aware that the generally physical layer concepts of the preferred embodiments of the present invention may be integrated into more complex communication devices and/or systems such as, but not limited to, bridges, switches, routers, and/or gateways.

Generally, at least one TMTS CES interface 532 provides circuit emulation capability that may be used to carry generally historical, legacy interfaces that are commonly associated with circuit-switched networks, such as the public switched telephone network (PSTN). Those skilled in the art will be aware of analog and/or digital interfaces to the PSTN that are commonly found in devices interfacing to the PSTN. In digital form, these interfaces often comprise integer multiples of a DS0 at 56 kbps (N×56) and/or 64 kbps (N×64). Also, a person skilled in the art will be aware of various common multiplexing technologies that may be used to aggregate the integer multiples of DS0s. These multiplexing technologies generally can be divided into the plesiochronous digital hierarchy (PDH) and the synchronous digital hierarchy (SDH) that are well-known to one of ordinary skill in the art.

In general, at least one TMTS 802.3 interface 531 may be connected into a headend hub, switch, or router 535 or any other networking device to implement various policy decisions for providing connectivity between the transport modem termination system 215 and the client transport modems (cTMs) 265. One skilled in the art generally will be aware of the various policy considerations in choosing different types of networking devices and/or connections for connecting to TMTS 802.3 interface 531.

Furthermore, at least one TMTS CES interface 532 might be connected to a telco concentrator that generally might be various switching and/or multiplexing equipment designed to interface to technologies generally used for carrying circuit-switched connections in the PSTN. Thus, telco concentrator 536 might connect to TMTS 215 using analog interfaces and/or digital interfaces that generally are integer multiples of DS0 (56 kbps or 64 kbps). Some non-limiting examples of analog interfaces that are commonly found in the industry are FXS/FXO (foreign exchange station/foreign exchange office) and E&M (ear & mouth). In addition to carrying the actual information related to CES emulation service between TMTS 215 and telco concentrator 536, TMTS CES interface 532 also may to carry various signaling information for establishing and releasing circuit-switched calls. One skilled in the art will be aware of many different signaling protocols to handle this function, including but not limited to, channel associated signaling using bit robbing, Q.931 D-channel signaling of ISDN, standard POTS signaling as well as many others.

In general, one or more devices at the headend, such as headend hub, switch, and/or router 535, generally provide connectivity between TMTS 215 and backbone network 537, which may provide connectivity to various types of network technology and/or services. Also, telco concentrator 536 may be further connected to the public switched telephone network (PSTN). In general, telco concentrator 536 might provide multiplexing and/or switching functionality for the circuit emulation services (CES) before connecting these services to the PSTN. Also, telco concentrator 536 could convert the circuit emulation services (CES) into packet-based services. For example, 64 kbps PCM voice (and associated signaling) carried across TMTS CES interface 532 might be converted into various forms of packetized voice (and associated signaling) that is carried on a connection between telco concentrator 536 and headend hub, switch, and/or router 535. In addition, the connection between telco concentrator 536 and headend hub, switch, and/or router 535 may carry network management, configuration, and/or control information associated with telco concentrator 536.

In general, TMTS 802.3 interface 531 and TMTS CES interface 532 may be considered to be at least part of the headend physical (PHY) interface network 540. Also, at least part of the common network 240 generally may be considered to be the backbone interface network 541. In addition to the systems and interfaces generally designed for transparently carrying information between the central-side networks (as represented at TMTS 802.3 interface 531 and TMTS CES interface 532) of the TMTS 215 and the remote-side networks of at least one cTM 265, the communication system generally has connections to local server facilities 543 and operations, administration, and maintenance system 544 that may both be part of common network 240. Network management, configuration, maintenance, control, and administration are capabilities that, although optional, are generally expected in many communication systems today. Though the preferred embodiments of the present invention might be implemented without such functions and/or capabilities, such an implementation generally would be less flexible and would probably be significantly more costly to support without some specialized network functions such as, but not limited to, operations, administration, and maintenance (OA&M) 544. Also, local server facility 543 may comprise servers running various protocols for functions such as, but not limited to, dynamic network address assignment (potentially using the dynamic host configuration protocol—DHCP) and/or software uploads as well as configuration file uploads and downloads (potentially using the trivial file transfer protocol—TFTP).

FIG. 5a further shows how cable transmission (CT) physical (PHY) transceiver (TX/RX) 115 in TMTS 215 might interface to RF interface network 550 in the preferred embodiment of the present invention. In an embodiment of the present invention, CT PHY transceiver 115 connects to a TMTS asynchronous serial interface (ASI) 551 for the downstream communication from TMTS 215 towards at least one client transport modem (cTM) 265. In a preferred embodiment of the present invention, the QAM (Quadrature Amplitude Modulation) modulator 552 is external to the TMTS 215. One skilled in the art will be aware that other embodiments of the present invention are possible that may incorporate the at least one QAM modulator 552 into the TMTS 215 for downstream communication. Furthermore, an ASI (asynchronous serial interface) interface is only one non-limiting example of a potential interface for the at least one QAM modulator 522. QAM modulators 552 with ASI interfaces are commonly used in cable transmission networks 105, and reuse of existing technology and/or systems may allow lower cost implementations of the preferred embodiments of the present invention. However, other embodiments using various internal and/or external interfaces to various kinds of modulators might be used in addition to or in place of the TMTS ASI interface 551 to at least one QAM modulator 552.

Because QAM modulators are used for many types of transmission in CATV networks, one skilled in the art will be aware of many interfaces (both internal and external) that might be used for connecting QAM modulator(s) 522 for downstream transmission. The TMTS ASI interface 551 is only one non-limiting example of an interface that is often used in the art and is well-known to one of ordinary skill in the art. As one skilled in the art will be aware, such QAM modulators have been used in CATV networks to support downstream transmission for commonly-deployed services such as, but not limited to, DOCSIS cable modems and digital TV using MPEG video. Due to the common usage of such QAM modulators for digital services and the large variety of external and internal interfaces used by many vendors' equipment, one skilled in the art will be aware that many types of interfaces may be used for transmitting the digital bit streams of a TMTS to QAM modulators for modulation followed by further downstream transmission over cable transmission networks. Thus, in addition to TMTS ASI interface 551, one skilled in the art will be aware of other standard and/or proprietary interfaces that may be internal or external to TMTS 215 and that might be used to communicate digital information to QAM modulator(s) 522 for downstream transmission. These other types of interfaces to QAM modulators are intended to be within the scope of the embodiments of the present invention.

In general, TMTS 215 controls the downstream modulation formats and configurations in the preferred embodiments of the present invention. Thus, when external modulators (such as QAM modulator 552) are used with TMTS 215, some form of control messaging generally exists between TMTS 215 and QAM modulator 552. This control messaging is shown in FIG. 5a as QAM control interface 553, which generally allows communication between at least one QAM modulator 552 and TMTS 215. In the preferred embodiment of the present invention, this communication between at least one QAM modulator 552 and TMTS 215 may go through headend hub, switch, and/or router 535 as well as over TMTS 802.3 interface 531.

Furthermore, modulators such as, but not limited to, at least one QAM modulator 552 often are designed to map information onto a set of physical phenomena or electromagnetic signals that generally are known as a signal space. Generally a signal space with M signal points is known as a M-ary signal space. In general, a signal space with M signal points may completely encode the floor of $\log_2 M$ bits or binary digits of information in each clock period or cycle. The floor of $\log_2 M$ is sometimes written as floor($\log_2 M$) or as $\lfloor \log_2 M \rfloor$. In general, the floor of $\log_2 M$ is the largest integer that is not greater than $\log_2 M$. When M is a power of two (i.e., the signal space has 2, 4, 8, 16, 32, 64, etc. signal points), then the floor of $\log_2 M$ generally is equal to $\log_2 M$, and $\log_2 M$ generally is known as the modulation index. Because the minimum quanta of information is the base-two binary digit or bit, the information to be mapped into a signal space generally is represented as strings of bits. However, one skilled in the art will be aware that the preferred embodiment of the present invention may work with representations of information in other number bases instead of or in addition to base two or binary.

As known to those of ordinary skill in the art, the demodulation process generally is somewhat the reverse of the modulation process and generally involves making best guess or maximum likelihood estimations of the originally transmitted information given that an electromagnetic signal or physical phenomena is received that may have been corrupted by various factors including, but not limited to, noise. In general, TMTS downstream radio frequency (RF) interface 554 carries signals that have been modulated for transmitting information downstream over an RF network. TMTS upstream radio frequency (RF) interface 555 generally carries signals that have to be demodulated to recover upstream information from an RF network. Although the preferred embodiments of the present invention generally use quadrature amplitude modulation (QAM), one skilled in the art will be aware of other possible modulation techniques. Furthermore, "Digital Communications, Fourth Edition" by John G. Proakis and "Digital Communications: Fundamentals and Applications, Second Edition" by Bernard Sklar are two common books on digital communications that describe at least some of the known modulation techniques. These two books by John G. Proakis and Bernard Sklar are incorporated by reference in their entirety herein.

Tables 1, 2, 3 and 4 generally show the transmission parameters used in the preferred embodiments of the present invention. One skilled in the art will be aware that other transmission characteristics and parameters could be used for alternative embodiments of the present invention. Table 1 specifies at least some of the preferred transmission parameters for downstream output from a TMTS. In addition, Table 2 specifies at least some of the preferred transmission parameters for downstream input into a cTM. Also, Table 3 specifies at least some of the preferred transmission parameters for upstream output from a cTM. Finally, Table 4 specifies at least some of the preferred transmission parameters for upstream input to a TMTS.

Furthermore, one skilled in the art will be aware that the concepts of the embodiments of the present invention could be used in different frequency ranges using optional frequency upconverters and/or downconverters. Therefore, although the preferred embodiments of the present invention may be designed to preferably work within the specified frequency ranges, the scope of the concepts of the present invention is also intended to include all variations of the present invention that generally involve frequency shifting the operational range of the upstream and/or downstream channels in a cable distribution network. Frequency shifting signals using upconverters and/or downconverters is known to one of ordinary skill in the art of cable networks.

TABLE 1

Downstream output from TMTS

| Parameter | Value |
| --- | --- |
| Channel Center Frequency (fc) | 54 MHz to 857 MHz ±30 kHz |
| Level | Adjustable over the range 50 to 61 dBmV |
| Modulation Type | 64 QAM and 256 QAM |
| Symbol Rate (nominal) | |
| 64 QAM | 5.056941 Msym/sec |
| 256 QAM | 5.360537 Msym/sec |
| Nominal Channel Spacing | 6 MHz |
| Frequency Response | |
| 64 QAM | ~18% Square Root Raised Cosine Shaping |
| 256 QAM | ~12% Square Root Raised Cosine Shaping |
| Output Impedance | 75 ohms |
| Output Return Loss | >14 dB within an output channel up to 750 MHz; >13 dB in an output channel above 750 MHz |
| Connector | F connector per [IPS-SP-406] |

±30 kHz includes an allowance of 25 kHz for the largest FCC frequency offset normally built into upconverters.

TABLE 2

Downstream input to cTM

| Parameter | Value |
| --- | --- |
| Center Frequency (fc) | 54 MHz to 857 MHz ±30 kHz |
| Level | −5 dBmV to +15 dBmV |
| Modulation Type | 64 QAM and 256 QAM |
| Symbol Rate (nominal) | |
| 64 QAM | 5.056941 Msym/sec |
| 256 QAM | 5.360537 Msym/sec |
| Bandwidth | |
| 64 QAM | 6 MHz with ~18% Square Root Raised Cosine Shaping |
| 256 QAM | 6 MHz with ~12% Square Root Raised Cosine Shaping |
| Total Input Power (40–900 MHz) | <30 dBmV |
| Input (load) Impedance | 75 ohms |
| Input Return Loss | >6 dB 54–860 MHz |
| Connector | F connector per [IPS-SP-406] (common with the output |

TABLE 3

Upstream output from cTM

| Parameter | Value |
|---|---|
| Channel Center Frequency (fc) | |
| Sub-split | 5 MHz to 42 MHz |
| Data-split | 54 MHz to 246 MHz |
| Number of Channels | Up to 3 |
| Nominal Channel Spacing | 6 MHz |
| Channel composition | Up to 14 independently modulated tones |
| Tone Modulation Type | QPSK, 16 QAM, 64 QAM or 256 QAM |
| Symbol Rate (nominal) | 337500 symbols/s |
| Tone Level | Adjustable in 2 dB steps over a range of −1 dBmV to +49 dBmV per tone (+10.5 dBmV to +60.5 dBmV per fully loaded channel, i.e. all 14 tones present) |
| Tone Frequency Response | 25% Square Root Raised Cosine Shaping |
| Occupied Bandwidth per Tone | 421.875 kHz |
| Occupied Bandwidth per Channel | 5.90625 MHz |
| Output Impedance | 75 ohms |
| Output Return Loss | >14 dB |
| Connector | F connector per [IPS-SP-406] |

TABLE 4

Upstream input to TMTS

| Parameter | Value |
|---|---|
| Channel Center Frequency (fc) | |
| Subsplit | 5 MHz to 42 MHz |
| Data-split | 54 MHz to 246 MHz |
| Tone nominal level | +20 dBmV |
| Tone Modulation Type | QPSK, 16 QAM, 64 QAM or 256 QAM |
| Symbol Rate (nominal) | 337500 symbols/s |
| Tone Bandwidth | 421.875 kHz with 25% Square Root Raised Cosine Shaping |
| Total Input Power (5–246 MHz) | <30 dBmV |
| Input (load) Impedance | 75 ohms |
| Input Return Loss | >6 dB 5–246 MHz |
| Connector | F connector per [IPS-SP-406] |

Generally, the downstream signals associated with TMTS 215 may or may not be combined in downstream RF combiner 556 with other downstream RF signals from applications such as, but not limited to, analog video, digital video, DOCSIS data, and/or cable telephony. Upstream RF splitter 557 may split the upstream signals for TMTS 215 from upstream signals for other applications such as, but not limited to, analog video, digital video, DOCSIS data, and/or cable telephony. Also, the downstream RF combiner 556 and upstream RF splitter 557 might be used to carry the communications for multiple transport modem termination systems, such as TMTS 215, over a cable transmission (CT) network 105. The signals used in communication between a TMTS 215 and at least one client transport modem (cTM) 265 generally might be treated like any other RF signals for various applications that generally are multiplexed into cable transmission (CT) network 105 based upon 6 MHz frequency channels.

If cable transmission (CT) network 105 is a hybrid fiber-coax (HFC) network, then the transport network 560 may include transmitter 561 receiver 562 as optical/electrical (O/E) interfaces that convert the RF signals between coaxial cable and fiber optical lines. In addition, transport combiner 563 may handle combining the two directions of optical signals as well as other potential data streams for communication over at least one fiber using techniques such as, but not limited to, wavelength-division multiplexing (WDM). Thus, in a preferred embodiment of the present invention using HFC as at least part of cable transmission (CT) network 105, transport media 565 may be fiber optical communication lines.

FIG. 5b generally shows the continuation of cable transmission (CT) network 105, transport network 560, and transport media 565 in providing connectivity between TMTS 215 and at least one client transport modem (cTM) 265. In a preferred embodiment of the present invention that utilizes fiber optic lines as at least part of transport network 560, transport splitter 567 may provide wavelength division multiplexing (WDM) and demultiplexing to separate the signals carried in the upstream and downstream directions and possibly to multiplex other signals for other applications into the same at least one fiber. If transport network 560 is a fiber network and cable transmission (CT) network 105 is a hybrid fiber-coax network, then at least one distribution node 568 may comprise optical/electrical interfaces to convert between a fiber transport network 560 and a coaxial cable distribution network 570. In general, there may be a distribution media interface 572 and distribution media 574 that provide connectivity between at least one client transport modem (cTM) 265 and distribution node 568.

A client transport modem (cTM) 265 generally comprises a cable transmission physical (PHY) transceiver (TX/RX) 165 as well as a remote-side network physical (PHY) transceiver (TX/RX) 275. In addition, a client transport modem (cTM) 265 comprises cable transmission (CT) physical (PHY) control (CTRL) 577 and system control 579. In general, CT PHY control 577 is concerned with handling bandwidth allocations in cable transmission (CT) network 105, and system control 579 generally is concerned with cTM management and/or configuration.

In the preferred embodiment of the present invention a client transport modem (cTM) 265 generally interfaces with at least one subscriber physical (PHY) interface network 580. Interfaces such as interface 285 in FIG. 2b may comprise a cable transport modem (cTM) 802.3 interface 581 and/or a cTM circuit emulation service (CES) interface 582 in FIG. 5b. Thus, a cTM may have multiple interfaces to different remote-side networks, and the interfaces may use different interface types and/or technologies. Also, a cTM 265 may have a cTM control interface 583 that is used to allow at least one provisioning terminal 585 to perform various tasks such as, but not limited to, configuration, control, operations, administration, and/or maintenance. In the preferred embodiment of the present invention, the cTM control interface 583 may use ethernet/802.3, though other interface types and technologies could be used. Also, cTM control interface 583 could use a separate interface from interfaces used to connect to remote-side networks such as subscriber local area network 595. Based on various policy decisions and criteria, such as but not limited to security, the cTM control interface 583 may be carried over the same communications medium that connects to various remote-side networks or it may be carried over separate communications medium from that used in connecting to various remote-side networks. In the preferred embodiment of the present invention, the cTM control interface 583 is carried in a separate 802.3/ethernet medium for security.

Also, FIG. 5b shows client transport modem (cTM) 265 being connected over cTM circuit emulation service (CES) interface 582 to another remote-side network, the subscriber telephony network 596. Many remote or subscriber locations have legacy equipment and applications that use various interfaces commonly found in connections to the PSTN. The preferred embodiments of the present invention allow connection of these types of interfaces to the client transport modem (cTM) 265. Some non-limiting examples of these interfaces are analog POTS lines as well as various digital interfaces generally supporting N×56 and N×64 (where N is any positive integer). The digital interfaces may have a plurality of DS0s multiplexed into a larger stream of data using the plesiochronous digital hierarchy (PDH) and/or the synchronous digital hierarchy (PDH). In the preferred embodiments of the present invention, cTM CES interface 582 is a T1 line, which is part of the plesiochronous digital hierarchy (PDH).

Protocol Models

FIG. 6 shows more detail of a preferred embodiment of a transport modem termination system (TMTS) 215 and/or a client transport modem (cTM) 265. In general, for various tasks such as, but not limited to, configuration, management, operations, administration, and/or maintenance, a TMTS 215 and/or a cTM 265 generally may have a capability of system control 219 and/or 579, respectively. In general, the system control 219 and/or 579 may have at least one cable transmission (CT) physical (PHY) transceiver (TX/RX) 115 and/or 165 as well as at least one interface for connecting to central-side and/or remote-side networks with ethernet/ 802.3 physical (PHY) transceiver 225 and/or 275 being the at least one type of connection to the central-side and/or remote-side networks in the preferred embodiment of the present invention. At least one cable transmission (CT) physical (PHY) transceiver (TX/RX) 115 and/or 165 generally is connected to at least one cable transmission (CT) network 105. Also, in the preferred embodiment of the present invention at least one ethernet/802.3 physical (PHY) transceiver 225 and/or 275 is connected to at least one ethernet/802.3 media 605.

In general, a single instance of a 802.3/ethernet media access control (MAC) algorithm could be used for both the 802.3 physical (PHY) transceiver (TX/RX) 225 and/or 275 as well as the cable transmission (CT) physical (PHY) transceiver (TX/RX) 115 and/or 165. In other embodiments multiple instances of a medium access control (MAC) algorithm may be used. In general, ethernet/802.3 uses a carrier sense multiple access with collision detection (CSMA/CD) MAC algorithm. Each instance of the algorithm generally is responsible for handling the carrier sensing, collision detection, and/or back-off behavior of in one MAC collision domain. The details of the 802.3 MAC are further defined in IEEE standard 802.3-2000, "Part 3: Carrier sense multiple access with collision detection (CSMA/ CD) access method and physical layer", which was published in 2000, and is incorporated by reference in its entirety herein.

The preferred embodiment of the present invention generally functions as a physical layer repeater between at least one 802.3 media 605 and at least one cable transmission (CT) network 105. Although repeaters may support a particular MAC algorithm for management and control purposes, generally repeaters do not break up a network into different collision domains and/or into different layer three sub-networks. However, one skilled in the art will be aware that other embodiments are possible for devices such as, but not limited to, bridges, switches, routers, and/or gateways. These other embodiments may have multiple instances of the same and/or different MAC algorithms.

Furthermore, the CSMA/CD MAC algorithm as well as the physical layer signals that generally are considered part of the ethernet/802.3 specification may be used to carry different frame types. In the preferred embodiment of the present invention, because of the wide-spread availability of Internet Protocol (IP) technology, the system control 219 for TMTS 215 and/or the system control 579 for cTM 265 generally may use IP for various tasks such as, but not limited to, configuration, management, operations, administration, and/or maintenance. On ethernet/802.3 networks, IP datagrams commonly are carried in Digital-Intel-Xerox (DIX) 2.0 or ethernet_II frames. However, other frame types may be used to carry IP datagrams including, but not limited to, 802.3 frames with 802.2 logical link control (LLC) and a sub-network access protocol (SNAP). Thus, 802.2 LLC/ DIX 615 handles the correct frame type information for the WP datagrams communicated to and/or from the system control 219 and/or 579 of TMTS 215 and/or cTM 265, respectively. Often network devices using the internet protocol (IP) are configurable for 802.2 LLC and/or ethernet_II frame types.

In general, for communications with IP devices a mapping should exist between logical network layer addresses (such as IP addresses) and hardware, data link, or MAC layer addresses (such as ethernet/802.3 addresses). One protocol for dynamically determining these mappings between IP addresses and ethernet/802.3 addresses on broadcast media is the address resolution protocol (ARP). ARP is commonly used in IP devices that are connected to broadcast media such as ethernet/802.3 media. Thus, the preferred embodiments of the present invention generally support ARP 620 to allow tasks such as, but not limited to, configuration, management, operations, administration, and/or maintenance of TMTS 215 and/or cTM 265.

In the preferred embodiments of the present invention, TMTS 215 and/or cTM 265 generally support management and/or configuration as IP devices. Thus, system control 219 and/or 579 generally has an IP layer 625 that may also optionally include support for ICMP. The internet control message protocol (ICMP) is commonly used for simple diagnostic tasks such as, but not limited to, echo requests and replies used in packet internet groper (PING) programs. Generally, various transport layer protocols such as, but not limited to, the user datagram protocol (UDP) 630 are carried within IP datagrams. UDP is a connectionless datagram protocol that is used in some basic functions in the TCP/IP (Transmission Control Protocol/Internet Protocol) suite. Generally, UDP 630 supports the dynamic host configuration protocol (DHCP) 635, which is an extension to the bootstrap protocol (BOOTP), the simple network management protocol (SNMP) 640, the trivial file transfer protocol (TFTP) 645, as well as many other protocols within the TCP/IP suite.

DHCP 635 is commonly used in IP devices to allow dynamic assignment of IP addresses to devices such as TMTS 215 and/or cTM 265. SNMP 640 generally supports "sets" to allow a network management system to assign values on the network devices, "gets" to allow a network management system to retrieve values from network devices, and/or "traps" to allow network devices to information a network management system of alarm conditions and events. TFTP 645 might be used to load a configuration from a file onto a network device, to save off a configuration of a network device to a file, and/or to load new code or program software onto a network device. These protocols of DHCP 635, SNMP 640, and TFTP 645 may be used in the preferred embodiment for control processes 650 in system control 219 and/or 579 of TMTS 219 and/or cTM 265, respectively.

Furthermore, one skilled in the art will be aware that many other interfaces are possible for tasks such as, but not limited to, configuration, management, operations, administration, and/or maintenance of TMTS 215 and/or cTM 265. For example, the system control 219 or 579 in TMTS 215 and/or cTM 265 may support the transmission control protocol (TCP) instead of or in addition to UDP 630. With TCP, control processes 650 could use other TCP/IP suite protocols such as, but not limited to, the file transfer protocol (FTP), the hyper text transfer protocol (HTTP), and the telnet protocol. One skilled in the art will be aware that other networking devices have used FTP for file transfer, HTTP for web browser user interfaces, and telnet for terminal user interfaces. Also, other common use interfaces on network equipment include, but are not limited to, serial ports, such as RS-232 console interfaces, as well as LCD (Liquid Crystal Display) and/or LED (Light Emitting Diode) command panels. Although the preferred embodiments of the present invention may use DHCP 635, SNMP 640, and/or TFTP 645, other embodiments using these other types of interfaces are possible for tasks such as, but not limited to, configuration, management, operations, administration, and/or maintenance of TMTS 215 and/or cTM 265.

In the preferred embodiments of the present invention, the local server facility 543 and/or the OA&M system 544 of FIG. 5*a* as well as the provisioning terminal 585 of FIG. 5*b* are at least one host device 660 that communicated with control processes 650 of TMTS 215 and/or cTM 265. In general, at least one host device 660 may be connected to 802.3 media 605 through 802.3 physical (PHY) transceiver (TX/RX) 670. Host device 660 may have an 802.3/ethernet (ENET) media access control (MAC) layer 675, an 802.2 LLC/DIX layer 680, and higher layer protocols 685. Although FIG. 6 shows host device 660 directly connected to the same 802.3 media 605 as TMTS 215 or cTM 265, in general there may be any type of connectivity between host device 660 and TMTS 215 and/or cTM 265. This connectivity may include networking devices such as, but not limited to, repeaters, bridges, switches, routers, and/or gateways. Furthermore, host device 660 does not necessarily have to have the same type of MAC interface as TMTS 215 and/or cTM 265. Instead, host device 660 generally is any type of IP host that has some type of connectivity to TMTS 215 and/or cTM 265 and that supports the proper IP protocols and/or applications for tasks such as, but not limited to, configuration, management, operations, administration, and/or maintenance.

Figure 7:
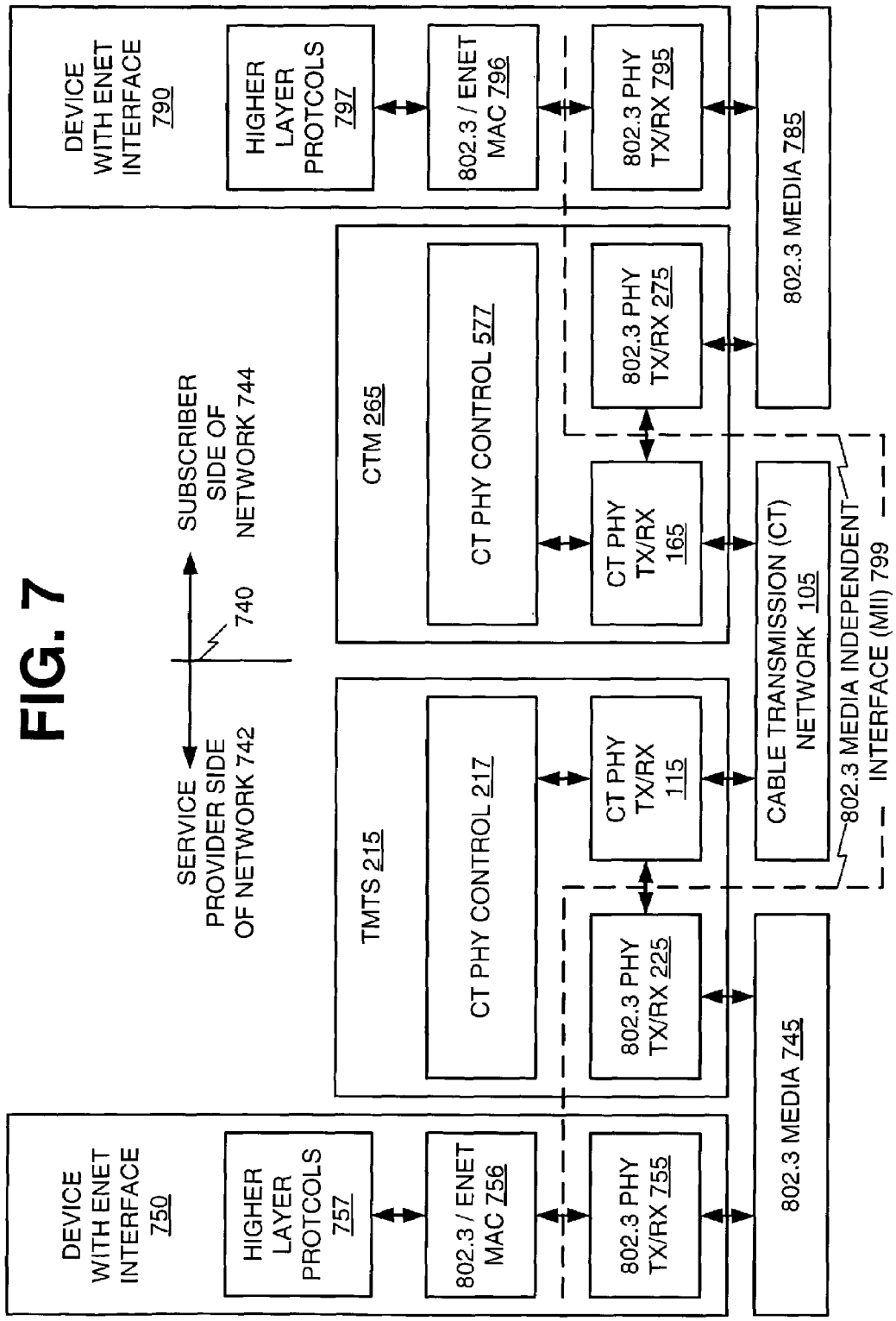
FIG. 7 shows a block diagram of a TMTS and a cTM providing physical layer repeater service.

FIG. 7 shows a more detailed breakdown of how TMTS 215 and cTM 265 might provide communication over cable transmission network 105. The preferred embodiments of the present invention might be used in a network generally divided at point 740 into a service-provider-side (or central-side) of the network 742 as well as a subscriber-side, customer-side, or remote-side of the network 744. In general, TMTS 215 would be more towards the central-side or service-provider-side of the network 742 relative to cTM 265, which would be more towards the subscriber-side, customer-side, or remote-side of the network 744 relative to the TMTS 215. As was shown in FIGS. 5*a* and 5*b*, and is shown again in FIG. 7, TMTS 215 may comprise a cable transmission (CT) physical (PHY) transceiver (TX/RX) 115, an ethernet/802.3 physical (PHY) transceiver (TX/RX) 225, and a cable transmission (CT) physical (PHY) control 217. Also, cTM 265 may comprise a cable transmission (CT) physical (PHY) transceiver (TX/RX) 165, an ethernet/802.3 physical (PHY) transceiver (TX/RX) 275, and a cable transmission (CT) physical (PHY) control 577.

In the preferred embodiment of the present invention, TMTS 215 and cTM 265 generally provide layer one, physical level repeater service between ethernet/802.3 physical (PHY) transceiver (TX/RX) 225 and ethernet/802.3 physical (PHY) transceiver (TX/RX) 275. Furthermore, cable transmission (CT) physical (PHY) control 217 in TMTS 215 generally communicates with cable transmission (CT) physical (PHY) control 577 in cTM 265 to allocate and/or assign bandwidth. In addition to allocating and/or assigning bandwidth, cable transmission (CT) physical control 217 and cable transmission (CT) physical control 577 generally may include mechanisms to request and release bandwidth as well as to inform the corresponding cable transmission (CT) physical (PHY) control of the bandwidth allocations. Also, cable transmission (CT) physical control 217 and cable transmission (CT) physical control 577 generally may communicate to negotiate cTM radio frequency (RF) power levels so that the TMTS receives an appropriate signal level.

In the preferred embodiments of the present invention, the TMTS 215 and the cTM 265 generally are transparent to ethernet/802.3 frames communicated between ethernet/802.3 physical (PHY) transceiver (TX/RX) 225 and ethernet/802.3 physical (PHY) transceiver 275. To maintain this transparency, the communication between cable transmission (CT) physical (PHY) control 217 and cable transmission (CT) physical (PHY) control 577 generally do not significantly modify and/or disturb the ethernet frames communicated between 802.3/ethernet physical (PHY) transceiver (TX/RX) 225 and 802.3/ethernet physical (PHY) transceiver (TX/RX) 275. There are many possible ways of communicating between cable transmission (CT) physical (PHY) control 217 and cable transmission (CT) physical (PHY) control 577 of TMTS 215 and cTM 265, respectively, while still maintaining transparency for the 802.3 physical transceivers 225 and/or 275. In the preferred embodiments of the present invention, the traffic between cable transmission (CT) physical (PHY) control 217 and 577 of TMTS 215 and cTM 265, respectively, is multiplexed into the same data stream with 802.3/ethernet traffic between 802.3 physical (PHY) transceivers 225 and 275 of TMTS 215 and cTM 265, respectively. However, the control traffic generally uses a different frame than standard ethernet/802.3 traffic.

Ethernet/802.3 frames generally begin with seven octets of preamble followed by a start frame delimiter of 10101011 binary or AB hexadecimal. (In reality ethernet DIX 2.0 has an eight octet preamble, and IEEE 802.3 has a seven octet preamble followed by a start frame delimiter (SFD). In either case, these initial eight octets are generally the same for both ethernet DIX 2.0 and IEEE 802.3.) To differentiate control frames between cable transmission (CT) physical (PHY) control 217 and 577 from ethernet frames between 802.3 physical (PHY) transceivers (TX/RX) 225 and 275, a different value for the eighth octet (i.e., the start frame delimiter) may be used on the control frames. Because most devices with ethernet/802.3 interfaces would consider a frame with a start frame delimiter (SFD) to be in error, these control frames generally are not propagated through 802.3 physical (PHY) transceivers (TX/RX) 225 and/or 275. This solution offers the advantage of the control frames that communicate bandwidth allocations being generally inaccessible to devices on directly connected 802.3 media. This lack of direct accessibility to the control frames may provide some security for communications about bandwidth allocations, which may be related to various billing policies. Because cable transmission (CT) physical (PHY) control 217 and 577 generally does not generate 802.3 or ethernet frames in the preferred embodiment of the present invention, FIG. 7 shows cable transmission (CT) physical (PHY) control 217 and 577 generally connected to cable transmission (CT) physical (PHY) transceivers (TX/RX) 115 and 165, respectively, and generally not connected to 802.3/ethernet physical (PHY) transceivers (TX/RX) 225 and 275, respectively.

As shown in FIG. 7, ethernet/802.3 physical (PHY) transceiver (TX/RX) 225 in TMTS 215 generally is connected to 802.3/ethernet media 745, which is further connected to at least one device with an ethernet interface 750. Device with ethernet interface 750 may further comprise an 802.3/ethernet physical (PHY) transceiver (TX/RX) 755, an 802.3/ethernet medium access control layer 756, as well as other higher layer protocols 757. Also, ethernet/802.3 physical (PHY) transceiver (TX/RX) 275 in cTM 265 generally is connected to 802.3/ethernet media 785, which is further connected to at least one device with an ethernet interface 790. Device with ethernet interface 790 may further comprise an 802.3/ethernet physical (PHY) transceiver (TX/RX) 795, an 802.3/ethernet medium access control layer 796, as well as other higher layer protocols 797.

In general, the preferred embodiments of the present invention provide transparent physical layer repeater capability that may carry information between device with ethernet interface 750 and device with ethernet interface 790. As a non-limiting example, device with ethernet interface 750 may have information from a higher layer protocol such as, but not limited to, an IP datagram. In FIG. 7, this IP datagram is formed in the higher layer protocols block 757 and is passed down to 802.3/ethernet MAC layer 756, which adds data link information to form an ethernet frame. Then 802.3 physical (PHY) transceiver (TX/RX) 755 handles generating the proper electromagnetic signals to propagate the information over 802.3/ethernet media 745. In the preferred embodiments of the present invention, TMTS 215 functions as a repeater that copies bits (or other forms of information) received from 802.3/ethernet media 745 by 802.3/ethernet physical (PHY) transceiver (TX/RX) 225. The bits are copied over to cable transmission (CT) physical (PHY) transceiver (TX/RX) 115, which generates the proper signals to communicate the information over cable transmission network 105. (Note: in some embodiments some portions of the signal generation may be performed externally to the TMTS 215 as in at least one external QAM modulator 552.)

After propagating through cable transmission (CT) network 105, the bits (or other forms of information) are received in cable transmission (CT) physical (PHY) transceiver (TX/RX) 165 of cTM 265. In the preferred embodiments of the present invention, cTM 265 functions as a repeater that copies bits (or other forms of information) received from cable transmission network 105 by cable transmission (CT) physical (PHY) transceiver (TX/RX) 165. The bits are copied over to 802.3/ethernet physical (PHY) transceiver (TX/RX) 275, which generates the proper signals to communicate the information over 802.3/ethernet media 785.

In device with ethernet interface 790, 802.3/ethernet physical (PHY) transceiver (TX/RX) 795 receives the electromagnetic signals on 802.3/ethernet media 785 and recovers the bits (or other forms of information) from the electromagnetic signals. Next, 802.3/ethernet media access control (MAC) 796 generally checks the ethernet/802.3 framing and verifies the frame check sequence (FCS) or cyclic redundancy code (CRC). Finally, the IP datagram is passed up to higher layer protocols 797. Generally, a reverse process is followed for communications in the opposite direction.

Furthermore, it is to be understood that embodiments of the present invention are capable of providing similar connectivity over cable transmission (CT) network 105 to devices (such as device with ethernet interface 750 and device with ethernet interface 790), which may be directly connected to 802.3/ethernet media 745 and/or 785 as well as other devices that are not directly connected to 802.3/ethernet media 745 and/or 785. Thus, other devices which are indirectly connected to 802.3/ethernet media through other media, links, and/or networking devices may also utilize the connectivity provided by the preferred embodiments of the present invention.

In the preferred embodiments of the present invention, TMTS 215 can be thought of as providing level one, physical layer repeater service between 802.3/ethernet physical (PHY) transceiver (TX/RX) 225 and cable transmission (CT) physical (PHY) transceiver (TX/RX) 115. Also in the preferred embodiments of the present invention, cTM 265 can be thought of as providing level one, physical layer repeater service between 802.3/ethernet physical (PHY) transceiver (TX/RX) 275 and cable transmission (CT) physical (PHY) transceiver (TX/RX) 165. In addition in the preferred embodiments of the present invention, TMTS 215 and cTM 265 together can be thought of as providing level one, physical layer repeater service between 802.3/ethernet physical (PHY) transceiver (TX/RX) 225 and 802.3/ethernet physical (PHY) transceiver (TX/RX) 275. In providing level one, physical layer repeater service between 802.3/ethernet physical (PHY) transceiver (TX/RX) 225 and 802.3/ethernet physical (PHY) transceiver (TX/RX) 275, TMTS 215 and cTM 265 each may be thought of as half-repeaters of a repeater pair.

In general, networking devices connecting local area networks (or LANs such as, but not limited to, ethernet/802.3 media 745 and 785) over a wide-area network (or WAN such as, but not limited to, cable transmission network 105) may be viewed using at least two abstractions or models. First, the two devices at each end of the WAN may be viewed as independent networking devices each acting as a repeater, bridge, switch, router, gateway, or other type of networking device connecting the LAN and the WAN. Alternatively, a pair of networking devices on each end of a WAN could be viewed based on each networking device providing one half of the service provided over the WAN. Thus, each networking device at the end of a WAN could be thought of as a half-repeater, half-bridge, half-switch, half-router, half-gateway, etc. for a pair of networking devices providing connectivity across a WAN. In addition, one skilled in the art will be aware that the networking devices on each end of a connection may actually perform according to different forwarding constructs or models (such as, but not limited to, repeater, bridge, switch, router, and/or gateway). Thus, one skilled in the art will be aware that one of the networking devices (either the TMTS 215 or a cTM 265) connected to cable transmission network may provide services such as, but not limited to, repeater, bridge, switch, router, and/or gateway while the other networking device (either a cTM 265 or the TMTS 215, respectively) may provide the same or different services such as, but not limited to, repeater, bridge, switch, router, and/or gateway. Furthermore, each networking device could provide different services or forwarding constructs for different protocols.

Therefore, even though the preferred embodiments of the present invention have a repeater service or forwarding construct for both a TMTS 215 and a cTM 265 as well as a TMTS 215 and a cTM 265 jointly, one skilled in the art will be aware that other embodiments of the present invention are possible in which the forwarding construct for a TMTS 215 and/or a cTM may be independently chosen. Furthermore, the forwarding construct could be different for each client transport modem 265, 266, 267, and 268 connected to the same TMTS 215. Also, transport modem termination systems 215 may have different forwarding behavior or forwarding constructs for each port. In addition, multiple TMTS 215 devices might utilize different forwarding constructs but still be connected to the same cable transmission network 105. Also, one skilled in the art will be aware of hybrid forwarding constructs in addition to the general layer one repeater service, layer two bridge service, and/or layer three routing service. Any hybrid type of forwarding construct also might be used as alternative embodiments of the present invention. Therefore, one skilled in the art will be aware that alternative embodiments exist utilizing other forwarding constructs in addition to the layer one, repeater service of the preferred embodiment of the present invention.

FIG. 7 further shows an 802.3/ethernet media independent interface (MII) 799 as a dashed line intersecting connections to various 802.3/ethernet physical layer interfaces or transceivers (755, 225, 275, and 795). In general, the IEEE 802.3 standards defined a media independent interface for 100 Mbps ethernet and a Gigabit media independent interface (GMII) for 1000 Mbps ethernet. References in the figures and description to MI and/or GMII are meant to include both MII and GMII. Generally, the MII and GMII interfaces allow 802.3 interfaces to be made that can be interfaced with different physical cables. As a non-limiting example, 100BaseT4, 100BaseTX, and 1000BaseFX are three different types of physical cables/optical lines that can be used in the IEEE 802.3 ethernet standards covering 100 Mbps or fast ethernet. 100BaseTX is designed for twisted pair cables, whereas 100BaseFX is designed for fiber optic cables. The media independent interface (MII) provides a standard interface for communicating with devices designed to form and interpret the physical electrical and/or optical signals of different types of media.

Figure 8:
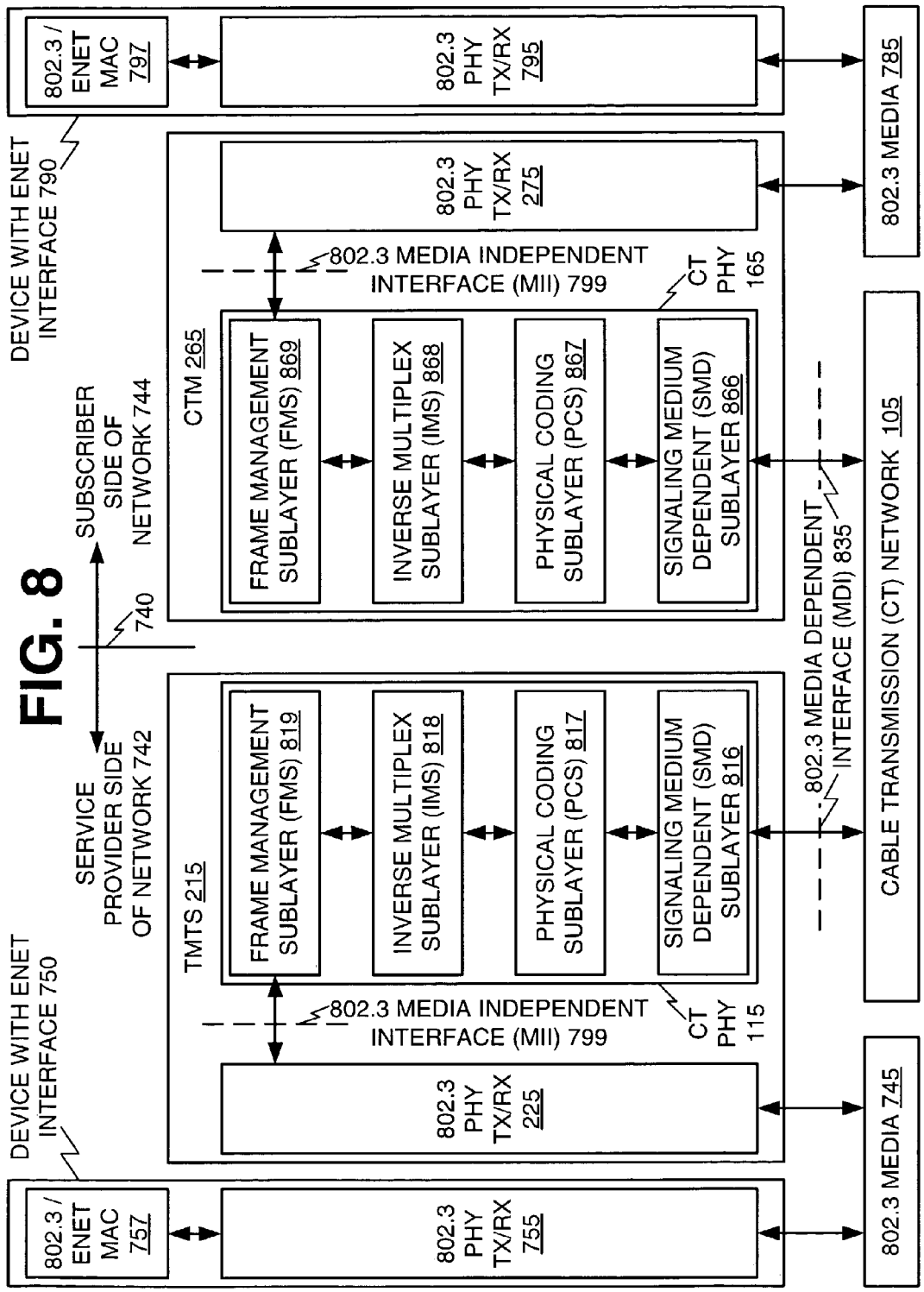
FIG. 8 shows an expanded block diagram of the protocol sublayers within the physical layer of the TMTS and the cTM.

FIG. 8. shows a more detailed diagram for connecting ethernet devices through a transport modem termination system (TMTS) 215 and a client transport modem (cTM) 265. FIG. 8 further divides the cable transmission (CT) physical (PHY) transceiver (TX/RX) 115 and 165. TMTS 215 comprises CT PHY 115, which further comprises signaling medium dependent (SMD) sublayer 816, physical coding sublayer (PCS) 817, inverse multiplex sublayer (IMS) 818, and frame management sublayer (FMS) 819. FMS 819 connects to 802.3/ethernet physical transceiver 225 through 802.3/ethernet media interface (MII) 799. SMD sublayer 816 communicates through cable transmission (CT) network 105 across 802.3/ethernet media dependent interface (MDI) 835.

Also client transport modem 265 has a cable transmission physical transceiver 165 that comprises signaling medium dependent (SMD) sublayer 866, physical coding sublayer (PCS) 867, inverse multiplex sublayer (IMS) 868, and frame management sublayer (FMS) 869. SMD sublayer 866 communicates through cable transmission network 105 across 802.3 media dependent interface (MDI) 835. FMS 869 provides an 802.3 media independent interface (MI) 799, which may be connected to an 802.3 ethernet physical transceiver 275.

In general, FMS 819 and 869 provide management functions that allow control traffic to be combined with and separated from data traffic. A frame management sublayer (such as FMS 819 and/or 869) may support a plurality of 802.X interfaces. Each active 802.X port of FMS 869 in client transport modem 265 generally has a one-to-one relationship with an associated active 802.X port in a transport modem termination system 215. Generally FMS 819 within TMTS 215 has similar behavior to FMS 869 in cTM 265. However, as TMTS 215 generally is a concentrator that may support a plurality of client transport modems, such as cTM 265, FMS 819 of TMTS 215 usually has more 802.X interfaces than FMS 869 of cTM 265.

The inverse multiplex sublayer of IMS 818 and IMS 868 generally is responsible for multiplexing and inverse multiplexing data streams of FMS 819 and 869 across multiple frequency-division multiplexed (FDM) carriers. The asymmetrical differences in cable transmission networks between one-to-many downstream broadcast and many-to-one upstream transmission generally lead to different techniques for downstream multiplexing than the techniques for upstream multiplexing. In the preferred embodiment of the present invention downstream multiplexing utilizes streams of MPEG (Moving Picture Experts Group) frames on shared frequencies of relatively larger bandwidth allocations, while upstream multiplexing utilizes non-shared frequencies of relatively smaller bandwidth allocations. Even though the upstream and downstream bandwidth allocation techniques of the inverse multiplexing sublayer (IMS) are different, the preferred embodiments of the present invention are still capable of providing symmetrical upstream and downstream data rates (as well as asymmetrical data rates). Furthermore, the inverse multiplexing sublayer (IMS) splits the incoming sequential octets of FMS data flows (i.e., flows of data from and/or to FMS ports) for parallel transmission across a cable transmission network utilizing a plurality of frequency bands in parallel. This parallel transmission of data flows will tend to have lower latency than serial transmission.

The physical coding sublayer (such as PCS 817 and 867) generally is responsible for handling forward error correction (FEC) and quadrature amplitude modulation (QAM) coding and decoding of the information communicated between IMS sublayer peer entities (such as IMS 818 and IMS 868). The signaling medium dependent (SMD) sublayer (such as the SMD peer entities 816 and 866) generally is responsible for communicating the encoded and modulated information from the physical coding sublayer onto a cable transmission network 105 at the proper frequency ranges and in the proper optical and/or electrical carrier waves.

Figure 9:
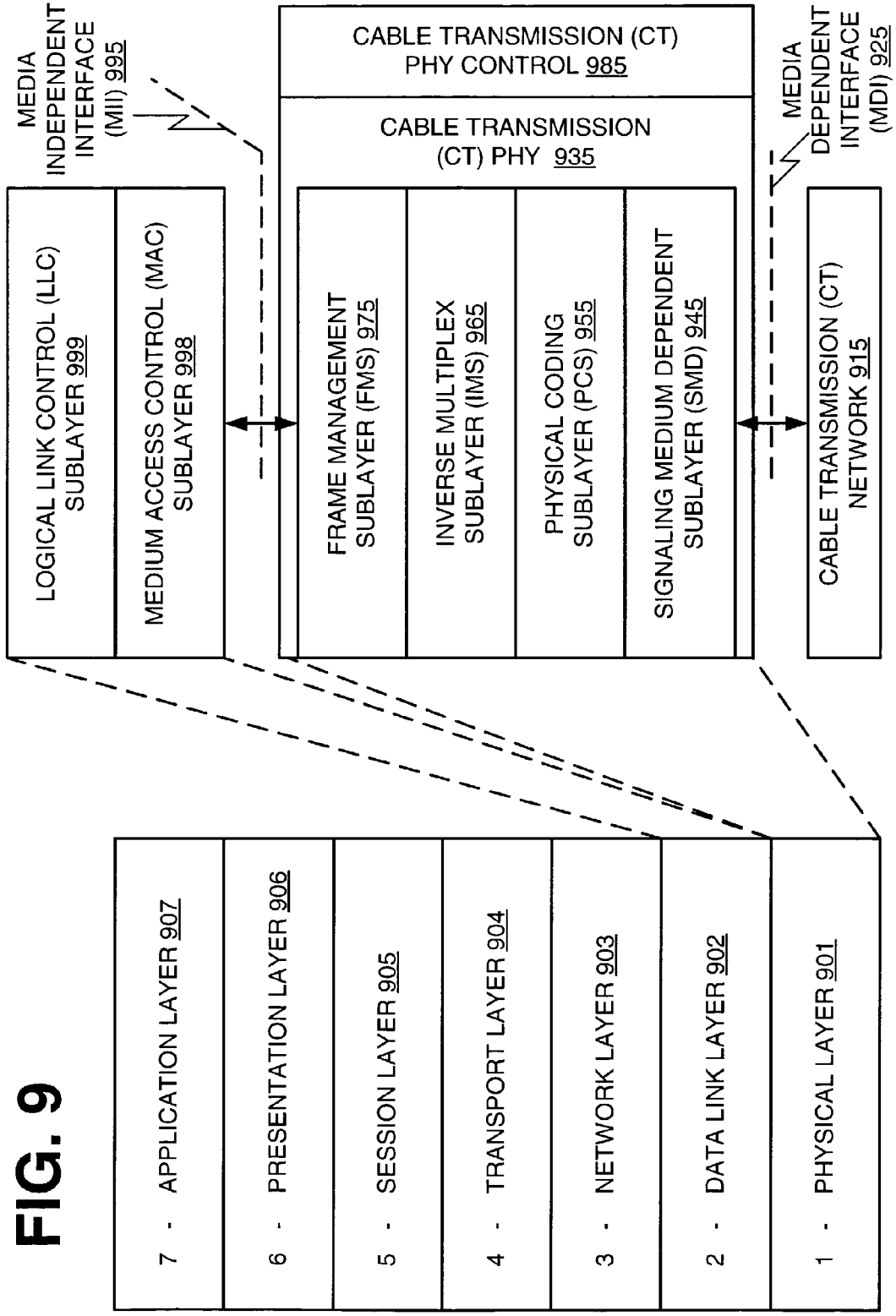
FIG. 9 shows how a cable transmission physical layer fits in the OSI model.

FIG. 9 shows the open systems interconnect (OSI) seven-layer model, which is known to one of skill in the art, as well as the relationship of the OSI model to the physical layer specification of the preferred embodiments of the present invention and to some portions of the IEEE 802.X standards. In OSI terminology corresponding layers (such as the layer 3 Internet Protocol) of two communicating devices (such as IP hosts) are known as peer entities. The OSI model comprises the level 1 physical layer 901, the level 2 data link layer 902, the level 3 network layer 903, the level 4 transport layer 904, the level 5 session layer 905, the level 6 presentation layer 906, and the level 7 application layer 907. The preferred embodiments of the present invention generally operate over communication media that function as cable transmission network 915. Although cable transmission network 915 certainly comprises hybrid fiber-coax (HFC) cable plants, CT network 915 more generally also comprises all coax and all fiber transmission plants. Furthermore, cable transmission network 915 even more generally comprises any communication medium using frequency-division multiplexing (FDM) and/or the optical variation of frequency division multiplexing known as wavelength division multiplexing (WDM).

The cable transmission network 915 communicates information across a media dependent interface (MDI) 925 with cable transmission physical layer 935. FIG. 9 shows that cable transmission physical layer 935 is associated with the physical layer 901 of the OSI model. Similarly to FIG. 8, cable transmission PHY 935 is shown in FIG. 9 with the four sublayers of the signaling medium dependent sublayer (SMD) 945, physical coding sublayer (PCS) 955, inverse multiplex sublayer (IMS) 965, and frame management sublayer (FMS) 975. The SMD 945, PCS 955, IMS 965, and FMS 975 sublayers form a user plane that generally is concerned with communicating user data. In addition, cable transmission PHY control 985 provides functions generally associated with management and/or control of communications through cable transmission physical layer 935 and the corresponding four sublayers (945, 955, 965, and 975).

FIG. 9 further shows how data link layer 902 is divided into medium access control sublayer (MAC) 998 and logical link control sublayer (LLC) 999 that are generally described in the IEEE 802 standards. IEEE 802.3 generally describes the carrier sense multiple access with collision detection (CSMA/CD) medium access control (MAC) protocol, while IEEE 802.2 generally describes the logical link control (LLC) protocol. Cable transmission physical layer 935 generally has a media independent interface (MII) 995 that provides connectivity between FMS 975 and an IEEE 802.3 MAC. Furthermore, one skilled in the art will be aware that the OSI model as well as other communication models are only abstractions that are useful in describing the functionality, behavior, and/or interrelationships among various portions of communication systems and the corresponding protocols. Thus, portions of hardware and/or software of actual networkable devices and the associated protocols may not perfectly match the abstractions of various communication models. Often when multi-layer abstract models of communication systems are mapped onto actual hardware and/or software the dividing line between one layer (or sublayer) and an adjacent layer (or sublayer) becomes somewhat blurred as to which hardware and/or software elements are part of which abstract layer. Furthermore, it is often efficient to used shared portions of hardware and/or software to implement interfaces between the abstract layers. However, the abstract models are useful in describing the characteristics, behavior, and/or functionality of communication systems.

Figure 10:
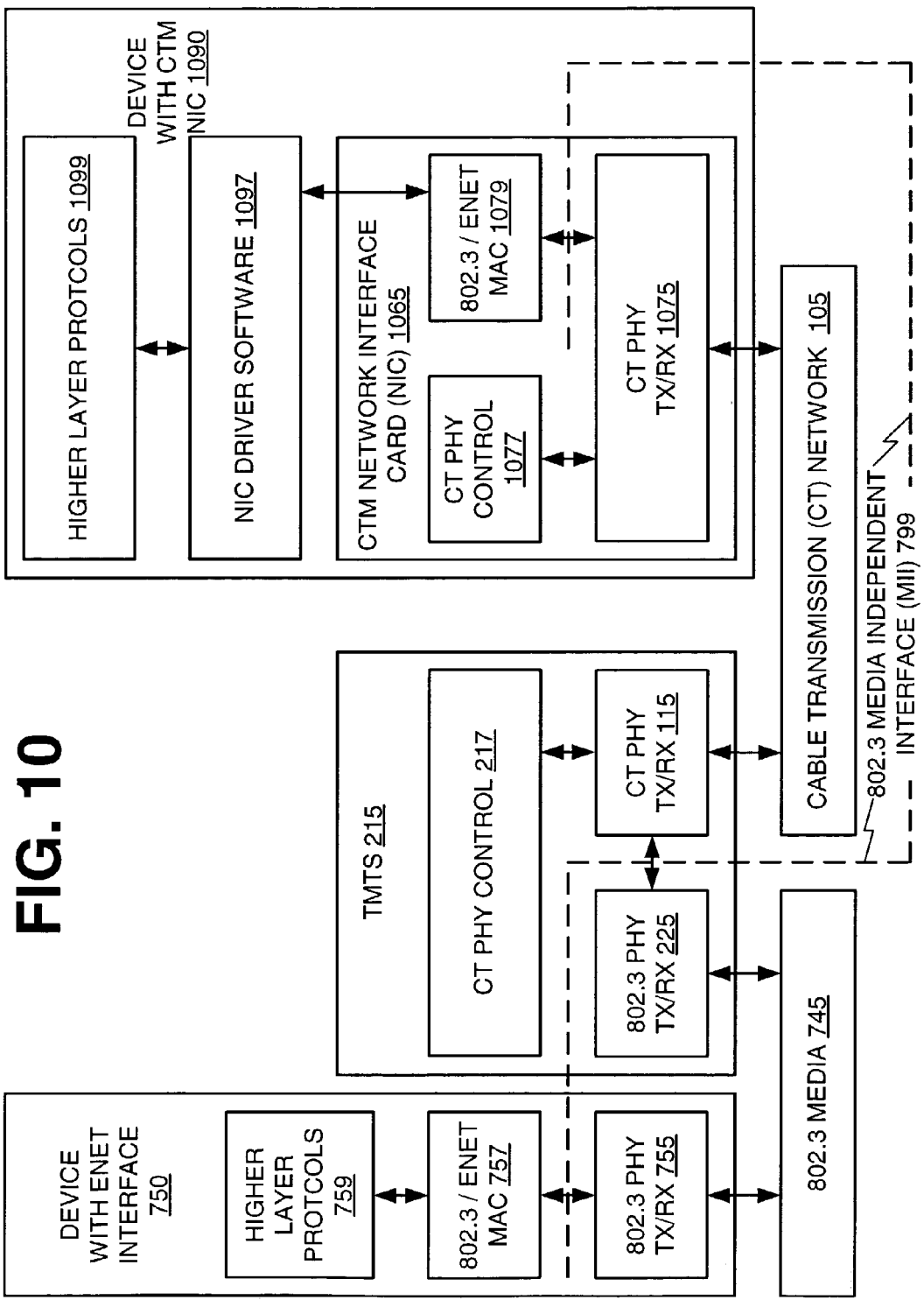
FIG. 10 shows a cable transmission physical layer that is part of a network interface card.

Much like peer entities of OSI protocol layers, there can also be peer entities of protocol sublayers. Thus, corresponding FMS, IMS, PCS, and/or SMD sublayers in communicating devices could be considered peer entities. Given this peer entity relationship, one of many alternative embodiments of the present invention is shown in FIG. 10. TMTS 215 and device with ethernet interface 750 are shown again in FIG. 10 but this time TMTS 215 transfers information with a client transport modem network interface card (NIC) 1065. CTM NIC 1065 comprises a CT physical layer transceiver (TX/RX) 1075 that is a peer entity of CT physical layer transceiver 115 of TMTS 215. Also, cTM NIC 1065 further comprises CT physical layer control 1077 that is a peer entity of CT physical layer control 217 of TMTS 215. Also, cTM NIC 1065 comprises 802.3/ethernet MAC 1079 that is a peer entity of 802.3/ethernet MAC 757 in device with ethernet interface 750.

Figure 11:
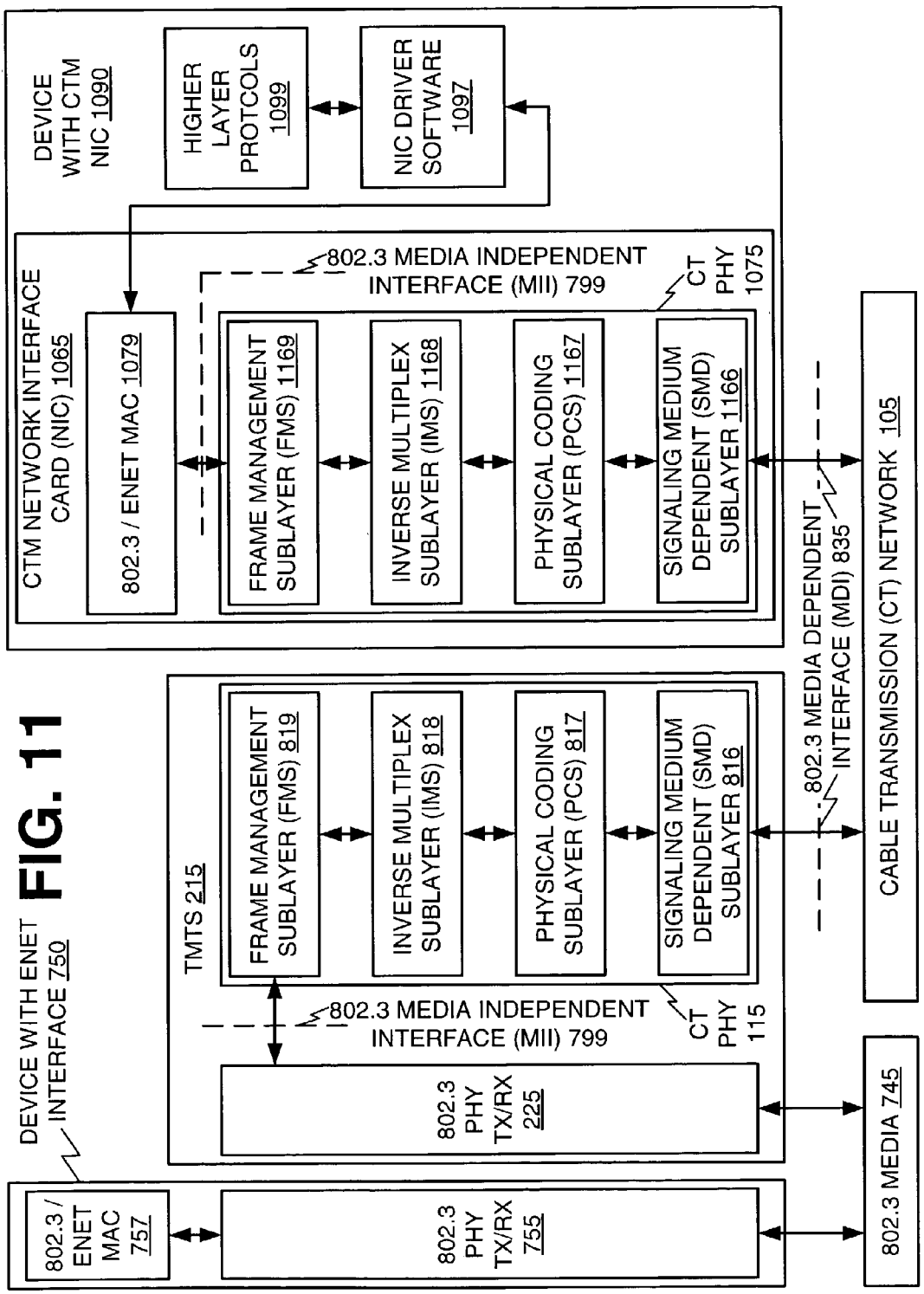
FIG. 11 shows an expansion of the cable transmission physical layer expanded into four sublayers in a network interface card.

Client transport modem NIC 1065 is shown within device with cTM NIC 1090, which further contains NIC driver software 1097 and higher layer protocols 1099. If device with cTM NIC 1090 is a personal computer, then NIC driver software 1097 might conform to one of the driver specifications, such as but not limited to, NDIS (Network Driver Interface Specification), ODI (Open Data-Link Interface), and/or the Clarkson packet drivers. Usually a network interface card plugs into a bus card slot and then uses driver software to interface with higher layer protocols. One skilled in the art will be aware that the cable transmission physical layer of the preferred embodiment of the present invention could be implemented in any type of networkable device in addition to PCs and workstations. Some non-limiting examples of networkable devices include computers, gateways, routers, switches, bridges, and repeaters. Sometimes these devices have expansion card buses that could be used to interface to logic implementing the cable transmission physical layer 1075 of the preferred embodiments of the present invention. Alternatively, the preferred embodiments of the present invention could be directly integrated into the base units of networkable devices. FIG. 11 further expands cable transmission physical layer 1075 (and the associated physical layer transceiver) into SMD sublayer 1166, PCS sublayer 1167, IMS sublayer 1168, and frame management sublayer 1169.

Frame Management Sublayer (FMS) Data Flows

Figure 12:
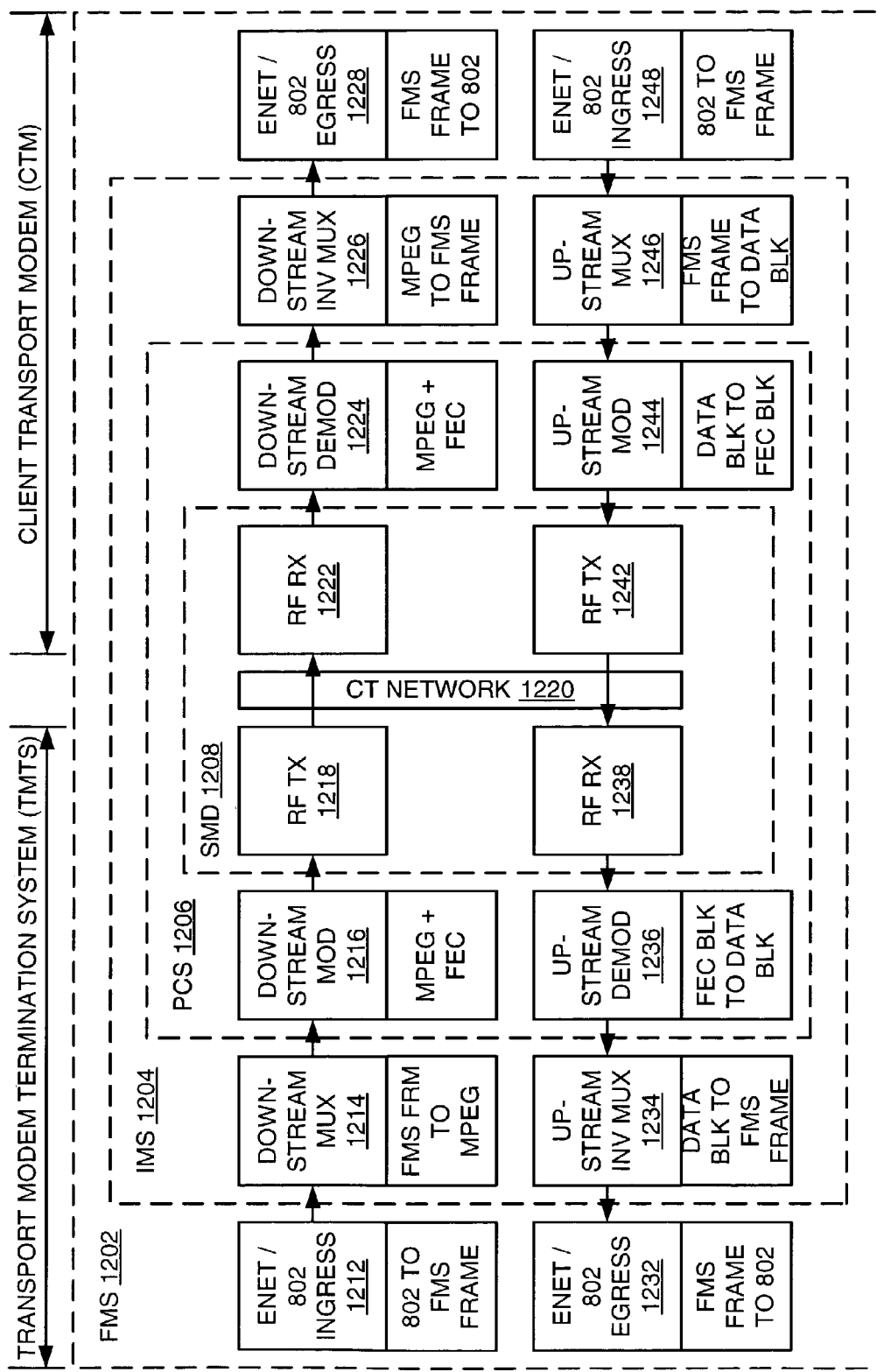
FIG. 12 shows a reference diagram of the downstream and upstream functions of the four sublayers.

FIG. 12 shows a system diagram using the physical layer of the preferred embodiment of the present invention for communication between a transport modem termination system and a client transport. The four sublayers (FMS 1202, IMS 1204, PCS 1206, and SMD 1208) are shown within dashed boxes. The upper portion of FIG. 12 shows downstream communication from a TMTS to a cTM, while the lower portion of FIG. 12 shows upstream communication from a cTM to a TMTS.

In the downstream communication ethernet/802 packets ingress into a cable transmission physical layer of the preferred embodiments of the present invention at ethernet/802 ingress 1212, which performs a conversion from ethernet/802 packets to FMS frames. FMS frames are then communicated to downstream multiplexer 1214 which converts the octets in FMS frames to octets in MPEG frames. MPEG headers and MPEG forward error correction (FEC) coding, which generally is a Reed-Solomon code, generally are added for communication to downstream modulator(s) 1216. The output of downstream modulator(s) 1216 is passed through radio frequency (RF) transmitter (TX) 1218, which generates the electrical and/or optical signals in the proper frequencies. These signals are communicated over cable transmitter network 1220 into RF receiver (RX) 1222. The incoming information in the electrical and/or optical signals generally is recovered into the MPEG frames in downstream demodulator 1224. The downstream MPEG frames are then passed to downstream inverse multiplexer 1226, which extracts the proper octets from MPEG frames to recover frame management sublayer (FMS) frames. The FMS frames then are converted back to ethernet/802 frames and complete downstream conveyance at ethernet/802 egress 1228.

Upstream communication of ethernet/802 packets ingress into a physical layer of the preferred embodiments of the present invention at ethernet/802 ingress 1248 which converts the ethernet/802 frames into frame management sublayer (FMS) frames. The FMS frames are converted into blocks of data in preparation for forward error correction coding in upstream multiplexer 1246. These upstream blocks of data may carry the octets of ethernet/802 frames over multiple carrier frequencies. In the preferred embodiment of the present invention a turbo product code forward error correction technique is utilized on the upstream blocks of data. One skilled in the art will be aware of the techniques of turbo product codes as well as alternative coding techniques for error detection and/or forward error correction. Upstream modulator 1244 modulates the information of the forward error correction blocks and passes the resulting modulating information to RF transmitter 1242, which generates the electrical and/or optical signals in the proper frequency ranges for communication over cable transmission network 1220. The upstream electrical and/or optical signals are received in RF receiver 1238. Upstream demodulator 1236 then handles recovering the forward error correction blocks of data. Also, upstream demodulator 1236 converts the forward error correction blocks back to the original blocks of data that were prepared in upstream multiplexer 1246. The octets of the data blocks are placed back into the proper FMS frames in upstream inverse multiplexer 1234. These FMS frames are then further converted back to ethernet/802 frames and leave the physical layer at ethernet/802 egress 1232.

FIG. 13 shows a more detailed diagram of the frame management sublayer (FMS). In FIG. 13 802.3/ethernet media 1302 is connected across media independent interface (MII) and/or gigabit media independent interface (GMII) 1304 to frame management sublayer (FMS) 1306, which is further connected to inverse multiplex sublayer (IMS) 1308. The connections of FMS 1306 to 802.3/ethernet media 1302 are known as uplink ports 1 through N (1312, 1314, 1316, and 1318). While the connections of FMS 1306 leading to IMS 1308 generally are known as attachment ports 1 through N (1322, 1324, 1326, and 1328). Each attachment port (1322, 1324, 1326, and 1328) is connected to its own set of at least one frame buffer (1332, 1334, 1336, and 1338, respectively) that provides at least part of the interface between FMS 1306 and IMS 1308. Frame buffer(s) (1332, 1334, 1336, and 1338) provide bi-directional communication of FMS data flows (1342, 1344, 1346, and 1348, respectively) between FMS 1306 and IMS 1308. In general, each active FMS data flow of a frame management sublayer in one device is associated one-to-one with an active data flow of a peer entity frame management sublayer in another device. Generally, each FMS data flow provides bi-directional connection-oriented communication between frame management sublayer peer entities in the associated devices. Thus, an FMS data flow generally provides bi-directional point-to-point connectivity between a pair of FMS peer entities.

FIG. 13 further shows various control functions 1352, which comprise 802.3/ethernet medium access control (MAC) interface 1354, cable transmission physical layer control 1356, and system control 1358. CT PHY 1356 generally handles control of the cable transmission physical layer, which includes the sublayers of FMS 1306 and IMS 1308 that are shown in FIG. 13. System control 1358 includes many of the network management, software download, and/or configuration setting file download and/or upload capabilities that generally utilize protocols from the TCP/IP suite for administering network devices.

Basically the frame management layer (FMS) 1306 is responsible for framing ethernet data into the proper frames for communications using the preferred embodiments of the present invention. Furthermore, control flows are communicated between cable transmission physical control 1356 and a corresponding peer entity cable transmission physical control in another device. These control flows are not part of the user data, and thus are not communicated through FMS 1306 to the uplink ports (1312, 1314, 1316, and 1318) that carry information to 802.3/ethernet media 1302. The control frames of control flows may be multiplexed with data frames by utilizing different start frame delimiters to indicate ethernet data frames and control frames.

FIG. 14 shows a general format for an 802.3/ethernet frame as is known by one of ordinary skill in the art. In general, an ethernet frame comprises a preamble 1402 that is used to synchronize the transmitter and receiver in 802.3/ethernet media. After the preamble, start frame delimiter 1404 is used to indicate the beginning of the 802.3/ethernet frame. In IEEE 802.3 and ethernet, this start frame delimiter is the one octet value of 0xAB (in hexadecimal). Following the start frame delimiter (SFD) 1402, 802.3/ethernet frames generally have a header 1406 that includes six octets of destination address, six octets of source address, and other information depending on whether the frame type is IEEE 802.3 raw, ethernet_II, IEEE 802.3 with an 802.2 LLC, or IEEE 802.3 with an 802.2 LLC and a Sub-Network Access Protocol (SNAP). In addition, one skilled in the art will be aware of various techniques for tagging or labeling ethernet/802.3 frames, such as but not limited to, Multi-Protocol Label Switching (MPLS), Resilient Packet Ring (RPR), and/or Virtual LAN (VLAN). After the labeling or tagging information and the 802.3/ethernet header 1406, data 1408 generally is carried in a variable length payload. At the end of 802.3/ethernet packets, a frame check sum (FCS) 1410 error detecting code (usually using a cyclic redundancy check (CRC)) is computed.

To allow all the ethernet/802.3 frame types and various labeling and/or tagging protocols to be transparently communicated using the preferred embodiments of the present invention, the start frame delimiter is used as a field for multiplexing control frames with ethernet/802.3 data frames. Normally, ethernet/802.3 frames do not use the start frame delimiter (SFD) field 1404 for multiplexing because the SFD octet is responsible for providing proper frame alignment in ethernet/802.3 networks. FIG. 15 shows the frame format for control frames in the preferred embodiment of the present invention. In some ways, control frames are similar to ethernet II and 802.3 raw frames with a preamble 1502, a start frame delimiter (SFD) 1504, a six octet destination address 1505, a six octet source address 1506, a two octet length and/or type field 1507, a variable length payload 1508 for carrying control information, and a four octet frame check sequence (FCS) or cyclic redundancy code (CRC) 1510.

However, in comparing the prior art ethernet/802.3 data frame of FIG. 14 with the control frame of FIG. 15 utilized in communication systems using the preferred embodiments of the present invention, the start frame delimiter fields 1404 and 1504 are different. For ethernet/802.3 data frames in FIG. 14, the start frame delimiter has a value of 0xAB in hexadecimal, while for control frames in FIG. 15 the start frame delimiter has a value of 0xAE in hexadecimal. This difference in the octet of the start frame delimiter (SFD) allows data frames and control frames to be multiplexed together without affecting the transparency of the communication system to all types of ethernet/802.3 frame variations. Control frames transmitted by cable transmission physical control (such as 1356) are multiplexed with the data of an FMS data flow (such as 1342, 1344, 1346, and/or 1348) that is destined for the same location as the data of that FMS data flow.

Figure 16:
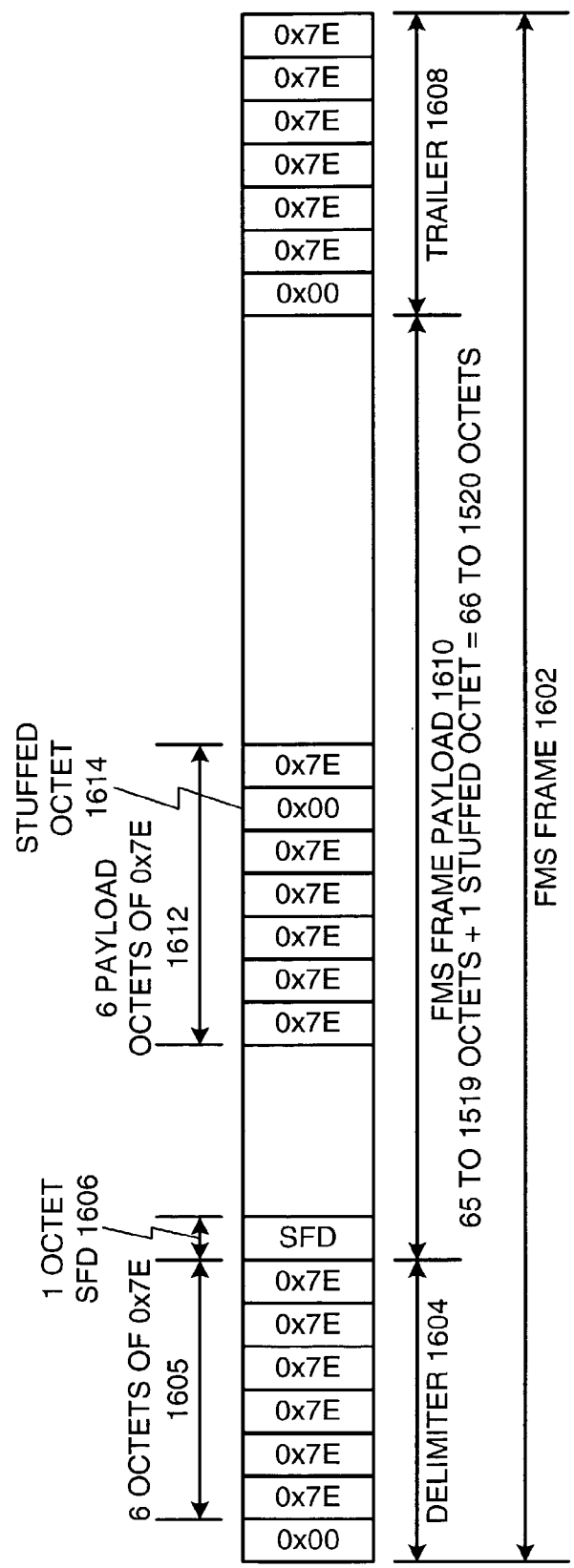
FIG. 16 shows the frame management sublayer (FMS) frame format.

In addition, FIG. 16 shows the FMS frames 1602 communicated between FMS peer entities in a system utilizing the preferred embodiments of the present invention. In general, because of the one-to-one or point-to-point, non-shared relationship of connection-oriented communications between active FMS attachment ports and associated active peer entity FMS attachment ports, bits may be continuously transmitted to maintain synchronization. In the absence of any data frames or control frames to transmit, the system continuously communicates an octet of 0x7E hexadecimal, which functions similarly to the continuous communication of HDLC (High-level Data-Link Control) flags in many point-to-point synchronous connections. Furthermore, as shown in FIG. 16, the delimiter 1604 for an FMS frame 1602 is one octet of 0x00 followed by six octets of 0x7E hexadecimal 1605. The frame delimiter of an FMS frame 1602 is followed by a one octet start frame delimiter (SFD) 1606 that contains the value 0xAB hexadecimal for ethernet/802.3 data frames and that contains the value 0xAE hexadecimal for control frames as shown in FIG. 15. FMS frame 1602 generally has a frame trailer 1608 and a payload 1610. When two FMS frames are transmitted immediately after each other, only one octet of 0x00 and six octets of 0x7E 1605 are needed between the two FMS frames. In other words, there is no need to transmit both a trailer 1608 for a first FMS frame 1602 and a starting delimiter 1604 for a second FMS frame 1602 when the second FMS frame is transmitted immediately after the first FMS frame. Thus, when a second FMS frame is transmitted immediately after a first FMS frame, either the trailer 1608 of the first FMS frame or the starting delimiter 1604 of the second FMS frame may be omitted.

In general, the payload 1610 of an FMS frame 1602 generally may carry an ethernet/802.3 frame or a control frame beginning with the SFD octets of 0xAB and 0xAE, respectively, and continuing through the frame check sequence (FCS) 1410 or 1510. Because one hexadecimal octet (or a consecutive sequence of a plurality of hexadecimal octets) with the value of 0x7E may appear in ethernet/802.3 and/or control frames, an octet stuffing technique is used to ensure that the information in an FMS frame payload 1610 is communicated transparently and that the FMS frame 1602 boundaries can be detected by a starting FMS delimiter 1604 and an FMS trailer 1608 (i.e., a trailing FMS delimiter). The FMS sublayer handles this process of framing ethernet and control frames using the FMS frame delimiters of one octet of 0x00 followed by six octets of 0x7E. In addition, byte or octet stuffing allows a payload containing octet or byte values that might cause misinterpretations of starting delimiter 1604 or trailing delimiter 1608 to be communicated transparently. Various techniques for byte, octet, and/or character stuffing in byte-oriented protocols as well as bit stuffing in bit-oriented protocols are known by one of ordinary skill in the art, and one technique is described in Andrew S. Tanenbaum's Second and Third Editions of "Computer Networks", which are both incorporated by reference in their entirety herein. Furthermore, the HDLC formatted frames communicated using an asynchronous, byte- or octet-oriented version of the Point-to-Point Protocol (PPP) generally use another octet-stuffing procedure to maintain transparency. This, octet stuffing procedure is described in Internet Request For Comments (RFC) 1662, which is entitled "PPP in HDLC Framing" and is incorporated in its entirety by reference herein.

In general, octet stuffing involves adding additional octets to a frame whenever a pattern in the frame might cause an ambiguity in a receiver trying to determine frame boundaries. For example, six payload octets of 0x7E at 1612 in FIG. 16 could have an extra octet of 0x00 added as a stuffed octet 1614. The additional stuffed octets generally increase the size of the payload. One or more stuffed octets 1614 may be added to a payload to handle each situation where a receiver might have had some ambiguity in determining correct frame boundaries based on the patterns in the payload data matching or overlapping with the bit patterns used to specify frame boundaries.

Figure 17:
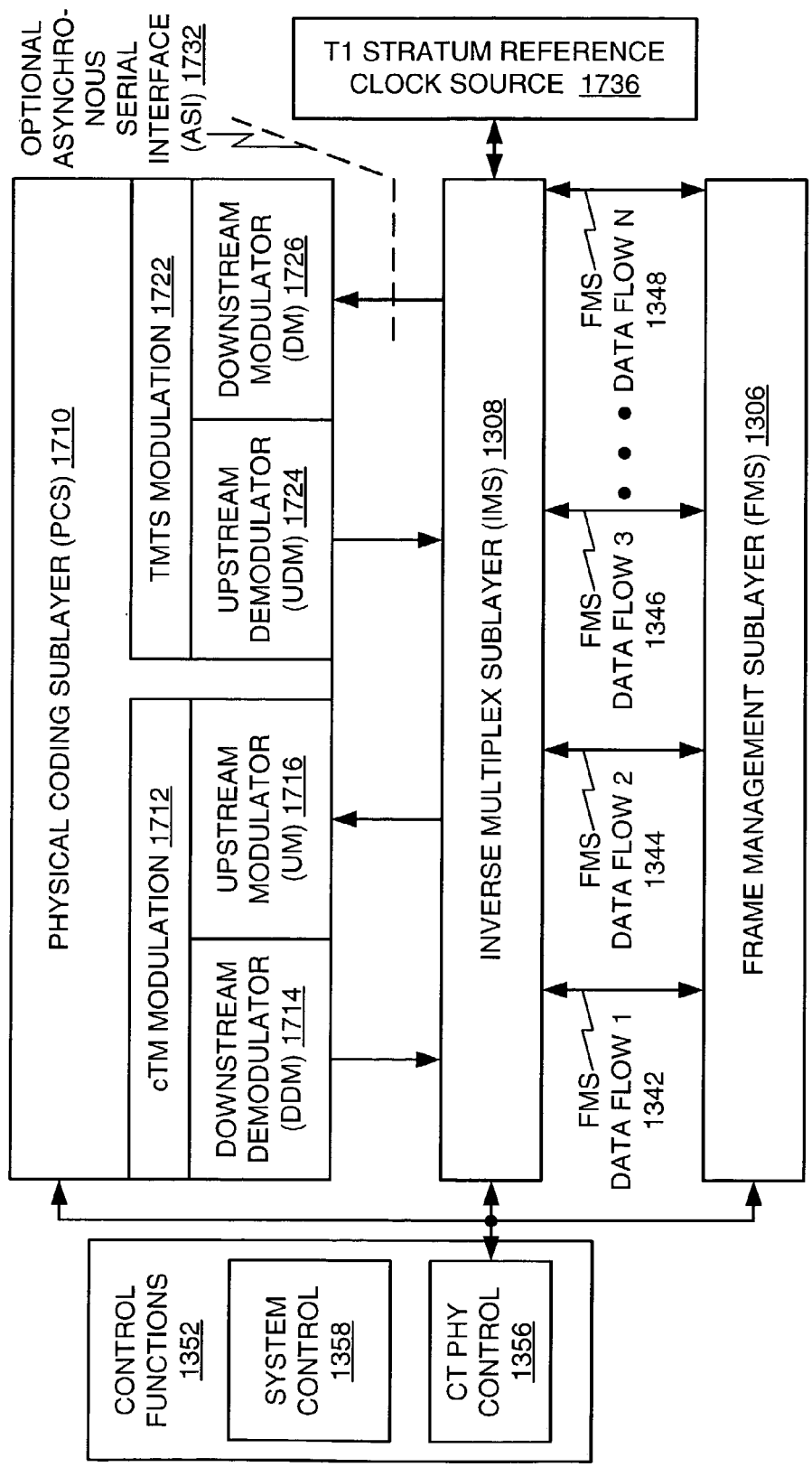
FIG. 17 shows the relationship among the frame management sublayer (FMS), the inverse multiplex sublayer (IMS), and the physical coding sublayer (PCS).

FIG. 17 shows the relationships of inverse multiplex sublayer 1308 to frame management sublayer 1306 and physical coding sublayer 1710. Several of the items from FIG. 13 have been repeated including control functions 1352, systems control 1358, CT PHY control 1356 as well as FMS data flows 1 through N (1342, 1344, 1346, and 1348). The frame buffers between FMS 1306 and IMS 1308 have been omitted for simplicity of the discussion of FIG. 17. Physical coding sublayer 1710 varies depending on whether client transport modem modulation 1712 or transport modem termination system modulation 1722 is being used. Client transport modem modulation comprises a downstream demodulator 1714 that provides input into IMS 1308 and further comprises upstream modulator 1716 that receives the output of an inverse multiplex sublayer 1308. In contrast to the cTM modulation 1712, the TMTS modulation 1722 comprises upstream demodulator 1724 that provides input to an IMS 1308 and further comprises downstream modulator 1726 that receives input from IMS 1308. The IMS 1308 performs different multiplexing/demultiplexing functions depending on whether the direction of communication is upstream or downstream. As discussed previously the downstream modulator 1726 of a transport modem termination system may include integrated QAM modulators. Alternatively, the downstream MPEG packets and/or frames may be communicated over an optional asynchronous serial interface (ASI) 1732 to an external QAM modulator. One skilled in the art is aware of many mechanisms and devices that are commonly used in communicating MPEG frames over ASI interfaces to QAM modulators. Furthermore, because the downstream communication of IMS 1308 utilizes MPEG streams that can carry clock information, IMS 1308 is connected to a T1 stratum reference clock source 1736 or another clock source commonly used for various N×64 and/or N×56 digital telephone company services that may involve plesiochronous digital hierarchy (PDH) or synchronous digital hierarchy (SDH) multiplexing. On the TMTS-side, T1 stratum reference clock source 1736 (or another clock source as would be known by someone of ordinary skill in the art) generally is an input to IMS 1308 in a TMTS. In contrast on the cTM-side, T1 stratum reference clock source 1736 (or another clock source as would be known by someone of ordinary skill in the art) generally is an output that is driven by the IMS 1308 in a cTM.

MPEG Packets

Figure 18:
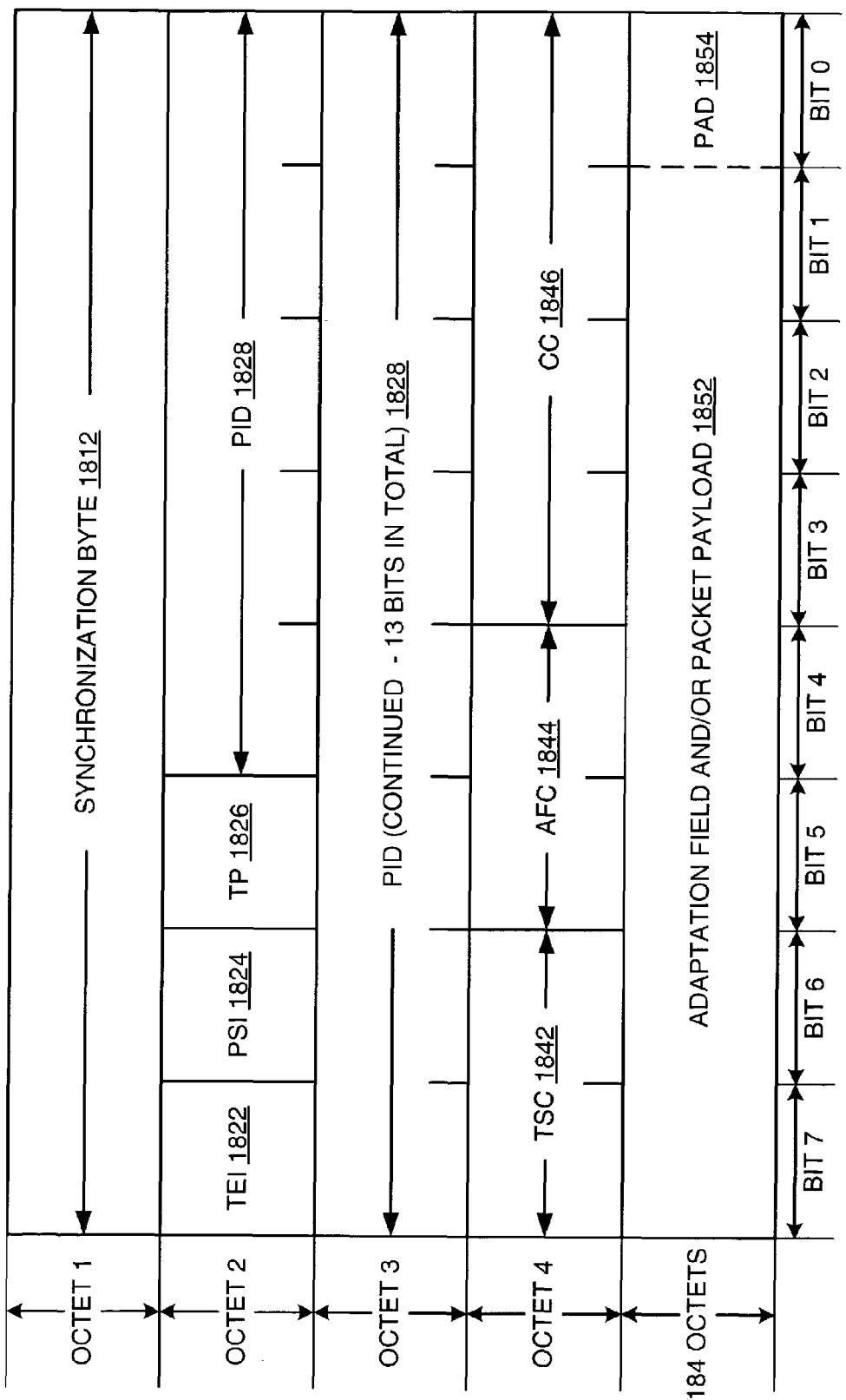
FIG. 18 shows the MPEG frame format.

FIG. 18 shows the layout of an MPEG frame that is known to one of skill in the art and is described in ITU-T H.222.0 entitled "Audiovisual and Multimedia Systems" and ITU-T J.83 entitled "Transmission of Television, Sound Program and Other Multimedia Signals", which are both incorporated by reference in their entirety herein. Synchronization Byte (SB) 1812 contains the eight bit value 0x47 hexadecimal. The transport error indicator (TEI) 1822 is set in a communication system using the preferred embodiments of the present invention to indicate frame decoding errors of MPEG packets to an 802.3 MII interface connected to a frame management sublayer. The cable transmission physical layer (including the four sublayers of FMS, IMS, PCS, and SMD) in a communication system utilizing the preferred embodiments of the present invention generally does not utilize payload start indicator (PSI) 1824, transport priority (TP) bit 1826, and the transport scrambling control (TSC) bits 1842.

The cable transmission physical (CT PHY) layer of a communication system utilizing the preferred embodiments of the present invention does utilize the thirteen bit packet identifier (PID) field to specify various streams of MPEG packets. In general, the PID numbers 0x0000 through 0x000F are not used to carry the cable transmission physical (CT PHY) layer communications in a system operating with the preferred embodiments of the present invention. These PIDs of 0x0000 through 0x000F are utilized for other MPEG functions such as but not, limited to, program association table (PAT), conditional access table (CAT), and transport stream description table that are known to one of skill in the art. In addition, the preferred embodiments of the present invention do not utilize the PIDs of 0x1FFF, which indicates the null packet, and 0x1FFE, which indicates DOCSIS downstream communications. PIDs in the range of 0x0010 through 0x1FFD are utilized to carry the cable transmission physical layer (CT PHY) information in a communication system using the preferred embodiments of the present invention. The PIDs are allocated for carrying the information of FMS data flows by starting at 0x1FFD and working downward.

The four bits of the continuity counter (CC) 1846 increment sequentially for each packet that belongs to the same PID. The IMS downstream communication of MPEG packets are generated contemporaneously in parallel with the same value for the continuity counter (CC) 1846 across all the parallel packets. The continuity counter 1846 is incremented in unison across all the MPEG stream to help ensure that inverse multiplexing operations across multiple MPEG streams are performed utilizing the correctly aligned set of packet payloads.

The two bits of the adaptation field control (AFC) 1844 specifies whether the payload contains a packet payload only, an adaptation field only, or a packet payload and an adaptation field. The 184 octets of an MPEG packet or frame after the four octet header may contain an adaptation field and/or a packet payload 1852, and is padded to the fixed size of 184 octets with pad 1854. In general, the preferred embodiments of the present invention do not generate MPEG packets containing both adaptation fields and other payload information. However, one skilled in the art will be aware that other implementations are possible using various combinations of adaptation fields and payload information in MPEG packets.

Figure 19:
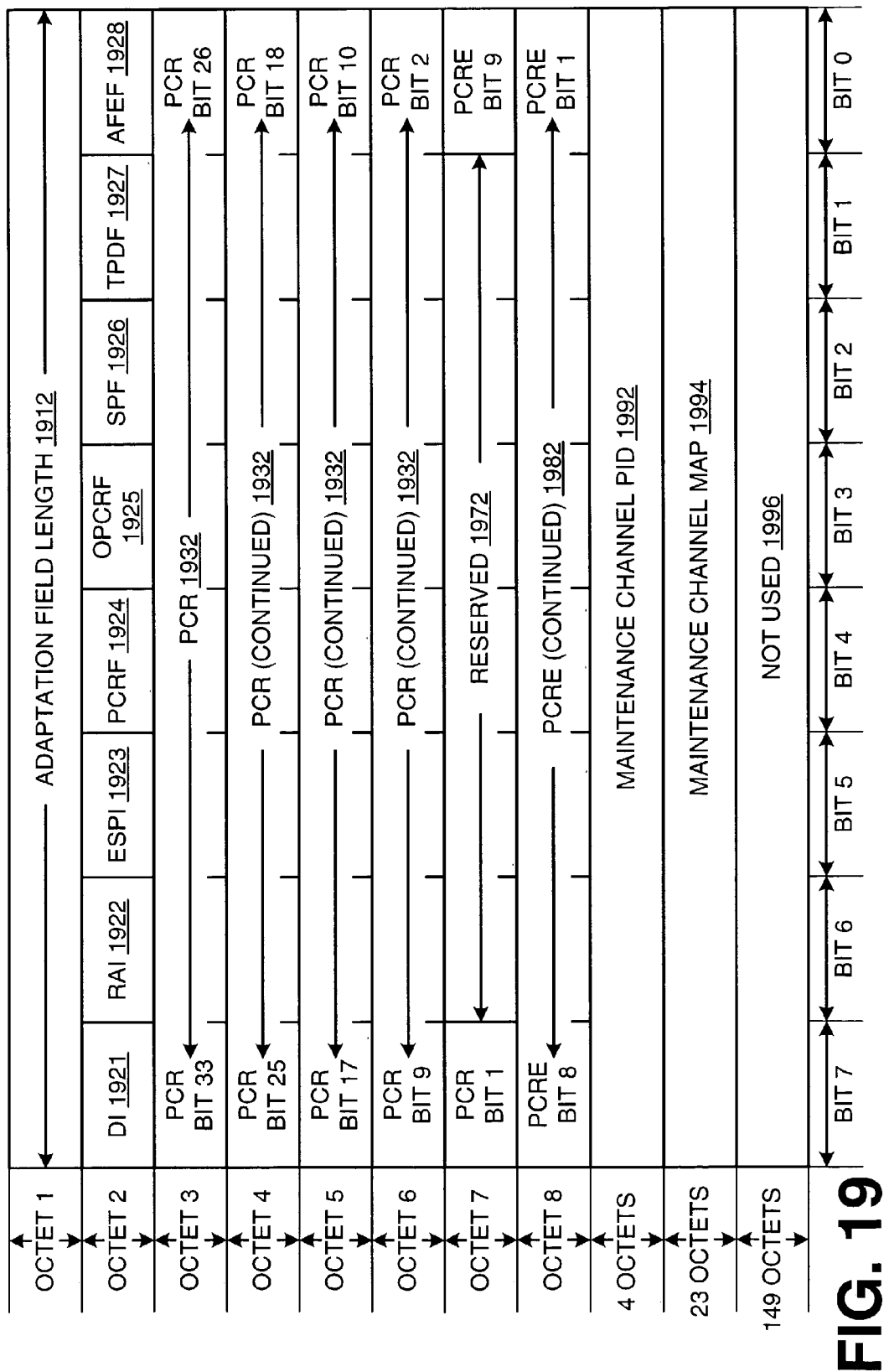
FIG. 19 shows the MPEG adaptation field format.

FIG. 19 further shows an MPEG adaptation field that has been slightly modified from the standard MPEG adaptation field known to one of ordinary skill in the art. The cable transmission physical layer (CT PHY) of a communication system using the preferred embodiments of the present invention generally does not utilize the MPEG adaptation field bits of the discontinuity indicator (DI) 1921, the random access indicator (RAI) 1922, the elementary stream priority indicator (ESPI) 1923, the original program clock reference flag (OPCRF) 1925, the splice point flag (SPF) 1926, the transport private data flag (TPDF) 1927, and the adaptation field extension flag (AFEF) 1928.

The adaptation field length 1912 comprises eight bits that specify the number of octets in an adaptation field after the adaptation field length itself. In the preferred embodiments of the present invention, if an MPEG packet includes an adaptation field, the adaptation field length (AFL) 1912 may range from 0 to 182 octets (with the count starting at the first octet after the AFL octet 1912). The MPEG packets generated by the preferred embodiments of the present invention that carry an adaptation field generally have the program clock reference flag (PCRF) set to 1 to indicate that a program clock reference is carried in the adaptation field. The thirty-three bit program clock reference (PCR) 1932 and the nine bit program clock reference extension (PCRE) 1982 are concatenated into a forty-two bit counter with the PCRE being the least significant bits of the counter. The forty-two bit counter generally is used to indicate the intended time of arrival of the octet containing the last bit of the program clock reference (PCR) at the input to an inverse multiplex sublayer (IMS) of a client transport modem (cTM). Also, the reserved bits 1972 are not utilized in the preferred embodiments of the present invention.

The maintenance channel PID (MC PID) 1992 is used to allow a client transport modem (cTM) to startup and establish communications with a transport modem termination system (TMTS) to begin a registration process. Initially, the cTM listens to at least one low bandwidth maintenance channel established by the TMTS. The TMTS continuously broadcasts maintenance-oriented information on at least one low bandwidth maintenance channel that is specified by at least one MC PID 1992. The maintenance information includes multiplexing maps as well as other registration information. The client transport modem determines the maintenance channel PID 1992 by listening to downstream MPEG packets containing the adaptation field. Based on the value of the MC PID 1992, the client transport modem will know which downstream MPEG packets contain maintenance channel information. Furthermore, the maintenance channel map (MC-MAP) 1994 comprises twenty-three octets or 23×8=184 bits that specify the octets in the downstream MPEG packets with a PID equal to MC-PID 1992. Each bit in the MC-MAP represents one octet in the 184 octet MPEG payload of the MPEG packets with a PID value equal to MC-PID. This map of bits (MC-MAP) and the PID value (MC-PID) allow a client transport modem to select and inverse multiplex through the IMS sublayer the information of the low bandwidth downstream maintenance channel.

Network Clocking

Although most of the description of the preferred embodiments of the present invention has related to communication of ethernet/802.3 frames between cable transmission physical (CT PHY) layer peer entities, the preferred embodiments of the present invention also allow communication of circuit emulation services (CES) that generally are associated with the N×56 and N×64 interfaces of telephone company service providers. Despite the increasing deployment of packetized voice connectivity, many communication systems still utilize these various N×56 and N×64 services and will continue to do so for the foreseeable future. Thus, offering a T1 or other type of N×56/64 interface allows customers to easily connect their existing voice networking equipment to a client transport modem. This allows the preferred embodiments of the present invention to support remote offices with packetized service of ethernet for data as well as circuit emulation service for legacy voice applications.

However, most customer oriented N×56 and N×64 equipment such as, but not limited to, a PBX (private branch exchange) with a T1 interface usually expects the T1 line from the service provider to supply the necessary network clocking. To be able to replace current T1 services of a customer, the preferred embodiments of the present invention generally should also be able to supply the necessary network clocking to customer premises equipment (CPE) such as a PBX. Because more accurate clocks such as atomic clocks are more expensive, the more expensive central office and/or service provider equipment (such as a central office switch or exchange) generally has a more accurate clock than the less expensive customer premises equipment (such as a private branch exchange). Thus, equipment primarily designed for use at a customer premises as opposed to in a service provider network generally is designed to use the clock derived from the clock delivered over service provider transmission lines or loops. One skilled in the art will be aware that these network clocking issues apply to all networking equipment and not just the limited example of PBXs and central office switches. These clocking issues for 8 kHz clocks are particularly relevant for equipment designed to utilize N×56/64 services (i.e., services based on multiples of a DS0).

Figure 20:
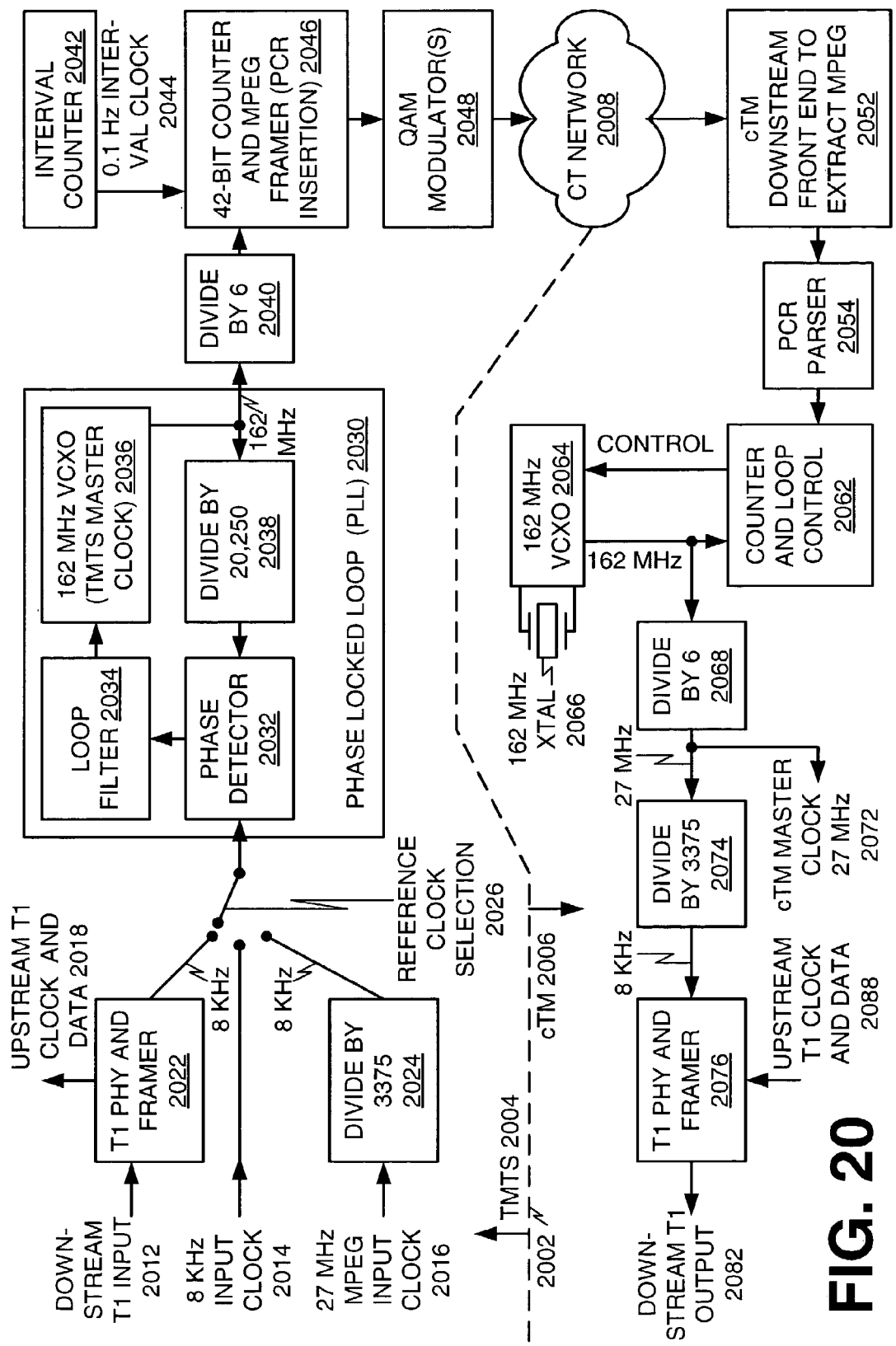
FIG. 20 shows clock distribution from a TMTS to a cTM.

FIG. 20 shows a way of delivering the proper clocking to customer premises equipment using a transport modem termination system and a client transport modem. Dashed line 2002 generally divides FIG. 20 between TMTS 2004 and cTM 2006. Both TMTS 2004 and cTM 2006 are connected into cable transmission network 2008. Furthermore, TMTS 2004 comprises various potential clock inputs including, but not limited to, downstream T1 input 2012, 8 kHz input clock 2014, as well as 27 MHz MPEG input clock 2016. These clock inputs are expected to be commonly found in the headend and/or distribution hub of cable service providers.

Generally, the 8 kHz clock 2014 is related to the N×56 kbps and N×64 kbps services. 8 kHz is the Nyquist sampling rate to be able to properly sample a 0 to 4 kHz analog POTS (Plain Old Telephone Service) voice frequency channel. With each sample having eight bits (or one octet), eight bits transmitted at 8 kHz (or 8000 cycles per second) yields a 8×8000=64,000 bits per second or 64 kbps. Many higher order PDH and SDH multiplexing techniques are based on multiples of this DS0 speed of 64 kbps or 56 kbps. Thus, an 8 kHz clock with a ⅛ kHz or 125 microsecond period is commonly available at N×56/64 interfaces to the public switched telephone network (PSTN).

Downstream T1 input 2012 generally also has a corresponding upstream T1 clock and data 2018 because T1 services are bi-directional. However, the service provider (or in this case downstream) clock generally is considered to be the master reference. Customer equipment clocking generally is derived from reference clocking of service provider or downstream services. As further shown in FIG. 20, the downstream T1 input 2012 and upstream T1 clock and data 2018 generally are connected in the TMTS to a T1 physical layer and framer (2022). One skilled in the art will be aware of various issues in T1 framing including various framing issues such as extended superframe (ESF) and D4 framing, synchronization based on the 193rd bit, as well as various physical layer technologies such as, but not limited to, alternate mark inversion (AMI) and 2B 1Q of HDSL (High bit rate Digital Subscriber Line) for carrying the 1.536 Mbps (or 1.544 Mbps) T1 service. In addition, though the preferred embodiments of the present invention generally are described with respect to North American T1 service, European N×56/64 services such as E1 also could be used. The output of T1 physical (PHY) layer interface and framer 2022 comprises an 8 kHz clock source.

In addition, because a TMTS using the preferred embodiments of the present invention generally is expected to be often deployed at cable headends and/or distribution hubs, a 27 MHz MPEG input clock 2016 is expected to be available based on the ubiquitous deployment of MPEG in digital cable television (CATV) networks. An 8 kHz reference clock may be derived from the 27 MHz clock by dividing by 3375 at item 2024. The 27 MHz MPEG clock, which generally is used for digital movies, turns out to be an exact multiple of 3375 times the 8 kHz clock, which generally is used for N×56/64 services associated with the PSTN. The three input clocks from MPEG, T1, and an 8 kHz reference are converted to 8 kHz clocks. Reference clock selection 2026 may be a switch that selects among the various 8 kHz reference clocks. As would be known by one of skill in the art, this clock selection switching could be implemented by mechanisms such as, but not limited to, software controlled switches, manual physical switches, and/or jumpers.

The selected 8 kHz clock reference is then input into phase locked loop (PLL) 2030, which further comprises phase detector 2032, loop filter 2034, a 162 MHz voltage controlled crystal oscillator (VCXO) of TMTS master clock 2036. The 162 MHz output of TMTS master clock 2036 is divided by 20,250 at item 2038 and fed back into phase detector 2032. As a result, phase locked loop (PLL) provides a loop that is used for locking the relative phases of the 8 kHz clock relative to the 162 MHz TMTS master clock 2036. Phase locked loops are known to one of skill in the art.

The 162 MHz master clock 2036 is divided by 6 at item 2040 to generate a 27 MHz clock before being input into a 42-bit counter and MPEG framer 2046 that performs the function of inserting the program clock reference into MPEG frames. Interval counter 2042 generates a 0.1 Hz interval clock 2044 that generally determines that rate at which snapshots of the 42 bit counter are sent downstream as the program clock reference (PCR) in the adaptation field of MPEG packets. The MPEG frames are communicated downstream to client transport modem 2006 using QAM modulator(s) 2048, which may be integrated into TMTS 2004 or could be external to TMTS 2004.

On the downstream side the client transport modem (cTM) 2006 includes the hardware and/or software to properly extract the MPEG frames and interpret the fields. These functions might be performed in cTM downstream front end to extract MPEG 2052 and program clock reference parser 2054. Based on the PCR value extracted from MPEG adaptation fields, the client transport modem 2006 determines how much the cTM master clock has drifted relative to the TMTS master clock. Counter and loop control 2062 determines the amount and direction of the relative clock drifts between the cTM and the TMTS and sends control signals to the cTM oscillator to correct the relative clock drift. Thus, the counter and loop control 2062 regulates the cTM clock to ensure the proper relationship relative the TMTS master clock 2036.

In the preferred embodiment of the present invention, the cTM utilizes a 162 MHz voltage controlled crystal oscillator (VCXO) 2064 that operates based on a 162 MHz crystal (XTAL) 2066. The 162 MHz clock is divided by 6 at item 2068 to result in a 27 MHz clock that is the cTM master clock 2072. This 27 MHz cTM master clock has been generally locked to the TMTS master clock 2036, which was further locked to the 8 kHz reference source in phase locked loop (2030) of TMTS 2004. After dividing the 27 MHz cTM master clock 2072 by 3375 in item 2074, an 8 kHz clock is recovered that generally is locked to the 8 kHz reference clocks of TMTS 2004. As a result the 8 kHz clock of cTM 2006 generally can be used similarly to a service provider master clock for N×56/64 services such as, but not limited to, T1. The 8 kHz clock is an input into T1 physical layer interface and framer 2076 which provide downstream T1 output 2082 that can be used as a network service provider clock by other CPE (such as but not limited to a PBX). In addition, the upstream T1 clock and data from CPE such as, but not limited to a PBX, provides the bi-directional communication generally associated with T1. However, the clock associated with upstream T1 clock and data 2088 from a PBX or other CPE generally is not a master clock, but a derived clock based on the downstream T1 output 2082, that is based on the master clock of a service provider.

In general, the downstream delivery of MPEG packets with PCR information is used as a network clock distribution mechanism to clock transfers of information in the opposite direction to distribution of the clock. Normally, MPEG PCR information in downstream MPEG packets is used to clock downstream flows of audio/visual information. However, in the preferred embodiments of the present invention, the downstream delivery of MPEG PCR clock information is used to provide a stratum clock to lock the upstream transmissions of circuit emulation services (CES) or N×56/N×64 services to the downstream network clock normally provided by service providers. Also, in the preferred embodiments of the present invention, the downstream distribution of MPEG packet containing PCR information is used to synchronize the upstream transmissions over multiple tones from a plurality of cTMs to a TMTS. Thus, the PCR information contained in MPEG packets is used to provide network clocking for communication that is in the opposite direction from the direction that MPEG packets are propagated.

Figure 21:
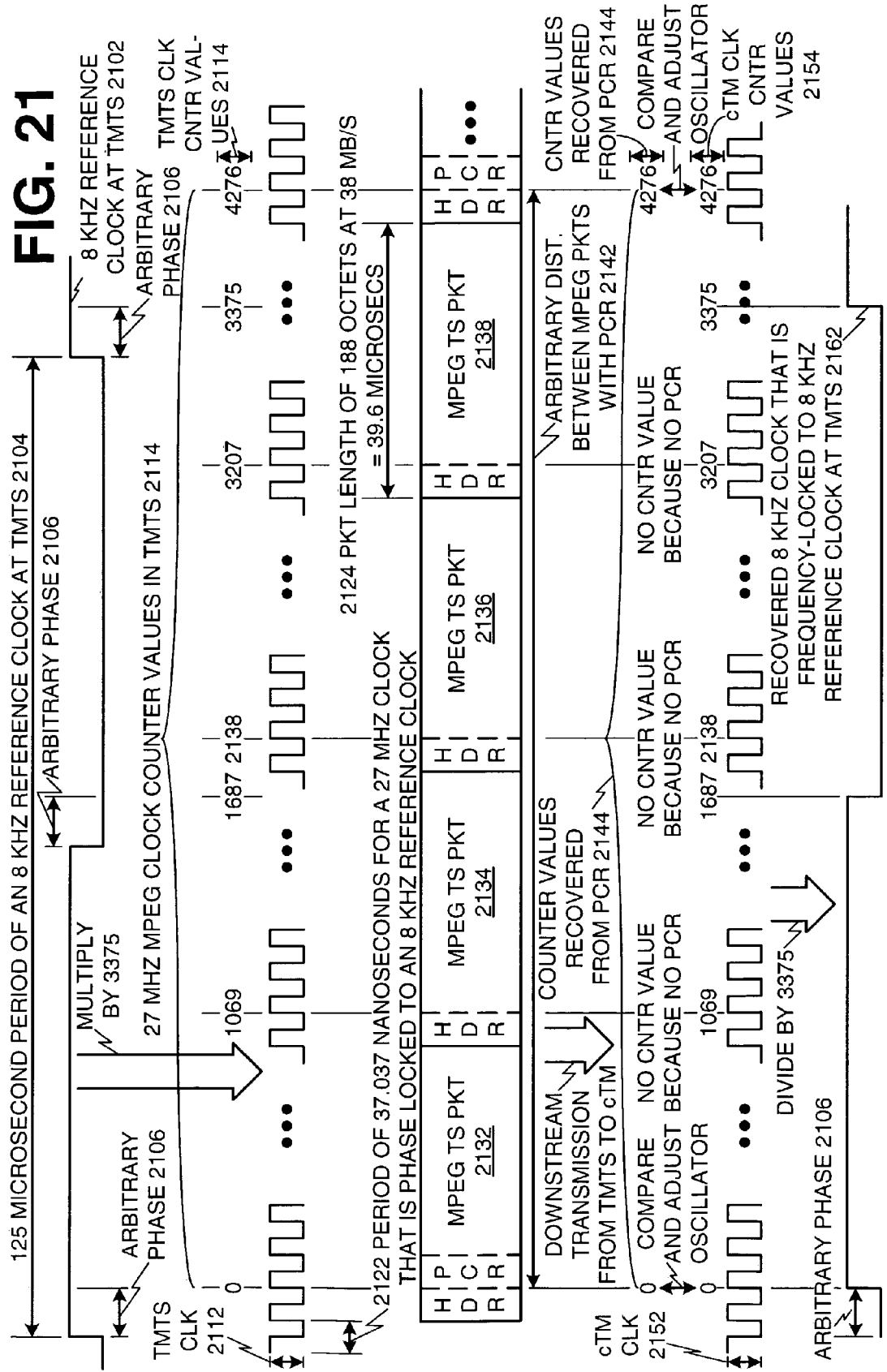
FIG. 21 shows a clock timing diagram for the TMTS and the cTM.

FIG. 21 shows a timing diagram of delivering an 8 kHz clock from a TMTS to a cTM using MPEG packets carrying program clock references (PCR). The timing diagram includes an 8 kHz reference clock 2102 that generally is associated with N×56/64 kbps services. An 8 kHz reference clock 2102 has a 125 microsecond period 2104. Normally, MPEG has a 27 MHz clock 2112 that has a period 2122 of approximately 37.037 nanoseconds. In general, the 8 kHz reference clock 2102 and the 27 MHz reference clock 2112 will have an arbitrary relative phase difference 2106. However, the relative phase difference 2106 between the 8 kHz clock 2102 and the 27 MHz clock 2114 is not significant so long as the clocks can be controlled so that they do not significantly drift relative to each other. In 6 MHz cable transmission frequency channels, MPEG packets may be transmitted at 38 Mbps. Given a 188 octet fixed length MPEG packet, this packet can be transmitted in approximately (188 octets×8 bits/octet)/38 Mbps=39.6 microseconds as illustrated at item 2124. A 27 MHz MPEG clock generally will complete approximately 1069 clock ticks in the 39.6 microseconds needed to transmit an MPEG packet of 188 octets at 38 Mbps on a 6 MHz frequency channel ((188 octets X 8 bits/octet)/38 Mbps)/(1/27 MHz clock rate)). Moreover, two 188 octet MPEG packets can be transmitted in 2×1069=2138 clock ticks of a 27 MHz clock; three 188 octet MPEG packets can be transmitted in 3×1069=3207 clock ticks of a 27 MHz clock; and four 188 octet MPEG packets can be transmitted in 4×1069=4276 clock ticks of a 27 MHz clock. Also, 27 MHz/8 kHz=3375 clock ticks of the MPEG 27 MHz clock 2112 occur in one clock tick of an 8 kHz clock 2102 with a 125 microsecond period 2104. The 8 kHz clock 2102 has a transition in 125 microseconds/2=62.5 microseconds, which is associated with 3375/2=1687 clock ticks of the 27 MHz MPEG clock 2112. These relevant clock counts are shown in FIG. 21 as 27 MHz TMTS clock counter values 2114.

The four MPEG packets (or MPEG transport stream (TS) packets) shown in FIG. 21 are labeled as 2132, 2134, 2136, and 2128. Although all the MPEG packets have headers (HDR) only some of the MPEG packets (namely MPEG packet 2132 and the MPEG packet following MPEG packet 2138) contain program clock reference (PCR) values. The time distance between MPEG packets containing PCR values generally is arbitrary as shown at item 2142. However, the preferred embodiments of the present invention generally should send PCR update values often enough to keep the TMTS and cTM clocks aligned to the desired level of accuracy. Item 2144 in FIG. 21 shows the counter values that are recovered from the MPEG PCR information received at a client transport modem (cTM). Because some of the MPEG packets received by a cTM generally will not contain PCR values (e.g., MPEG packets 2134, 2136, and 2138), a cTM generally will not recover a clock counter value from those MPEG packets.

As shown in FIG. 21, MPEG PCR values 2144 can be used in the client transport modem (cTM) to compare and adjust the client transport modem clock 2152 using a voltage controlled crystal oscillator (VCXO) to keep it in sync with the transport modem termination system (TMTS) clock 2112. Basically, the counter values recovered from the PCR 2144 are compared with client transport modem (cTM) counter values 2154 to allow adjustment of the cTM clock 2152. The 27 MHz client transport modem (cTM) clock 2152 can then be used to generate a recovered 8 kHz stratum clock 2162 by dividing by 3375. In general, the recovered 8 kHz clock 2162 at a cTM will have the same frequency as the 8 kHz reference clock 2102 at the TMTS. However, because the TMTS clock counter 2114 may start at an arbitrary phase difference 2106 from a reference 8 kHz clock 2102 at the TMTS, the 8 kHz clock 2162 recovered at a cTM will have an arbitrary (but generally fixed) phase difference 2106 from the 8 kHz reference clock 2102 at a TMTS.

Furthermore, because the MPEG packets carrying PCR values are delivered to one or more cTMs and because the propagation delay on the cable distribution network may be different to each cTM, the 8 kHz clock 2162 recovered at any cTM generally will have an arbitrary (but basically fixed) phase difference 2106 from the 8 kHz reference clock 2102 of the TMTS and an arbitrary (but basically fixed) phase difference 2106 from each of the other 8 kHz recovered clocks 2162 at the other cTMs. Although the recovered 8 kHz clock 2162 at a cTM will have an arbitrary phase difference 2106 from the 8 kHz input reference clock 2102 of the TMTS, this clock phase difference 2106 is not a problem. Generally, the phase of a reference clock at a telephone company central office is different from the phase of the clock delivered to customer premises equipment due at least to the propagation delays in the transmission lines between the service provider and the customer premises. However, it generally is important to synchronize the frequency of the service provider clock and the customer premises clocks so that the clocks do not significantly drift relative to each other. The recovered 8 kHz clock 2162 at the cTM is frequency-locked to the 8 kHz reference stratum clock 2102 at the TMTS (i.e., the clocks do not significantly drift relative to each other).

By frequency-locking each cTM clock to the TMTS clock, frequency stability of the poorly regulated cTM clocks is ensured. In addition, the multi-tone upstream frequency division multiplexing receiver in the TMTS generally performs optimally when the frequency error of the transmissions of different cTMs is small. Significant frequency differences in cTM clocks as well as the TMTS clock may create problems in selecting the correct carrier frequency of the upstream multi-tone frequency-division multiplexing. Thus, the downstream delivery of PCR information allows a plurality of client transport modems to properly set their respective oscillation clocks that are used in generating the frequency carrier signals. In this way each cTM can ensure that it is accurately transmitting in the right upstream frequency range for a tone instead of slightly interfering with an adjacent tone.

Downstream Multiplexing

The preferred embodiments of the present invention generally involve providing a frequency-division multiple access (FDMA) architecture to transparently carry frames of data between customer premises equipment and service provider equipment. The preferred embodiments of the present invention will function over not only hybrid fiber-coax systems but also over all fiber systems. Furthermore, the preferred embodiments of the present invention will work over cable distribution networks in a sub-split configuration that may be carrying legacy CATV video channels. Additionally, the preferred embodiments will work over bandwidth-split configurations.

In the downstream direction the preferred embodiments of the present invention support a point-to-multi-point configuration where a single 6 MHz channel provides one direction of traffic flow for one or more customer premises devices known as client transport modems (cTM). Downstream traffic in a 6 MHz channel may be shared by more than one cTM with each cTM being allocated a certain number of bits from the downstream modulators. To provide synchronization that allows a cTM to properly select the correct downstream bits and ignore the downstream bits destined for other cTMs, a framing method is used.

The MPEG 2 (Moving Picture Experts Group) transport stream is one non-limiting way of handling this framing functionality. Advantageously, MPEG 2 transport already is commonly used in CATV networks to deliver digital video and audio. Furthermore, MPEG 2 transport already includes synchronization mechanisms that can be used to align the clocks of cTMs. Also, MPEG 2 transport is a multiplexing mechanism that allows the high speed data of the preferred embodiments of the present invention to be potentially multiplexed with other MPEG 2 data in CATV networks.

In the upstream direction the standard 6 MHz channels of RF cable networks may be subdivided into multiple tones to allow frequency allocations to be managed at a much smaller granularity. Each one of these tones can be allocated to a different cTM. The preferred embodiments of the present invention avoid all the problems of DOCSIS in ranging and contention resolution (or media access control) by limiting the allocation of an upstream tone to one cTM at any particular time. Thus, the upstream direction generally represents a point-to-point architecture with one cTM communicating with one server transport modem (sTM) function. A plurality of these server transport modems may be implemented in a central-site concentrator known as a transport modem termination system (TMTS).

Figure 22:
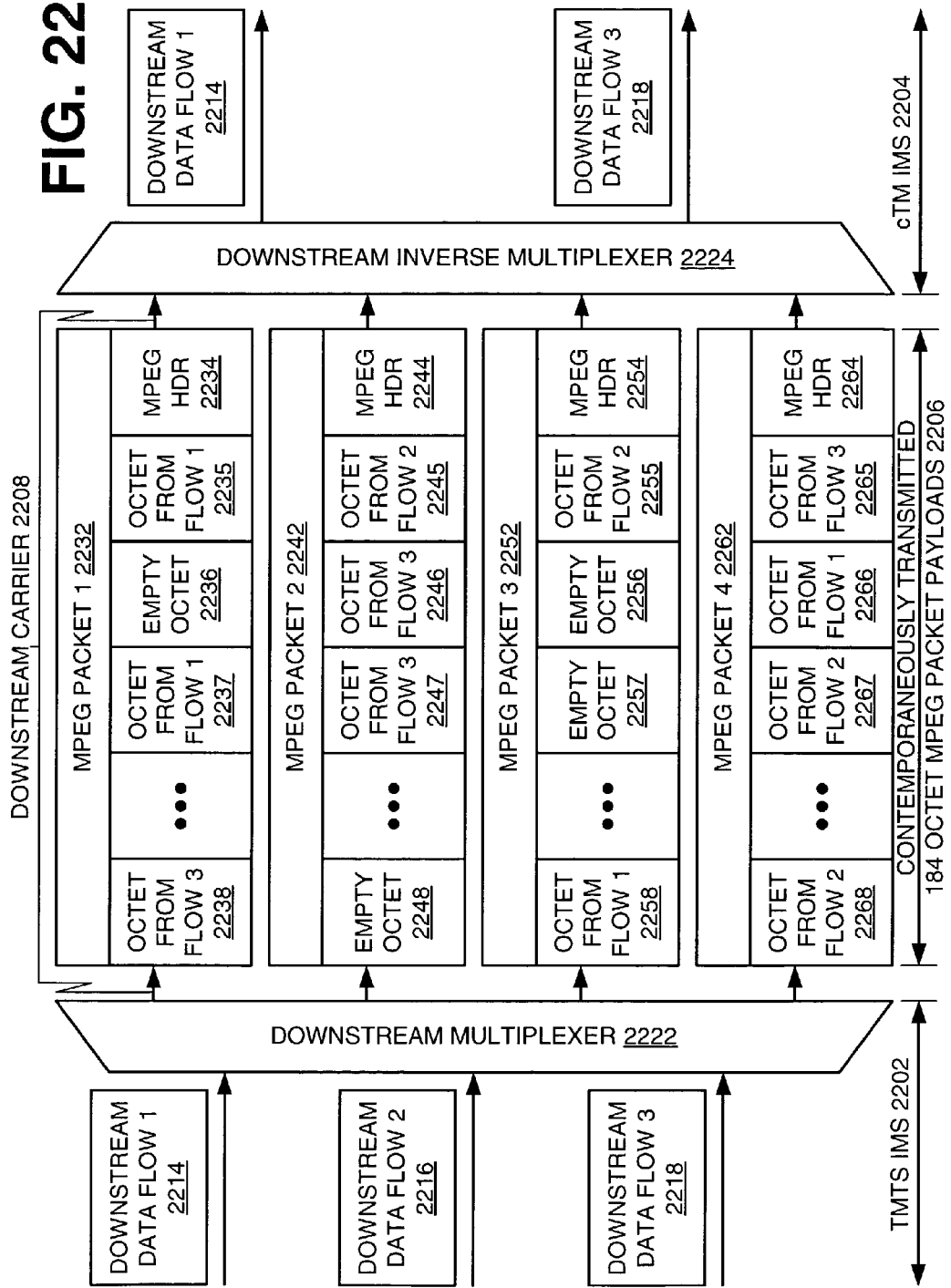
FIG. 22 shows the downstream inverse multiplex sublayer (IMS) communication of MPEG packets over multiple carriers.

As discussed above the preferred embodiments of the present invention generally carry downstream information in MPEG packets. The IMS sublayer of the TMTS is generally responsible for placing the downstream information into MPEG packets while the IMS sublayer of the cTM generally is responsible for recovering the information from the MPEG packets. FIG. 22 generally shows the downstream behavior of the TMTS IMS sublayer 2202 and the cTM IMS sublayer 2204. A plurality of 184 octet MPEG packet payloads 2206 may be contemporaneously transmitted downstream. Each of the contemporaneously transmitted MPEG packets is carried on its own downstream carrier frequency such as 2208. In the preferred embodiment of the present invention downstream carrier frequency such as 2208 is a 6 MHz frequency channel that is commonly found in CATV networks.

TMTS IMS 2202 is shown with three downstream data flows 2214, 2216, and 2218. Two of the downstream data flows 2214 and 2218 may be destined for one cTM IMS sublayer 2204. The other downstream data flow 2216 may be destined for a cTM IMS sublayer in a different client transport modem. The downstream data flows 2214, 2216, and 2218 generally are frame management sublayer data flows and carry information in FMS frames 1602 of FIG. 16. Downstream multiplexer in the TMTS 2222 is responsible for placing the downstream data flows into the correct MPEG packets while downstream inverse multiplexer 2224 is responsible for recovering the data flows from the correct MPEG packets.

FIG. 22 shows four MPEG packets 2232, 2242, 2252, and 2262 which each have an MPEG header 2234, 2244, 2254, and 2264 respectively. As shown in FIG. 22 octets from a single data flow are spread across a plurality of contemporaneously transmitted MPEG packets. For example, octets 2235, 2237, 2258, and 2266 of data flow 1 are spread across MPEG packets 2232, 2252, and 2262. Also, octets 2245, 2255, 2267, and 2268 of data flow 2 are spread across MPEG packets 2242, 2252, and 2262. In addition, octets 2238, 2246, 2247, and 2265 of data flow 3 are spread across MPEG packets 2232, 2242, and 2262. Empty octets 2236, 2248, 2256, and 2257 of MPEG packets 2232, 2242, and 2252 currently are not allocated to any data flow. Because the FMS data flows continuously transmit octets with 0x7E when there is no data to transmit, the octets of an MPEG packet that are allocated to a particular data flow generally contain either an octet from an FMS frame or the continuously transmitted 0x7E when there is no data from an FMS frame to be transmitted on an FMS data flow.

Figure 23:
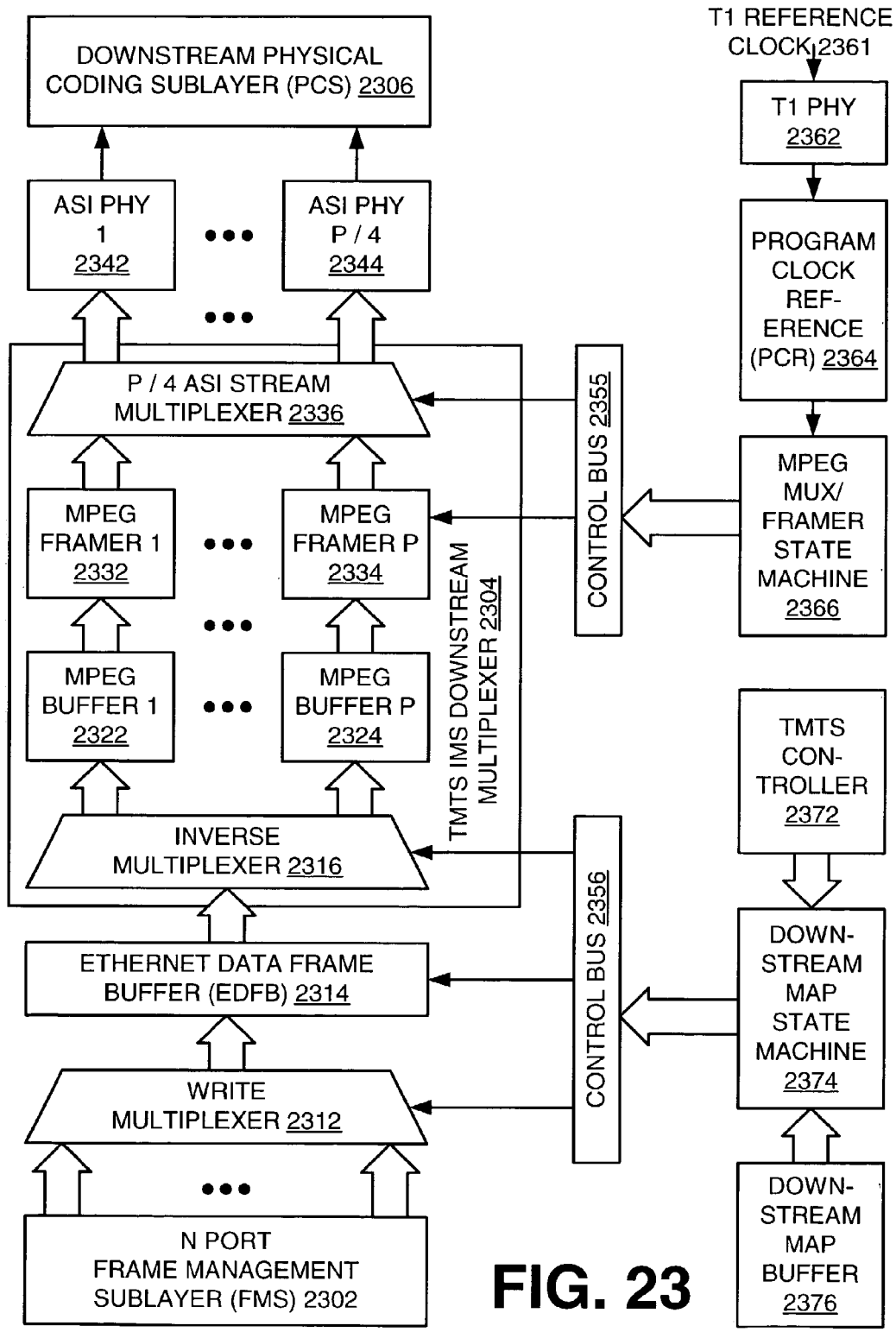
FIG. 23 shows the TMTS downstream IMS sublayer.

FIG. 23 shows a more detailed diagram of the downstream functionality of a TMTS multiplexer. An N port FMS sublayer 2302 communicates information to TMTS IMS downstream multiplexer 2304, which is further communicated to downstream PCS sublayer 2306 through various intermediate steps. N port FMS 2302 communicates information to write multiplexer 2312 which is responsible for managing the placement of data into ethernet data frame buffer (EDFB) 2314. EDFB 2314 is related to the frame buffers in FIG. 13. In general, N frame buffers may be implemented as a group of memory with write multiplexer 2312 and control bus 2356 specifying the correct memory address location associated with the proper FMS data flow. EDFB 2314 has one or more ring buffers associated with each data flow. The ring buffers keep up with pointers that specify the beginning address and ending address of valid data to be transferred to inverse multiplexer 2316. The behavior of inverse multiplexer 2316 will be described in more detail with respect to FIG. 24. However, inverse multiplexer 2316 generally reads data from EDFB 2314 and places it into one of P MPEG buffers shown as 2322 and 2324. Each MPEG buffer is associated with an MPEG framer shown as 2332 and 2334. MPEG framers 2332 and 2334 actually form MPEG frames including the MPEG headers and potentially adaptation fields that carry the program clock reference among other items. In the preferred embodiment of the present invention each group of four MPEG streams is converted into one asynchronous interface stream in P/4 ASI stream multiplexer 2336. These ASI streams have physical interfaces 2342 and 2344. The ASI streams are further passed to QAM modulators in PCS 2306. In other alternative embodiments of the present invention the MPEG streams go directly to the QAM modulators without utilizing ASI interfaces.

Furthermore, FIG. 23 also shows some of the hardware and/or software logic used to control the downstream communication of information from FMS sublayer 2302 into TMTS IMS downstream multiplexer 2304 and further into downstream PCS 2306. Control buses 2355 and 2356 carry at least some of the signals that drive this downstream communication through the sublayers in FIG. 23. In general, the preferred embodiments of the present invention use software and/or hardware to implement various logical functions. One skilled in the art will be aware of the trade-offs between implementing various functions in hardware, software, and/or some combination of hardware and software. Furthermore, one skilled in the art will be aware of methods for communicating signals between various portions of hardware and/or software. Also, one skilled in the art will be aware of the timing issues and techniques used in interfacing different types of hardware, logic, and/or circuitry to other hardware, logic, and/or circuitry. Moreover, one skilled in the art will be aware that interface buses are commonly used to facilitate the interconnection of hardware, logic, and/or circuitry. In addition, one skilled in the art will be aware that there are many other ways in addition to buses to handle the interconnection of hardware components. Thus, the use of buses is only one non-limiting example of hardware interconnection that may be used in the preferred embodiments of the present invention. One skilled in the art will be aware of other types of hardware interconnection as well as the various issues and complexities in utilizing various types of interconnections between and among hardware, logic, and/or circuitry.

As described with respect to FIGS. 20 and 21, the preferred embodiments of the present invention include a connection for a T1 reference clock 2361, which is input into T1 physical layer interface 2362. FIG. 21 also shows how the T1 clock is related to MPEG program clock reference (PCR) 2364. This PCR information is used in MPEG multiplexer/framer state machine 2366 that generates the changing values in the MPEG headers and passes the information to MPEG framers 2332 and 2334. Also, the TMTS includes TMTS controller 2372 that operates with downstream map state machine 2374 to cause the ethernet data from the correct data flow to be placed in the proper octet of the MPEG frames. This downstream map state machine 2374 also utilizes downstream map buffer 2376 which specifies the mapping of data flows into octets of MPEG packets.

Figure 24:
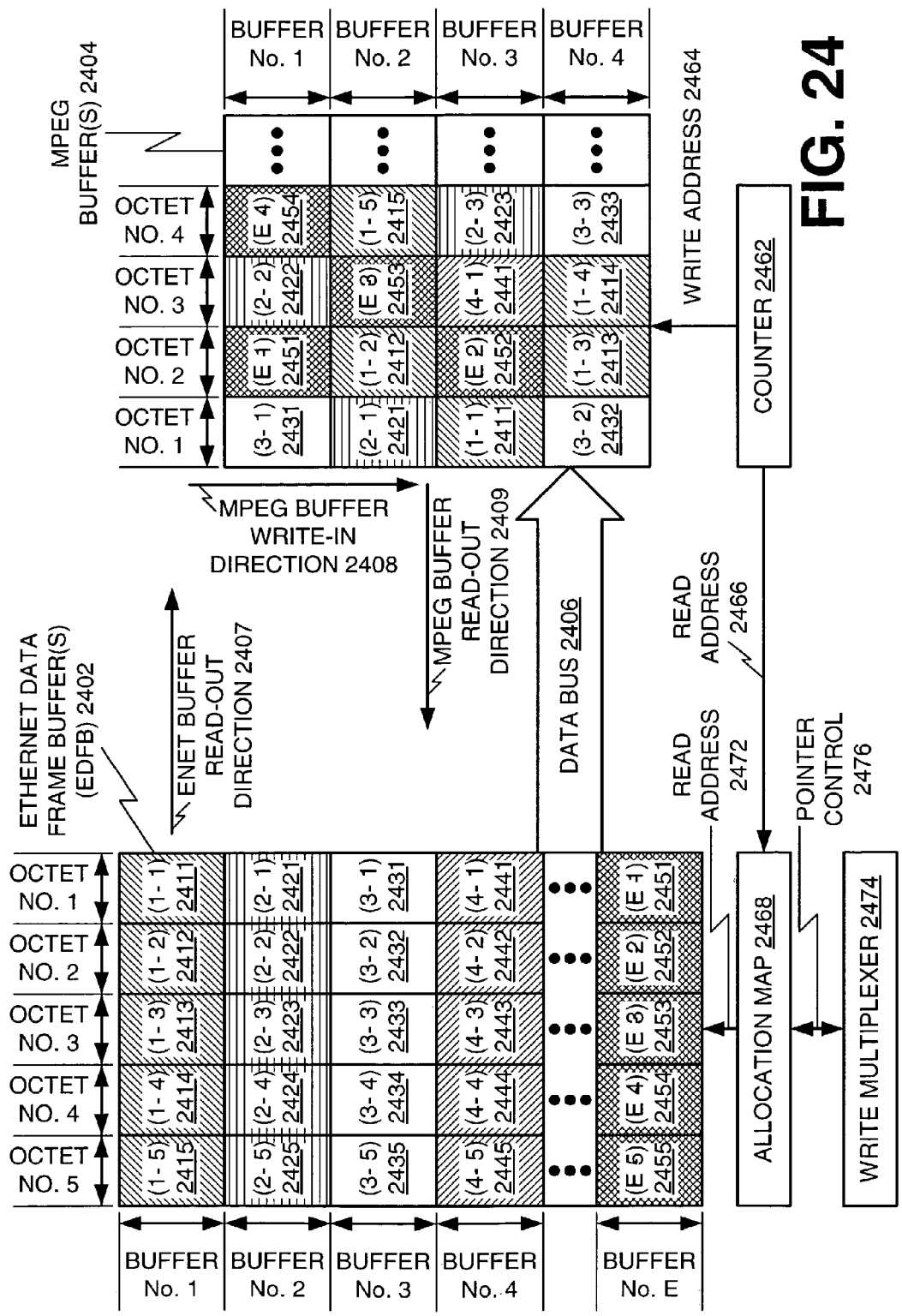
FIG. 24 shows the formation of MPEG packets from FMS frames.

FIG. 24 further shows the general behavior of downstream map state machine 2374 and its interaction with ethernet data frame buffer 2314 to cause the correct octets to be placed into MPEG buffers 2322 and 2324. FIG. 24 shows a small portion of the ethernet data frame buffer(s) (EDFB) 2402 as well as a portion of the MPEG buffers 2404. Basically, the octets in EDFB 2402 are read and moved across data bus 2406 to be written into MPEG buffers 2404. Arrow 2407 shows the ethernet buffer read-out direction, while arrow 2408 shows the MPEG buffer write-in direction. Also, arrow 2409 shows the MPEG buffer read-out direction, which generally relates to the direction that octets are transmitted on the cable distribution network. In FIG. 24 a non-limiting example of the preferred embodiments of the present invention would contemporaneously communicate octet No. 1 of MPEG buffer Nos. 1, 2, 3, and 4 on four different downstream 6 MHz channels. Also, in the non-limiting example of the preferred embodiments of the present invention, octet No. 2 of MPEG buffer Nos. 1, 2, 3, and 4 in FIG. 24 generally would be contemporaneously communicated on four different downstream 6 MHz channels. Similarly, in the non-limiting example of the preferred embodiments of the present invention, octet No. 3 of MPEG buffer Nos. 1, 2, 3, and 4 in FIG. 24 generally would be contemporaneously communicated on four different downstream 6 MHz channels. Furthermore, in the non-limiting example of the preferred embodiments of the present invention, octet No. 4 of MPEG buffer Nos. 1, 2, 3, and 4 in FIG. 24 generally would be contemporaneously communicated on four different downstream 6 MHz channels.

One skilled in the art will be aware that the concepts of the preferred embodiments of the present invention may transmit MPEG frames on at least one downstream frequency channel, and the use of a plurality of downstream frequency channels instead of just one frequency channel generally allows contemporaneous transmission of multiple MPEG packets and the corresponding octets. Thus, the choice of four MPEG buffers (Nos. 1, 2, 3, and 4) shown in FIG. 24 is only a non-limiting example that is used to better illustrate the possibility of utilizing more than one downstream frequency channel in the preferred embodiments of the present invention. In general, the portion of EDFB 2402 shown in FIG. 24 has five octets and buffers numbered 1 to E. One skilled in the art will be aware that this is a small example of a communication system utilizing the preferred embodiments of the present invention, and actual implementations would have more than five octets in EDFB 2402 as well as more than four octets in each of the four exemplary buffers of MPEG buffer(s) 2404.

In general the octets of the EDFB 2402 are labeled in FIG. 24 with an ordered pair of (EDFB buffer number—EDFB octet number). For example, octet 4 of buffer 3 in EDFB 2402 is (3-4). Also, the five octets of EDFB 2402 buffer 1 are 2411, 2412, 2413, 2414, and 2415; the five octets of EDFB 2402 buffer 2 are 2421, 2422, 2423, 2424, and 2425; the five octets of EDFB 2402 buffer 3 are 2431, 2432, 2433, 2434, and 2435; the five octets of EDFB 2402 buffer 4 are 2441, 2442, 2443, 2444, and 2445; and the five octets of EDFB 2402 buffer E are 2451, 2452, 2453, 2454, and 2455.

The values in these octets are read-out of EDFB 2402 according to ethernet buffer read-out direction 2407 and moved into the four MPEG buffer(s) 2404 according to the MPEG buffer write in direction 2408 whenever the allocation MAP specifies the same octet number for two or more MPEG buffers. (Because the data from the MPEG buffers 2404 generally is transmitted contemporaneously downstream with each MPEG buffer relating to an MPEG packet on its own carrier frequency, the No. 1 octets of MPEG buffers No. 1 through 4 are transmitted contemporaneously.) Also, the No. 2 octets of MPEG buffers No. 1 through 4 are transmitted contemporaneously. Thus, MPEG buffer write-in direction 2408 is the sequence for filling the MPEG buffers when the allocation maps specify that one FMS data flow is to the same octet number in two or more contemporaneously transmitted MPEG packets. Furthermore, the data in the EDFB buffers 2404 from FMS data flows generally is serial or sequential in nature with the value in octet 1 of any one of the EDFB buffer numbers 1 through E preceding the value of octet 2 in the same EDFB buffer number. In addition, the transmission of an MPEG packet that is formed based upon one of the MPEG buffers (numbered 1 through 4 in this example) is also sequential in nature such that the value in octet 1 of MPEG buffer 1 generally is transmitted downstream before the value in octet 2 of MPEG buffer 1. Thus, in general the information in an FMS data flow as held in one of the buffers of EDFB 2404 is read out in FIG. 24 in a right-to-left fashion. This information is written into the MPEG buffer(s) 2404 first in a top-to-bottom fashion (according to arrow 2408 that shows the MPEG buffer write-in direction) and then in a left-to-right fashion. The values in MPEG buffers 2404 generally are read out in a left-to-right fashion for downstream communication through a PCS sublayer and over a cable transmission network. The information of each of the MPEG data buffer(s) 2404 that are numbered 1 to 4 are read out in parallel for all four of the exemplary MPEG data buffers numbered 1 through four.

As an example, the values in octets 2431 (or 3-1), 2432 (or 3-2), and 2433 (or 3-3) generally are sequential octets of an FMS data flow comprising FMS data frames 1602 as shown in FIG. 16 that may be carrying ethernet/802.3 data frames or control frames. The value of octet 2431 (or 3-1) is read out of octet 1 of EDFB 2402 buffer No. 3 and written into octet 1 of MPEG buffer 2404 No. 1 prior to the value of octet 2432 (or 3-2) being read out of octet 2 of EDFB 2402 buffer No. 3 and being written into octet 1 of MPEG buffer 2404 No. 4. Furthermore, the value in octet 2432 (or 3-2) is read out of octet 2 of EDFB 2402 buffer No. 3 and written into octet 1 of MPEG buffer 2404 No. 4 prior to the value in octet 2433 (or 3-3) being read out of octet 3 of EDFB 2402 buffer No. 3 and being written into octet 4 of MPEG buffer 2404 No. 4. Then, the value of octet 2431 (or 3-1) is transmitted downstream contemporaneously with the value in octet 2432 (or 3-2), although the two octets are carried in different MPEG packets that are transmitted in parallel across multiple carrier frequencies. Also, the MPEG packet carrying the information from MPEG buffer 2404 No. 4 carries the values of the two consecutive or sequential octets 2432 (or 3-2) and 2433 (or 3-3) from an FMS data flow that was held in EDFB 2402 buffer No. 3. However, the MPEG packet that is formed (based upon MPEG buffer 2404 No. 4) now has intervening octets 2413 and 2414 (associated with different FMS data flows) between octet 2432 (or 3-2) and octet 2433 (or 3-3).

The process of reading from the ethernet data frame buffer(s) (EDFB) 2402, which generally contain FMS frames, and writing to MPEG buffer(s) 2404 is at least partially driven by counter 2462. Because MPEG packets are fixed length with 184 octets of payload, a counter 2462 can cycle through the octet positions of MPEG buffer(s) 2404, which generally hold fixed length MPEG payloads. The counter 2462 supplies its value as a write address for MPEG buffer(s) 2404. Also, the counter 2462 supplies its value as a read address 2466 to allocation map 2468, which generally keeps track of the relationship specifying the location in MPEG packets where the octets of FMS data flows contained in EDFB 2404 are to be placed. Allocation map 2468 may be implemented at least partially as a memory lookup table that uses read address 2466 to read out the value from the memory look up table associated with allocation map 2468. The value from the lookup table together with pointer control 2476 information from write multiplexer 2474 provides the information needed to generate the read address(es) 2472 of the EDFB 2402. As described with respect to FIG. 23, the ethernet data frame buffer(s), which are labeled as EDFB 2402 in FIG. 24, have one or more ring buffers with the position in each of the ring buffer determined based on at least two pointers associated with each ring buffer. The two pointers for each ring buffer specify the next write location for writing octets of FMS frames into a ring buffer of EDFB 2402 and specify the next read location for reading octets of the FMS frames out of the ring buffer of EDFB 2402 and into the MPEG buffer(s) 2404. Basically, the read and write pointers for each ring buffer keep track of which octets in EDFB 2402 contain valid information from FMS frames and which octets in EDFB 2402 have not yet been written to an MPEG payload as represented by the MPEG buffer(s) 2404.

Figure 25:
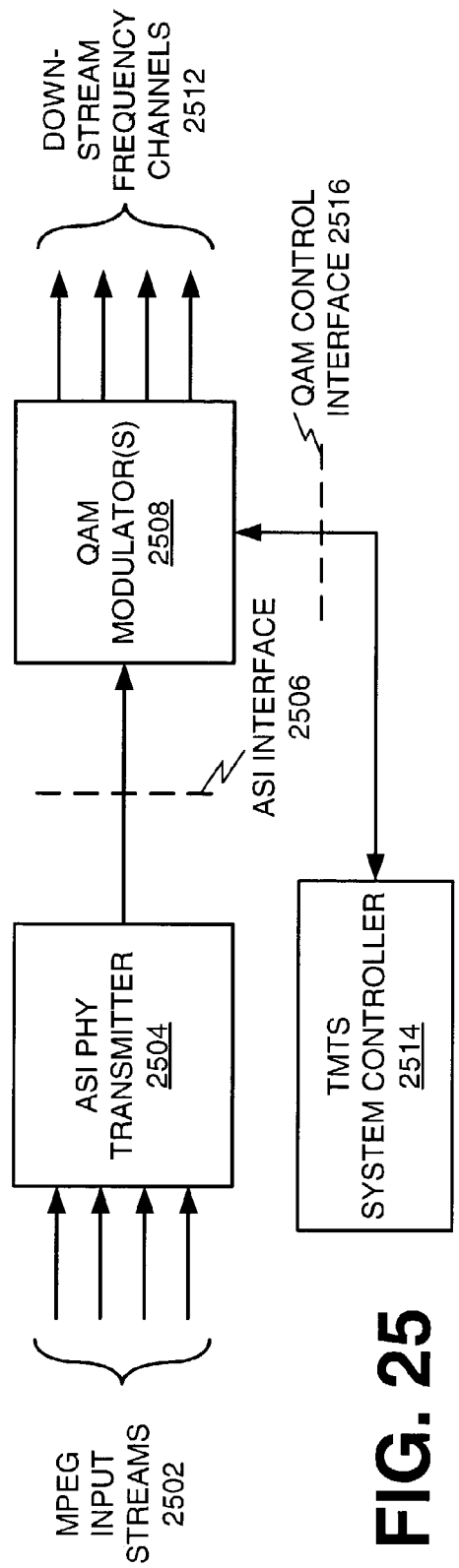
FIG. 25 shows the downstream communication of MPEG packets using an asynchronous serial interface (ASI) to communicate with external QAM modulators.

FIG. 25 shows a block diagram from communicating MPEG streams in an ASI format to QAM modulators for transmission on downstream frequency channels. Four MPEG input streams 2502 may be provided to an asynchronous serial interface (ASI) physical (PHY) transmitter 2504 that generates an ASI interface 2506 as the transmitted output. The ASI interface 2506 provides input to QAM modulator(s) 2508, which generate the electrical and/or optical signals for transmitting the digital information of the MPEG streams in ASI format on the downstream frequency channels 2512. In the preferred embodiments of the present invention the downstream frequency channels are 6 MHz channels that are commonly used in cable TV networks. One skilled in the art will be aware of this configuration for communicating MPEG input streams 2502 downstream on 6 MHz frequency channels because it is commonly used in delivery digital CATV services.

The QAM modulator(s) 2508 are controlled by and/or deliver feedback information to TMTS system controller 2514. In general, QAM control interface 2516 allows TMTS system controller to specify the downstream carrier frequency for each modulator of QAM modulator(s) 2508. Also, various other modulation parameters may be communicated from TMTS system controller 2514 to QAM modulator(s) 2508 over QAM control interface 2516. Furthermore, QAM modulator(s) 2508 may report various performance conditions including failures back to TMTS system controller 2514 over QAM control interface 2516. This use of QAM modulator(s) 2508 that generally are controlled by software and/or hardware logic (and/or circuitry) in the form of TMTS system controller 2514 is known by one of skill in the art because it is commonly used in CATV networks to deliver various services.

Figure 26:
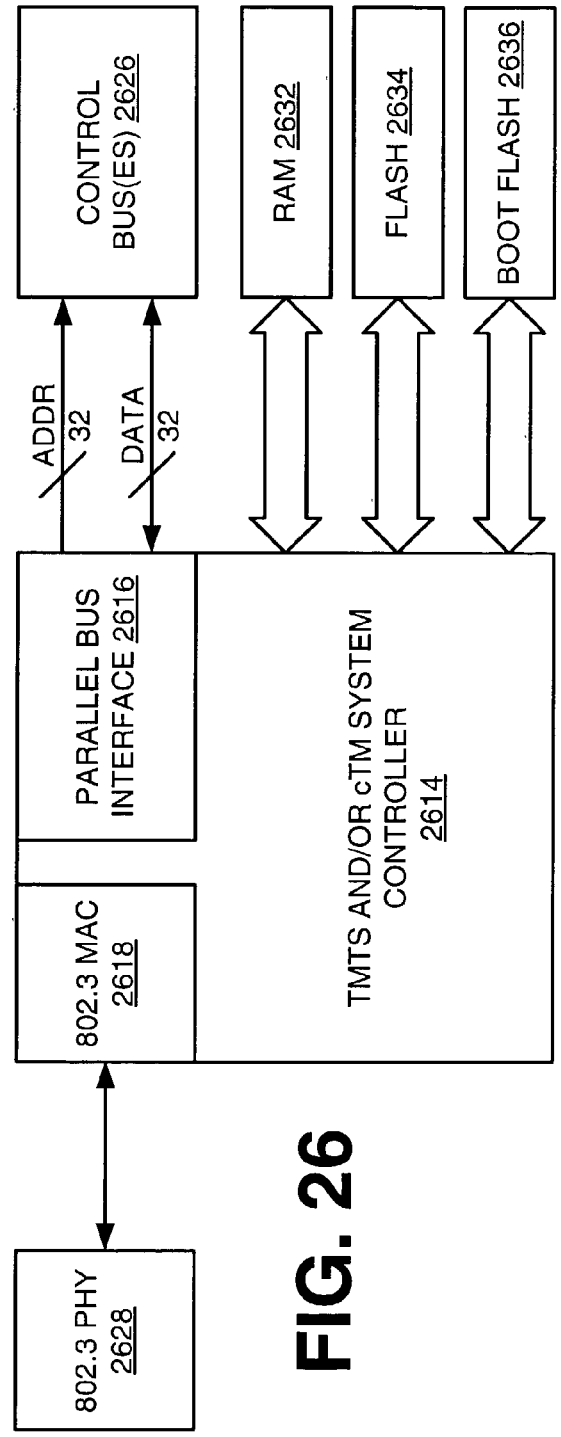
FIG. 26 shows a block diagram of a TMTS and/or cTM system controller.

FIG. 26 shows a block diagram of a system controller that may be used in a TMTS and/or a cTM. TMTS and/or cTM system controller 2614 is a Motorola MPC855T Power Quick Micro-controller in the preferred embodiments of the present invention. The data sheet for the MPC855T is incorporated by reference in its entirety herein. TMTS and/or cTM system controller has a parallel bus interface 2616 that includes a thirty-two bit address bus and a thirty-two bit data bus. The addresses and data from parallel bus interface 2616 are propagated throughout a TMTS and/or a cTM through various control bus(es) 2626. In addition, TMTS and/or cTM system controller 2614 includes an 802.3 (and/or ethernet) MAC interface 2618. This 802.3/ethernet MAC interface 2618 can be connected to an 802.3 physical interface 2628, which transmits and/or receives the proper electrical and/or optical signals for carrying 802.3/ethernet MAC frames over the various types of ethernet physical layers that are known to one of ordinary skill in the art.

The ethernet/802.3 MAC interface 2618 may be used for communicating various control information various protocols that are known to one of ordinary skill in the art. One commonly-used, non-limiting set of protocols is the TCP/IP (Transmission Control Protocol/Internet Protocol) suite, which is used on the Internet and includes many protocols for performing various functions. In the TCP/IP suite, telnet, HTTP (Hyper-Text Transfer Protocol), and SNMP (Simple Network Management Protocol) are commonly-used for configuration and/or management of network devices. In addition, FTP (File Transfer Protocol) and TFTP (Trivial File Transfer Protocol) are commonly used for downloading and/or uploading files of configuration settings as well as downloading software or firmware updates to network devices. Furthermore, the DHCP (Dynamic Host Configuration Protocol), which is an extension of the bootstrap protocol (BOOTP) is often used configuring IP address and other IP initialization information. One skilled in the art will be aware that these commonly-used protocols are only non-limiting examples of protocols for handling configuration/management, software/parameter setting file transfer, and IP configuration. One skilled in the art will be aware that many other protocols, both within the TCP/IP suite and outside the TCP/IP suite, can be used to perform similar functions.

Furthermore, FIG. 26 shows that TMTS and/or cTM system controller 2614 is connected to various types of memory including volatile storage or RAM 2632, which generally is used when TMTS or cTM system controller 2614 is operating as well as two areas of non-volatile storage in flash 2634 and boot flash 2636. Generally, flash 2634 contains configuration settings and system firmware and/or software, while boot flash 2636 generally contains a small amount of software and/or firmware that is used for booting TMTS and/or cTM system controller 2614 and is responsible for ensuring that downloads of new firmware and/or software to flash 2634 are applied correctly when a different firmware and/or software revision is installed in the system. This description of RAM 2632, flash 2634, and boot flash 2636 is the common way that network devices handle volatile operating memory and non-volatile memory for software/firmware and system configuration parameters. However, one skilled in the art will be aware of many other types of storage devices and technologies as well as other storage architectures that could be used to implement similar functionality to RAM 2632, flash 2634, and boot flash 2636.

Figure 27:
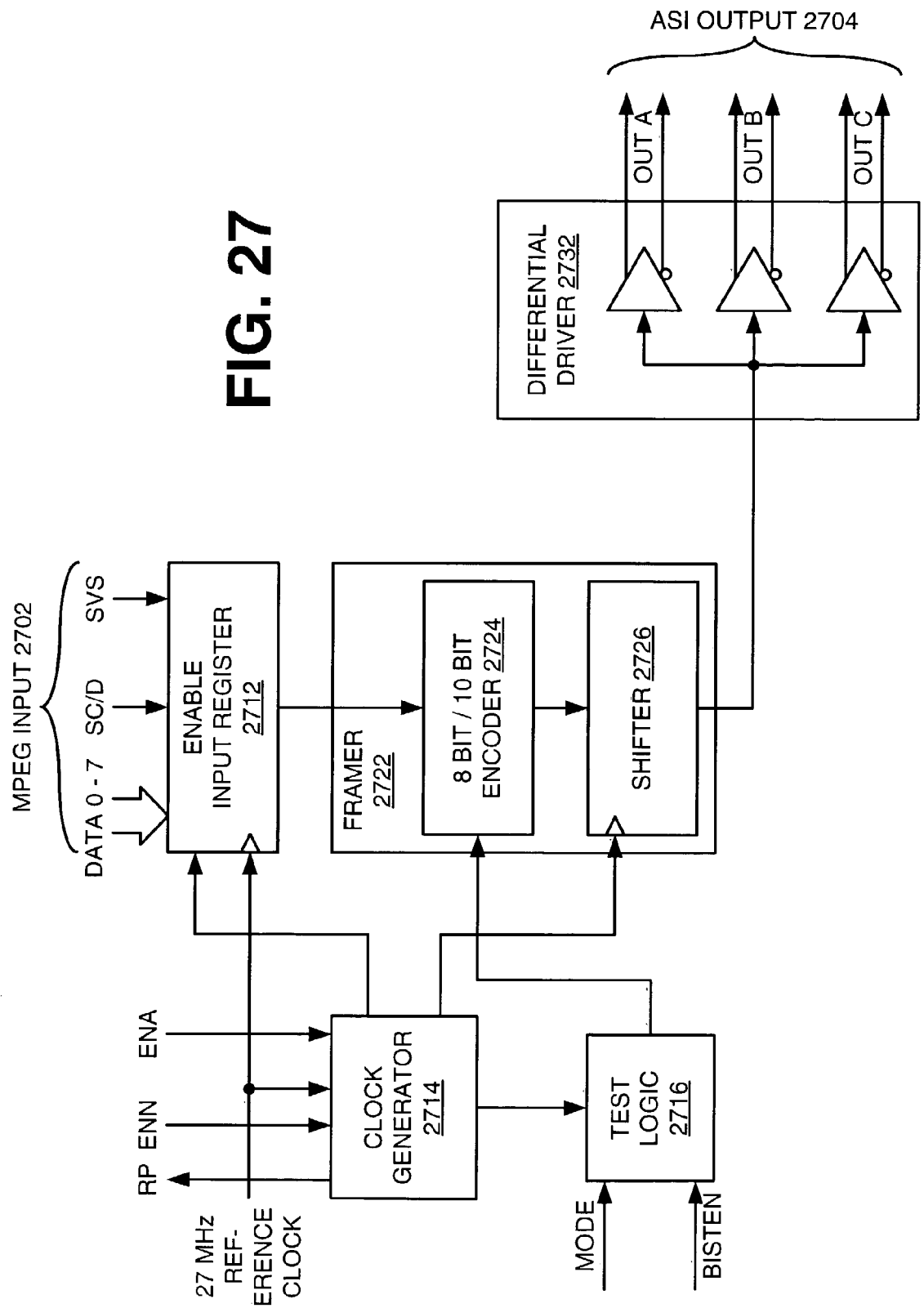
FIG. 27 shows a block diagram of an ASI transmitter.

FIG. 27 shows a block diagram of one implementation of an MPEG to ASI transmitter that may be used in the preferred embodiments of the present invention. The preferred embodiments of the present invention use a Cypress Semiconductor transmitter chip, such as the CY7B923 or the CY7B9234 SMPTE (Society of Motion Picture and Television Engineers), from the HOTLink chip family as ASI PHY transmitter 2504 in FIG. 25. The block diagram of FIG. 27 is from the data sheet for the CY7B9234, and this data sheet as well as the data sheet from the CY7B923 are in incorporated by reference in their entirety herein. In general, MPEG input 2702 is converted into an ASI output 2704. Enable input register 2712 passes the octets of MPEG packets into the framer 2722 based on 27 MHz reference clock. Framer 2722 creates an 8 bit/10 bit code in 8 bit/10 bit encoder 2724. This information is then shifted out to differential driver 2732 through shifter 2726, which may be implemented using positive emitter-coupled logic (PECL). Test logic 2716 is also used as an input to the 8 bit/10 bit encoder 2724. Due to the common usage of MPEG streams carried over ASI interfaces in the headend and/or distribution hubs of CATV networks, one skilled in the art will be aware of other off-the-shelf chips as well as other logic and/or circuitry that could be used as an ASI PHY transmitter 2504 to place four MPEG streams into an ASI bit stream.

Figure 28:
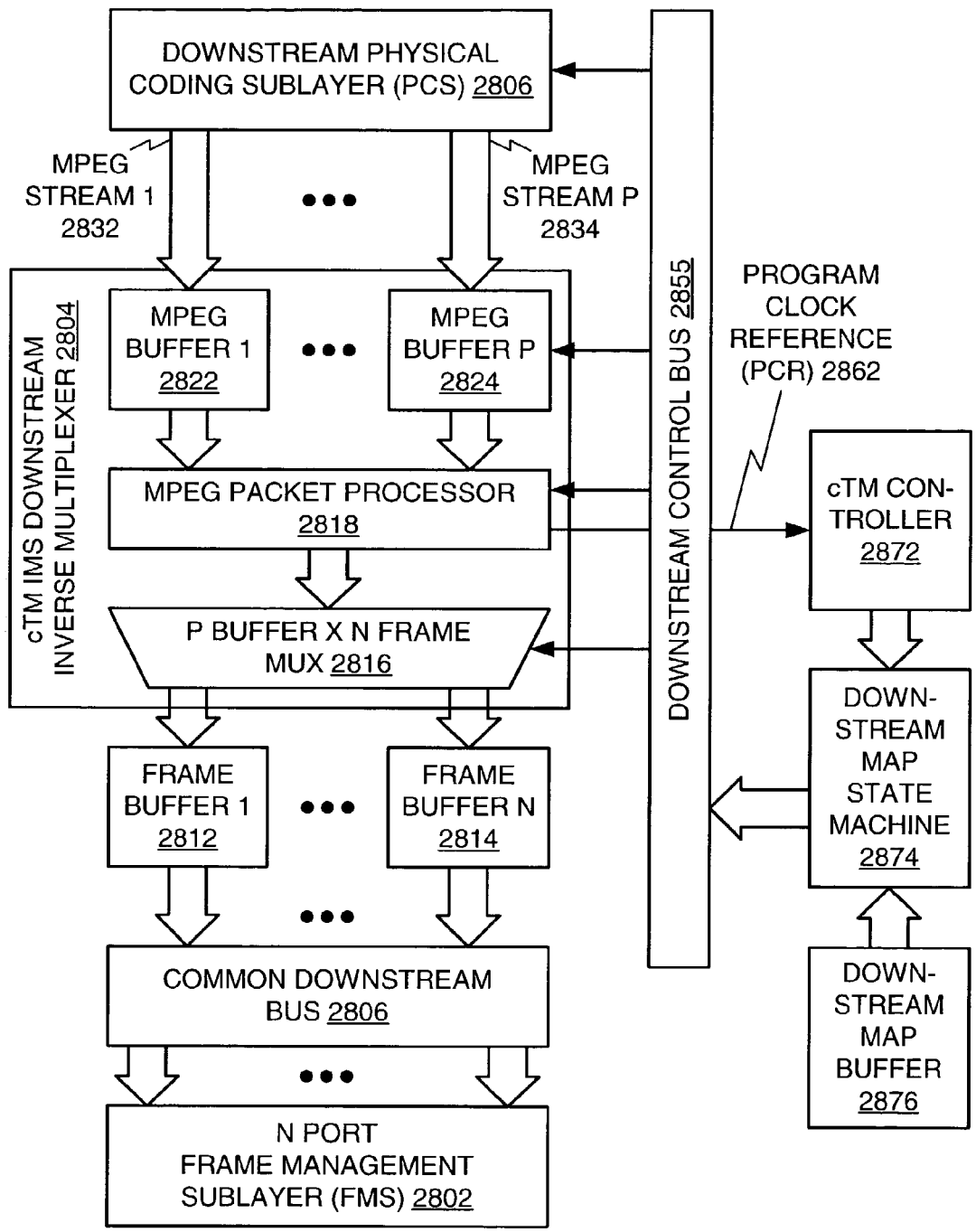
FIG. 28 shows the cTM downstream IMS sublayer.

FIG. 28 shows a block diagram for the downstream inverse multiplexer sublayer for a client transport modem. Downstream PCS 2806 recovers the MPEG streams 1 through P (2832 and 2834) from the QAM modulated downstream 6 MHz frequency channels. The MPEG streams are passed into cTM INS downstream inverse multiplexer 2804 where they are converted back into FMS frames that are delivered over common downstream bus 2806 to N port frame management sublayer (FMS) 2802. In more detail, cTM IMS downstream inverse mux 2804 includes MPEG buffers 1 through P (2822 and 2824) to receive MPEG streams 1 through P (2832 and 2834). MPEG packet processor 2818 determines whether the packet ID (PID) of each MPEG packet is one of the PIDs carrying downstream traffic to this particular client transport modem. Other MPEG packets with other PIDs may contain traffic that is not destined for this particular cTM and thus are discarded. The traffic with other PIDs that is not destined for this particular cTM may contain traffic destined for other client transport modems as well as other applications and uses of MPEG packets. Thus, MPEG PID numbers actually provide a mechanism for time-division multiplexing (TDM) other types of MPEG traffic onto the same 6 MHz frequency channel that carries traffic to a plurality of cTMs. MPEG packet processor 2818 handles the selection based on the PID values of the proper MPEG packets for the cTM that may include multiple MPEG packets transmitted in parallel across multiple 6 MHz frequency channels. Basically, MPEG packet processor 2818 acts as a selection filter based upon PID values to only select the MPEG packets containing PID values destined for a particular cTM.

P buffer×N frame mux 2816 generally performs the reverse of the process shown in FIG. 24 for the MPEG packets with PIDs containing information destined for this particular cTM. The P buffer×N frame mux selects the proper octets from the incoming MPEG frames and places them into frame buffers 1 through N (2812 and 2814) to reassemble the FMS frames that may be carrying ethernet/802.3 data frames or control frames in the FMS frame format of FIG. 16. The P buffer×N frame mux 2816 reassembles the FMS frames from the MPEG packets based upon a downstream map that is contained in downstream map buffer 2876 and is further described with respect to FIG. 30. The assembly of FMS frames from MPEG packets starts with the first octet of the lowest PID which is allocated to the cTM and increments by increasing PID numbers (of the PID numbers allocated to the cTM) to first recover the last octet allocated to the cTM in a parallel transmission of octets over multiple MPEG packets on multiple 6 MHz channels. Then the assembly of FMS frames continues using the same process on the next set of octets transmitted in parallel (in multiple MPEG packets on multiple 6 MHz frequency channels) that has at least one octet allocated to the cTM. All other MPEG octets not allocated to this particular cTM are discarded during the process.

The recovered octets are placed into the correct frame buffer based upon the allocation of client transport modem ethernet/802.3 uplink ports. The frame buffers 1 through N (2812 and 2814) containing the FMS frames are communicated over common downstream bus 2806 to N port FMS 2802, which converts the FMS frames back into ethernet/802.3 frames for transmission on the ethernet/802.3 ports of the client transport modem. The control frames are passed to the cable transmission (CT) physical (PHY) control and generally are not forwarded to the ethernet/802.3 ports of a client transport modem. Most ethernet/802.3 transceivers would consider the control frames as ethernet/802.3 errors because the control frames have a different start frame delimiter (SFD) octet of 0xAE instead of the correct SFD for ethernet/802.3 of 0xAB. In addition to this issue of the control frames having an incorrect SFD for communication on ethernet/802.3 media, based on security policies the control frame information generally should not be distributed on ethernet/802.3 media connected to the cTM.

Downstream map state machine 2874 utilizes information communicated with cTM controller 2872 and downstream map buffer 2876 to control the process of reassembling FMS frames from the octets of MPEG packets. In the preferred embodiments of the present invention, the downstream map state machine 2874 communicates with various portions of the client transport modem using downstream control bus 2855. Also, MPEG packet processor 2818 extracts the program clock reference (PCR) from the incoming MPEG packets and passes information on the clock to the cTM controller 2872. The information on the PCR is utilized by cTM controller 2872 in synchronizing its clock with the clock of the TMTS. As described previously with respect to FIGS. 20 and 21, the PCR allows the cTM to generate an 8 kHz clock that is frequency-locked to an 8 kHz stratum reference clock, a related 1.544 MHz clock, or a related 27 MHz clock that is connected to the TMTS. Also, the PCR helps the cTM to transmit using an accurate frequency for the carrier for upstream transmission of the upstream frequency-division multiplex (FDM) tones.

Referring now to FIG. 29, the TMTS and the cTM generally need to both have similar information regarding the allocation of MPEG PIDs and octets to specific client transport modems (cTMs). This information can be communicated between the TMTS and the cTM using various mechanisms, which may or may not utilize the cable network to communicate the information. As a central concentrator, the TMTS generally has this allocation information for each of the plurality of connected cTMs. In contrast, a cTM generally is only connected to a single TMTS (although one skilled in the art will be aware that the concepts of the present invention could be used to develop a cTM that communicates with multiple TMTSes). Thus, the TMTS generally maintains an allocation map of MPEG PIDs and octets for each cTM, while a cTM generally maintains one allocation map of MPEG PIDs and octets that are associated with downstream communication from the TMTS.

Potentially this information could be hard-coded into the TMTS and/or cTM in software/firmware and/or hardware during the equipment production process, or alternatively the end user of a cTM could manually enter this information into a cTM using various types of user interfaces with the settings configured to match the settings that a service provider uses in the TMTS. Although these processes of communicating the downstream MPEG configuration between a cTM and TMTS will work, they are inflexible, tedious, laborious, and error prone. A preferred method is to use the cable transmission network to distribute the configuration information. A service provider could setup initial MPEG allocation configurations through the operations, administration, and maintenance (OA&M) interfaces of the TMTS. During initialization/registration, a cTM can receive information about the proper MPEG allocations from the TMTS. Also, later communications between a TMTS and a cTM can update the MPEG allocations, thus changing the bandwidth utilized downstream between a cTM and a TMTS.

FIGS. 29 and 30 show one method of forming packets that communicate this MPEG allocation information between a TMTS and a cTM. Generally, the allocation maps are communicated separately to each cTM, so that each cTM is not even aware of the MPEG PIDs and octets assigned to each of the other cTMs. This security reduces the possibility of someone using a device to capture packets on the broadcast cable transmission network and eavesdrop on the communications of customers. Without the proper map information on the allocation of MPEG PIDs and octets, the broadcast downstream data of the preferred embodiments of the present invention generally will appear as random gibberish. Also, the upstream allocation map of each cTM for communication over the tones is communicated separately between the TMTS and the cTM associated with the upstream tone allocation map to offer similar security in the upstream direction. This separate distribution of map information together with the separation of FMS data flows into specific MPEG frames, octets, and tones offers an extremely secure access methodology.

Each of the 184 octet payloads of the downstream MPEG packets is independently assignable, both statically and dynamically for bandwidth burst capability, to an FMS data flow of a cTM. The map of these MPEG PID and octet allocations to specific cTMs may be communicated during periodic maintenance dialogs as well as in response to bandwidth changes. The downstream MPEG PID and octet allocation map is communicated in a variable length 802.3/ethernet frame payload. The map has a 17 octet header as shown in FIG. 29. It comprises TMTS MAC address 2902 in six octets, cTM MAC address 2904 in six octets, the number of assigned ports of a cTM 2906 (with each port associated with one active FMS data flow) in one octet, the number of assigned payload octets 2908 in two octets, and the number of unassigned payload octets 2910 in two octets.

As shown in FIG. 30, the format of the actual downstream MPEG allocation map includes a one octet TMTS port ID 3001 and a one octet cTM port ID 3002 that together identify one associated FMS data flow. Basically, the TMTS port ID 3001 as well as the cTM port ID are associated with the attachment port numbers in FIG. 13, which generally correspond to active FMS data flows. The number of different MPEG PIDs 3003 allocated to an active FMS data flow is contained in one octet. The values of the thirteen-bit MPEG PIDs 3004 that are part of an FMS data flow are contained in two octets. For each of the MPEG PIDs 3004 that are part of an FMS data flow, the MPEG payload allocation bitmap 3005 comprises 23 octets or 184 bits. Each bit in the 184 bits of the bitmap 3005 is 0 if the corresponding octet in the 184 octet MPEG packet payload is not allocated to the FMS data flow, whereas the bit is set to 1 if the corresponding octet in the 184 octet MPEG packet payload is allocated to the FMS data flow.

Generally, the structure of FIG. 30 is in the form of variable length records that can be carried in variable length 802.3/ethernet frames. Each record generally is identified by a TMTS port ID 3001-cTM port ID 3002 pair that relates to one FMS data flow. Then each record specifies the number of MPEG PIDs 3003 assigned to the FMS data flow. Each one of the MPEG PIDs 3004 assigned to an FMS data flow has an associated 23 octet (=184 bits) bitmap 3005 providing an indication of the allocation of the 184 octets in an MPEG payload.

For the purposes of describing FIG. 30, assume that the number of assigned ports 2906 in FIG. 29 contains a value identified by the letter W. This value of w indicates that the downstream MPEG allocation map contains W records identified by the TMTS Port ID-cTM port ID pairs of TMTS Port ID 1-cTM Port ID 1(3011 and 3012), TMTS Port ID 1-cTM Port ID 1(3041 and 3042), and through pair TMTS Port ID W-cTM Port ID W (3071 and 3072).

The record associated with TMTS Port ID 1-cTM Port ID 1 (3011 and 3012) has the value of X PIDs 3014. The PID values of the X PIDs 3014 are contained in PID 1 3016, PID 2 3026, and PID X 3036. Each one of the X PIDs is associated with one 184 bit bitmap pattern. Thus, PID 1 3016 is associated with bitmap pattern 1 3018; PID 2 3026 is associated with bitmap pattern 3028; and PID X 3036 is associated with bitmap pattern X 3038.

Similarly, the record associated with TMTS Port ID 2-cTM Port ID 2 (3041 and 3042) has the value of Y PIDs 3044. The PID values of the Y PIDs 3044 are contained in PID 1 3046, PID 2 3056, and PID Y 3066. Each one of the Y PIDs is associated with one 184 bit bitmap pattern. Thus, PID 1 3046 is associated with bitmap pattern 1 3048; PID 2 3056 is associated with bitmap pattern 3058; and PID Y 3066 is associated with bitmap pattern Y 3068.

Also, the record associated with TMTS Port ID Z-cTM Port ID Z (3071 and 3072) has the value of Z PIDs 3074. The PID values of the Z PIDs 3074 are contained in PID 1 3076, PID 2 3086, and PID Z 3096. Each one of the Z PIDs is associated with one 184 bit bitmap pattern. Thus, PID 1 3076 is associated with bitmap pattern 1 3078; PID 2 3086 is associated with bitmap pattern 3088; and PID Z 3096 is associated with bitmap pattern Z 3098. The information communicated in the map of FIG. 30 allows both the cTM and the TMTS to have a consistent map of the allocation of octets from MPEG packets with various PIDs to the downstream portion of an FMS data flow between the TMTS and the cTM.

Upstream Multiplexing

Refer now to FIG. 31, which shows a block diagram of the upstream communication from a cTM to a TMTS. Upstream data frames in a cTM are input at 3102 and output at 3108 of FIG. 31. The upstream frames at input 3102 and output 3108 are FMS frames that generally are formatted according to FIG. 16 and generally contain 802.3/ethernet data frames and/or control frames. The legends on FIG. 31 specify the cTM inverse multiplexing sublayer (IMS) 3112, the cTM physical coding sublayer (PCS) 3114, the cable transmission (CT) network (Net) 3115, the TMTS physical coding sublayer (PCS) 3116, and the TMTS inverse multiplexing sublayer (IMS) 3118. For simplicity the cTM and TMTS signaling medium dependent (SMD) sublayer is not shown in FIG. 31.

In general, the communication in the upstream direction from a cTM may convey 1 through N FMS data flows at 3122 in a cTM to 1 through N FMS data flows at 3164 in a TMTS. Because a TMTS supports a plurality of cTMs, a TMTS may actually receive N1 FMS data flows from a first cTM and N2 FMS data flows from a second cTM (where N, N1, and N2 are non-negative integer numbers). The N FMS data flows 3122 from the cTM(s) are communicated over M tones to the TMTS.

The upstream tones are frequency channels. However, to be able to manage upstream bandwidth allocations with a much finer granularity than the standard 6 MHz CATV frequency channels, the upstream tones generally have less frequency bandwidth than 6 MHz frequency channels. Also, unlike DOCSIS which shares one or more upstream frequency channels among multiple cable modems using a time-division multiple-access (TDMA) technique, the preferred embodiments of the present invention generally allocate a tone for the exclusive use of the upstream communications of one cTM. The TDMA strategy for upstream communication in DOCSIS creates system complexity with regard to ranging the various cable modems on a shared frequency channel so that the cable modems transmit in the proper TDMA time slots despite the different propagation delays over different length transmission line cables to each cable modem. In the preferred embodiments of the present invention this complexity based on propagation delay distances to different cTMs does not exist because the upstream tones (i.e., frequency channels) generally are not shared by multiple cTMs at the same time.

This non-shared nature of the upstream frequency tones coupled with the relative infrequency of upstream MPEG transmission in CATV networks leads to a different upstream multiplexing scheme between a cTM and a TMTS than the multiplexing scheme for downstream communication. As is known by one of ordinary skill in the art, often communication systems utilize error-checking and/or error-correcting codes that provide a coding gain to the communications systems. ITU-T standard J.83 entitled "Digital Multi-Programme Systems for Television, Sound, and Data Services for Cable Distribution" generally describes a Reed-Solomon forward error correction (FEC) that is commonly used as an error-correcting code for video, sound, and/or data carried in MPEG transport streams. Because the upstream transmission in the preferred embodiments of the present invention generally does not utilize MPEG transport stream packets or the Reed-Solomon FEC commonly utilized for data carried in MPEG transport stream packets, a different forward error-correcting code was chosen to provide a coding gain on the upstream flows of information on the tones. Thus, the preferred embodiment of the present invention generally uses a turbo product code for the upstream FEC.

FIG. 31 shows N FMS data flows 3122 entering upstream multiplexer 3124 to be spread across M tone FEC flows 3126 that are input into FEC frame encoder 3128. The FEC frame encoder generates information in an FEC block data format 3132 which is passed to frequency-division multiplexing (FDM) QAM modulation 3134. The data on M tones 3136 propagates upstream over cable transmission network 3145 into FDM QAM demodulation 3152 in the TMTS. After demodulation the FEC block data format is recovered at 3154 and fed into FEC frame decode 3156, which performs the turbo product code decoding and/or error correction to generate M tone FEC flows 3158. These M tone FEC flows 3158 are passed to upstream inverse multiplexer 3162 which reassembles the original N FMS data flows 3164.

Figure 32:
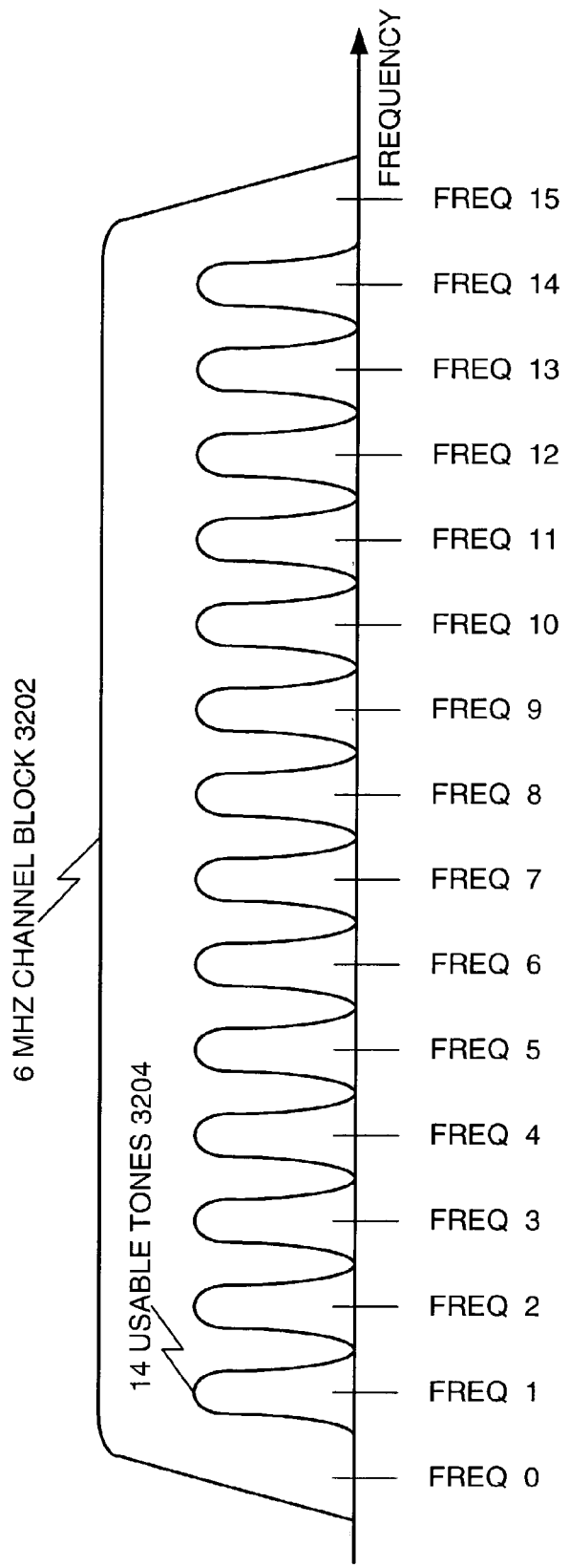
FIG. 32 shows 14 usable upstream tones in a 6 MHz channel block.

FIG. 32 shows how the frequency bandwidth of a 6 MHz frequency channel (or channel block) 3202 may be subdivided into 14 usable tones 3204 that are each themselves frequency channels. FIG. 32 actually shows 16 center frequencies (0–15). However, the roll-off of the internal filtering within the FDM modulator makes frequency 0 and frequency 15 unusable. The multi-channel FDM approach for the upstream tones in the preferred embodiments of the present invention differs from conventional discrete multi-tone (DMT) modulation because the 14 tones are fully separated and independent from each other in the frequency domain.

By dividing the frequency spectrum of a 6 MHz channel block into smaller frequency channels of fourteen tones, the frequency bandwidth allocations to client transport modems can be managed at a much smaller granularity. This smaller granularity of the fourteen tones (as opposed to 6 MHz frequency channel blocks) results in more efficient allocations of bandwidth to a client transport modem based upon the bandwidth demands of applications and a customer's willingness to pay. The smaller granularity of the fourteen tones allows frequency bandwidth allocations to more closely match customer requirements at a client transport modem.

Furthermore, dividing a 6 MHz channel block into fourteen tones has additional transmission benefits. Because the frequency range for one of the fourteen tones is smaller than the frequency range of a 6 MHz channel block, the amount of dispersion (or electromagnetic wave propagation delay that varies by frequency) is reduced within each of fourteen tones as compared to the 6 MHz channel block. Because of the generally lower dispersion (or frequency-dependent propagation delay) within a tone of the fourteen tones as opposed to within a 6 MHz frequency channel block, each of the tones generally will have a lower group delay. With a lower group delay for each of the fourteen tones, the signal-to-noise ratio of a tone generally is increased, and the tone may operate at a higher data rate. In the preferred embodiments of the present invention, a higher data rate for a tone is achieved by increasing the modulation index, which may be 2, 4, 6 or 8. Also, the modulation index for each of the fourteen tones is chosen independently to match the physical performance characteristics (including group delay characteristics) of the small portion of frequency spectrum occupied by one of the fourteen tones. Thus, the division of the frequency bandwidth from a 6 MHz channel block into fourteen smaller frequency bandwidths (that are called tones herein) allows more efficient adjustment of transmission parameters to more closely match the physical characteristics of the transmission network.

In addition, FIG. 32 shows another important reason for the accurate distribution of network clocking. Each of the fourteen upstream tones in FIG. 32 may be transmitted by a different client transport modem (cTM). To ensure that the transmissions of one cTM on one tone do not accidentally overlap with the transmissions of another cTM on an adjacent tone, each cTM needs a fairly accurate frequency reference (i.e., a clock) to properly establish the right modulation and transmit in the correct frequency tone. As a non-limiting example, suppose a first cTM is allocated frequency 1 from FIG. 32, and a second cTM is allocated frequency 2 from FIG. 32. If the first cTM one has an inaccurate frequency reference and transmits at a slightly higher frequency and if the second cTM has an inaccurate frequency reference and transmits at a slightly lower frequency, the transmissions of the two cTMs will interfere with each other. This problem is mitigated by ensuring that each cTM is frequency locked to a clock that is accurate enough to avoid this frequency overlap problem from multiple cTMs transmitting using frequency-division multiplexing (FDM).

Division of Upstream Data

To ensure low latency of frame transmission, an FMS frame may be spread across multiple upstream tones (i.e., upstream frequency channels) for parallel transmission. Furthermore, each active upstream tone may have a different QAM index of 2, 4, 6, or 8, which correspond to QPSK (Quadrature Phase Shift Keying), 16 QAM, 64 QAM, and 256 QAM. However, the upstream symbol rate used on each of the upstream tones generally is the same across all the upstream tones. Also, the forward error correction frame encoder expects blocks of data to generate the bit streams communicated over a tone. Therefore, the sequential octets of an FMS data flow are byte or octet multiplexed into 402 octet or 3216 bit blocks. Before applying the forward error correction (FEC) coding, a four octet or 32 bit cyclic redundancy check (CRC) is added to the 402 octets to yield 3216+32=3248 bits. In addition, an extra bit is added to the 3248 bits to yield 3249 bits, which is equal to 57 squared (i.e., 57×57), because turbo product coding may be performed on a two dimensional square of bits. One skilled in the art will be aware that error detecting and/or error correcting codes are often used in communication systems to obtain coding gain. The choice of using two levels of error detection and/or error correction with a four octet CRC and a (57/64)×(57/64) 2D turbo product code FEC are only a non-limiting example of a particular coding methodology chosen for the preferred embodiments of the present invention. One skilled in the art will be aware of the concepts of error detecting and/or error correcting codes and will be aware that other methodologies and error control codes also could be utilized with the concepts of the present invention. These other error control codes and potentially multi-level use of such codes are intended to be within the scope of the present invention.

These 3216 bit blocks of data may be further formed into four consecutive blocks of 3216 bits each with the four blocks being used to handled the differences in the four possible QAM indices 2, 4, 6, and 8 that may be independently selected for each upstream tone (i.e., upstream frequency channel). In comparison to the data throughput capacity of a tone operating with a QAM index of 8, tones operating at QAM indices of 2, 4, and 6 provide data throughputs that are ¼, ½, and ¾ respectively of the throughput with a QAM index of 8. To properly align data blocks sent across tones with different QAM indices selected from 8, 6, 4, 2, the cTM inverse multiplex sublayer (IMS) pads 0, 1, 2, or 3 respectively of the upstream 3216 bit data blocks with zeros. Though these padded blocks of zeros are fed into the forward error correction decoder they are removed by the cTM physical coding sublayer before upstream transmission. The TMTS physical coding sublayer replaces the padded blocks based upon the QAM index of a tone prior to passing the information through the TMTS FEC decoder.

Figure 33:
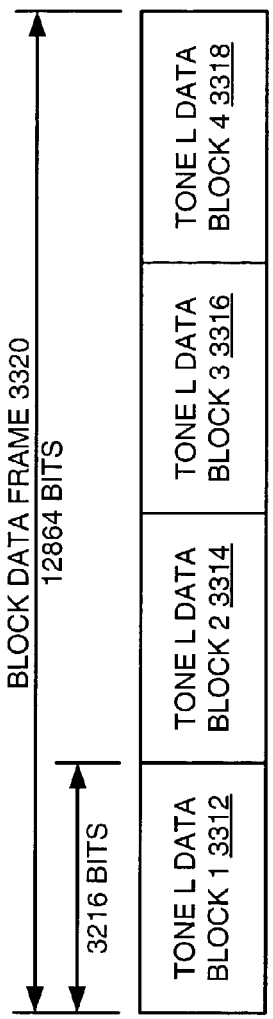
FIG. 33 shows the upstream block data frame format.

FIG. 33 shows four data blocks of 3216 bits each that might be passed to the Lth tone or tone L that is allocated to a cTM. If tone L has a QAM index of 8, then tone L data block 1 3312, tone L data block 2 3314, tone L data block 3 3316, and tone L data block 4 3318 each contain 3216 bits of data from FMS frames, while there are no tone L data blocks padded with zeroes. If tone L has a QAM index of 6, then tone L data block 1 3312, tone L data block 2 3314, and tone L data block 3 3316 each contain 3216 bits of data from FMS frames, while tone L data block 4 3318 is padded with zeroes. If tone L has a QAM index of 4, then tone L data block 1 3312 and tone L data block 2 3314 each contain 3216 bits of data from FMS frames, while tone L data block 3 3316 and tone L data block 4 3318 are each padded with zeroes. If tone L has a QAM index of 2, then tone L data block 1 3312 contains 3216 bits of data from FMS frames, while tone L data block 2 3314, tone L data block 3 3316, and tone L data block 4 3318 are each padded with zeroes. FIG. 33 also shows that four 3216 bit data blocks add up to (4×3216) 12864 bits of a block data frame 3320.

Each tone data block is passed into the FEC encoder, which first adds a 32 bit or four octet CRC as well as one additional bit to create a group of 3216+32+1=3249 bits. Then the FEC encoder performs a two-dimensional turbo product coding (TPC) on the 57×57=3249 bit blocks. The 2D-TPC generates error control bits based upon two-dimensional squares of information bits. In the preferred embodiments of the present invention the 57×57=3249 bits (including a data block of 3216 bits, a 32 bit CRC, and an extra bit) were chosen to be encoded into a 64×64=4096 FEC encoded block. This particular 2D-TPC code has an efficiency of (57×57) (64×64)=79.32%. Actually, the efficiency is ((57× 57)−1)/(64×64)=79.30% because one bit was added to the 406 octets to obtain a number of bits that is a perfect square 57×57 for a 2D-TPC. Including the four octet or 32 bit CRC in the efficiency calculation yields an overall efficiency from the CRC and the 2D-TPC code of 3216 bits/4096 bits=78.52%. One skilled in the art will be aware that other FEC coding techniques could be used and other groupings of bits into data blocks for generation of FEC bits could also have been chosen. Furthermore, codes with different efficiencies can be implemented to achieve different bit error performance in the preferred embodiments of the present invention.

Figure 34:
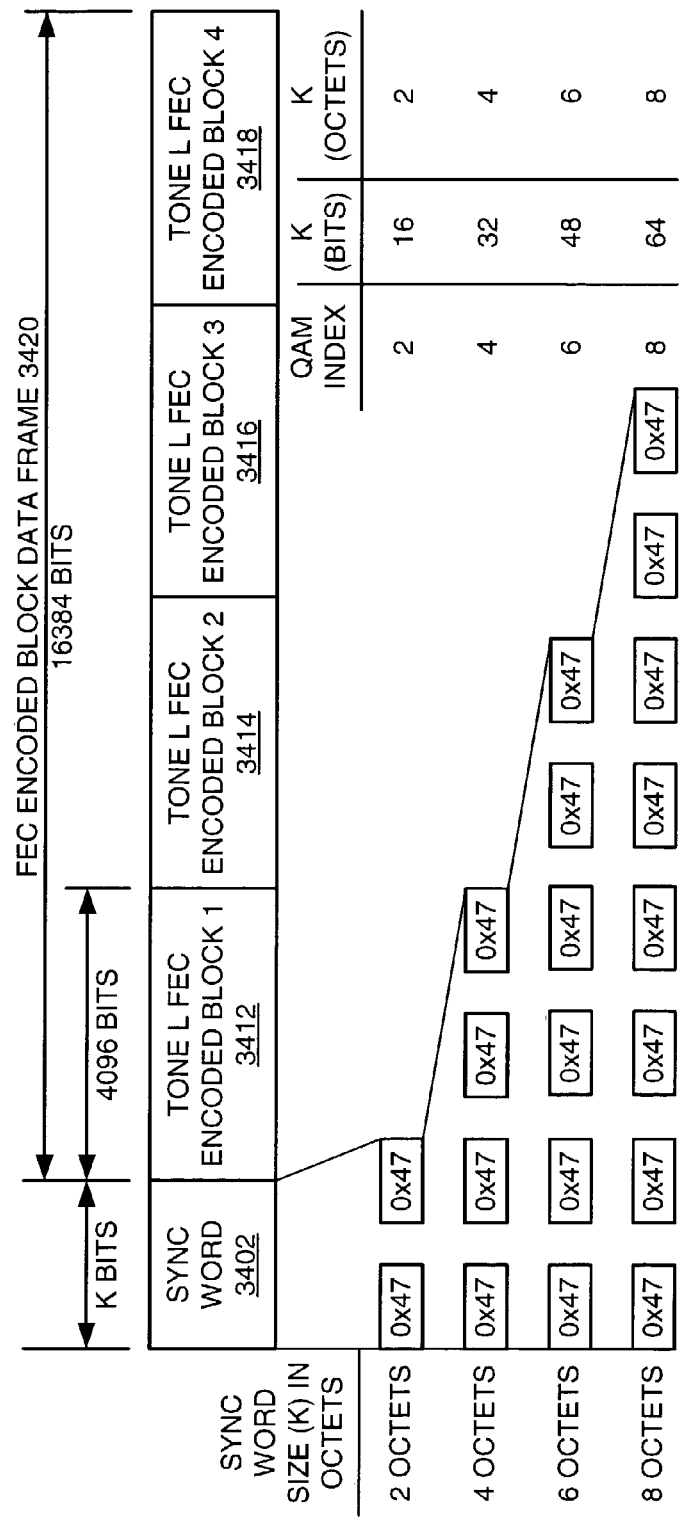
FIG. 34 shows the upstream forward error correction (FEC) encoded block data frame format.

After performing FEC coding or encoding, the resulting FEC encoded blocks are each 4096 bits. FIG. 34 shows four encoded FEC blocks for tone L or the Lth tone of a cTM. Four 4096 bit tone L FEC encoded blocks (3412, 3414, 3416, and 3418) add up to 4×4096=16384 bits of an FEC encoded block data frame 3420. Also, to allow proper framing of the FEC encoded blocks sync words 3402 are used to ensure the receiver in the TMTS can find the boundaries of FEC encoded block data frames 3420. However, because the QAM index of different tones may be a different selection from 2, 4, 6, and 8, the size of the sync word 3402 actually varies to handle the bit rate differences between tones operating at the different QAM indices. The sync word 3402 generally comprises one or more octets of 0x47 hexadecimal. As shown in FIG. 34, the length or size (K) of the of sync word is 2 octets for a tone with QAM index of 2, 4 octets for a tone with a QAM index of 4, 6 octets for a tone with a QAM index of 6, and 8 octets for a tone with a QAM index of 8. Because the symbol rates on each of the upstream tones generally is the same: a tone with a QAM index of 2 may transmit a 2 octet sync word of 0x47 0x47 in an amount of time T; a tone with a QAM index of 4 may transmit a 4 octet sync word of 0x47 0x47 0x47 0x47 in the same amount of time T; a tone with a QAM index of 6 may transmit a 6 octet sync word of 0x47 0x47 0x47 0x47 0x47 0x47 in the same amount of time T; and a tone with a QAM index of 8 may transmit an 8 octet sync word of 0x47 0x47 0x47 0x47 0x47 0x47 0x47 0x47 in the same amount of time T. Thus, the sync word generally is transmitted for a time T that is independent of the QAM index.

Table 5 generally shows the framing function operations of various cTM and TMTS sublayers.

TABLE 5

Framing Functions of Sublayers in the cTM and in the TMTS

| | cTM IMS | cTM PCS | TMTS PCS | TMTS ICM |
|---|---|---|---|---|
| Steps: | 1. Create A Data Blocks and 2. Create B Pad Blocks | 1. Discard B Pad Blocks and 2. Insert a Sync Word of C Octets in Length | 1. Obtain Sync Word Lock, 2. Strip Sync Word, and 3. Insert B Pad Blocks | 1. Discard B Pad Blocks |
| QAM Index | | | | |
| 2 | A = 1 B = 3 | B = 3 C = 2 | B = 3 | B = 3 |

TABLE 5-continued

Framing Functions of Sublayers in the cTM and in the TMTS

| | cTM IMS | cTM PCS | TMTS PCS | TMTS ICM |
|---|---|---|---|---|
| 4 | A = 2 B = 2 | B = 2 C = 4 | B = 2 | B = 2 |
| 6 | A = 3 B = 1 | B = 1 C = 6 | B = 1 | B = 1 |
| 8 | A = 4 B = 0 | B = 0 C = 8 | B = 0 | B = 0 |

FIG. 35*a* shows an example of tone L data block 3502 or a data block for the Lth tone of a cTM. The data block comprises 402 data octets or bytes (numbered 0 to 401), which add up to 402 octets×8 bits/octet=3216 bits. In addition to the 402 data octets, the forward error correction (FEC) chip used in the preferred embodiments of the present invention adds four octets or 32 bits for a cyclic redundancy check (CRC) to the 402 octets, which results in 406 octets or 3248 bits (=406 octets×8 bits/octet). Furthermore, an extra unused bit 3504 is added to the 406 bytes or octets to obtain a number (3249) that is the perfect square of 57×57 for a 2D-TPC.

FIG. 35*b* further shows the 2D-TPC FEC encoding of the preferred embodiments of the present invention. The Lth tone or tone L of a cTM is encoded into tone L FEC encoded block 3512, which includes 3249 bits (from the 3216 data bits, 32 CRC bits, and 1 extra unused bit) as shown in box 3514. Also, 847 error control bits are added to the tone L FEC encoded block 3512 as shown by the portion 3516 of the 64 bit×64 bit square that is outside the 57 bit×57 bit square.

Figure 36A:
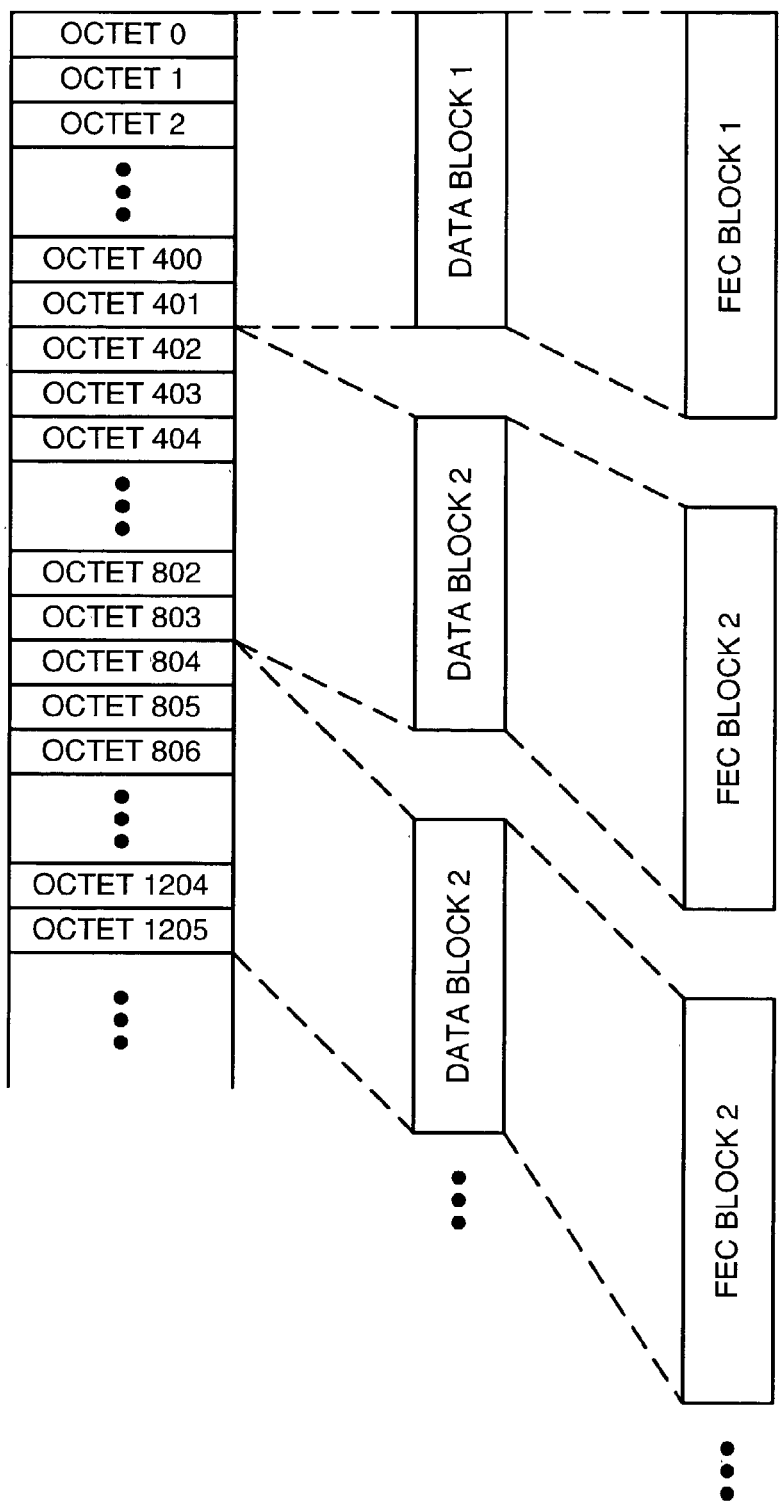
FIG. 36*a* shows the grouping of octets of an FMS data flow into 402 octet data blocks with each data block corresponding to forward error correction (FEC) block.

FIG. 36*a* shows how the consecutive octets of an FMS data flow are divided into data blocks of 402 octets or 3216 bits. Furthermore, each data block generally relates directly to a forward error correction (FEC) block that is 4096 bits in the preferred embodiments of the present invention. One skilled in the art will be aware that the choice of dividing the FMS data flows into 402 octet or 3216 bit data blocks in the preferred embodiments of the present invention is only a non-limiting example of a way of dividing the data. Other divisions of data into different size blocks are also intended to be within the scope of the present invention. Furthermore, one skilled in the art will be aware of error control coding techniques using both convolutional and block codes. Although FIG. 36*a* shows a generally one-to-one relationship between a data block and an FEC block, one skilled in the art will be aware that some memory-based actually may utilize previous information to form encoded streams of data. Thus, one skilled in the art will be aware that some error control coding techniques might actually utilize some previous information from data block 1 and/or FEC block 1 to form FEC block 2. Though this type of relationship is not shown in FIG. 36*a*, the scope of concepts of the present invention is intended to cover such memory-based coding techniques.

Figure 36B:
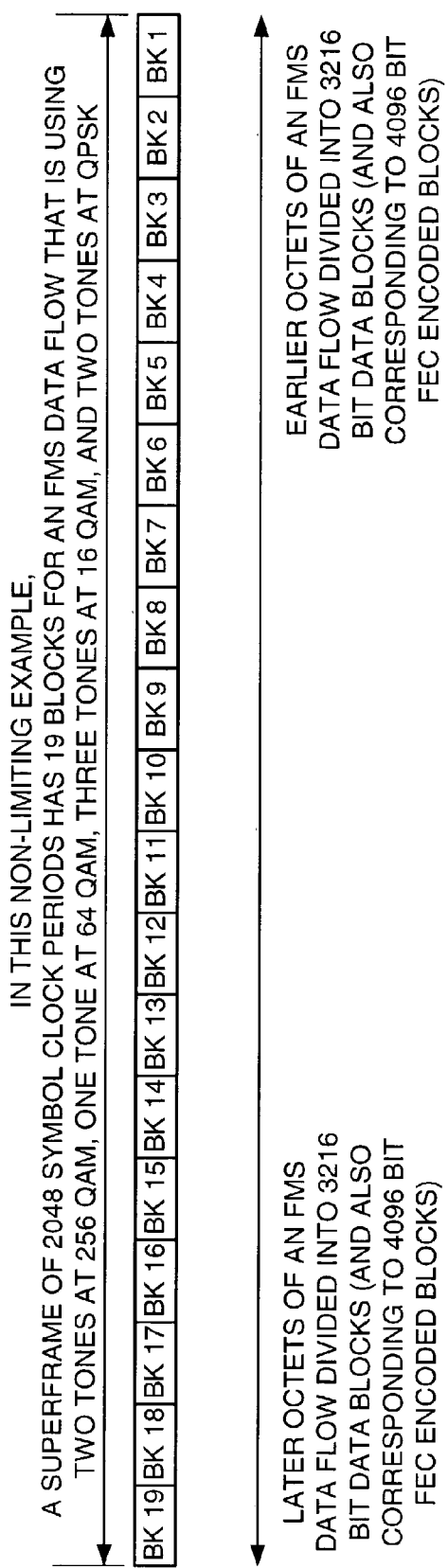
FIG. 36*b* shows a non-limiting example of nineteen data and/or FEC blocks in a superframe that lasts for 2048 symbol clock periods.

FIG. 36*b* shows a non-limiting example of 19 blocks that may be transmitted in a superframe. In the preferred embodiments of the present invention, a superframe generally relates to the number of upstream blocks from one FMS data flow that is communicated in 2048 symbol clock periods. For the non-limiting example of FIG. 36*b*, the nineteen blocks could be communicated in 2048 symbol clock periods using two active tones at 256 QAM to communicate four blocks each, using one active tones at 64 QAM to communicate one block, using three active tones at 16 QAM to communicate two blocks each, and using two active tones at QPSK to communicate one block each. As shown in FIG. 36b, block 1 or (BK 1) generally precedes blocks 2–19 (BK 2–BK 19) in the FMS data flow. Before entering the FEC coder in a cTM, each block generally is 402 octets or 3216 bits. During upstream transmission each octet generally is 4096 bits. After exiting the FEC decoder in a TMTS, each block generally is again 402 octets or 3216 bits. Therefore, the blocks (BK 1–BK 19) of FIGS. 36b and 36c could represent either the 3216 bit data blocks or the 4096 bit FEC blocks.

In general, the symbol rate for each tone of the preferred embodiments of the present invention is 337,500 symbols per second. At this symbol rate, 19 blocks approximately equals the amount of bandwidth needed to support 10 Mbps ethernet. A rough calculation of the bandwidth provided by nineteen blocks is relative straight-forward: (19 blocks/2048 symbol clock periods)×(402 octets/block)×(8 bits/octet)×(337,500 symbol clock periods/second)=10.07 Mbps. One skilled in the art will realize that the actual throughput calculations are a little more complex and depend on other factors including the overhead, mix of large and small packets, and the amount of octet stuffing. Also, one skilled in the art will be aware that shared 10 Mbps ethernet segments generally do not operate at full 10 Mbps throughput because of the possibility of collisions. This example of the throughput with nineteen blocks is non-limiting and for illustrative purposes only. For this non-limiting example, one skilled in the art will be aware how the concepts of the present invention can be used to support various data rates including, but not limited to, rates that are similar to various common ethernet/802.3 data rates of 10 Mbps, 100 Mbps, and/or 1 Gbps.

FIG. 36c shows a non-limiting example of how the nineteen blocks of FIG. 36b might be placed into a superframe for transmission over one or more upstream tones. In FIG. 36c tones in two different frequency channels (0 and 4) are active for carrying one FMS data flow upstream from one client transport modem (cTM). The frequency channels 0 and 4 in FIG. 36c may or may not be adjacent in frequency. Furthermore, the numbers for frequency channels of FIG. 36c (namely 0 and 4) do not necessarily imply anything about the actual frequency band used by a frequency channel. Thus, frequency channel 4 might or might not be at a lower frequency than frequency channel 0.

In the non-limiting example of FIG. 36c, within frequency channel 0 tone 3 is active at 256 QAM, tone 5 is active at 16 QAM, tone 7 is active at 64 QAM, tone 10 is active at 16 QAM, and tone 14 is active at QPSK. Within frequency channel 4 tone 2 is active at 16 QAM, tone 9 is active at QPSK, and tone 14 is active at 256 QAM. Although not shown in FIG. 36c, other tones within the same frequency channel(s) might be used by other client transport modems (cTMs) contemporaneously with the use of the active tones in FIG. 36c for a transport modem transmitting the 19 blocks upstream. Furthermore, the same client transport modem (cTM) that is communicating the nineteen blocks of one FMS data flow as shown in FIG. 36c also may contemporaneously utilize some of the other tones (possibly within the same frequency channels of 0 and 4) to carry a different FMS data flow.

FIG. 36c shows the block fill order for the preferred embodiments of the present invention. In the preferred embodiments of the present invention, the blocks of a superframe are filled by starting with the lowest numbered tone of the lowest numbered frequency. To begin with a first block is prepared for each active tone with a QAM index of 2, 4, 6, or 8. Next, a second block is prepared for each active tone with a QAM index of 4, 6, or 8. Then, a third block is prepared for each active tone with a QAM index of 6 or 8. Finally, a fourth block is prepared for each active tone with a QAM index of 8. FIG. 36c shows how the nineteen blocks from FIG. 36b are placed into a superframe following this general fill order. Also, the solid arrows under the blocks and the dashed arrows graphically illustrate this block fill order for forming superframes. Furthermore, one skilled in the art will be aware that other block fill orders could be chosen and that the fill order shown is FIG. 36c is only a non-limiting example of possible fill sequences that could be used in the preferred embodiments of the present invention.

In addition to FIG. 36c showing an example of the block fill order, FIG. 36c also shows the transmission timing of the nineteen blocks. On the right side of FIG. 36, an arrow indicates the increasing time for transmission on the tones. In the 2048 symbol clock periods of a superframe, the time periods of 0, 512, 1024, 1536, and 2048 symbol clock periods generally are indicated using longer dashed lines that often cut through the various nineteen blocks of FIG. 36c. Generally, after 0 symbol clock periods no portion of the nineteen blocks has been communicated. After 512 symbol clock periods the following blocks or partial blocks have been transmitted: all of block 1, one-half of block 2, the first three-fourths of block 3, the first one-half of block four, the first one-quarter of block 5, the first one-half of block 6, the first one-quarter of block 7, and all of block 8. After 1024 symbol clock periods the following blocks or partial blocks have been transmitted: all of block 9, the second one-half of block 2, the last one-quarter of block 3 and the first one-half of block 11, the second one-half of block 4, the second one-quarter of block 5, the second one-half of block 6, the second one-quarter of block 7, and all of block 14. After 1536 symbol clock periods the following blocks or partial blocks have been transmitted: all of block 15, the first one-half of block 10, the second one-half of block 11 and the first one-quarter of block 16, the first one-half of block 12, the third one-quarter of block 5, the first one-half of block 13, the third one-quarter of block 7, and all of block 17. After 2048 symbol clock periods the following blocks or partial blocks have been transmitted: all of block 18, the second one-half of block 10, the last three-quarters of block 16, the second one-half of block 12, the last one-quarter of block 5, the second one-half of block 13, the last one-quarter of block 7, and all of block 19. Thus, after a superframe of 2048 symbol clock periods, all the nineteen blocks (1–19) have been transmitted in the non-limiting example of FIG. 36c.

Although FIG. 36b generally shows the nineteen blocks as consecutive, there actually may be intervening bits between the blocks. In general, the nineteen blocks do relate to consecutive portions of an FMS data flow. However, the actual input into and/or out of the forward error control (FEC) coder and/or decoder processing logic may include additional bits that are needed to correctly utilize the interface of the FEC coder and/or decoder processing logic. Furthermore, in the preferred embodiments of the present invention the FEC coder and/or decoder processing logic (which are described further with respect to FIGS. 37 and 41) generally each handle only seven tones or one-half of a 6 MHz channel block. Thus, some of the nineteen blocks may be serially fed into (or received out of) the same FEC processing logic. During a contemporaneous period of time or in parallel, other blocks may be serially fed into other FEC processing logic.

As a non-limiting example, consider FIG. 36c. Suppose a first portion of FEC processing logic supports tones 1 through 7 of frequency channel 0, a second portion of FEC processing logic supports tones 8 through 14 of frequency channel 0, a third portion of FEC processing logic supports tones 1 through 7 of frequency channel 4, and a fourth portion of FEC processing logic supports tones 8 through 14 of frequency channel 4. In the preferred embodiments of the present invention, blocks 1, 2, 3, 9, 10, 11, 15, 16, and 18 could be serially fed into the first portion of FEC processing logic. Also, in the preferred embodiments of the present invention, blocks 4, 5, and 12 could be serially fed into the second portion of FEC processing logic. Moreover, in the preferred embodiments of the present invention, blocks 6 and 13 could be serially fed into the third portion of FEC processing logic. Furthermore, in the preferred embodiments of the present invention, blocks 7, 8, 14, 17 and 19 could be serially fed into the fourth portion of FEC processing logic. The input into (and/or out of) the different portions of FEC processing logic may be occurring in parallel. As a non-limiting example, in the preferred embodiments of the present invention block 1 from tone 3 of frequency channel 0 (or the third tone of the first half of frequency channel 0) may be fed into the first portion of FEC processing logic contemporaneously with block 4 of tone 10 of frequency channel 0 (or the third tone of the second half of frequency channel 0) being fed into the second portion of FEC processing logic. Thus, FIG. 36b is only intended to show the consecutive nature of blocks associated with FMS data flows. FIG. 36b is not intended to indicate that the blocks are always adjacent to each other during the processing. Instead there may be intervening bits between the blocks associated with one FMS data flow. As non-limiting examples of intervening bits, the intervening bits might be associated with different FMS data flows and also might be related to bits needed to correctly utilize various software and/or hardware interfaces such as an interface to FEC processing logic.

Upstream Client Transport Modem (cTM) Inverse Multiplexing Sublayer (IMS)

Figure 37:
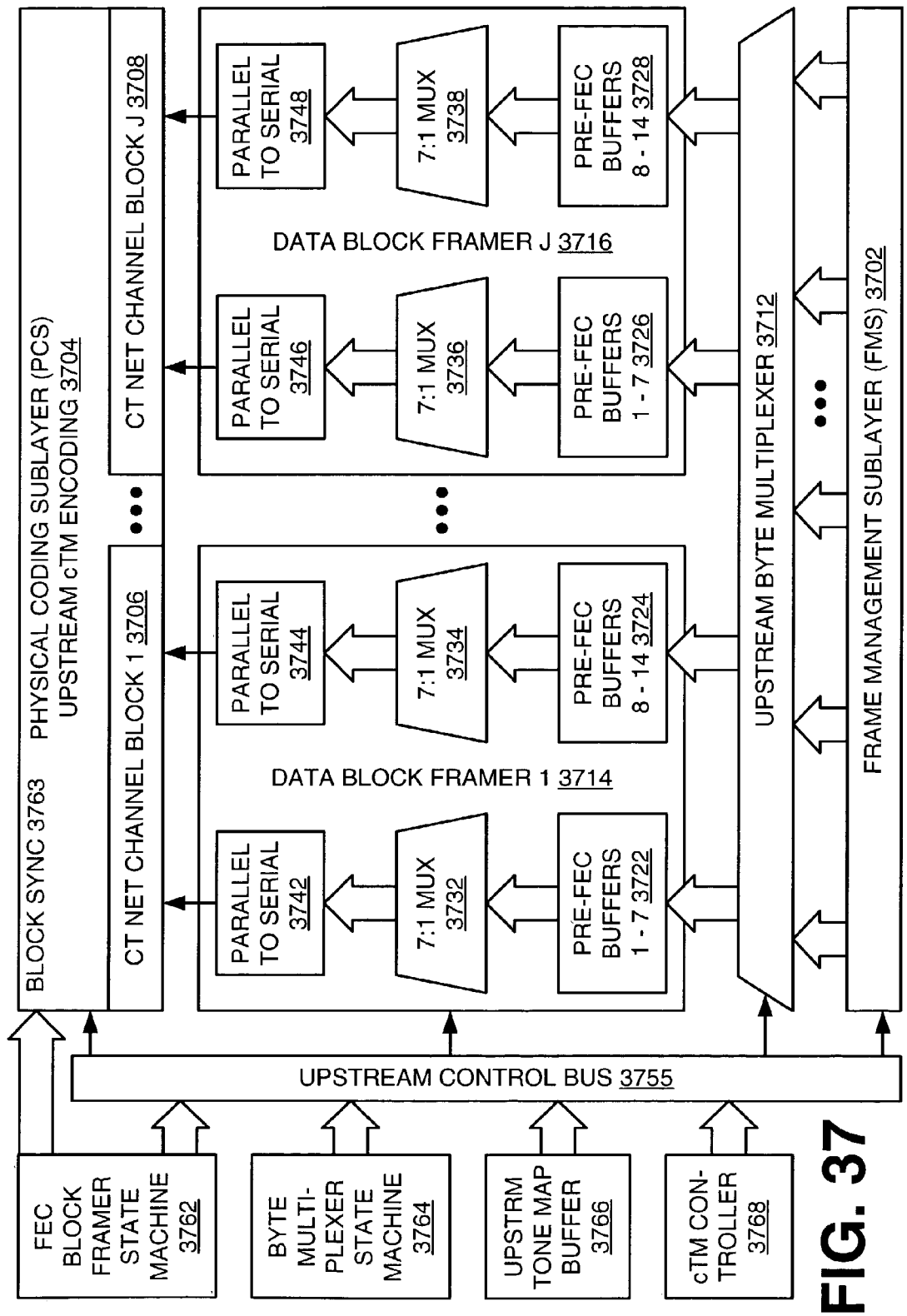
FIG. 37 shows a block diagram of the cTM upstream IMS sublayer.

FIG. 37 shows a block diagram of the upstream multiplexer in a cTM. Generally the upstream multiplexer handles multiplexing upstream octets (or bytes) of FMS frames into buffers leading to active upstream tones allocated to carry a particular FMS data flow. In addition, the upstream multiplexer in a cTM handles framing data into block data frames as shown FIG. 33. In FIG. 37 FMS data flows from frame management sublayer (FMS) 3702 are input into upstream byte (or octet) multiplexer 3712. Upstream byte mux 3712 passes information for active tones into data block framers 1 through J (3714 and 3716). The data block framers 3714 and 3716 pass the data blocks into physical coding sublayer upstream cTM encoding 3704 through cable transmission network channel blocks 1 through J (3706 and 3708).

The cable transmission network channel blocks 3706 and 3708 generally are the blocks comprising a plurality of upstream frequency-division multiplexed tones (or frequency channels that each have smaller frequency bandwidths) that are carried in a larger-bandwidth frequency channel, which may itself be frequency-division multiplexed with other larger-bandwidth frequency channels. In the preferred embodiments of the present invention, the smaller bandwidth frequency channels are the 14 tones which may be carried in a 6 MHz, larger-bandwidth frequency channel that is commonly called a channel in CATV networks. This multiplexing of multiple small bandwidth tones into a 6 MHz channels was further described with respect to FIG. 32. Thus, in the preferred embodiments of the present invention, cable transmission network channel blocks 1 through J (3706 and 3708) are associated with 6 MHz frequency channels.

In the preferred embodiment of the present invention, the bandwidth (or processing horsepower) of the hardware handling forward error correction (i.e., the 2D-TPC FEC encoder of the physical coding sublayer) is such that it could generate the 4096 bit encoded FEC blocks from the 3216 bit data blocks for seven tones each operating with a QAM index of 8. Although a QAM index of 8 leads to the highest data throughput across an upstream tone, this QAM index of 8 places the worst case demands on the processing horsepower that generates the FEC coding, because the FEC processing generally should be complete to have the FEC encoded block ready for transmission when the QAM modulators with index 8 are ready to send the next block. These processing limits of the FEC computation hardware are only specific to a particular implementation in the preferred embodiment of the present invention, and one skilled in the art will be aware of other embodiments that have FEC processing hardware capable of supporting the FEC generation of blocks for a different number of tones.

Because of these processing limitations in the preferred embodiments of the present invention, two FEC encoders (which each support 14 tones) are used to support the 14 tones of an upstream 6 MHz channel block. One skilled in the art will realize this is a common solution to performance limits of various hardware that is accomplished by utilizing multiple instances of the hardware to allow parallel execution. Also, one skilled in the art will be aware that faster FEC processing hardware could support FEC generation for more upstream tones, whereas slower FEC processing hardware could support FEC generation for less tones. Generally, there is a tradeoff between using less of the faster processors, which are often more expensive, and more of the slower processor, which are often less expensive.

Given the choice of FEC processing hardware that can handle seven tones in the preferred embodiments of the present invention, two FEC processors are used to support the fourteen tones in a 6 MHz channel block. Therefore, the data block framers 3174 and 3176 generally contain parallel functions for feeding the block data frames into two streams to be delivered to the two portions of hardware each performing FEC processing FEC for seven tones. In data block framer 1 (item 3714), pre-FEC buffers 1–7 (item 3722) supporting upstream tones 1 through 7 of 6 MHz cable transmission channel block 1 3706 are in parallel with pre-FEC buffers 8–14 (item 3724) supporting upstream tones 8 through 14 of 6 MHz cable transmission channel block 1 3706. Furthermore, in data block framer J (item 3716), pre-FEC buffers 1–7 (item 3726) supporting upstream tones 1 through 7 of 6 MHz cable transmission channel block J 3708 are in parallel with pre-FEC buffers 8–14 (item 3728) supporting upstream tones 8 through 14 of 6 MHz cable transmission channel block J 3708.

The outputs of pre-FEC buffers 3722, 3724, 3726, and 3728, are forwarded to seven-to-one (7:1) multiplexers (muxes) 3732, 3734, 3736, and 3738 respectively. The 7:1 multiplexers 3732, 3734, 3736, and 3738 handle multiplexing the data of several pre-FEC buffers 3722, 3724, 3726, and 3728 respectively, which each contain block data frames 3320 for seven upstream tones. Thus, supposing tones 1 and 2 of cable transmission (CT) network channel block 1 are active, 7:1 multiplexer 3732 first passes a data block from pre-FEC buffers 3722 for tone 1 to parallel-to-serial conversion block 3742, and then passes a data block from pre-FEC buffers 3722 for tone 2 to parallel-to-serial conversion block 3742. The parallel-to-serial conversion blocks 3742, 3744, 3746, and 3748 convert the data from the parallel interfaces that are used internally for many of the buses utilized in the preferred embodiments of the present invention into serial interfaces that are used on the FEC processing hardware in the preferred embodiments of the present invention. One skilled in the art of digital hardware design will be familiar with converting between parallel and serial data to interface to various hardware inputs. Thus, other types of hardware implementations in alternative embodiments of the present invention might utilize various hardware interfacing combinations using different types of parallel and/or serial buses.

In addition, FIG. 37 shows FEC block framer state machine 3762 which controls data transfers from pre-FEC buffers 3722, 3724, 3726, and 3728 through 7:1 multiplexer 3732, 3734, 3736, and 3738 into the FEC encoders of PCS 3704 via parallel-to-serial interfaces 3742, 3744, 3746, and 3748. Also, FEC block framer state machine 3762 sends FEC frame sync information (shown as block sync 3763) to PCS 3704 to denote the boundaries of FEC encoded block data frames as shown in FIG. 34. Byte multiplexer state machine 3764 controls the mapping sequence of upstream byte multiplexer 3712 based upon an upstream tone map that indicates the tones allocated to particular FMS data flows that are active within a cTM. Based upon the upstream tone map each pre-FEC buffer will be assigned a tag number that links the buffer to an active FMS data flow. During the multiplexing process of upstream multiplexer 3712 the byte multiplexer state machine will read pre-FEC tag number from the upstream tone allocation map and link the tag to the address and output enable lines of frame buffers (not shown in FIG. 37) containing FMS frames. The upstream tone allocation map is contained in upstream tone map buffer and indicates one or more tones in potentially multiple 6 MHz channel blocks that are allocated to the upstream portion of an FMS data flow. Also, FIG. 37 shows cTM controller 3768 which coordinates the operation of the cTM. The communication of various cTM control functions occurs over upstream control bus 3755.

Figure 38:
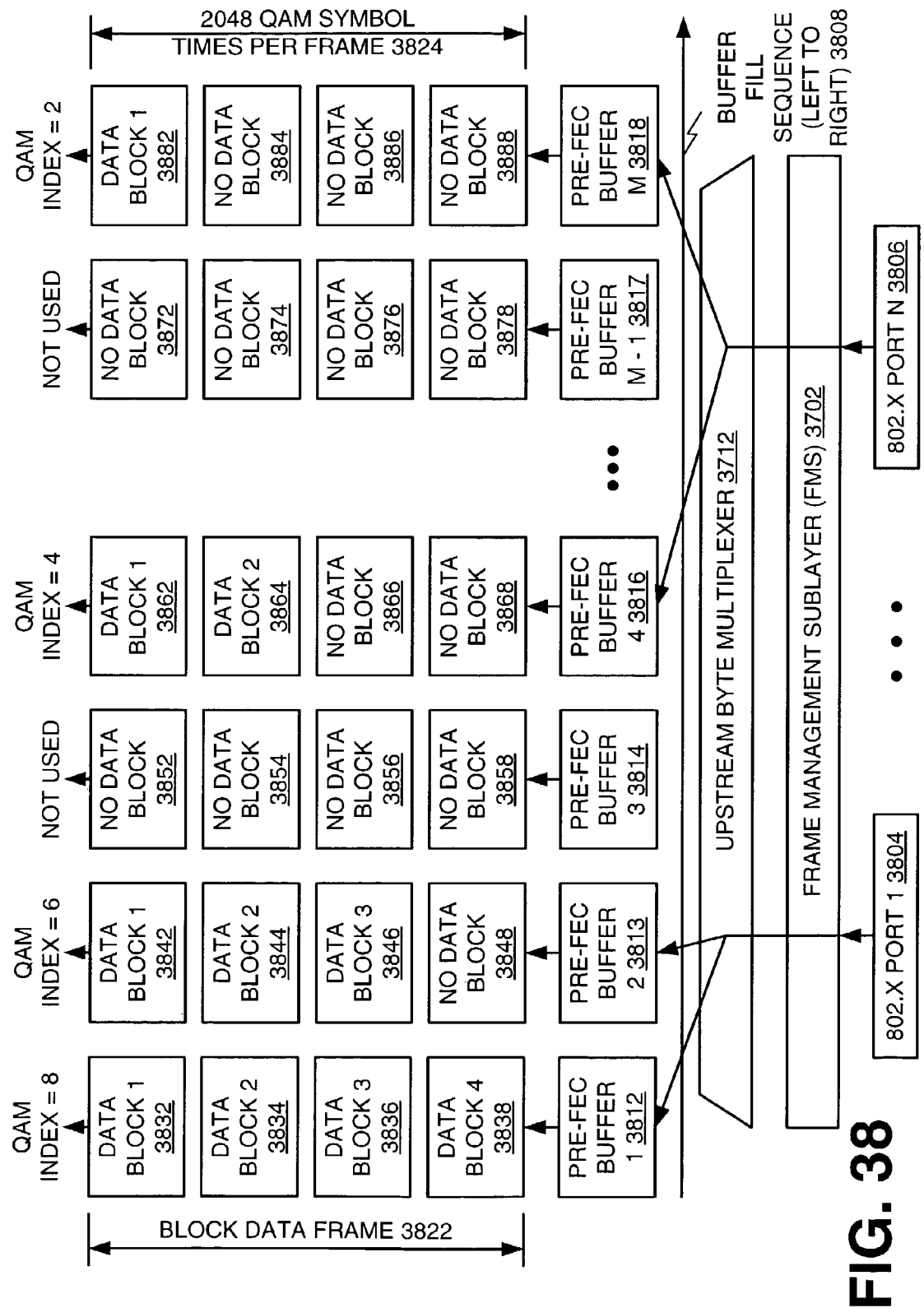
FIG. 38 shows the upstream byte multiplexer operation of a cTM

FIG. 38 generally shows the operation of upstream byte multiplexer 3712. In general, the upstream byte multiplexer 3712 receives FMS data flows from frame management sublayer (FMS) 3702. In general, there may be N FMS data flows with each FMS data flow potentially coming from 802.X port 1 (item 3804) through 802.X port N (item 3806). In the example operation of FIG. 38 four of the M tones are used. The active FMS data flow associated with 802.X port 1 (item 3804) is utilizing tones 1 and 2, which have QAM indices of 8 and 6 respectively. Also, the active FMS data flow associated with 802.X port N (item 3806) is utilizing tones 4 and M, which have QAM indices of 4 and 2 respectively. Tones 3 and M−1 are not being used in FIG. 38.

In FIG. 38, pre-FEC buffer 1 3812, data block 1 3832, data block 2 3834, data block 3 3836, and data block 4 3838 are associated with tone 1, which has a QAM index of 8. Pre-FEC buffer 2 3813, data block 1 3842, data block 2 3844, data block 3 3846, and no data block 3848 are associated with tone 2, which has a QAM index of 6. Pre-FEC buffer 3 3814, no data block 3852, no data block 3854, no data block 3856, and no data block 3858 are associated with tone 3, which is not used by the cTM in the example of FIG. 38. Pre-FEC buffer 4 3816, data block 1 3862, data block 2 3864, no data block 3866, and no data block 3868 are associated with tone 4, which has a QAM index of 4. Pre-FEC buffer (M−1) 3817, no data block 3872, no data block 3874, no data block 3876, and no data block 3878 are associated with tone M−1, which is not used by the cTM in the example of FIG. 38. Finally, pre-FEC buffer M 3818, data block 1 3882, no data block 3884, no data block 3886, and no data block 3888 are associated with tone M. The four blocks of either data or no data associated with any tone form a block data frame 3822 that is further described with respect to FIG. 33. In the preferred embodiments of the present invention, block data frames 3822 are transmitted in 4×512 QAM symbol times per frame 3824.

Upstream byte multiplexer 3712 byte takes the octets or bytes of active FMS data flows and byte multiplexes this information across the pre-FEC buffers (associated with tones allocated to a particular active FMS data flow) in 406 byte (512 symbol time) increments. For each tone operating with a QAM index of 8, the four blocks of a block data frame 3822 will be filled with data. In addition, for each tone operating at a QAM index of 6, the first three blocks of a block data frame 3822 will be filled with data, and the one remaining block will contain no data. Also, for each tone operating at a QAM index of 4, the first two blocks of a block data frame 3822 will be filled with data, and the two remaining blocks will contain no data. Finally, for each tone operating at a QAM index of 2, the first block of a block data frame 3822 will be filled with data, and the three remaining blocks will contain no data. Furthermore in FIG. 38, arrow 3808 specifies the direction of the pre-FEC buffer fill sequence as left to right with respect to FIG. 38 or sequentially beginning with the lowest pre-FEC buffer of the lowest tone number 1 and preceding to the pre-FEC buffer of the highest tone number M. When the pre-FEC buffer of the highest tone is reached, the process repeats in a circular fashion.

Figure 39:
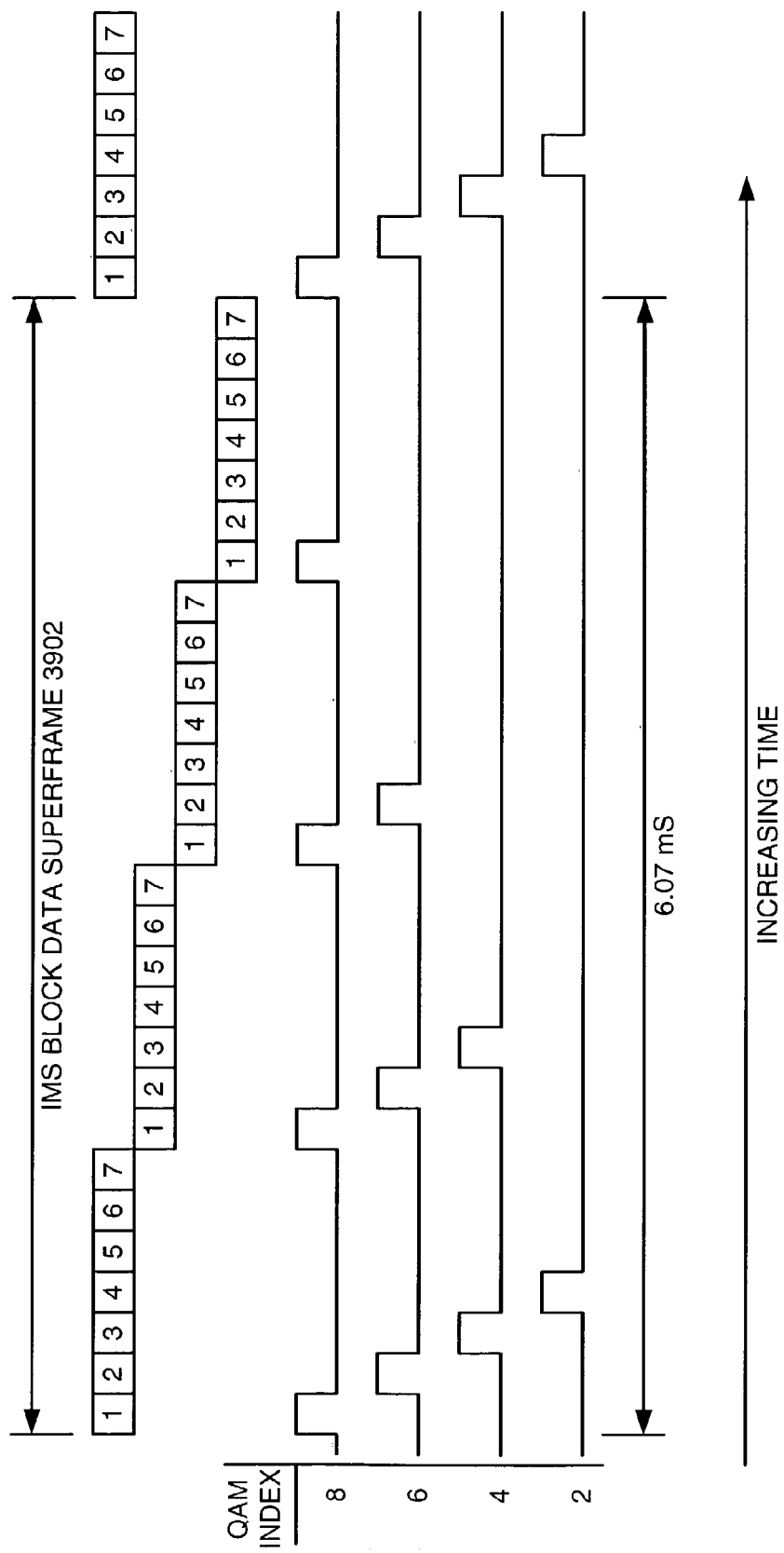
FIG. 39 shows a timing diagram of block data sequencing.

FIG. 39 shows an example timing diagram for multiplexing the data in pre-FEC buffers into the FEC encoder of the physical coding sublayer. As described above, in the preferred embodiments of the present invention, the hardware handling FEC generation (i.e., the FEC encoder) has enough processing power to perform FEC generation for up to seven tones. The multiplexing of the seven streams of data from the pre-FEC buffers associated with the seven tones proceeds sequentially across all seven streams. However, the timing of the streams generally is adjusted to account for each tone's QAM index as shown in the timing diagram of FIG. 39.

In the example of FIG. 39, the numbers 1 through 7 represent the timing for tones 1 through 7 respectively. FIG. 39 assumes an example configuration in which tone 1 has a QAM index of 8 (i.e., 256 QAM), tone 2 has a QAM index of 6 (i.e., 64 QAM), tone 3 has a QAM index of 4 (i.e., 16 QAM), and tone 4 has a QAM index of 2 (i.e., QPSK). Also, FIG. 39 assumes that tones 5, 6, and 7 are not currently being used. As can be seen from FIG. 39, the pulse to time the stream associated with tone 1 operating at 256 QAM is four times per IMS block data superframe 3902, while the pulse to time the stream associated with tone 2 operating at 64 QAM is three times per IMS block data superframe 3902. In addition, the pulse to time the stream associated with tone 3 operating at 16 QAM is two times per IMS block data superframe 3902, while the pulse to time the stream associated with tone 1 operating at QPSK is one time per IMS block data superframe 3902. An inverse multiplexer sublayer (IMS) block data superframe 3902 is related to the time it takes to cycle four blocks of data (with 3,249 bits each) from seven streams through the FEC encoding processor of the physical coding sublayer (PCS). The FEC processor generates 4,096 bits from the incoming blocks of 3,249 bits. The nominal symbol rate of the preferred embodiments of the present invention is 337,500 symbols per second. With a QAM index of 8, four blocks of 4,096 bits=16,384 bits can be transmitted in 16,384 bits/8 bps per symbol clock tick=2, 048 symbol clock ticks. 2,048 symbol clock ticks/337,500 symbol clock ticks per second is approximately 6.07 milliseconds. Similar calculations yield the same value of 6.07 msec. are available for the 3×4,096=12,288 bits transmitted at QAM index 6, the 2×4,096=8,192 bits transmitted at QAM index 4, and the 1×4,096=4,096 bits transmitted at QAM index=2.

Figure 40:
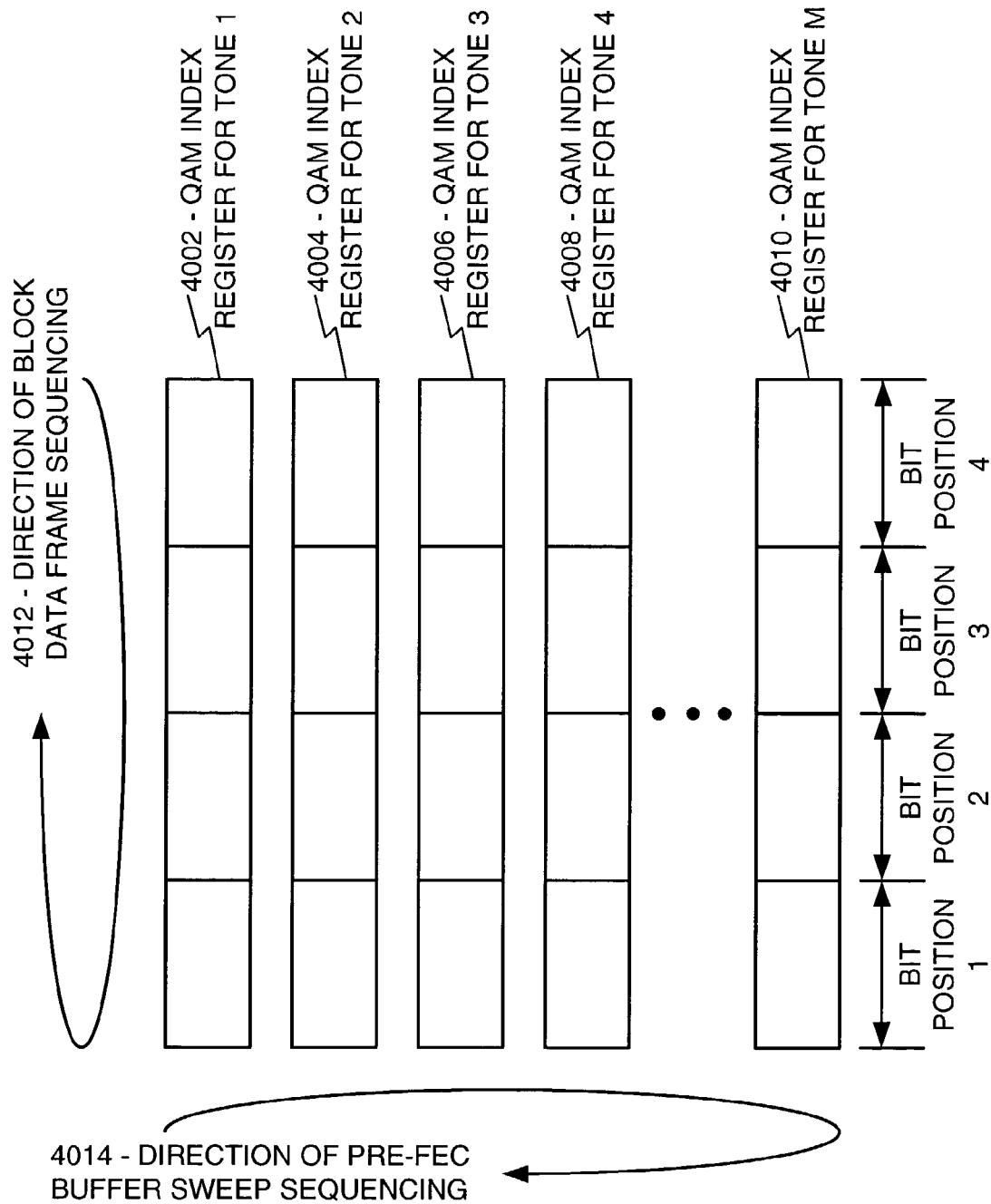
FIG. 40 shows the pre-FEC buffer sweeping sequence.

Referring now to FIG. 40, four-bit QAM index registers for tones 1, 2, 3, 4, and M (4002, 4004, 4006, 4008, and 4010 respectively) are shown. Each register has four bit positions that are set based on the QAM index for a tone. For a tone with QAM index=8, the corresponding register is set to the bit pattern 1111, with the left-most bit of the pattern relating to bit position 1 and the right-most bit of the pattern relating to bit position 4. In addition, for QAM indices 6, 4, and 2, the bit patterns are 1110, 1100, and 1000 respectively. FIG. 40 shows the two dimensional sweep of these QAM index registers (4002, 4004, 4006, 4008, and 4010). The two-dimensional sweep accommodates both the pre-FEC buffer sweep sequencing 4014 and the block data frame sequencing 4012. Whenever the four bits of a QAM index register have been shifted out of the register, a completed block data frame has been assembled.

Upstream Transport Modem Termination System (TMTS) Inverse Multiplexing Sublayer (IMS)

Figure 41:
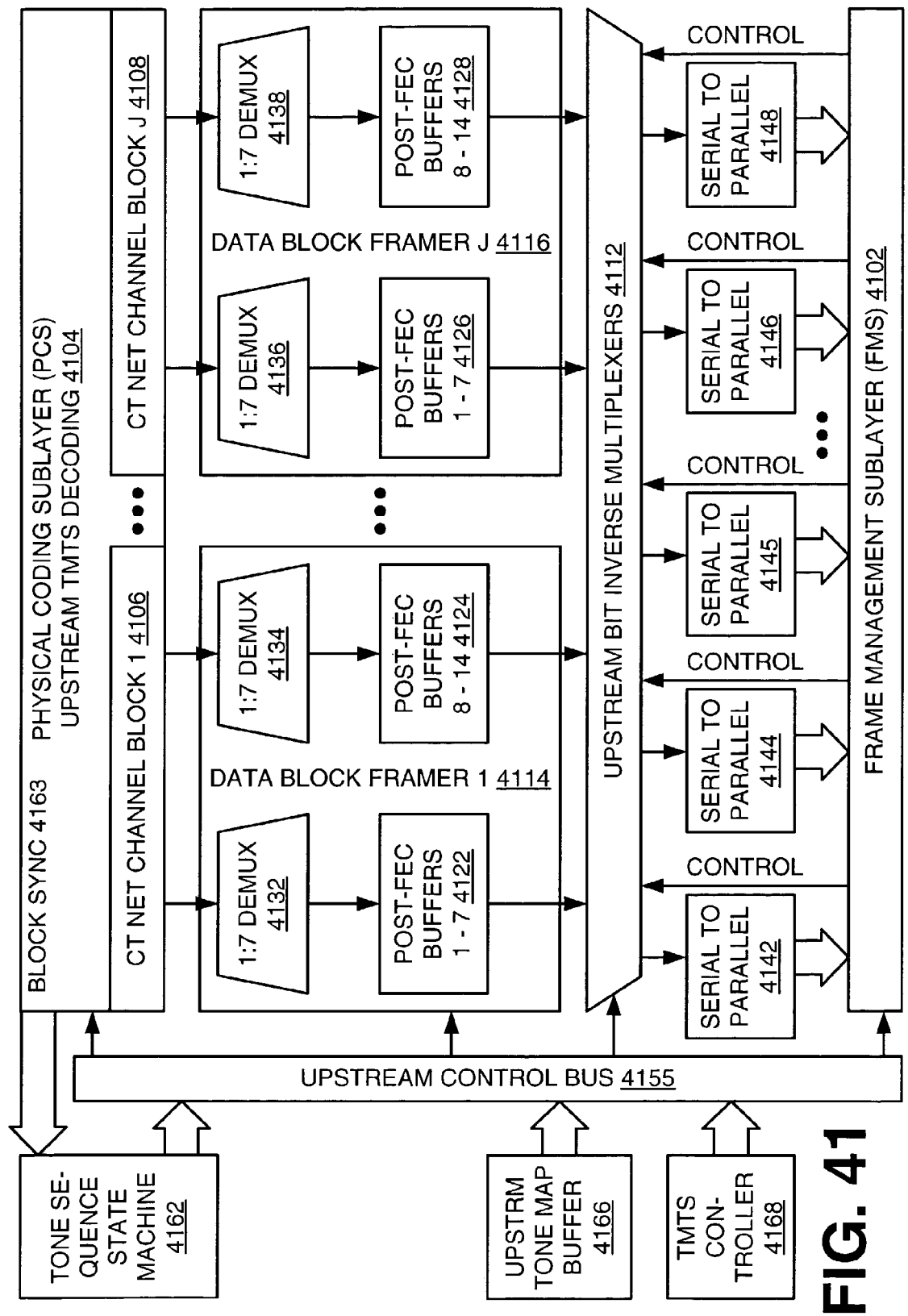
FIG. 41 shows a block diagram of the upstream inverse multiplex sublayer of the TMTS.

FIG. 41 shows a block diagram of the upstream inverse multiplexing sublayer (IMS) of the TMTS. In general, the IMS sublayer of the TMTS handles reassembling the FMS data flows for communication to frame management sublayer (FMS) 4102. The physical coding sublayer (PCS) of upstream TMTS decoding 4104 receives upstream tones from one or more cTMs. As discussed with respect to the cTM upstream IMS sublayer and FIG. 32, in the preferred embodiments of the present invention the upstream tones are small bandwidth frequency channels that are frequency-division multiplexed into a 6 MHz frequency channel (or channel block) that might be further frequency-division multiplexed with other 6 MHz frequency channels in a cable transmission network. Cable transmission network channel block 1 (4106) through cable transmission channel block J 4108 support 14 upstream tones on each 6 MHz channel or channel block. As a central concentrator device for a plurality of cTMs, a TMTS might actually support more 6 MHz channel blocks than a cTM, with each 6 MHz channel block allowing another fourteen tones. The incoming upstream information of the tones is passed from the PCS to the correct data block framer 1 through J (4114 and 4116) associated with the CT net channel blocks 1 through J (4106 and 4108) respectively. The processing limitations of the FEC decoding hardware relate to the processing limitations of the FEC encoding hardware. As a result, the TMTS divides each of the data block framers 4114 and 4116 into two parallel paths that generally handle seven of the upstream tones in similar fashion to the way the data block framers 3714 and 3716 of the cTM are divided.

Also, post-FEC buffers 1–7 (4122) for channel block 1, post-FEC buffers 8–14 (4124) for channel block 1, post-FEC buffers 1–7 (4126) for channel block J, and post-FEC buffers 8–14 (4128) for channel block J are shown separated based on the 7:1 multiplexing in the cTM and 1:7 demultiplexing in the TMTS to handle the performance limitations of the hardware used for FEC encoding and decoding. One skilled in the art will be aware that even though a particular error control coding technique is utilized between two communication devices, the same type of hardware does not have to be used for implementing both the encoding processes and the decoding processes. The 1:7 demultiplexing of the TMTS is handled by 1:7 demultiplexers 4132, 4134, 4136, and 4138. Unlike the cTM 7:1 multiplexers, which operated on a byte or octet level, the 1:7 demultiplexers 4132, 4134, 4136, and 4138 generally operate on a bit-wise level in the preferred embodiments of the present invention. Also, the post-FEC buffers 4122, 4124, 4126, and 4128 of the TMTS operate on serial data streams as opposed to parallel data streams in the preferred embodiments of the present invention. As stated before, one skilled in the art is familiar with performing conversion between serial and parallel interfaces. Because the post-FEC buffers 4122, 4124, 4126, and 4128 provide serial bit stream outputs, the TMTS IMS sublayer uses an upstream bit inverse multiplexers 4112 as opposed to the upstream byte multiplexer 3712 of the cTM that operated on a parallel bus carrying the bits of one or more octets. Because FMS sublayer 4102 expects a parallel interface for the bits in the octets of FMS data flows, serial-to-parallel converters 4142, 4144, 4145, 4146, and 4148 convert from the serial bit streams of upstream bit inverse multiplexers 4112 to the parallel interface of FMS sublayer 4102.

FIG. 41 shows an upstream control bus 4155 being used to connect a tone sequence state machine 4162, an upstream tone map buffer, and a TMTS controller 4168 to various other portions of a transport modem termination system (TMTS). In general, the preferred embodiments of the present invention use software and/or hardware to implement various logical functions. One skilled in the art will be aware of the trade-offs between implementing various functions in hardware, software, and/or some combination of hardware and software. Furthermore, one skilled in the art will be aware of methods for communicating signals between various portions of hardware and/or software. Also, one skilled in the art will be aware of the timing issues and techniques used in interfacing different types of hardware, logic, and/or circuitry to other hardware, logic, and/or circuitry. Moreover, one skilled in the art will be aware that interface buses are commonly used to facilitate the interconnection of hardware, logic, and/or circuitry. In addition, one skilled in the art will be aware that there are many other ways in addition to buses to handle the interconnection of hardware components. Thus, the use of buses is only one non-limiting example of hardware interconnection that may be used in the preferred embodiments of the present invention. One skilled in the art will be aware of other types of hardware interconnection as well as the various issues and complexities in utilizing various types of interconnections between and among hardware, logic, and/or circuitry.

In addition, FIG. 41 shows tone sequence state machine 4162, which controls the upstream IMS sublayer processes. The tone sequence state machine 4162 accepts information from PCS 4104 about the block sync 4163 associated with IMS block data superframes 3902 (see FIG. 39) or the transmission of four FEC encoded blocks and the sync words (see FIG. 34) across seven tones. This block sync signal synchronizes the frame boundary for recovery of data from the upstream tones. After correlating the frame boundary, the data from the FEC decoders in the PCS 4104 will be sequentially input through 1:7 demultiplexers 4132, 4134, 4136, and 4138 into the post-FEC buffers 4122, 4124, 4126, and 4128 respectively based upon the QAM index of the associated upstream frequency tone. The two-dimensional sweep sequencing scheme of FIG. 40 will properly sequence the data into the post-FEC buffers 4122, 4124, 4126, and 4128.

The post-FEC buffers 4122, 4124, 4126, and 4128 each contain seven buffers (1–7 or 8–14) with each one of the seven buffers being a serial memory that contain the information that is carried in the 3216 bits of a data block for a tone. (See FIG. 33) In the preferred embodiments of the present invention, these post-FEC buffers are written to and read from in a serial manner. Upstream bit inverse multiplexers 4112 generally comprises a (14×J): 1 inverse multiplexer for each active FMS data flow. In the preferred embodiments of the present invention, each one of the (14×J): 1 inverse multiplexers (in upstream bit inverse multiplexers 4112) may be controlled (as shown by the control signals) by the FMS attachment port and/or uplink port for recovering the upstream portion of the active FMS data flows utilizing the upstream tone mapping information contained in upstream tone map buffer 4166. The serial-to-parallel converters 4142, 4144, 4145, 4146, and 4148 convert the serial bits of the upstream bit inverse multiplexers 4112 into parallel octets expected by FMS 4102.

Downstream Client Transport Modem (cTM) Demodulation and Physical Coding Sublayer (PCS)

Figure 42:
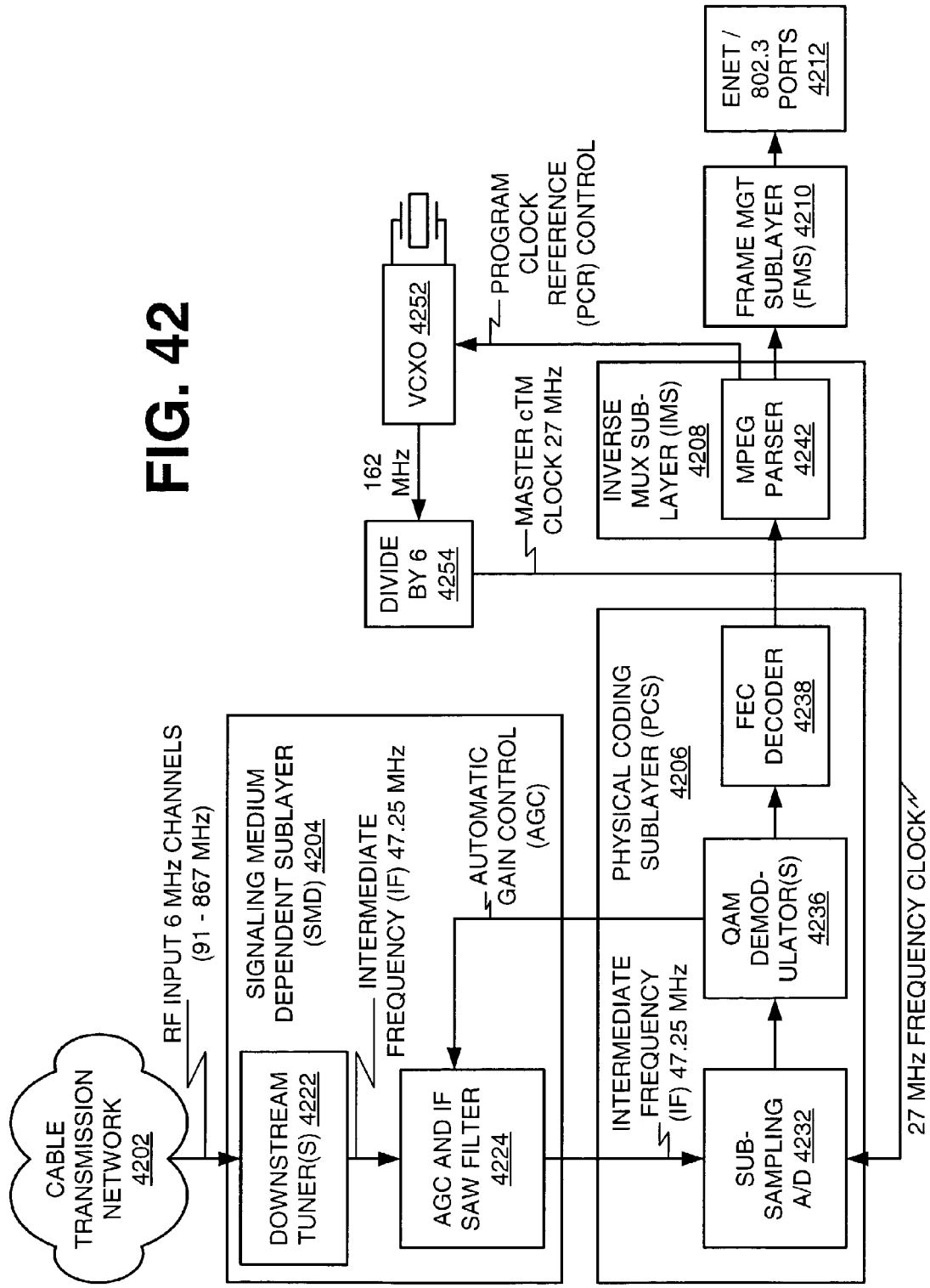
FIG. 42 shows a block diagram of the downstream demodulator of a cTM.

FIG. 42 shows the downstream demodulation for a cTM. The signals in the 6 MHz downstream channels carrying MPEG packets are communicated over cable transmission network 4202 into the signaling medium dependent (SMD) sublayer 4204 and then into the physical coding sublayer (PCS) 4206. The information of the MPEG packets is passed to inverse multiplex sublayer (IMS) 4208 and on to frame management sublayer 4210 to be communicated on ethernet/802.3 ports 4212. The signaling medium dependent (SMD) 4204 sublayer comprises one or more downstream tuner(s) 4222 for the 6 MHz downstream frequency channels. In the preferred embodiments of the present invention, the tuners generally provide output with a center intermediate frequency (IF) of about 47.25 MHz. The output of tuner(s) 4222 is passed to automatic gain control (AGC) and intermediate frequency (IF) SAW filter 4224. In general, automatic gain control (AGC) amplifies signals in the proper range, and the SAW IF filter further helps to reject adjacent 6 MHz frequency channels.

The 6 MHz frequency channel that is down converted to a center intermediate frequency (IF) of about 47.25 MHz by the downstream tuner(s) 4222 and is filtered by the AGC and IF SAW filter 4224 is then passed into sub-sampling A/D 4232 to digitize the signal and convert it to the second intermediate center frequency of about 6.75 MHz. Sub-sampling A/D 4232 subsamples the lower sideband of the second harmonic of the 27 MHz sampling frequency. The second intermediate frequency is related by the equation: second IF center frequency=(2×27 MHz)−47.25 MHz=6.75 MHz. Because the lower sideband is used, the resulting signal is frequency-spectrum inverted, which can be corrected for later within the demodulator by (among other ways) reversing the I and Q QAM phases to reorient the spectrum to a non-reversed frequency spectrum. In the preferred embodiments of the present invention, the sub-sampling A/D 4232 provides the necessary accuracy of resolution at 27 M samples per second. In the preferred embodiments of the present invention, sub-sampling A/D 4232, QAM Demodulator(s) 4236, and FEC Decoder 4238 may all be implemented within a STV0297J QAM Demodulator with Analog to Digital Converter Integrated Circuit (IC) chip made by ST Microelectronics. The data sheet for the STV0297J is incorporated in its entirety by reference herein.

After the sub-sampling A/D 4232, QAM demodulator(s) 4236 provides the completion of the QAM demodulation of signal. After the QAM demodulation, the information generally is carried in baseband binary signals that are commonly found within devices using digital logic signal levels such as, but not limited to, TTL (transistor—transistor logic). QAM demodulator(s) pass the information on to forward error correction (FEC) decoder 4238, which generally handles error detection and/or correction using the Reed-Solomon code that is commonly used in digital multi-programme systems utilizing ITU-T Recommendation J.83. Also QAM demodulator(s) 4236 provide feedback for automatic gain control to the AGC and IF SAW filter 4224. From FEC decoder block 4238, the MPEG packets pass to MPEG parser 4242 within the inverse multiplex sublayer (IMS) 4208. MPEG parser 4242 handles selecting the MPEG packets with the correct PIDs for this cTM and discarding the packets with other PIDs. After reassembly of the FMS data flows in IMS 4208, the FMS data flows are passed to FMS 4210 for conversion to ethernet packets to be transmitted on ethernet/802.3 ports 4212.

In addition, MPEG parser 4242 parses the information about the MPEG program clock reference (PCR) to allow the system to send clock control signals to voltage controlled crystal oscillator (VCXO) 4252, which produces a 162 MHz clock. The 162 MHz clock is divided by 6 in item 4254 to result in a 27 MHz clock that is provided to PCS 4206 and other portions of the cTM. Many of the FIGs. show clocks of different rates for various functions in the preferred embodiments of the present invention. One skilled in the art will be aware of techniques for implementing various clock division functions to reduce the frequency of clock oscillations. Also, one skilled in the art will be aware that faster oscillating clocks, though generally more accurate than slower oscillating clocks, are generally more expensive than the slower oscillating clocks. Thus, various alternative embodiments of the present invention could be designed using oscillators with different initial oscillation rates and the appropriate clock dividing functions. All these alternative embodiments are intended to be within the scope of the present invention.

Upstream Client Transport Modem (cTM) Modulation and Physical Coding Sublayer (PCS)

Figure 43:
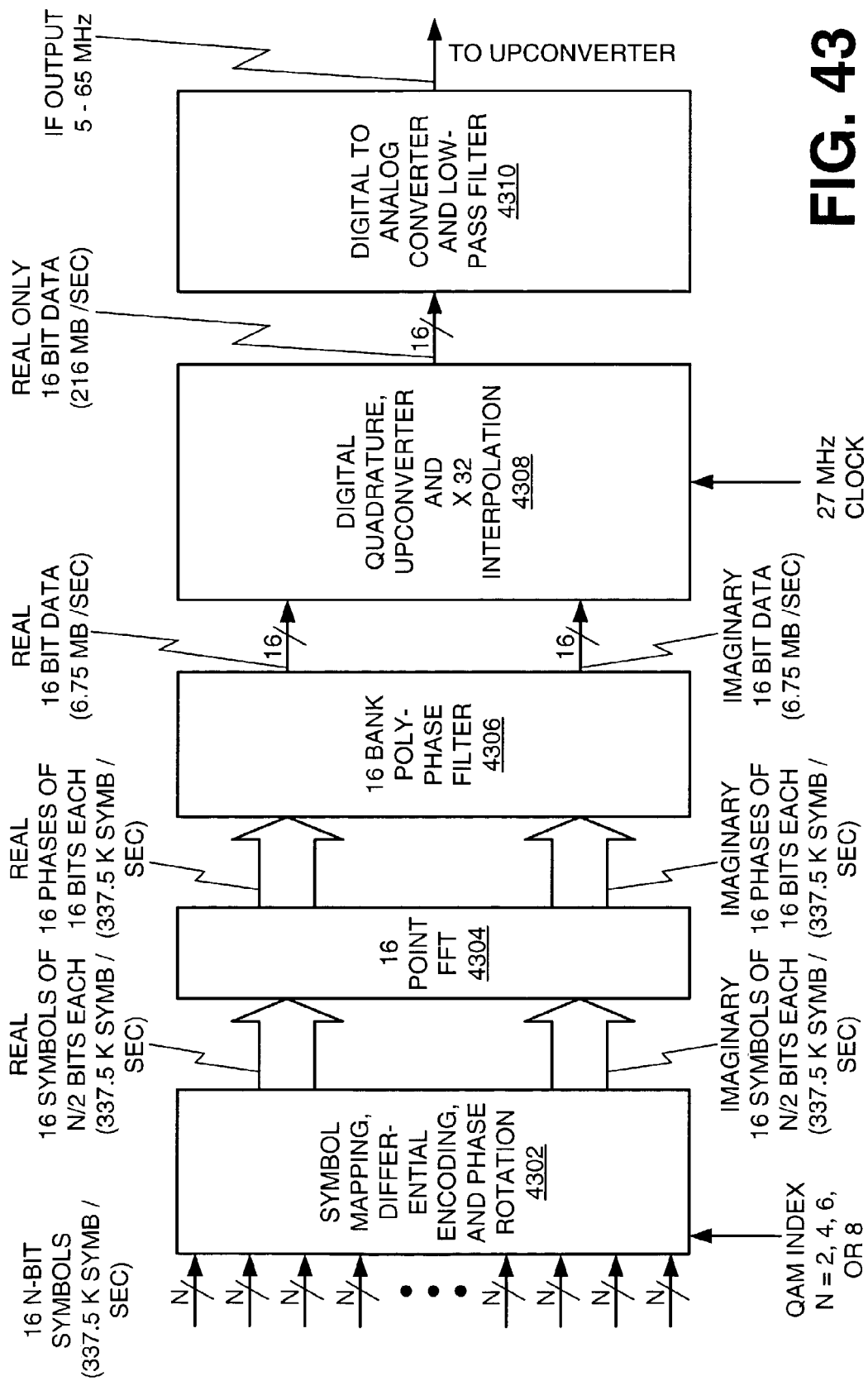
FIG. 43 shows a block diagram of the upstream modulator of a cTM.

Referring now to FIG. 43, a block diagram of the upstream modulator in a cTM is shown. In general, symbol mapping, differential encoding, and phase rotation block 4302 accepts input of 16 bit streams with each stream divided into symbols of N bits each, where N is the modulation index of 2, 4, 6, or 8. In general, the modulation index can be different for each of the 16 inputs. In the preferred embodiments of the present invention, the symbol rate is 337.5 K symbols/second for all of the QAM indices with the QAM index adjusting the number of signal points in the constellations and the inter-symbol distance based on the $Eb/N_0$ of each upstream tone (i.e., the relatively small bandwidth FDM frequency channels). Basically, the 16 inputs into symbol mapping, differential encoding, and phase rotation block 4302 support the bitstreams of 14 upstream tones of a 6 MHz channel block. However, two (16−14=2) of the inputs to the modulator will be filled with null symbols or zeroes to allow easier implementation of the X 32 Interpolation in block 4308. Thus, the fourteen upstream tones of a 6 MHz channel block are generated using a 16 point FFT 4306.

In the preferred embodiments of the present invention, digital signal processing (DSP) techniques are utilized to perform computations in the complex domain as shown by the real and imaginary portions of FIG. 43. The upstream modulator comprises a 16 point fast Fourier transform (FFT) 4304 that is cascaded into a 16 bank poly-phase filter 4306. In general, the 16 point FFT 4304 modulates the incoming 14 data streams on the appropriate carrier frequencies, while the 16 bank poly-phase filter 4306 acts as a comb filter that applies root-Nyquist shaping to each of the 14 tones contemporaneously. In the preferred embodiments of the present invention, the outputs of the poly-phase filter 4306 are combined using a conventional 16-stage adder tree and complex accumulator. By performing the computations up until the digital-to-analog conversion in the complex domain, information about the phase and amplitude are both preserved.

After the 14 tones are digitally generated in 16 point FFT 4304 and passed through 16 bank poly-phase filter 4306, digital quadrature, upconversion and X 32 interpolation are performed by block 4308. Within block 4308, a series of interpolator-filters gradually raise the sample rate up to the final value. In the preferred embodiments of the present invention the X 32 interpolation is performed in three stages of X 2, X4, and X4, which together multiply to X 32. In the preferred embodiments of the present invention these interpolation stages generally limit the number of usable tones to 14 in a 6 MHz frequency channel. For the chosen symbol rate of 337.5 K symbols/sec, the 14 tones (i.e., relatively smaller frequency channels) just fit inside a 6 MHz frequency channel (i.e., the relatively larger frequency channel). One skilled in the art will be aware that other alternative embodiments of the present invention could divide the 6 MHz frequency channels into more than 14 or less than 14 tones per channel for managing frequency bandwidth allocations at a smaller or larger, respectively, granularity. Also, alternative embodiments of the present invention with different symbol rates could be used to allow a different number of upstream tones to fit into a 6 MHz channel. Furthermore, one skilled in the art will be aware that the size of the relatively larger frequency channel could be different than 6 MHz in alternative embodiments of the present invention. The ubiquitous development of equipment and device electronics/optics for 6 MHz CATV channels has led to economies of scale in production of these devices. Thus, 6 MHz frequency channels were chosen for the preferred embodiments of the present invention due to availability of relatively low cost components for 6 MHz frequency channels and due to the ease of integrating the preferred embodiments of the present invention into CATV networks based upon 6 MHz channels.

After X 32 interpolation in block 4308, the real and imaginary signal components are recombined in the digital quadrature portion of block 4308. Generally the digital quadrature modulator uses an NCO to frequency-shift the 14 tone channel block to various frequencies in the intermediate frequency passband. After the quadrature frequency shifting in block 4308 the real and imaginary components are combined and sent to analog converter portion of block 4310. The resulting real-only analog intermediate frequency (IF) output of the digital-to-analog conversion process, is then applied to an upstream converter stage, which performs the final conversion to the desired upstream output frequency.

The clocks and symbol rates driving the upstream modulator of FIG. 43 are derived from a master cTM clock that is frequency locked to a master TMTS clock using the MPEG-2 program clock reference. Thus, the downstream PCR functions as a clock distribution system to properly align the upstream modulators of one or more cTMs. Based on propagation delays and/or various other factors, the TMTS will receive the upstream tones from various cTMs that may have different phase variations, but will be frequency locked to a master clock in the TMTS, which simplifies the demodulation process.

Generally, the upstream modulation approach of the preferred embodiments of the present invention uses multi-channel frequency-division multiplexing that is different from Discrete Multi-Tone (DMT) modulation. Unlike DMT, the FDM approach of the preferred embodiments of the present invention utilizes tones that are fully separated and independent from each other in the frequency domain. This frequency separation is accomplished by performing a phase rotation in block 4302 prior to the 16 point FFT in block 4304. This phase rotation in block 4302 pre-rotates or spins the incoming complex symbols through a phase advance so that the complex symbols constructively modulate carrier waveforms that are (1+alpha) times the symbol rate. Alpha is an excess bandwidth factor and equals 0.25 in the preferred embodiments of the present invention. This running phase advancement or phase rotation of block 4302 allows the nominal rate symbols to be interpolated up to match and amplitude modulate any one of the 14 carrier frequency tones in an upstream 6 MHz channel block. The carrier frequencies of the upstream frequency tones are effectively separated at multiples of (1+alpha) times the symbol rate. The pre-rotations of phases in block 4302 are accomplished easily because the alpha of 0.25 leads to phase shifts that are multiples of 90 degrees. Phase shifts in multiples of 90 degrees can be performed in QAM modulation simply by exchanging the real and imaginary components or their additive inverses. Although one skilled in the art will be aware that other values for alpha could be used in alternative embodiments of the present invention, an alpha value of 0.25 and the 90 degree phase shifts lead to a simple implementation of the phase rotation portion of block 4302.

Based on the modulation technique of the preferred embodiments of the present invention, the 14 upstream tones of a 6 MHz channel are fully separated in a standard FDM fashion and do not overlap as in the case of a standard DMT spectrum. This choice of standard FDM as opposed to DMT for modulation allows the upstream receiver in the TMTS to properly detect the tones from different cTMs that generally will have arbitrary and unpredictable phase differences. These arbitrary and unpredictable phase differences between the upstream tones of different cTMs generally cause a problem for the orthogonally overlapped frequency tones of standard or conventional DMT modulation techniques. Based on the downstream delivery of a master clock from the TMTS over the MPEG PCR, the clocks of the different client transport modems can generally be frequency locked to the TMTS clock. However, different upstream tones from different cTMs may have varying and arbitrary phase quasi-static offsets relative to the TMTS master clock. These slow-moving or quasi-static phase offsets can be tracked by the baseband phase de-rotators in a multi-channel FDM demodulator in the TMTS. The upstream modulation parameters of the preferred embodiments of the present invention are specified in Table 6.

TABLE 6

Upstream Modulation Parameters

| Parameter | Value |
| --- | --- |
| Symbol rate, Rs | 337.5 kilosymbols/second |
| Alpha factor, a | 0.25 |
| Modulator pulse shaping | Root-Nyquist raised cosine |
| Demodulator pulse shaping | Root-Nyquist raised cosine |
| Tone spacing = (1 + alpha) X Rs | 421.875 kHz |
| Tone occupied bandwidth | 421.875 kHz |
| FFT size | 16-point |
| Number of Tones (usable) | 14 |
| Channel Occupied bandwidth | 5.90625 MHz |
| Modulation indices | n = 2  b/s/Hz  QPSK |
|  | n = 4  b/s/Hz  16-QAM |
|  | n = 6  b/s/Hz  64-QAM |
|  | n = 8  b/s/Hz  256-QAM |
| Constellation | Standard rectangular QAM |
| Interpolation factor | x32 ( = x2 x4 x4 ) |

Figure 44:
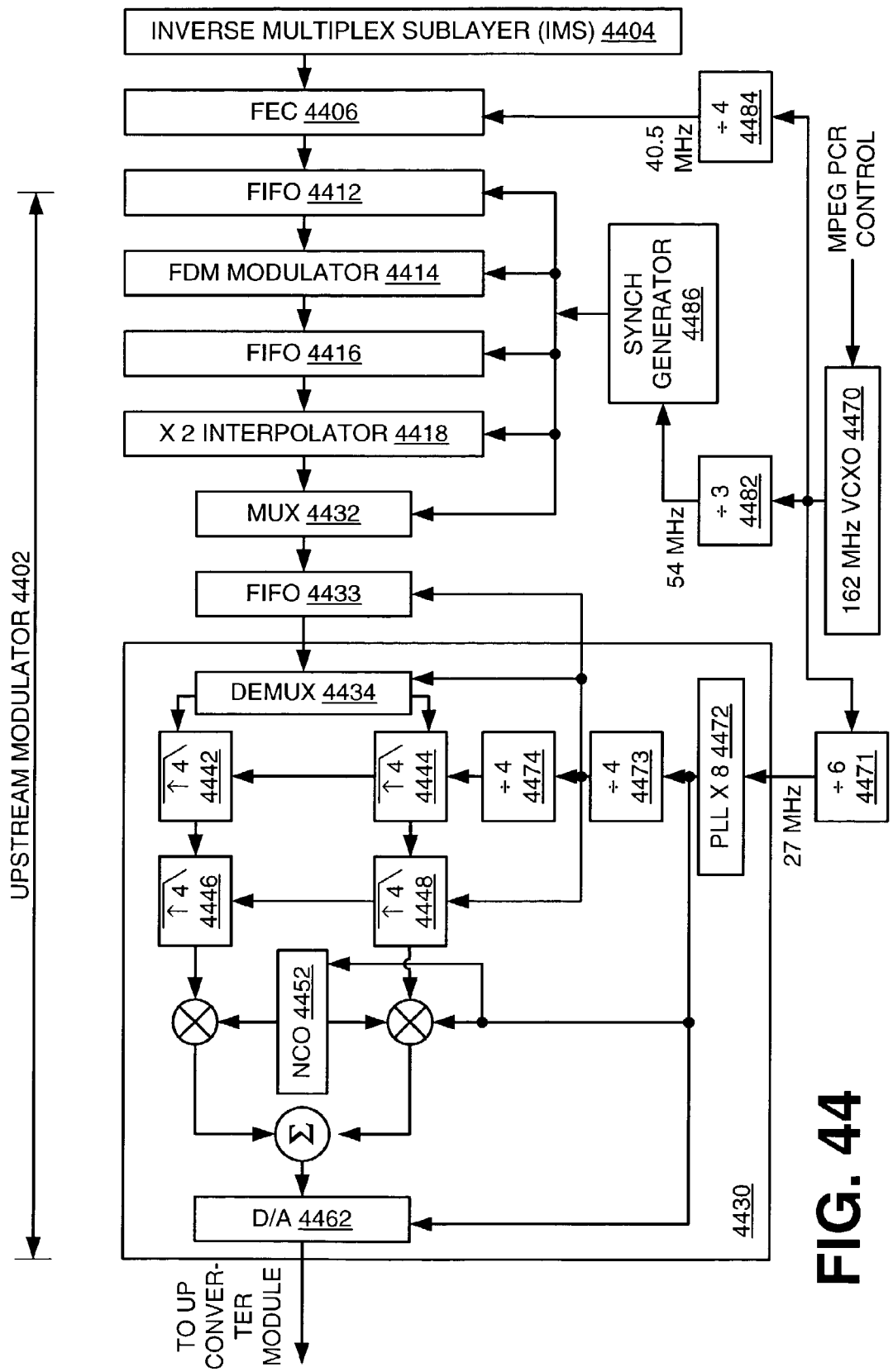
FIG. 44 shows a more detailed diagram of the upstream modulator of a cTM.

A more detailed breakdown of a preferred embodiment of the upstream modulator 4402 is shown in FIG. 44, though one skilled in the art will be aware that other alternative embodiments are possible. In general, the inverse multiplex sublayer (IMS) 4404 in a cTM passes information to the forward error correction (FEC) encoders 4406, with the upstream information being buffered in a first-in, first-out (FIFO) 4412 before being passed into FDM modulator 4414. FDM modulator 4414 generally performs the functions of blocks 4302, 4304, and 4306 from FIG. 43. In the preferred embodiments of the present invention the FDM modulator 4414 may be implemented at least partially by a digital signal processing (DSP) chip, though one skilled in the art will be aware of many different implementations. The output of FDM modulator 4414 is passed to FIFO 4416 before entering X 2 interpolator 4418. The multiplexer 4432 is used to pass the output of X 2 interpolator 4418 through FIFO 4433 and into block 4430, which in the preferred embodiments of the present invention is an Analog Devices AD9879, the data sheet for which is incorporated by reference in its entirety herein. As one skilled in the art will be aware, hardware real estate for the pins of semi-conductor chips is costly, therefore mux 4432 and demux 4434 are used to input signals into block 4430 through a relatively smaller number of interface pins on a chip. Demultiplexer 4434 passes the real and imaginary components of the signals into X 4 interpolators 4442 and 4444, before the real and imaginary components are further fed into X 4 interpolators 4446 and 4448. Following X 4 interpolators 4446 and 4448 a quadrature modulator feeds the digital-to-analog (D/A) converter 4462. The quadrature modulator is driven by numerically controlled oscillator (NCO) 4452, while the output of D/A 4462 is passed to the upconverter module to convert from the intermediate frequency (IF) of 47.25 MHz to the proper 6 MHz frequency channel block on the cable transmission network.

FIG. 44 further shows some of the clock distribution of a 162 MHz voltage controlled crystal oscillator (VCXO) 4470. As discussed previously, the oscillator and clock of a cTM are adjusted based on control information from downstream MPEG packets carrying PCR values. The resulting clock is divided by 6 in block 4471 and passed into block 4430 and further passed into a phase-locked loop (PLL) X 8 block 4472, with the output routed to several functions within block 4430 including but not limited to D/A 4462 and the quadrature modulator. In addition, the output of PLL X 8 block 4472 is passed to divide by 4 block 4473, which delivers a clock to X 4 interpolators 4446 and 4448, demux 4434 in block 4430, and mux 4432 outside of block 4430. Furthermore, this clock from divide by 4 block 4473 is further passed to divide by 4 block 4474 inside block 4430. Inside block 4430, the clock divided by 4 through block 4474 is used by interpolators 4442 and 4444. Outside block 4430, the clock from 162 MHz voltage controlled crystal oscillator (VCXO) 4470 is divided by 3 in block 4482 and is supplied to synch generator 4486. In general, synch generator 4486 provides the necessary clock to properly time the operations of FIFO 4412, FDM modulator 4414, FIFO 4146, X 2 interpolator 4418, and multiplexer 4432. One skilled in the art will be aware of details of interfacing various hardware and/or software logic using the proper timing signals to provide input to one portion of hardware and/or software based on providing output from another portion of hardware and/or software. Furthermore, the clock from 162 MHz VCXO 4470 is divided by 4 in block 4484 and provided to FEC 4406.

Upstream Transport Modem Termination System (TMTS) Demodulation and Physical Coding Sublayer (PCS)

Figure 45:
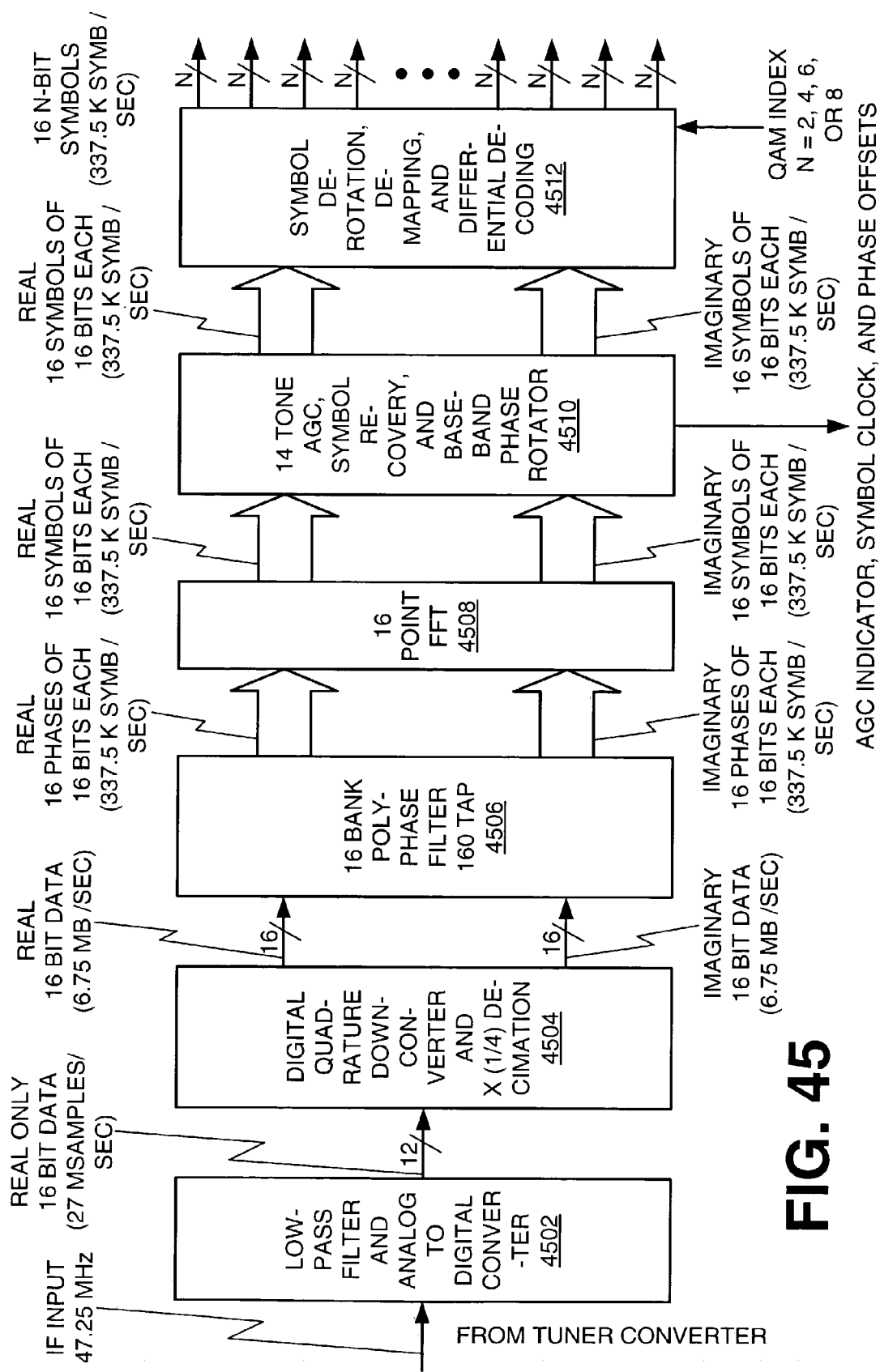
FIG. 45 shows a block diagram of the upstream demodulator of a TMTS.

Moving now to FIG. 45, a block diagram of the upstream tone demodulation in the TMTS is shown. From the tuner converter of the TMTS, an intermediate frequency (IF) signal at 47.25 MHz is delivered to the low-pass filter (LPF) and analog-to-digital (A/D) converter block 4502. The output of LPF and A/D block 4502 is input into digital quadrature down converter and X (¼) decimation block 4504. Using the digital processing, real and imaginary 16 bit data components are separated and passed into 16 bank poly-phase filter 160 tap 4506 to yield real and imaginary phases at a symbol rate of 337.5 K symbols/second. The real and imaginary phases are input into 16 point fast Fourier transform (FFT) 4508, which generates real symbols and imaginary symbols. The resulting symbols from 16 point FFT 4508 are input into 14 tone automatic gain control (AGC), symbol recovery, and baseband phase rotator block 4510. After performing the operations of block 4510, the real and imaginary symbols are passed into symbol de-rotation, de-mapping, and differential decoding block 4512, which may generate up to 14 symbols of N bits each, where N depends on the QAM index of 2, 4, 6, or 8. Also, 14 tone automatic gain control (AGC), symbol recovery, and baseband phase rotator block 4510 provides outputs of automatic gain control (AGC) indication, symbol clock, and the phase offsets.

In general, the upstream demodulator accepts a group of up to 14 RF tones (or frequency channels) within a 6 MHz frequency channel and demodulates them into the respective data streams. Each of the fourteen center carrier frequencies and associated band of frequencies around each center frequency is a tone, and fourteen tones may fit into a 6 MHz frequency channel or channel block. In the preferred embodiments of the present invention each tone may be set to QAM indices of 2, 4, 6, and 8 corresponding to QPSK, 16QAM, 64QAM, and 256QAM. In the preferred embodiments of the present invention the symbol rate is nominally the same of 337.5 K symbols/second regardless of the number of bits of information encoded in each symbol based on the QAM index.

In the preferred embodiments of the present invention, the upstream demodulator utilizes digital signal processing (DSP) to be able to operate in the complex domain, which allows both phase and amplitude information to be retained generally throughout the upstream demodulator. Referring to FIG. 45, 16 bank poly-phase filter 4506 provides input to 16 point FFT 4508. The 16 block poly-phase filter 4506 performs the function of a comb filter by applying raised cosine root-Nyquist shaping to each of the 14 tones contemporaneously. The 16 point FFT 4508 demodulates and separates the incoming 14 streams of data from the 14 carrier frequencies. Though the 16 point FFT 4508 could discriminate among 16 tones, the preferred embodiment of the present invention utilizes only 14 tones because of response limitations in the interpolators of the cTM modulator. However, one skilled in the art will be aware that alternative embodiments of the present invention with different response limitations of the interpolators could support more or less than 14 tones. To be able to use a standard 16 point FFT 4508, the fourteen tones plus two additional unused tones will be applied to the 16 point FF14508. However, incoming information on the unused additional tones will be ignored.

A digital automatic gain control (AFC) loop interacts with block 4510 and adjusts the gain level of the incoming fourteen tones. Also, block 4510 recovers the symbol clock. Furthermore, block 4510 performs a baseband phase rotation that measures and removes static (or quasi-static) phase shift in a constellation. Although the frequency of the TMTS clock and a plurality of cTM clocks may generally be locked through the downstream MPEG PCR distribution and cTM clock adjustment, each of the fourteen tones may be coming from a different cTM, and each cTM may been a different distance from the TMTS along the transmission lines of the cable transmission network. The different distances to a cTM may result in different propagation delays for signals from different cTMs. The fixed nature of wired connections generally makes the propagation delay static (or at least quasi-static). However, incoming signals from two different cTMs may have arbitrary phase differences. In general, the phase de-rotator is capable of performing slow corrections to phase shifts. Generally, it is more difficult to handle continuous phase changes that would result if the TMTS and cTM clocks were not locked to the same frequency. As previously discussed the downstream distribution of MPEG program clock reference (PCR) information allows for a network clock to be distributed using data packets as opposed to the commonly used standard physical layer clock signals. This clock distribution based on the MPEG PCR can be used to ensure that the cTM and TMTS clocks are frequency locked, so that no free running frequency difference exists.

However, in the preferred embodiments of the present invention, a design decision to use a low-cost tuner in the TMTS, does not have an external clock input to allow the local oscillator to be phase-locked to an external source, thus creating an additional problem regarding clocking. As a result of this choice of a low-cost tuner in the preferred embodiments of the present invention, the entire communication system generally is frequency synchronous (with respect to the communication of information over the cable distribution network) except for the tuner of the TMTS. Without correction, this free-running tuner in the TMTS will cause the baseband phase rotator of the TMTS demodulation to drift relative to the other clocks and cause errors. To resolve this problem, a multi-tone automatic frequency control (AFC) technique is utilized as at least part of the of the preferred embodiments of the present invention. The multi-tone AFC technique allows the demodulator to track small frequency changes and prevent the baseband phase rotator from slipping cycles. In addition, depending on the update rate of the phase rotator in block 4510, the phase rotator should be able to adjust for the generally very small frequency changes that are beyond the resolution of the multi-tone AFC. In the preferred embodiments of the present invention, the multi-tone AFC has a finite frequency step because it is implemented using digital techniques.

After the 14 tones are de-rotated in the symbol de-rotation portion of block 4512, each tone generally is de-spun to convert the recovered symbols back to the nominal symbol rate, which is 337.5 K symbols/second in the preferred embodiments of the present invention. (The description of the upstream cTM modulator regarding FIGS. 43 and 44 describes the pre-rotation or spinning of the transmitted symbols to cause the symbols to modulate carriers at multiples of (1+alpha) times the symbol rate.) Once the incoming symbols are again being communicated at the nominal symbol rate of 337.5 K symbols/second, a slicer and/or demapper in block 4512 makes a decision as to which of the N symbols was sent through a QAM constellation with index N during one symbol time or symbol period. One skilled in the art will be aware that detection of the most likely transmitted symbol from a QAM symbol constellation generally involves dividing the incoming signals into various decision regions that each map to a QAM symbol representing a number of bits based on the QAM index. With QAM, the information generally is encoded differentially so that the output of demapping in block 4512 is passed to a differential decoding function also in block 4512. One skilled in the art generally will be aware of the processes, steps, and or techniques of recovering bits from incoming QAM signals. The output of the differential decoding in block 4512 generally will result in up to 14 bit streams at the decoder output if all 14 tones are active. Each data stream will have N bits per symbol, where N depends on the QAM index of 2, 4, 6, or 8. These fourteen bit streams are passed on to the FEC decoding and then into the inverse multiplex sublayer of the TMTS.

Figure 46:
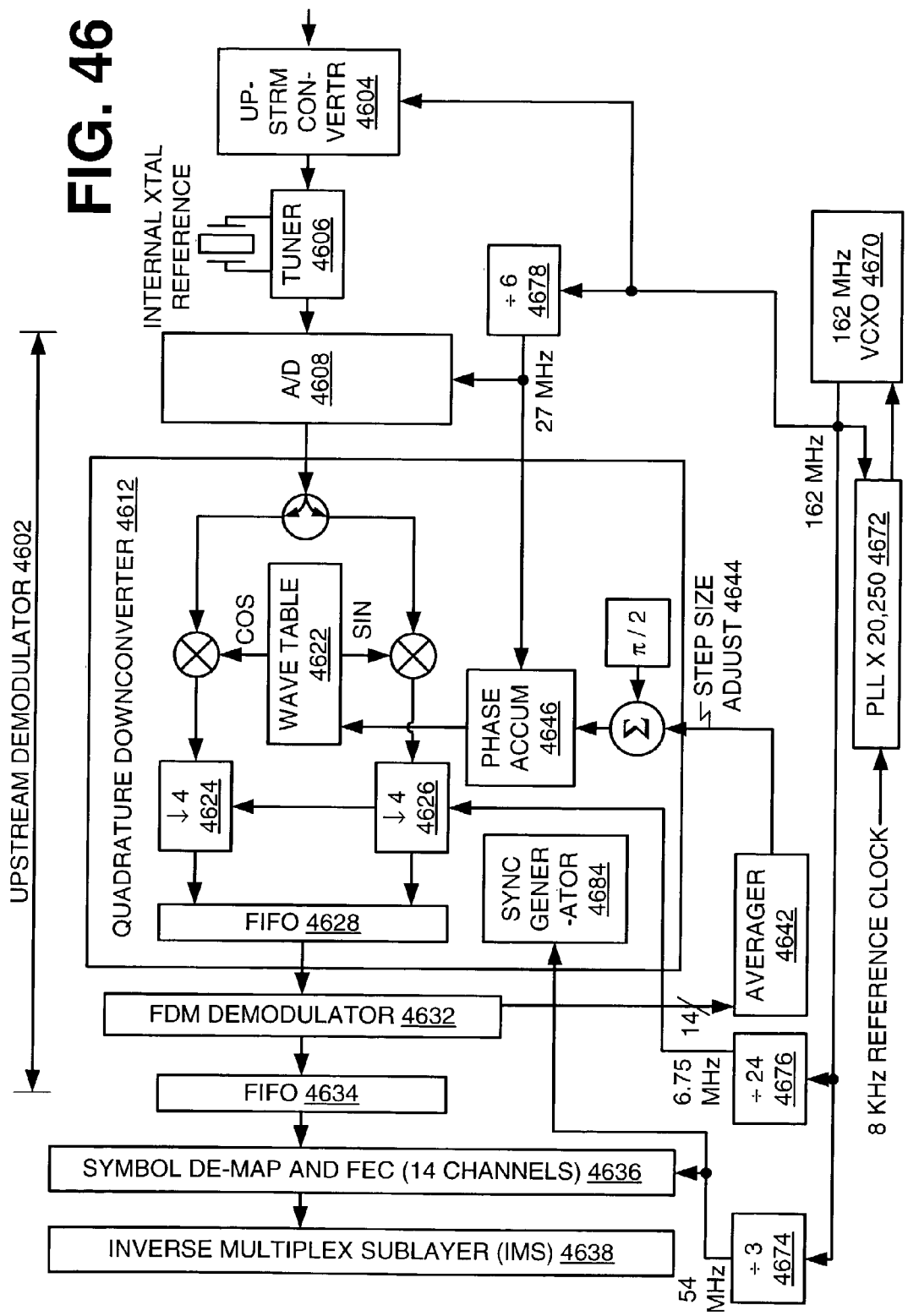
FIG. 46 shows a more detailed diagram of the upstream demodulator of a TMTS.

FIG. 46 shows the upstream demodulator of the TMTS in more detail. The legend specifying upstream demodulator 4602 generally shows the boundaries of the functions that are performed in the upstream demodulator of the physical coding sublayer (PCS) of the TMTS. In general, signals from the cable transmission network are input into the signaling medium dependent (SMD) sublayer and into tuner 4606. For sub-split operation with a 5–42 MHz spectrum of the cable transmission network in the preferred embodiment of the present invention, the incoming upstream signal that is the composite of up to fourteen active tones comes into an upstream converter 4604 that is part of the signaling medium dependent (SMD) sublayer before being passed to tuner 4606. The upstream converter converts a desired 6 MHz band (in the sub-split range of 5–42 MHz) into a frequency range that is appropriate for input to tuner 4606. The tuner 4606 down-converts the 6 MHz band to the intermediate frequency of 47.25 MHz.

For data-split operation in the frequency range 50–250 MHz, the preferred embodiments of the present invention do not need upstream converter 4604. Instead the signals from the cable transmission network generally may be directly applied to tuner 4606. In both the sub-split and the data-split frequency range cases, the tuner 4606 selects the proper 6 MHz channel and converts the signals of the 6 MHz channel to the be in the intermediate frequency (IF) range of 47.25 MHz. This IF signal from tuner 4606 is passed to analog-to-digital (A/D) converter 4608.

The 14 tone, 6 MHz wide channel at the intermediate frequency of 47.25 MHz is sampled by A/D 4608 at a rate of 27 MHz that is phase-locked to the MPEG time base of 27 MHz. This sampling technique is known as sub-sampling, and basically results in the 47.25 IF signal being converted to an equivalent signal at 6.75 MHz (but with an inverted spectrum). One skilled in the art will be aware of alternative implementations that do not use the sub-sampling technique, but require higher sampling rates. With a non-sub-sampling technique, only the frequency range of 0–13.5 MHz could be sampled with a 27 MHz clock based on the Nyquist limit that requires sampling at twice the frequency of the highest frequency component in the relevant spectrum. But sub-sampling allows any energy within the images of this 0–13.5 MHz range, as reflected about an axis at the 27 MHz sampling frequency and its harmonics, to be also converted to the baseband range of 0–13.5 MHz. If any energy is contained in the lower sideband of the sampling harmonic, the resulting spectrum will be inverted.

For the preferred embodiments of the present invention, the 47.25 MHz intermediate frequency is exactly 6.75 MHz below the second harmonic of the 27 MHz sampling frequency (i.e., (27 MHz X 2)×47.25 MHz=6.75 MHz). Therefore, the 47.25 MHz IF is in the lower sideband of the second harmonic of 27 MHz (i.e., 54 MHz). After A/D conversion in A/D 4608, the energy at 47.25 MHz appears in the digitized data as if it were originally centered at 6.75 MHz, but the frequency spectrum of the signal is inverted such that 47.25 MHz+0.25 MHz maps to 6.75 MHz–0.25 MHz and 47.25 MHz −0.25 MHz maps to 6.75 MHz+0.25 MHz. This frequency inversion is easily handled using complex (imaginary and real) signals in digital demodulation by swapping the real and imaginary components to reverse the direction of vector rotation and to pass on the correct signals for further demodulation.

The quadrature down converter 4612 of FIG. 46 accepts 27 mega-samples-per-second from A/D 4608 and separates the data into real and imaginary components. The real and imaginary components can be separated by multiplying two identical copies of each sample by sine and cosine functions at the frequency of 6.75 MHz. A numerically controlled oscillator (NCO) based on a wave table 4622 containing digitized values of the sinusoidal waveform at 6.75 MHz together with a phase accumulator 4646 and a phase step-size adjust register can be used to generate the proper waveforms for separating the data into real and imaginary components.

If the incoming 14 tones were frequency-locked to the clock used for separating the real and imaginary components, the operation to generate sine and cosine functions is quite simple because the 4:1 (or 27 MHz: 6.75 MHz) ratio of the sampling clock to the clock used for separating the real and imaginary components could be implemented by just cycling through the values 0, +1, and −1. However, because tuner 4606 has a free running internal crystal oscillator (XTAL), the incoming signals have some frequency instability that results in an unknown amount of frequency error in the incoming intermediate frequency (IF) signal. To deal with this issue a more sophisticated numerically controlled oscillator (NCO) is used that includes wave table 4622. The numerically controlled oscillator (NCO) using a wave table 4622 implementation generally will allow oscillator adjustments of as much as +/−50 kHz to correct for the clocking problem of the free-running tuner clock. The step size adjustment 4644 allows the numerically controlled oscillator or NCO (represented at least by phase accumulator 4646 and wave table 4622) to adjust its phase to match incoming frequency drift. Averager 4642 is also involved in providing the multi-tone automatic frequency control; however, this process of adjusting for frequency drift is discussed in more detail with respect to the multi-tone automatic frequency control (AFC) of FIG. 47.

After separating the real and imaginary components of the incoming signals by multiplying by sine and cosine waves (properly adjusted for by the AFC of FIG. 47), the outputs are fed into decimation by 4 blocks 4624 and 4626 to reduce the sample rate from 27 MHz down to 6.75 MHz. The signals from decimation by 4 blocks 4624 and 4626 are passed to first-in, first-out (FIFO) buffer 4628, before entering FDM demodulator 4632. In general FDM demodulator 4632 in FIG. 46 comprises the 16 bank poly-phase filter 4506, the 16 point FFT 4508, and portions of blocks 4510 and 4512 of FIG. 45. In addition, in the preferred embodiments of the present invention, each of the 14 tones has its own control loop to handle automatic gain control, symbol timing recovery, and baseband (carrier) phase rotation as shown in block 4510 of FIG. 45. For each of the fourteen tones, a decision is made on each axis of the symbol map (constellation). In addition, the resulting symbols are de-spun in order to regenerate the original symbol phases used by the modulator of the cTM. Next the symbol is differentially decoded in block 4512 of FIG. 45 to restore the bits streams for the FEC decoder. In the more detailed FIG. 46, FDM demodulator 4632 first passes the demodulated signals to FIFO 4634. Then the symbol de-map and FEC of the 14 channels is performed in block 4636 before the bit streams are passed to the inverse multiplex sublayer 4638. In general, some of the functions of the blocks in FIG. 46 such as symbol demap are shown consolidated with the forward error correction in block 4636 only to simplify the drawing. This combination of various functions into blocks is not meant to imply any limitations on the hardware implementations of the preferred embodiments of the present invention. In general, one skilled in the art is adept at mapping functional block diagrams to specific hardware implementations.

FIG. 46 also shows one potential clock delivery system. A 162 MHz voltage controlled crystal oscillator (VCXO) 4670 is shown as the master clock for the TMTS in the preferred embodiments of the present invention. One skilled in the art will be aware of many ways of reducing high frequency clocks using various divide-by functions, so one skilled in the art will be aware of other ways of generating a 27 MHz clock that is often used in the preferred embodiments of the present invention. FIG. 46 shows the 162 MHz clock being synchronized with an 8 kHz stratum reference clock using a phase-locked loop (PLL) X 20,250 in block 4672. In addition, the 162 MHz clock from VCXO 4670 is delivered to divide by 3 block 4674, to divide by 6 block 4678, and to divide by 24 block 4676. The divide by 24 block 4676 provides a 6.75 MHz clock to decimators 4624 and 4626. The divide by 3 block 4674 and the divide by 6 block 4678 generate the 54 MHz and 27 MHz clocks respectively that supply clocking to various parts of FIG. 46. In particular, the output of divide by 3 block 4674 provides a clock to sync generator 4684, which further provides many of the clocking signals needed within quadrature downconverter 4612. One skilled in the art will be aware of details of interfacing various hardware and/or software logic using the proper timing signals to provide input to one portion of hardware and/or software based on providing output from another portion of hardware and/or software. However, notice that tuner 4606 has its own internal crystal reference that is not frequency locked to the other clocks shown in FIG. 46. The multi-tone AFC (automatic frequency control) of FIG. 47 corrects for this clock problem with respect to the free-running tuner 4606.

Figure 47:
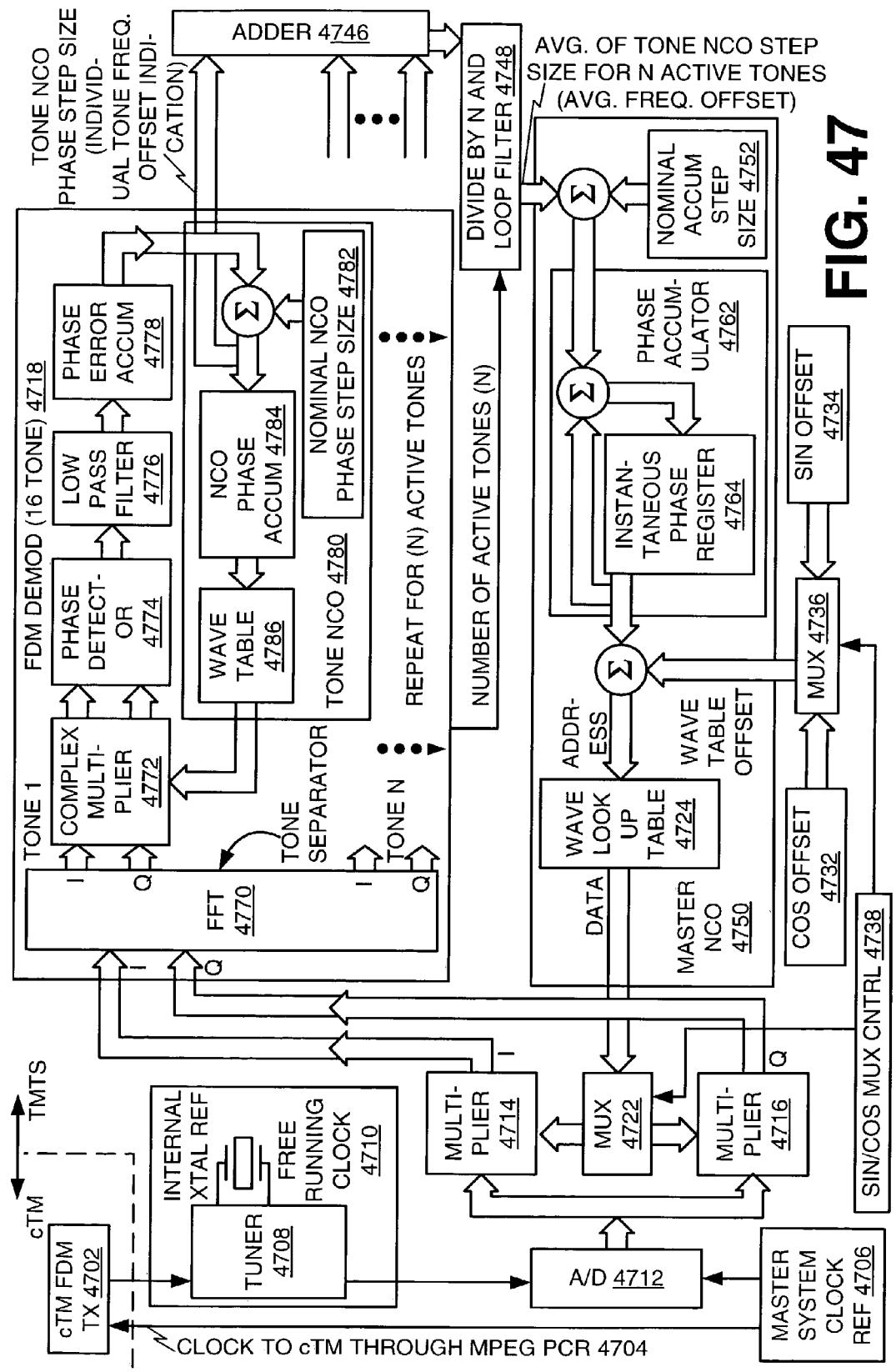
FIG. 47 shows a block diagram of a multi-tone automatic frequency control.

Moving now to the block diagram of the multi-tone automatic frequency control (AFC) capability in FIG. 47, the dashed line separates the portion FIG. 47 that is the TMTS and the part of FIG. 47 that is the cTM. Almost all of FIG. 47 relates to the TMTS; however, the cTM FDM upstream transmitter 4702 is shown receiving its clock through the MPEG PCR 4704. This downstream delivery of clock based on the master system clock reference 4706 in the TMTS synchronizes the clock of the cTM. But the tuner 4708 used in the TMTS for the preferred embodiments of the present invention has it own internal crystal oscillator reference. Therefore, this results in the tuner having a free running clock 4710. The multi-tone AFC of FIG. 47 corrects for this free running clock 4710 of the tuner 4708.

Because of the frequency instability of tuner 4708 and its free-running clock 4710, an unknown amount of frequency error will be present in the intermediate frequency signal applied to the upstream demodulator. To handle this problem an average of the individual frequency errors of all the active tones, which could be from 1 to 14, is used as a feedback signal to cause adjustment of a master numerically controller oscillator (NCO) 4750 in the quadrature downconverter 4612 that provides input into FDM demodulator 4718. This automatic frequency control (AFC) operation will tend to cause the frequency error to be almost zero as perceived by the FDM demodulator 4718, thus canceling out the problems of the free-running clock 4710 in the tuner 4708.

The multi-tone AFC of FIG. 47 will compensate for frequency shifts that occur contemporaneously across all the active tones of a 6 MHz channel block. Thus, the multi-tone AFC of FIG. 47 may correct for frequency drift due to the free running clock 4710 in the tuner 4708 as well as for any miscellaneous frequency drift in block converters of a cable transmission network. However, in general the multi-tone AFC of FIG. 47 generally does not handle frequency drift of an individual tone whose frequency becomes unlocked relative to the other tones. Also multi-tone AFC generally tends to correct the most common frequency drifts experienced by a group of tones in a channel block because the averaging across multiple tones will tend to correct problems seen by tones on average, but not the uncommon occurrence of frequency drift on one active tone out of many active tones. Also, the multi-tone AFC of FIG. 47 automatically adjusts to changes in the number of active tones.

The multi-tone AFC system operates by observing the amount of frequency error in each individual tone at the output of frequency division demodulator 4718. The frequency error of each of the phase corrections for all the active tones of a channel block are added together in adder 4746. Then divide by N and loop control 4748 computes the average of the frequency error. The number of active tones, N, is communicated from the FDM demod 4718 to divide by N and loop control 4748.

A number representing the average amount of frequency error based on the average of all the frequency errors is summed with the nominal accumulator step size to determine the size of the next step for the wave table 4724. Phase accumulator 4762 keeps track of the current instantaneous phase value in instantaneous phase register 4764. By adding the current accumulated value of the phase (in block 4762) to the amount of phase change based on the nominal step size (in block 4752) plus a number proportional to the average frequency error for all N tones (in block 4748), the next value for indexing into the wave table 4724 can be computed in instantaneous phase register 4764. The wave table 4724 stores at least a portion of the digitized values for a sinusoidal wave at the proper frequency. The value of the instantaneous phase register is summed with an offset of either a cosine or a sine wave as stored in cosine offset 4732 and sine offset 4734. By adding the proper offset of either sine or cosine, one wave table 4724 can produce both waves. The instantaneous phase register 4764 plus an offset for either sine or cosine results in the generation of the address in the wave table 4724 used to look up the proper digitized value of the sine or cosine wave. Selection of sine or cosine is controlled by sin/cos multiplexer 4738, which sends control signals to mux 4736 and mux 4722. The digitized value of the sinusoidal wave from the wave table memory 4724 is output as data to mux 4722. Then depending on whether sin or cosine multiplication is being done as determined by sin/cos mux control 4738, the sine and/or cosine data from the wave table 4724 will be multiplied in multipliers 4714 and/or 4716 with the incoming signals from the A/D 4712. The outputs of the multipliers result in the in-phase and quadrature phase signals to the FDM demodulator 4718.

In the preferred embodiments of the present invention, FDM demodulator 4718 further comprises fast Fourier transform (FFT) 4770 that separates the tones. Then at least for each active tone, the output of FFT 4770 is passed into complex multiplier 4772, which also receives input from wave table 4786 in tone numerically controlled oscillator (NCO) 4780. The output of complex multiplier 4772 is passed to phase detector 4774, which provides input to low pass filter 4776. The low pass filter 4776 provides input to phase error accumulator 4778. The output of phase error accumulator 4778 is added to the nominal numerically controlled oscillator (NCO) phase step size from block 4782. The output of this addition is an estimate of the frequency offset for an individual active tone. The value of this addition could be called a tone NCO phase step size or an individual tone frequency offset indication. The resulting value of this addition of the outputs of blocks 4478 and 4782 is provided as an input to NCO phase accumulator 4784 as well as to adder 4746. Also, adder 4746 receives similar inputs for each of the other tones. Based on the NCO phase accumulator 4784, a proper selection from wave table 4786 is made to adjust the tone NCO 4780 for the frequency error, with the adjusted values from the wave table 4786 providing input into complex multiplier 4772. The feedback loop through complex multiplier 4772, phase detector 4774, low pass filter 4776, phase error accumulator 4778 and through tone NCO 4780 is performed for each tone (or at least for each active tone). Thus, this feedback loop is repeated for each of the active tones.

More generally, the multi-tone AFC system of FIG. 47 observes the amount of frequency correction that is being performed by the phase rotators for each of the fourteen active tones. The AFC system averages the tone numerically controlled oscillator (NCO) 4780 step size from each active tone to generate a number representing the average frequency error. The tone NCO 4780 step size is a direct measure of the tone frequency when an FDM demodulator 4718 is "locked" to the incoming tone via its individual carrier-recovery loop. For a single active channel, the frequency error could be used by itself to provide input to the master numerically controlled oscillator (NCO) 4750 (as implemented by a wave table memory in the preferred embodiments of the present invention). However, with multiple active tones (potentially up to fourteen), it is hard to determine which tone is the best to use for input to the master NCO 4750. Thus, an average of all active tones may be more accurate. To perform an average, the FDM demodulator 4718 informs the divide by N and control loop 4748 about the number of active tones. (A determination of whether a tone is active or not can be performed in the automatic gain control signals.) To determine the average, the frequency error values are added together in adder 4746 before being divided by the number of active tones, N, to yield a steering signal to drive the composite loop.

The steering signal is then used to drive the master NCO 4750 in the Quadrature Modulator by incrementing or decrementing the phase step size. This is achieved by adding the steering signal to the nominal 90 degree step size that the master NCO 4750 makes when the frequency drift is zero (and when the NCO frequency is exactly 6.75 MHz). By adding slightly to the phase step size, the master NCO 4750 will step ahead slightly more than 90 degrees each clock cycle, thus emulating a frequency slightly higher than the nominal master NCO 4750 frequency of 6.75 MHz. By decrementing the step size (i.e. steering signal magnitude is negative) the master NCO 4750 will phase step ahead slightly less than 90 degrees thus emulating a frequency slightly lower than the nominal 6.75 MHz master NCO 4750 frequency. In either case the master NCO 4750 will be driven to match the incoming frequency thus nullifying any common frequency drift. The 90 degree step size is only a non-limiting example of a choice for the step size, and one skilled in the art will be aware that the numerically controlled oscillator (NCO) 4750 could be designed to operate in general on any arbitrary step size. A loop amplifier with appropriate filtering should be installed between the averager and the master NCO 4750 to control the loop dynamics to acceptable values.

To simplify master NCO 4750 wavetable lookup, only a 90 degree segment of the wavetable need be stored because of the 4 times redundant symmetry of a sinusoidal wave. In addition, only one table needs to be maintained to service both sine and cosine waveforms, as the table can be multiplexed at twice the 27 MHz sampling rate (or 54 MHz). Also, the mechanism can be further simplified by optionally adding an offset to the phase accumulator output that representing 90 degrees of phase shift, so that the master NCO 4750 output will generate either cosine or sine waveforms. The downstream modulation parameters of the preferred embodiments of the present invention are specified in Table 7.

TABLE 7

Upstream Demodulation Parameters

| Parameter | Value |
|---|---|
| Symbol rate, Rs | 337.5 kilosymbols/second |
| Alpha factor, a | 0.25 |
| Modulator pulse shaping | Root-Nyquist raised cosine |
| Demodulator pulse shaping | Root-Nyquist raised cosine |
| Tone spacing = (1 + alpha) X Rs | 421.875 kHz |
| Tone occupied bandwidth | 421.875 kHz |
| FFT size | 16-point |
| No. Tones (usable) | 14 |
| Channel Occupied bandwidth | 5.90625 MHz |
| Modulation indices | n = 2  b/s/Hz  QPSK |
|  | n = 4  b/s/Hz  16-QAM |
|  | n = 6  b/s/Hz  64-QAM |
|  | n = 8  b/s/Hz  256-QAM |
| Constellation | Standard rectangular QAM |
| Decimation factor before FDM Demod | x ¼ |
| Rates & Frequencies | |
| 1$^{st}$ Intermediate Frequency | 47.25 MHz |
| 2$^{nd}$ Intermediate Frequency | 6.75 MHz |
| A-to-D Sampling Rate | 27 MHz |
| NCO Sampling Rate | 27 MHz |
| NCO Nominal Frequency | 6.75 MHz |
| Output of Quadrature Down Converter = 16 * 1.25 * 337.5 E3 = | 6.75 MHz |

Figure 48:
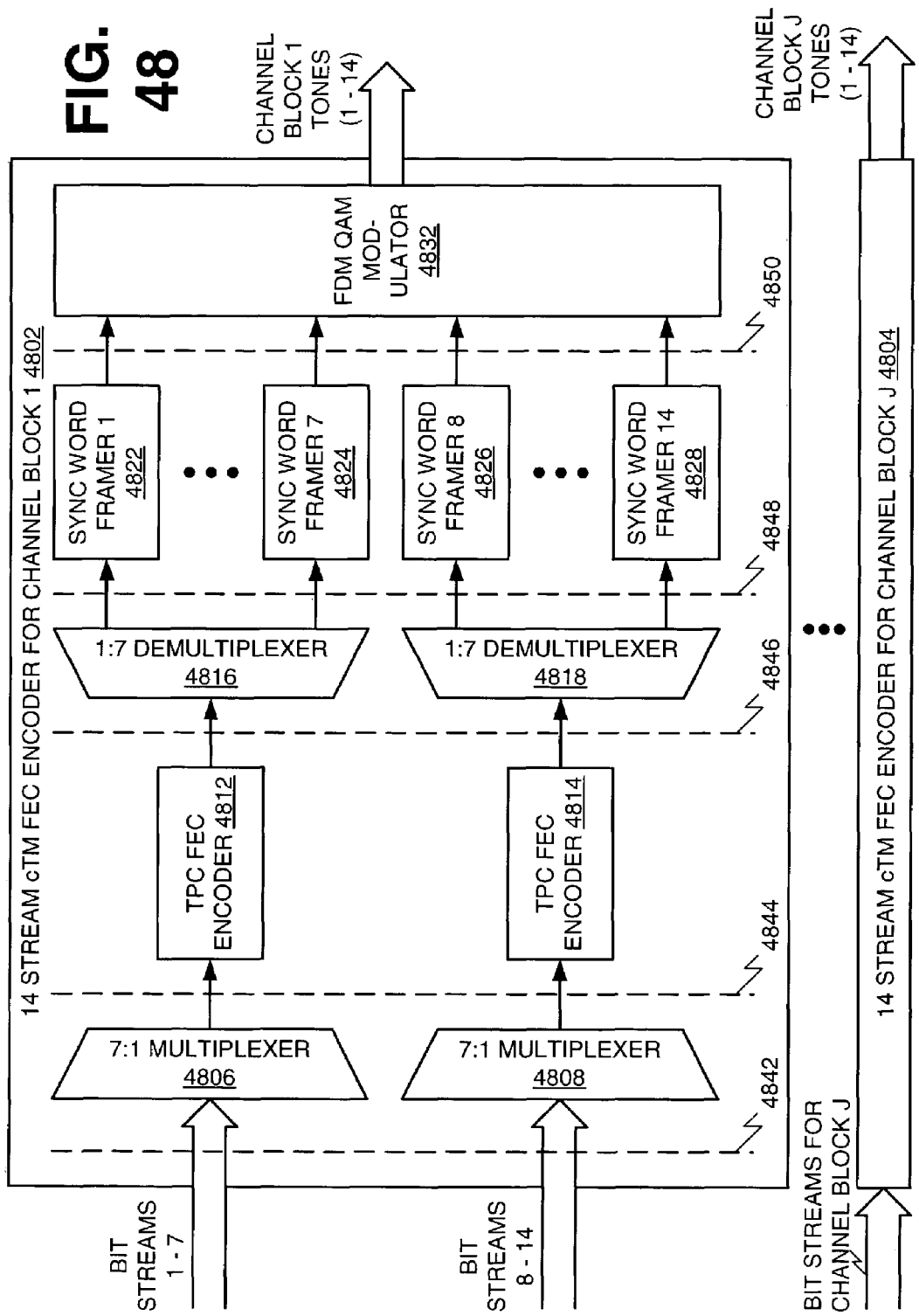
FIG. 48 shows a block diagram of an upstream FEC encoder in the cTM.

Upstream Forward Error Correction (FEC) and Non-Limiting Example with Four Active Upstream Tones at 256 QAM, 64 QAM, 16 QAM, and QPSK Respectively FIG. 48 shows the upstream forward error correction (FEC) processing of the cTM. In the preferred embodiments of the present invention, a cTM may support one or more 14 tone upstream FEC encoders for channel blocks 1 through J (items 4802 and 4804). Each FEC encoder supports 14 upstream bit streams that may be sent over fourteen tones. As discussed previously, in the preferred embodiments of the present invention a turbo product code (TPC) FEC is utilized. The hardware of the TPC FEC encoder only has enough processing power to handle 7 tones, so two TPC FEC encoders 4812 and 4814 are utilized in parallel. Also, the bit streams for tones 1 through 7 and tones 8 through 14 are multiplexed (items 4806 and 4808) into and demultiplexed (items 4816 and 4818) out of TPC FEC encoders 4812 and 4814, respectively. Sync word framers 4822, 4824, 4826, and 4828 provide sync word framing to align the FEC encoded blocks. These FEC encoded bit streams are then passed to FDM QAM modulator 4832.

The dashed lines in FIG. 48 indicate various portions of an example of passing bit streams through the FEC encoders. Dashed line 4842 corresponds to FIG. 49, dashed line 4844 corresponds to FIG. 50, dashed line 4846 corresponds to FIG. 51, dashed line 4848 corresponds to FIG. 52, and dashed line 4850 corresponds to FIG. 53. For FIGS. 49–53 and 55–58, tone 1 is at QAM index 8; tone 2 is at QAM index 6; tone 3 is at QAM index 4; tone 4 is at QAM index 2; and the rest of the tones are unused.

Figure 49:
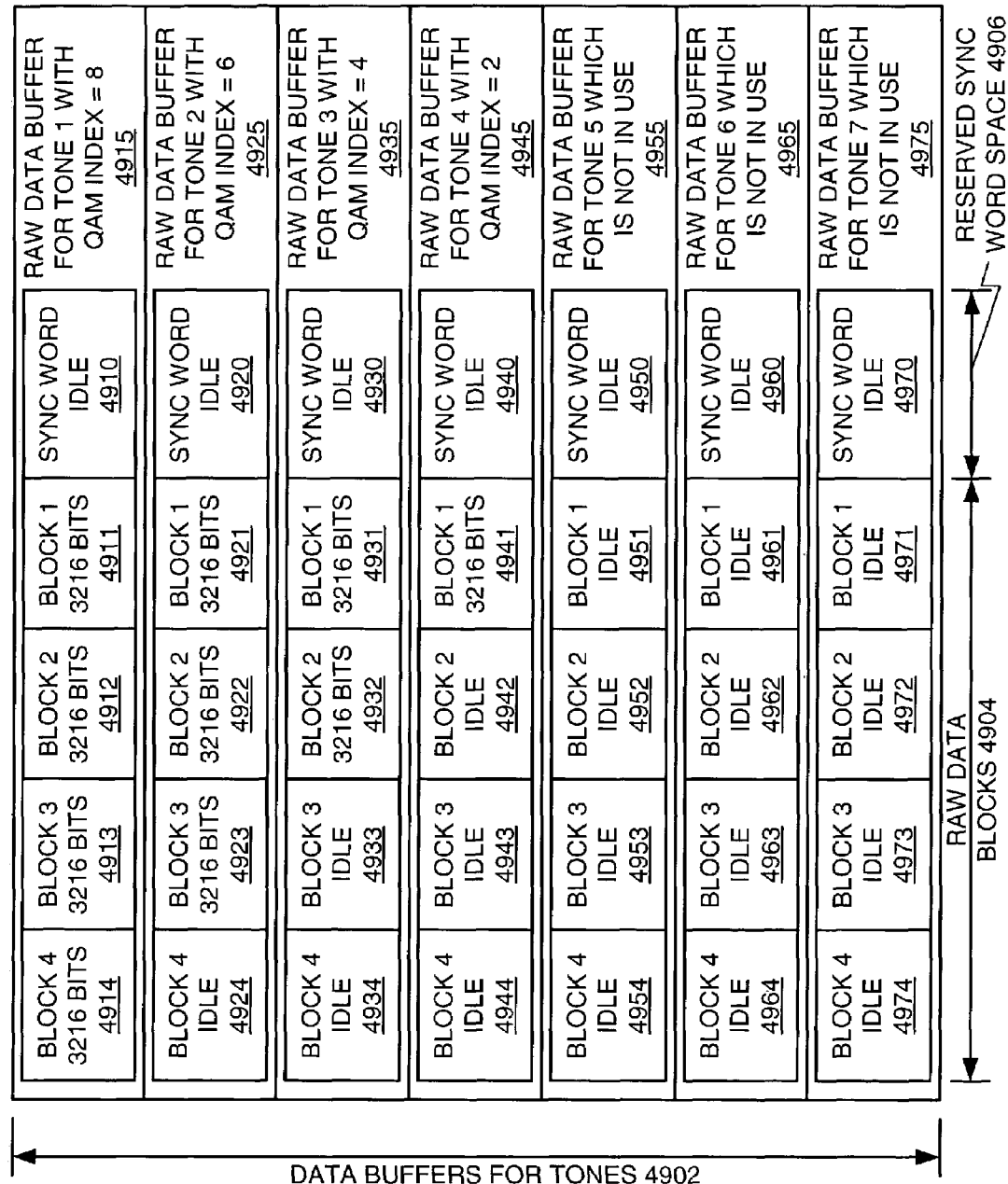
FIGS. 49–53 show an example of the operation of the FEC encoder from FIG. 48.

In FIG. 49, the rows 4902 specify the data buffers for the tones, while the columns generally specify either the raw data blocks 4904 or the reserved sync word space 4906. The raw data buffer for tone 1 4915 includes sync word 4910, block 1 4911, block 2 4912, block 3 4913, and block 4 4914. The raw data buffer for tone 2 4925 includes sync word 4920, block 1 4921, block 2 4922, block 3 4923, and block 4 4924. The raw data buffer for tone 3 4935 includes sync word 4930, block 1 4931, block 2 4932, block 3 4933, and block 4 4934. The raw data buffer for tone 4 4945 includes sync word 4940, block 1 4941, block 2 4942, block 3 4943, and block 4 4944. The raw data buffer for tone 5 4955 includes sync word 4950, block 1 4951, block 2 4952, block 3 4953, and block 4 4954. The raw data buffer for tone 6 4965 includes sync word 4960, block 1 4961, block 2 4962, block 3 4963, and block 4 4964. The raw data buffer for tone 7 4975 includes sync word 4970, block 1 4971, block 2 4972, block 3 4973, and block 4 4974. Some of the blocks contain data, while others are idle. The raw data blocks are 3216 bits each.

Figure 50:
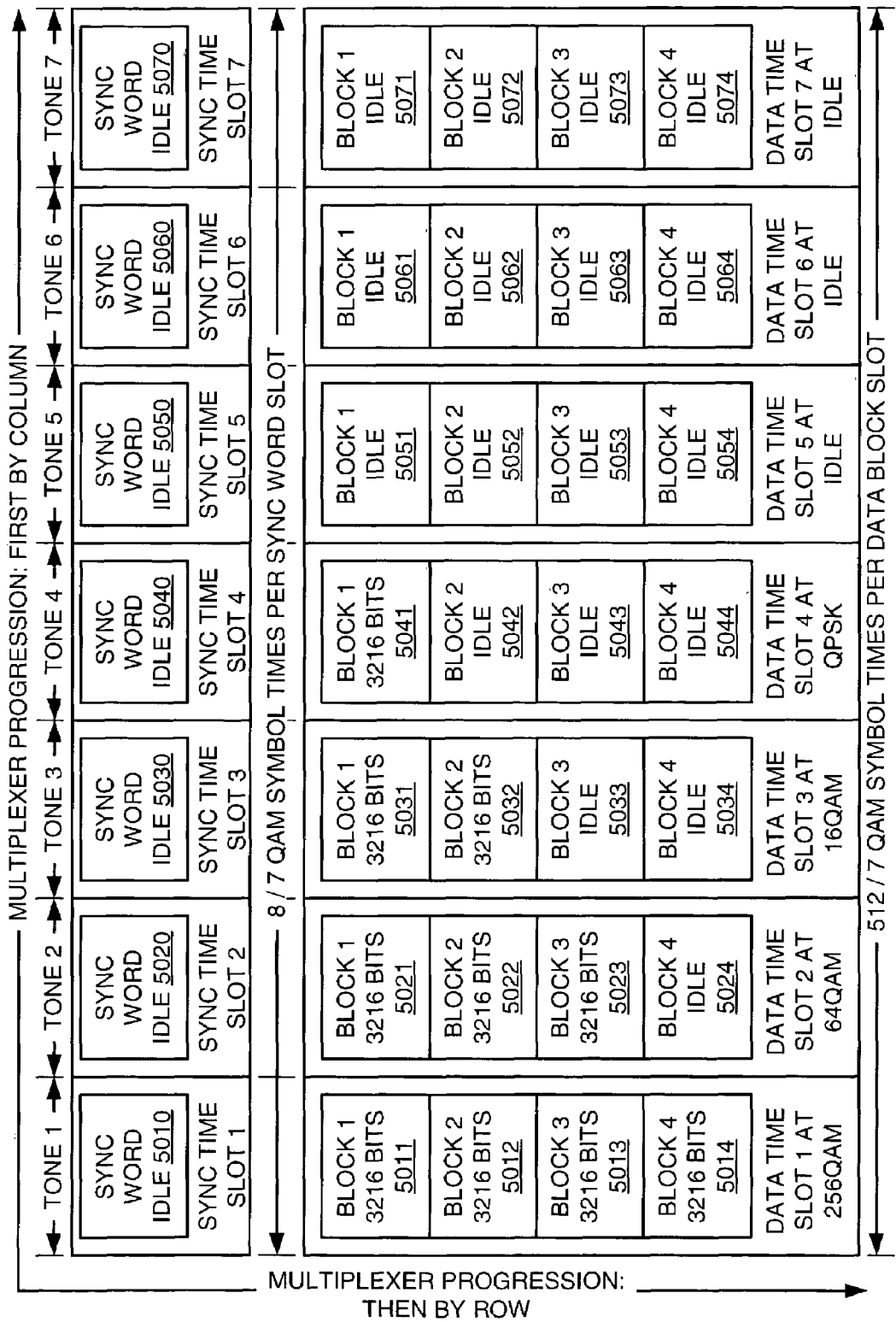

In FIG. 50, the columns generally represent the seven tones, and the rows represent the blocks and or sync word positions. Tone 1 comprises sync word 5010, block 1 5011, block 2 5012, block 3 5013, and block 4 5014. Tone 2 comprises sync word 5020, block 1 5021, block 2 5022, block 3 5023, and block 4 5024. Tone 3 comprises sync word 5030, block 1 5031, block 2 5032, block 3 5033, and block 4 5034. Tone 4 comprises sync word 5040, block 1 5041, block 2 5042, block 3 5043, and block 4 5044. Tone 5 comprises sync word 5050, block 1 5051, block 2 5052, block 3 5053, and block 4 5054. Tone 6 comprises sync word 5060, block 1 5061, block 2 5062, block 3 5063, and block 4 5064. Tone 7 comprises sync word 5070, block 1 5071, block 2 5072, block 3 5073, and block 4 5074. Some of the blocks contain 3216 bit blocks of raw data while some of the blocks are empty (i.e., idle).

Figure 51:
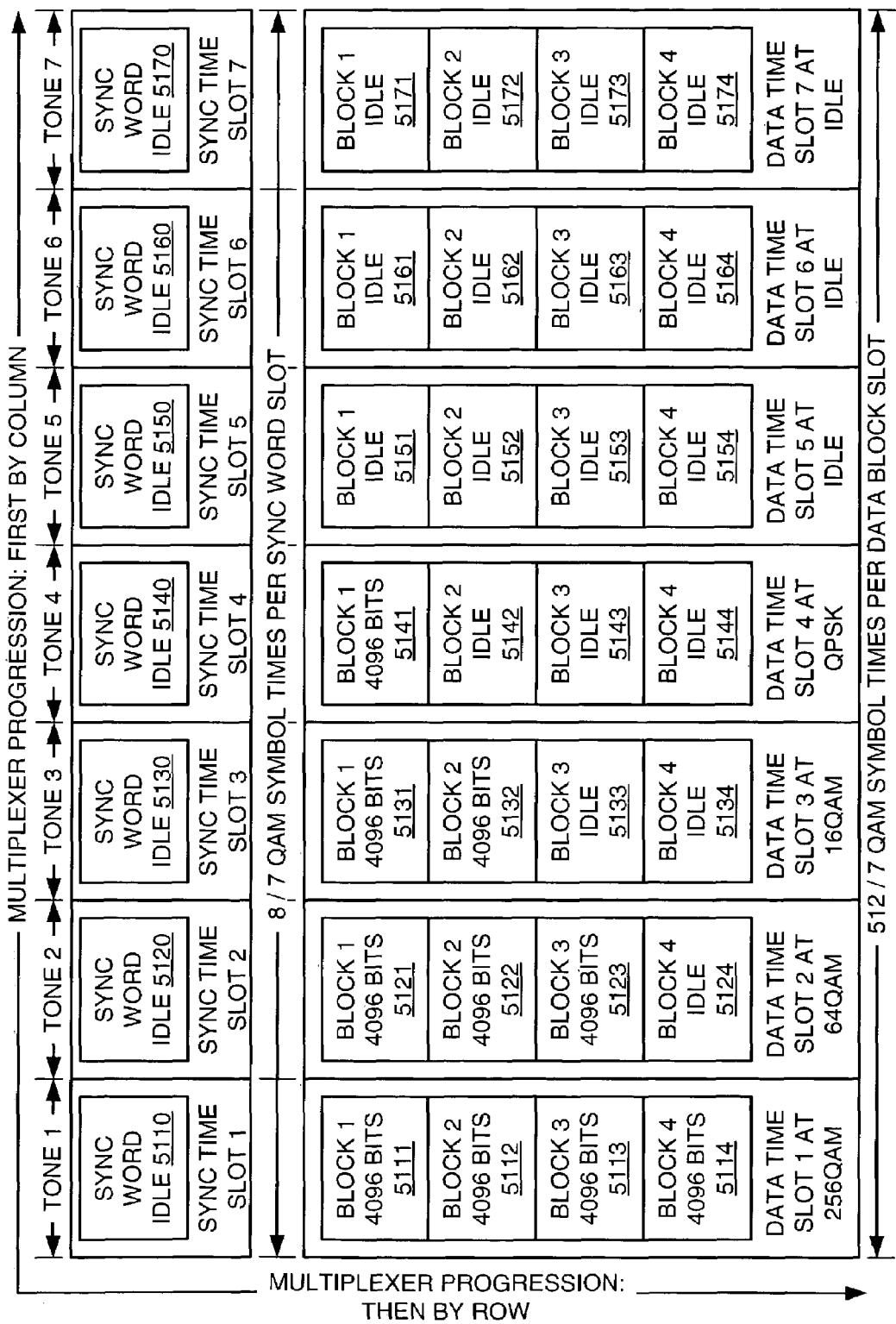

In FIG. 51, the columns generally represent the seven tones, and the rows represent the blocks and or sync word positions. Tone 1 comprises sync word 5110, block 1 5111, block 2 5112, block 3 5113, and block 4 5114. Tone 2 comprises sync word 5120, block 1 5121, block 2 5122, block 3 5123, and block 4 5124. Tone 3 comprises sync word 5130, block 1 5131, block 2 5132, block 3 5133, and block 4 5134. Tone 4 comprises sync word 5140, block 1 5141, block 2 5142, block 3 5143, and block 4 5144. Tone 5 comprises sync word 5150, block 1 5151, block 2 5152, block 3 5153, and block 4 5154. Tone 6 comprises sync word 5160, block 1 5161, block 2 5162, block 3 5163, and block 4 5164. Tone 7 comprises sync word 5170, block 1 5171, block 2 5172, block 3 5173, and block 4 5174. Some of the blocks contain 4096 bit blocks of FEC encoded data while some of the blocks are empty (i.e., idle).

Figure 52:
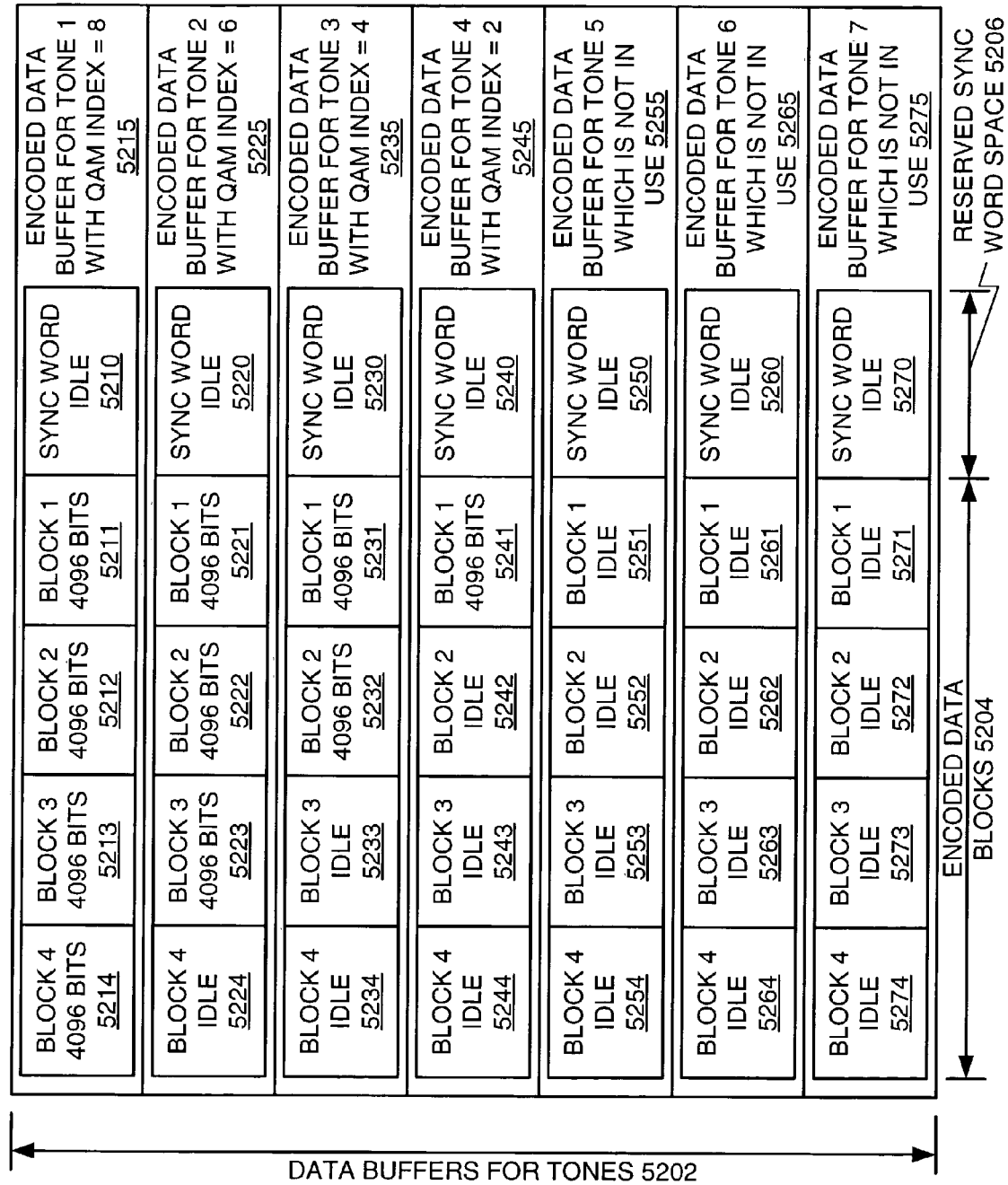

In FIG. 52, the rows 5202 specify the data buffers for the tones, while the columns generally specify either the FEC encoded blocks 5204 or the reserved sync word space 5206. The raw data buffer for tone 1 5215 includes sync word 5210, block 1 5211, block 2 5212, block 3 5213, and block 4 5214. The raw data buffer for tone 2 5225 includes sync word 5220, block 1 5221, block 2 5222, block 3 5223, and block 4 5224. The raw data buffer for tone 3 5235 includes sync word 5230, block 1 5231, block 2 5232, block 3 5233, and block 4 5234. The raw data buffer for tone 4 5245 includes sync word 5240, block 1 5241, block 2 5242, block 3 5243, and block 4 5244. The raw data buffer for tone 5 5255 includes sync word 5250, block 1 5251, block 2 5252, block 3 5253, and block 4 5254. The raw data buffer for tone 6 5265 includes sync word 5260, block 1 5261, block 2 5262, block 3 5263, and block 4 5264. The raw data buffer for tone 7 5275 includes sync word 5270, block 1 5271, block 2 5272, block 3 5273, and block 4 5274. Some of the blocks contain data, while others are idle. The FEC encoded data blocks are 4096 bits each.

Figure 53:
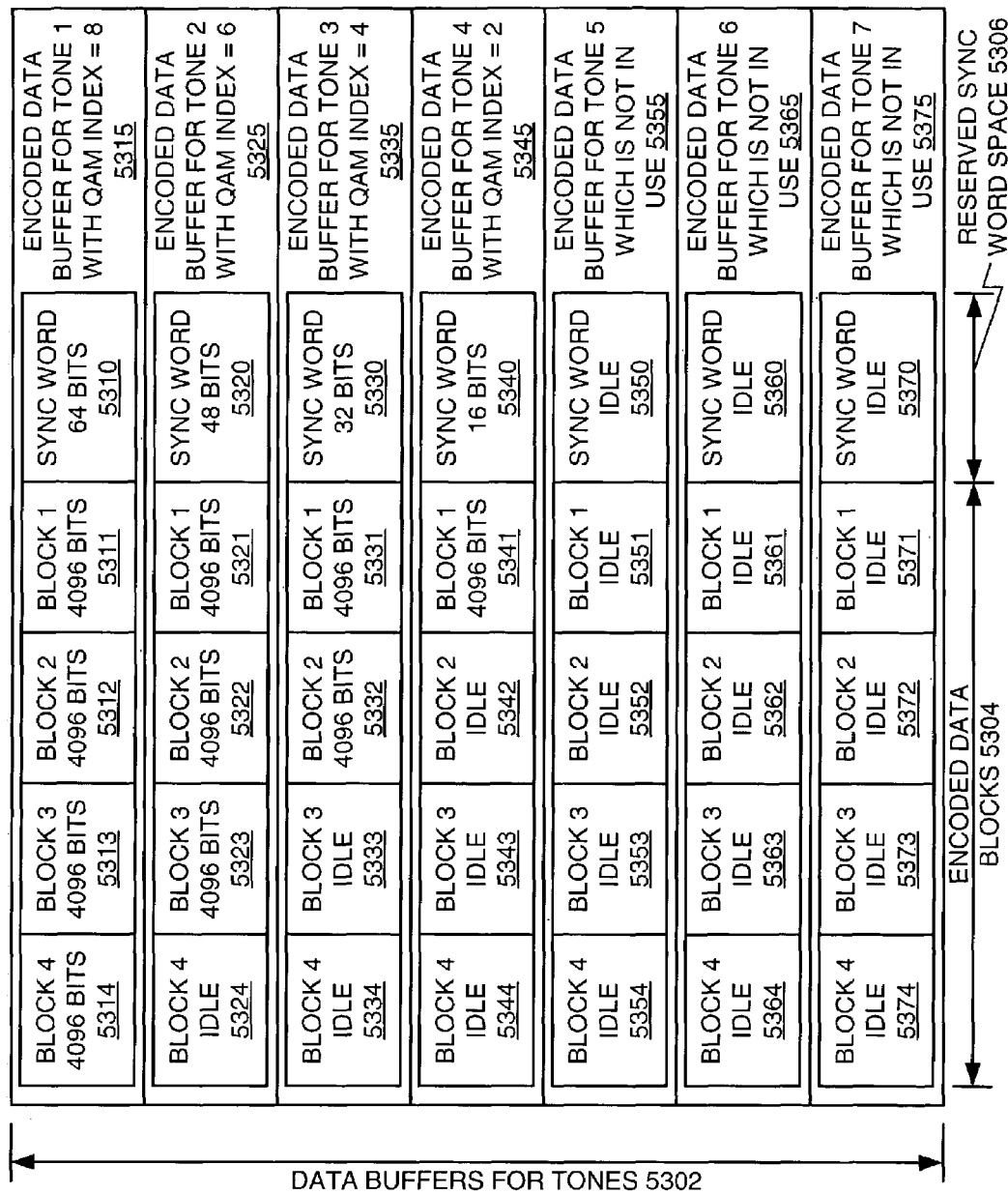

In FIG. 53, the rows 5302 specify the data buffers for the tones, while the columns generally specify either the FEC encoded blocks 5304 or the reserved sync word space 5306. The raw data buffer for tone 1 5315 includes sync word 5310, block 1 5311, block 2 5312, block 3 5313, and block 4 5314. The raw data buffer for tone 2 5325 includes sync word 5320, block 1 5321, block 2 5322, block 3 5323, and block 4 5324. The raw data buffer for tone 3 5335 includes sync word 5330, block 1 5331, block 2 5332, block 3 5333, and block 4 5334. The raw data buffer for tone 4 5345 includes sync word 5340, block 1 5341, block 2 5342, block 3 5343, and block 4 5344. The raw data buffer for tone 5 5355 includes sync word 5350, block 1 5351, block 2 5353, block 3 5353, and block 4 5354. The raw data buffer for tone 6 5365 includes sync word 5360, block 1 5361, block 2 5362, block 3 5363, and block 4 5364. The raw data buffer for tone 7 5375 includes sync word 5370, block 1 5371, block 2 5372, block 3 5373, and block 4 5374. Some of the blocks contain data, while others are idle. The FEC encoded data blocks are 4096 bits each. Also, in FIG. 53, the sync words of active tones 5310, 5320, 5330, and 5340 have been filled with 0x47 octet values for a number of bits equal to the QAM index times 8.

Figure 54:
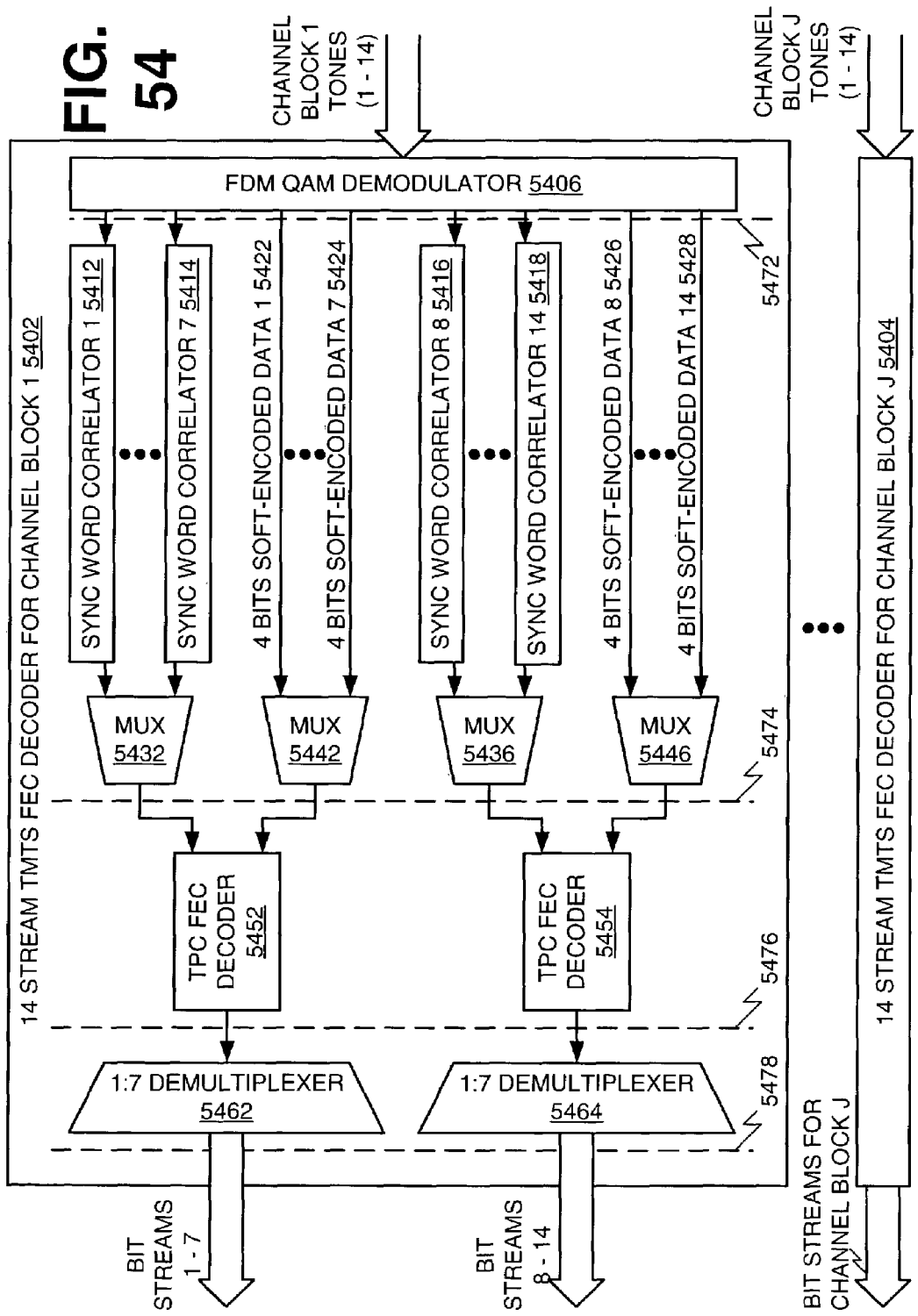
FIG. 54 shows a block diagram of an upstream FEC decoder in the TMTS.

FIG. 54 shows a block diagram of the FEC decoder(s) of the TMTS. Incoming data for an upstream channel of 14 tones is passed into one of J FEC decoders (items 5402 and 5404) to support up to J channel blocks of 6 MHz each. The tones are initially communicated into FDM QAM demodulator 5406. As described previously, the FEC decoding hardware used in the preferred embodiments of the present invention only has enough processing horsepower to handle seven-bit streams at the data rates of the preferred embodiments of the present invention. Thus, two sets of hardware are used in parallel to support the 14 tones. From the FDM QAM demodulator 5406, the sync words are correlated in sync word correlators 1–14 (5412, 5414, 5416, and 5418). In the preferred embodiments of the present invention soft decoding of four bits per incoming bit is used to attempt to improve the performance of the system. One skilled in the art will be aware of various soft decoding techniques and the trade-offs between soft-decoding and hard-decoding. The soft-encoded bit streams 5422, 5424, 5226, and 5428 are input into multiplexers 5442 and 5446, while the sync word correlators are input into multiplexers 5442 and 5446. The multiplexers 5432, 5442, 5436, and 5446 provide input to the turbo product code (TPC) FEC decoders 5452 and 5454. One skilled in the art will be aware that other FEC techniques could be used instead of turbo product codes. The 1:7 demultiplexers 5462 and 5464 handle generating the decoded bit streams for the 14 upstream tones in a channel block.

The dashed lines in FIG. 54 indicate various portions of an example of passing bit streams through the FEC decoders. Dashed line 5472 corresponds to FIG. 55, dashed line 5474 corresponds to FIG. 56, dashed line 5476 corresponds to FIG. 57, and dashed line 5478 corresponds to FIG. 58. For FIGS. 49–53 and 55–58, tone 1 is at QAM index 8; tone 2 is at QAM index 6; tone 3 is at QAM index 4; tone 4 is at QAM index 2; and the rest of the tones are unused.

Figure 55:
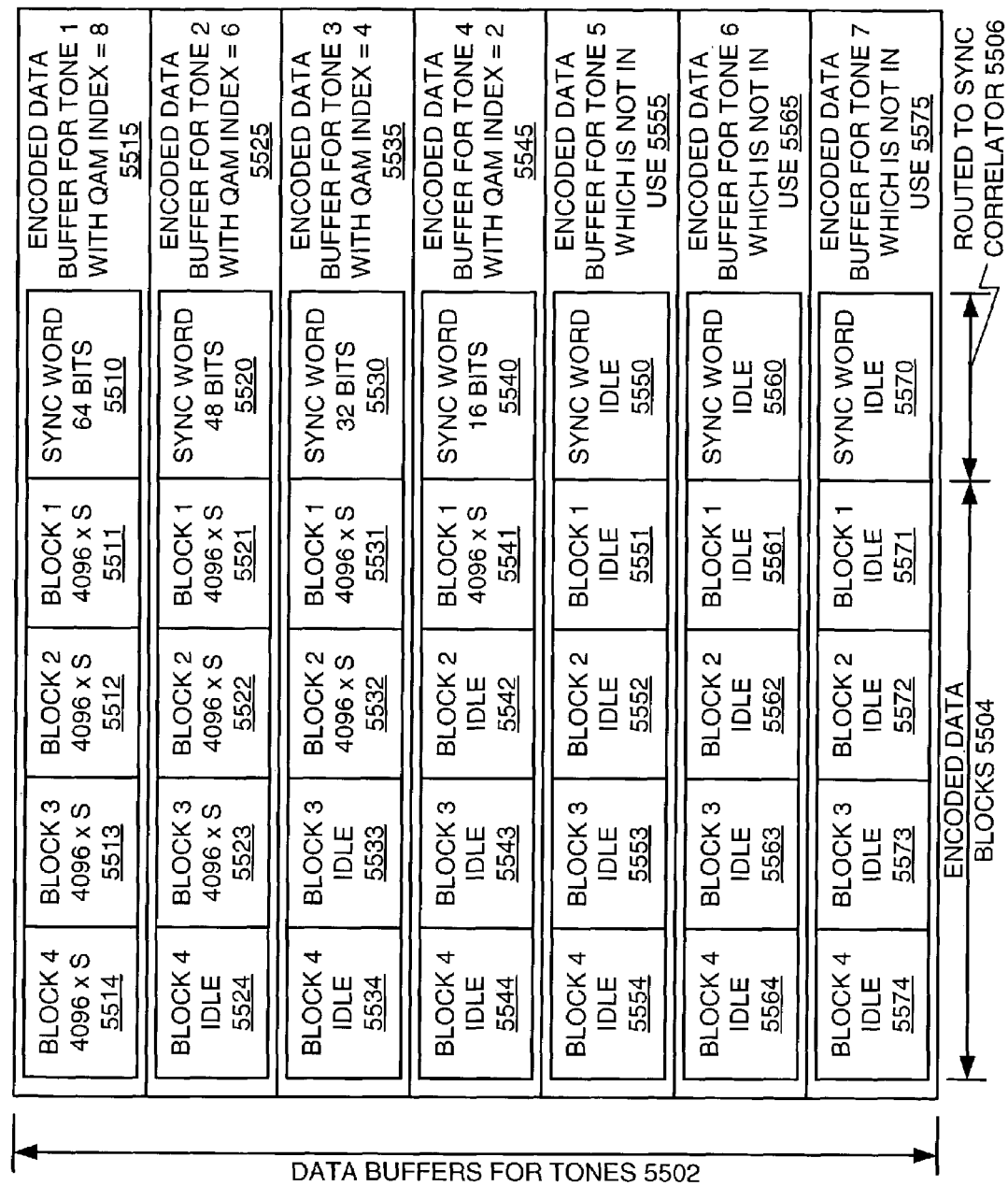
FIGS. 55–58 show an example of the operation of the FEC decoder from FIG. 54.

In FIG. 55, the rows 5502 specify the data buffers for the tones, while the columns generally specify either the FEC encoded blocks 5504 or the sync word 5506 routed to the sync correlator. The raw data buffer for tone 1 5515 includes sync word 5510, block 1 5511, block 2 5512, block 3 5513, and block 4 5514. The raw data buffer for tone 2 5525 includes sync word 5520, block 1 5521, block 2 5522, block 3 5523, and block 4 5524. The raw data buffer for tone 3 5535 includes sync word 5530, block 1 5531, block 2 5532, block 3 5533, and block 4 5534. The raw data buffer for tone 4 5545 includes sync word 5540, block 1 5541, block 2 5542, block 3 5543, and block 4 5544. The raw data buffer for tone 5 5555 includes sync word 5550, block 1 5551, block 2 5552, block 3 5553, and block 4 5554. The raw data buffer for tone 6 5565 includes sync word 5560, block 1 5561, block 2 5562, block 3 5563, and block 4 5564. The raw data buffer for tone 7 5575 includes sync word 5570, block 1 5571, block 2 5572, block 3 5573, and block 4 5574. Some of the blocks contain data, while others are idle. The FEC encoded data blocks are 4096X S bits each. The S bits are used in soft decoding as is known by one of ordinary skill in the art. Soft-decoding may pass some information on the decisions of the QAM symbol selection to the FEC decoder. Sometimes this process may yield improved performance over hard decoding. In the preferred embodiments of the present invention, S is four bits per one bit of encoded data. Also, in FIG. 55, the sync words of active tones 5510, 5520, 5530, and 5540 have 0x47 octet values for a number of bits equal to the QAM index times 8.

Figure 56:
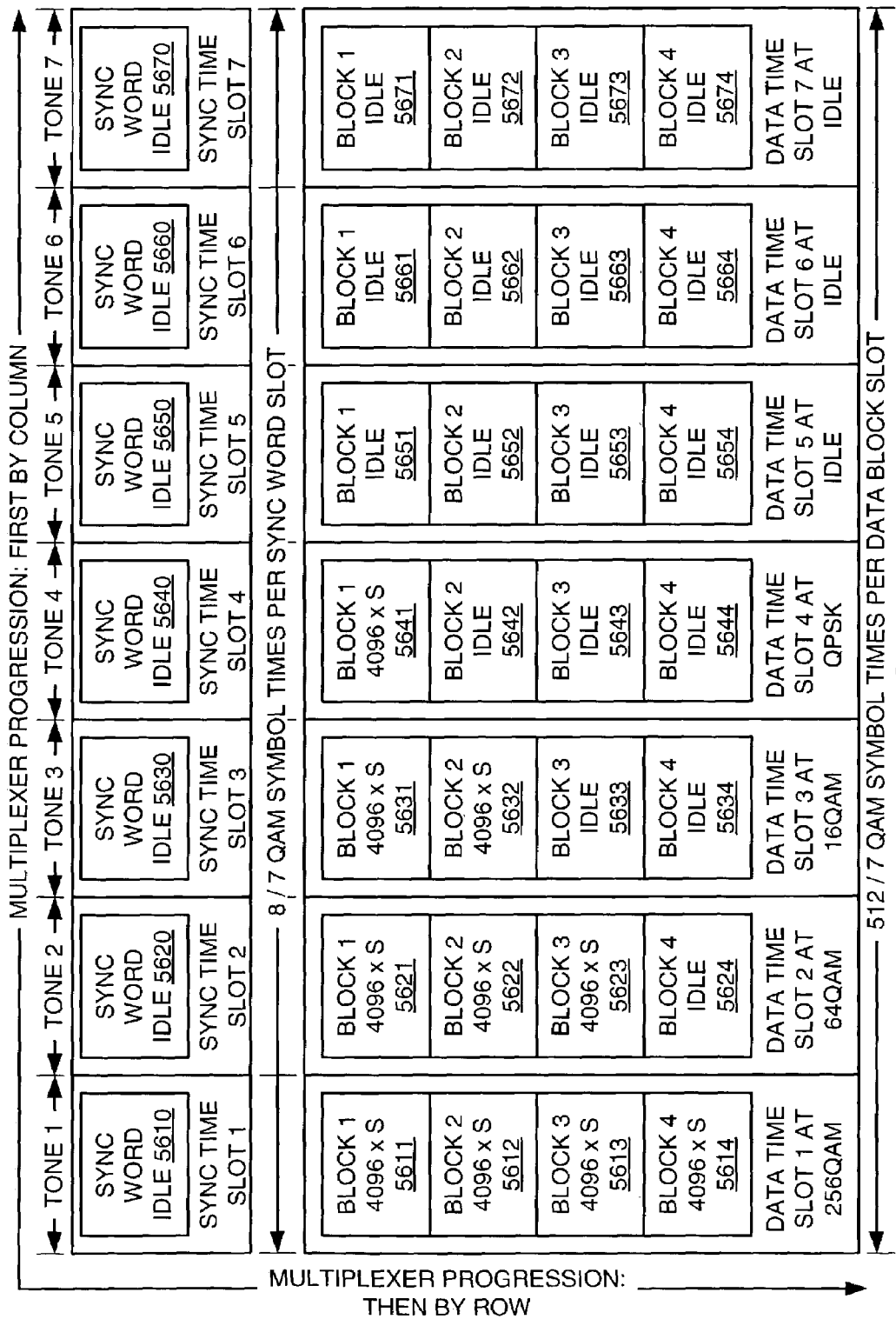

In FIG. 56, the columns generally represent the seven tones, and the rows represent the blocks and or sync word positions. Tone 1 comprises sync word 5610, block 1 5611, block 2 5612, block 3 5613, and block 4 5614. Tone 2 comprises sync word 5620, block 1 5621, block 2 5622, block 3 5623, and block 4 5624. Tone 3 comprises sync word 5630, block 1 5631, block 2 5632, block 3 5633, and block 4 5634. Tone 4 comprises sync word 5640, block 1 5641, block 2 5642, block 3 5643, and block 4 5644. Tone 5 comprises sync word 5650, block 1 5651, block 2 5652, block 3 5653, and block 4 5654. Tone 6 comprises sync word 5660, block 1 5661, block 2 5662, block 3 5663, and block 4 5664. Tone 7 comprises sync word 5670, block 1 5671, block 2 5672, block 3 5673, and block 4 5674. Some of the blocks contain data while some of the blocks are empty (i.e., idle). The FEC encoded data blocks are 4096 X S bits each. The S bits are used in soft decoding as is known by one of ordinary skill in the art. Soft-decoding may pass some information on the decisions of the QAM symbol selection to the FEC decoder. Sometimes this process may yield improved performance over hard decoding. In the preferred embodiments of the present invention, S is four bits per one bit of encoded data.

Figure 57:
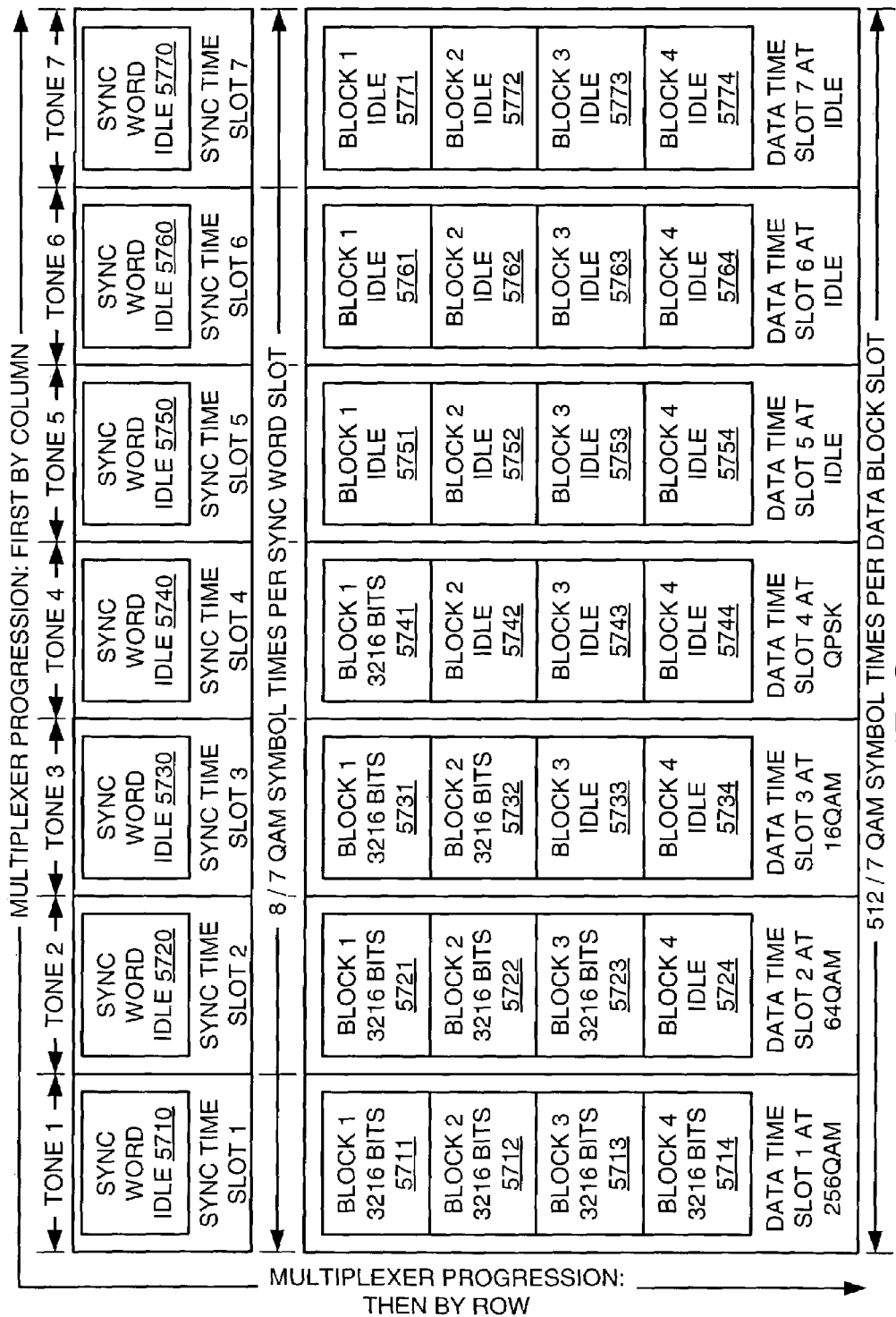

In FIG. 57, the columns generally represent the seven tones, and the rows represent the blocks and or sync word positions. Tone 1 comprises sync word 5710, block 1 5711, block 2 5712, block 3 5713, and block 4 5714. Tone 2 comprises sync word 5720, block 1 5721, block 2 5722, block 3 5723, and block 4 5724. Tone 3 comprises sync word 5730, block 1 5731, block 2 5732, block 3 5733, and block 4 5734. Tone 4 comprises sync word 5740, block 1 5741, block 2 5742, block 3 5743, and block 4 5744. Tone 5 comprises sync word 5750, block 1 5751, block 2 5752, block 3 5753, and block 4 5754. Tone 6 comprises sync word 5760, block 1 5761, block 2 5762, block 3 5763, and block 4 5764. Tone 7 comprises sync word 5770, block 1 5771, block 2 5772, block 3 5773, and block 4 5774. Some of the blocks contain 3216 bit blocks of decoded data while some of the blocks are empty (i.e., idle).

Figure 58:
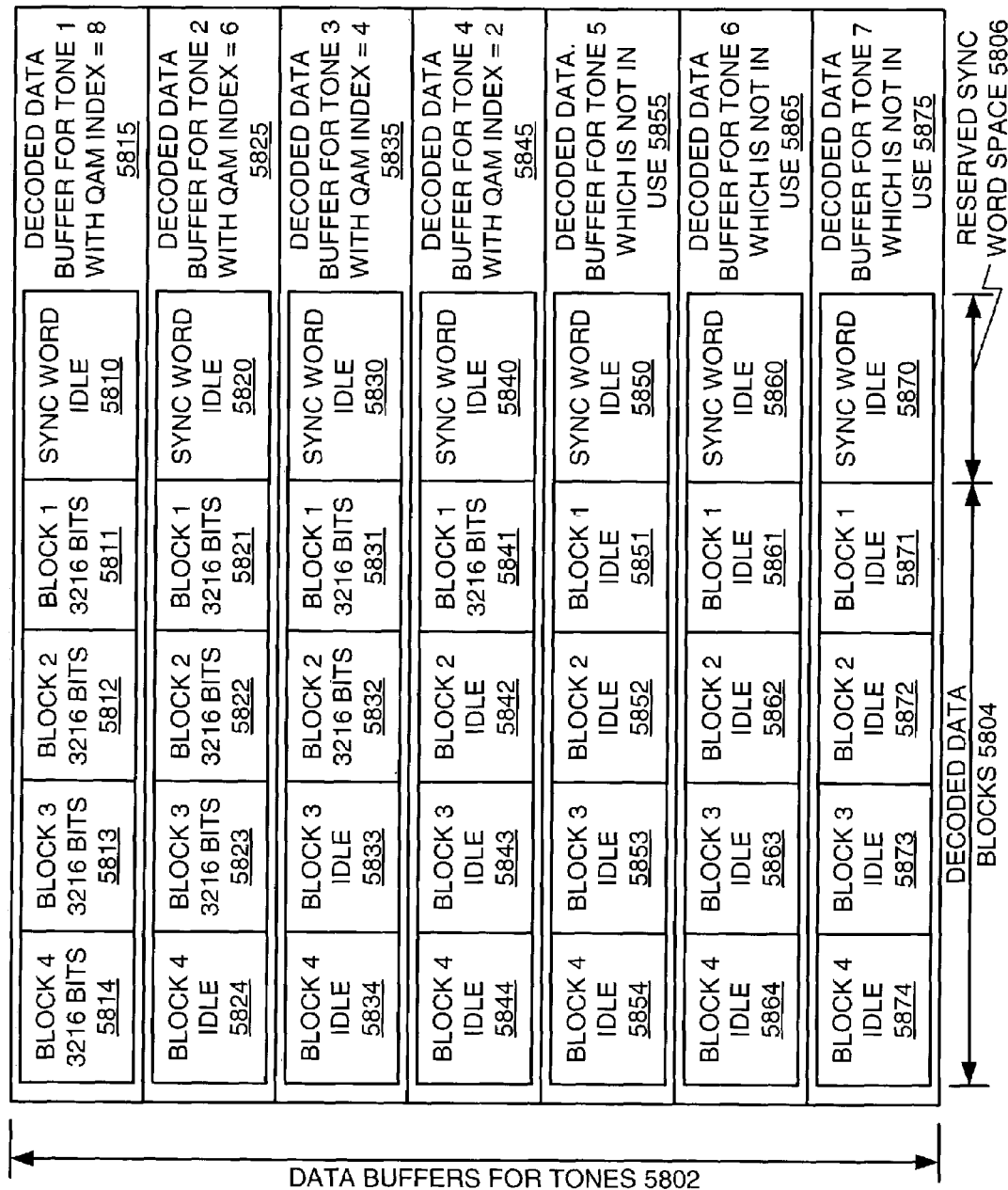

In FIG. 58, the rows 5802 specify the data buffers for the tones, while the columns generally specify either the decoded data blocks 5804 or the reserved sync word space 5806. The decoded data buffer for tone 1 5815 includes sync word 5810, block 1 5811, block 2 5812, block 3 5813, and block 4 5814. The decoded data buffer for tone 2 5825 includes sync word 5820, block 1 5821, block 2 5822, block 3 5823, and block 4 5824. The decoded data buffer for tone 3 5835 includes sync word 5830, block 1 5831, block 2 5832, block 3 5833, and block 4 5834. The decoded data buffer for tone 4 5845 includes sync word 5840, block 1 5841, block 2 5842, block 3 5843, and block 4 5844. The decoded data buffer for tone 5 5855 includes sync word 5850, block 1 5851, block 2 5852, block 3 5853, and block 4 5854. The decoded data buffer for tone 6 5865 includes sync word 5860, block 1 5861, block 2 5862, block 3 5863, and block 4 5864. The decoded data buffer for tone 7 5875 includes sync word 5870, block 1 5871, block 2 5872, block 3 5873, and block 4 5874. Some of the blocks contain data, while others are idle. The decoded data blocks are 3216 bits each.

Figure 59:
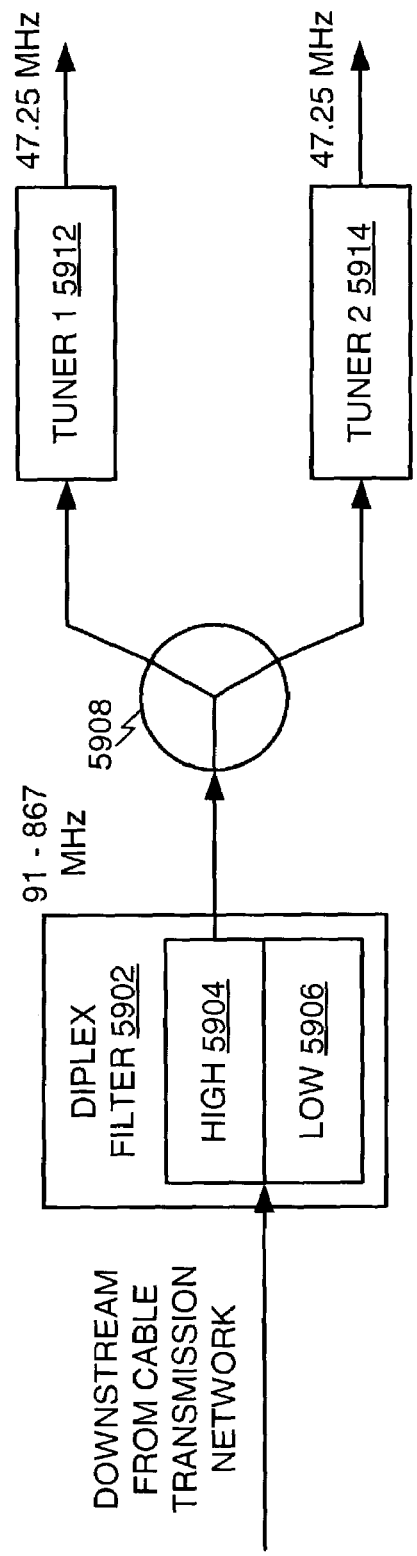
FIG. 59 shows a block diagram of downstream RF reception in a cTM.

Client Transport Modem (cTM) and Transport Modem Termination System (TMTS) Physical Medium Dependent (PMD) Sublayer FIG. 59 shows the downstream RF reception of a cTM. In the preferred embodiments, each cTM supports at least two downstream 6 MHz channel tuners 5912, 5914, and 5916 which are connected through splitter 5908 to diplex filter 5902. Diplex filter 5902 generally separates the upstream and downstream channels. In FIG. 59, the high portion 5904 of diplex filter 5902 handles the downstream channels.

Figure 60:
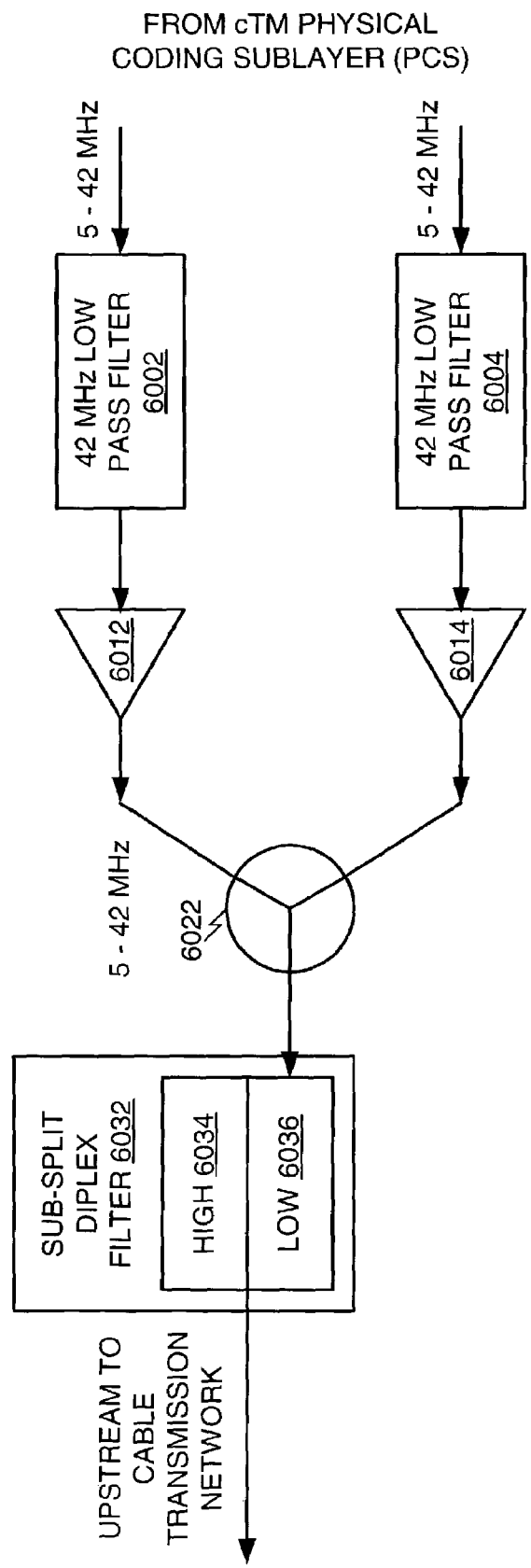
FIG. 60 shows a block diagram of the upstream RF transmission from a cTM in sub-split operation.

FIG. 60 shows the upstream RF transmission of a cTM in a sub-split configuration. In the preferred embodiments of the present invention, each cTM supports at least two 6 MHz upstream channels with each upstream channel being input to one of the 42 MHz low pass filters 6002, 6004, and 6006. The outputs of the low pass filters 6002, 6004, and 6006 are passed to amplifiers 6012, 6014, and 6016 respectively. The signals of the various amplifiers are combined in combiners 6022 and are in the range of 5–42 MHz. The low portion 6036 of sub-split diplex filter 6032 is used for upstream transmission.

Figure 61:
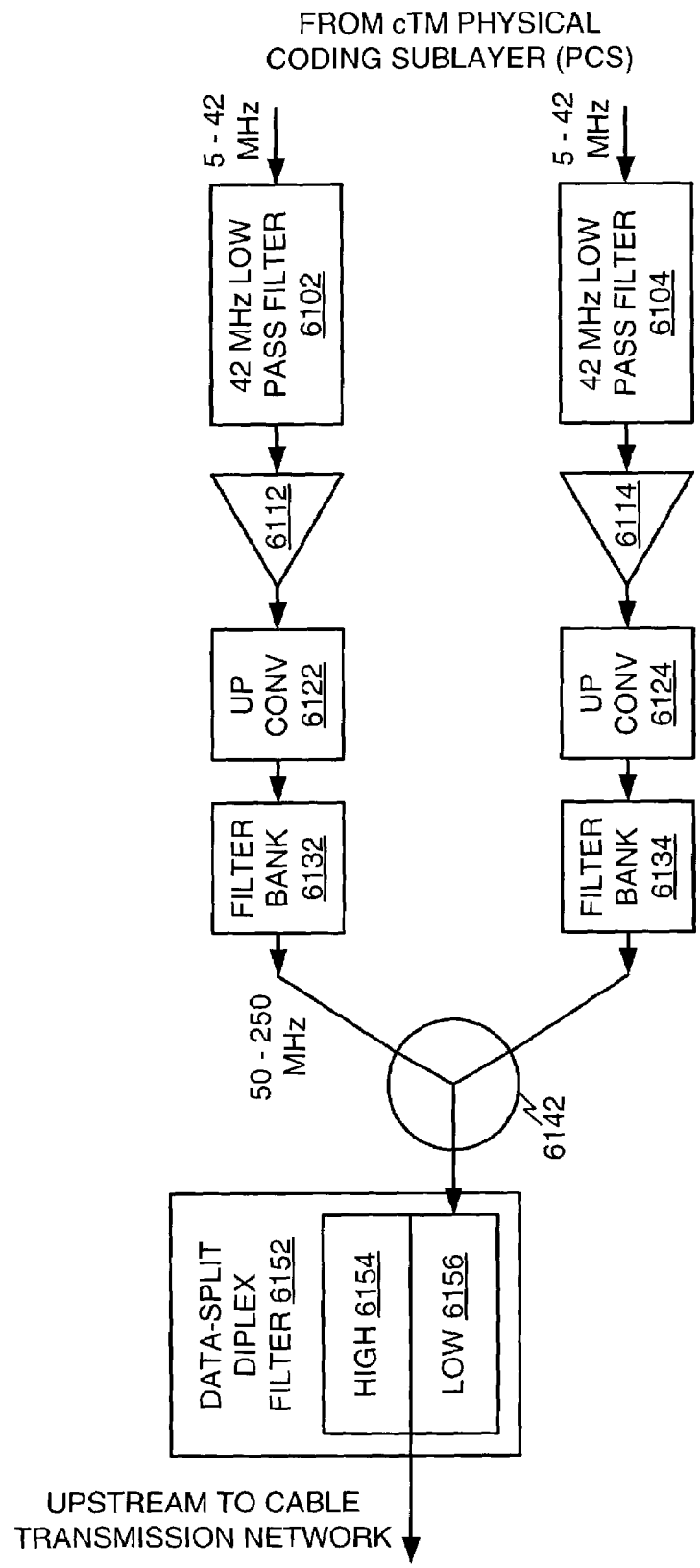
FIG. 61 shows a block diagram of the upstream RF transmission from a cTM in data-split operation.
Figure 63:
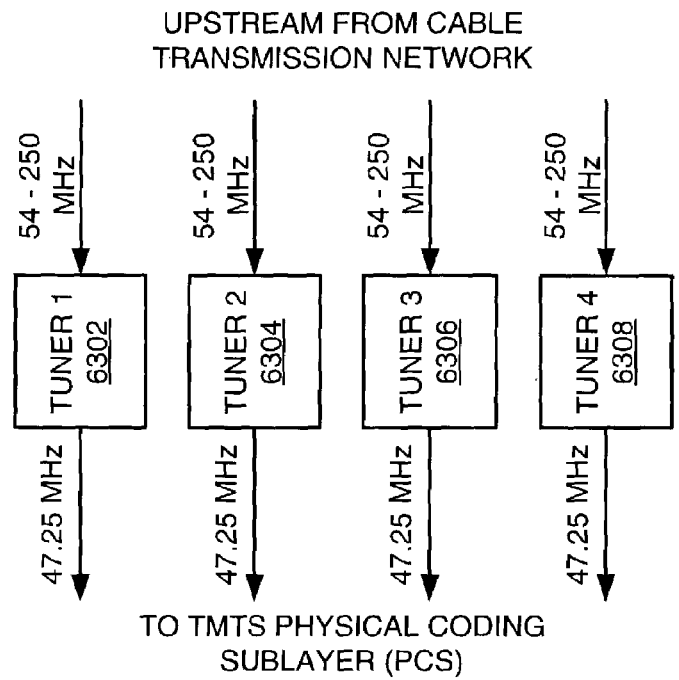
FIG. 63 shows a block diagram of the upstream RF reception in a TMTS in data-split operation.

FIG. 61 shows the upstream RF transmission of a cTM in a data-split configuration. In the preferred embodiments of the present invention, each cTM supports at least two 6 MHz upstream channels with each upstream channel being input to one of the 42 MHz low pass filters 6102, 6104, and 6106. The outputs of the low pass filters 6102, 6104, and 6016 are passed to amplifiers 6112, 6114, and 6116 respectively. Unlike the sub-split case, the data-split configuration upconverts the signals to a frequency in the range 50 to 250 MHz in upconverters 6122, 6124, and 6126. The signals go through filter banks 6132, 6134, and 6136 before being combined in combiner 6142. The low portion 6156 of sub-split diplex filter 6152 is used for upstream transmission.

Figure 62:
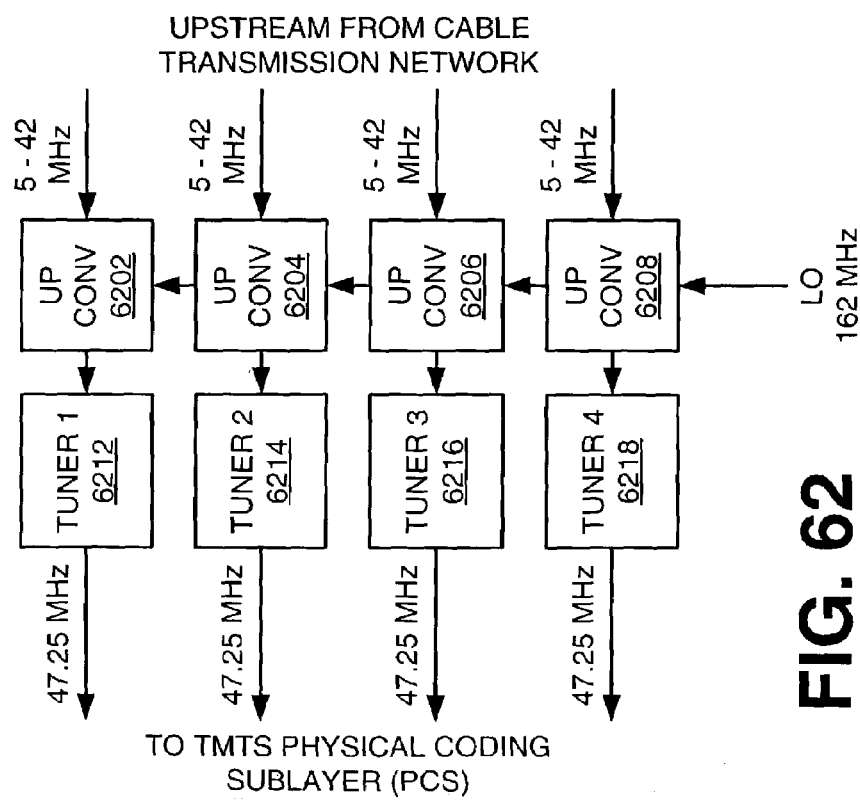
FIG. 62 shows a block diagram of the upstream RF reception in a TMTS in sub-split operation.

FIG. 62 shows the upstream RF reception at a TMTS in the sub-split case. In general, a TMTS supports four upstream 6 MHz frequency channels in the preferred embodiments of the present invention. In the sub-split case, the incoming spectrum is upconverted in upconverters 6202, 6204, 6206, and 6208 prior to single tuner conversion in tuners 6212, 6214, 6216, and 6218. This upconversion places the upstream spectrum in the tuners' receiving range of 54 to 858 MHz for the preferred embodiments of the present invention. A tuner (6212, 6214, 6216, and 6218) selects one 6 MHz channel and down converts it to an intermediate frequency (IF). In the preferred embodiments of the present invention, the upconverters 6202, 6204, 6206, 6208 have a local oscillator (LO) input of 162 MHz.

FIG. 62 shows the upstream RF reception at a TMTS in the data-split case. In general, a TMTS supports four upstream 6 MHz frequency channels in the preferred embodiments of the present invention. In the data-split case, upconverters are not needed because the signals may be fed directly into tuners 6302, 6304, 6306, and 6308.

Furthermore, one skilled in the art will be aware that the sub-split configuration of North American cable systems commonly uses 5–42 MHz. One skilled in the art will realize that the concepts of the preferred embodiments of the present invention also will work with a frequency range of 5–65 MHz, which is often found in many international cable systems, and will work in other frequency ranges that may or may not be used in cable systems. Thus, one skilled in the art will be aware that the use of 5–42 MHz in FIGS. 59–63 is only a non-limiting example of the preferred embodiments of the present invention, and that the concepts of the preferred embodiments of the present invention also will work with other frequency ranges. Furthermore, the number of tuners and/or transmitters shown in FIGS. 59–63 is only a non-limiting example of the preferred embodiments of the present invention. One skilled in the art will recognize that the concepts of the preferred embodiments of the present invention can be scaled to utilize any number (from one to infinity) of frequency channels. Actual implementations of preferred embodiments of the present invention generally would be built with a number of tuners and/or transmitters based upon expected customer demands as well as the costs of adding additional hardware, logic, and/or circuitry to support the additional tuners and/or transmitters in a TMTS and/or a cTM.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, at least the following is claimed:

1. A method of providing automatic frequency control of a plurality of frequency channels, the method comprising the steps of:
    demodulating the plurality of frequency channels to produce a plurality of data streams and a plurality of per-channel frequency errors, each error associated with one of the plurality of frequency channels;
    determining an average frequency error of the plurality of per-channel frequency errors; and
    adjusting at least one oscillator to reduce the average frequency error.

2. The method of claim 1, wherein the plurality of frequency channels comprise at least one active frequency channel and at least one inactive frequency channel, and wherein the step of determining the average frequency error excludes the at least one inactive frequency channel from determination of the average frequency error.

3. The method of claim 2, wherein the at least one active frequency channel further comprises a plurality of active frequency channels, and wherein each of the plurality of active frequency channels have an associated frequency channel oscillator.

4. The method of claim 3, wherein at least one of the associated frequency channel oscillators utilizes at least one wave table.

5. The method of claim 1, wherein the at least one oscillator comprises at least one master oscillator that is adjusted based on the average frequency error.

6. The method of claim 5, wherein the master oscillator utilizes at least one wave table.

7. A device that provides automatic frequency control of a plurality of frequency channels, the device comprising:
    logic configured to demodulate the plurality of frequency channels to produce a plurality of data streams and a plurality of per-channel frequency errors, each error associated with one of the plurality of frequency channels;
    logic configured to determine an average frequency error of the plurality of per-channel frequency errors; and
    logic configured to adjust at least one oscillator to reduce the average frequency error.

8. The device of claim 7, wherein the plurality of frequency channels comprise at least one active frequency channel and at least one inactive frequency channel, and wherein the logic configured to determine the average frequency error excludes the at least one inactive frequency channel from determination of the average frequency error.

9. The device of claim 8, wherein the at least one active frequency channel further comprises a plurality of active frequency channels, and wherein each of the plurality of active frequency channels have an associated frequency channel oscillator.

10. The device of claim 9, wherein at least one of the associated frequency channel oscillators utilizes at least one wave table.

11. The device of claim 7, wherein the at least one oscillator comprises at least one master oscillator that is adjusted based on the average frequency error.

12. The device of claim 11, wherein the master oscillator utilizes at least one wave table.

13. A method of providing automatic frequency control of a plurality of frequency sub-channels residing within a frequency channel, the method comprising the steps of:
    demodulating the plurality of frequency channels to produce a plurality of data streams and a plurality of per-subchannel frequency errors, each error associated with one of the plurality of frequency sub-channels;
    determining an average frequency error of the plurality of per-subchannel frequency errors; and
    adjusting at least one oscillator to reduce the average frequency error.

14. The method of claim 13, wherein the plurality of frequency sub-channels comprise a first active frequency sub-channel and a second inactive frequency sub-channel, and wherein the step of determining the average frequency error excludes the first one inactive frequency sub-channel from determination of the average frequency error.

15. The method of claim 14, wherein the first active frequency sub-channel further comprises a plurality of active frequency sub-channels, and wherein each of the plurality of active frequency sub-channels have an associated frequency sub-channel oscillator.

16. The method of claim 15, wherein at least one of the associated frequency sub-channel oscillators utilizes at least one wave table.

17. The method of claim 13, wherein the at least one oscillator comprises at least one master oscillator that is adjusted based on the average frequency error.

18. The method of claim 17, wherein the master oscillator utilizes at least one wave table.

* * * * *